US006456022B1

(12) United States Patent
Fitzgibbon et al.

(10) Patent No.: US 6,456,022 B1
(45) Date of Patent: Sep. 24, 2002

(54) MOVABLE BARRIER OPERATOR

(75) Inventors: James J. Fitzgibbon, Streamwood, IL (US); Paul E. Wanis, San Diego, CA (US); Colin B. Willmott, Buffalo Grove, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 0 days.

(21) Appl. No.: 09/536,428

(22) Filed: Mar. 27, 2000

Related U.S. Application Data

(62) Division of application No. 09/161,840, filed on Sep. 28, 1998, now Pat. No. 6,172,475.

(51) Int. Cl.[7] .......... B23Q 35/00

(52) U.S. Cl. .......... 318/162; 318/163; 388/904

(58) Field of Search .......... 318/255, 256, 318/257, 264, 265, 266, 268, 461, 466, 468, 162, 163, 164; 49/25, 26, 28, 31; 388/904

(56) References Cited

U.S. PATENT DOCUMENTS

| | | | |
|---|---|---|---|
| 2,268,133 A | 12/1941 | Carlson | 250/233 |
| 3,147,001 A | 9/1964 | Purdy | 268/59 |

(List continued on next page.)

FOREIGN PATENT DOCUMENTS

| | | | |
|---|---|---|---|
| DE | 297 06 251 | 10/1997 | G08C/17/00 |
| EP | 0 280 854 | 9/1988 | E05F/15/16 |
| EP | 0 544 262 | 6/1993 | E05F/15/00 |
| EP | 0 767 288 | 4/1997 | E05F/15/20 |
| EP | 0 771 923 | 5/1997 | E05F/15/02 |
| EP | 0 786 848 | 7/1997 | H03M/1/66 |
| GB | 2 122 382 | 1/1984 | E05F/15/10 |
| GB | 2 245 389 | 1/1992 | E05F/15/20 |
| WO | WO 90/10776 | 9/1990 | E05F/15/20 |

*Primary Examiner*—Bentsu Ro
(74) *Attorney, Agent, or Firm*—Fitch, Even, Tabin & Flannery

(57) ABSTRACT

A movable barrier operator having improved safety and energy efficiency features automatically detects line voltage frequency and uses that information to set a worklight shut-off time. The operator automatically detects the type of door (single panel or segmented) and uses that information to set a maximum speed of door travel. The operator moves the door with a linearly variable speed from start of travel to stop for smooth and quiet performance. The operator provides for full door closure by driving the door into the floor when the DOWN limit is reached and no auto-reverse condition has been detected. The operator provides for user selection of a minimum stop speed for easy starting and stopping of sticky or binding doors.

15 Claims, 45 Drawing Sheets

U.S. PATENT DOCUMENTS

| | | | | | |
|---|---|---|---|---|---|
| 3,262,105 | A | | 7/1966 | Bell | 340/203 |
| 3,654,480 | A | | 4/1972 | Stephenson | 250/231 |
| 4,064,404 | A | | 12/1977 | Wilmott et al. | 307/141.4 |
| 4,234,833 | A | * | 11/1980 | Barrett | 318/282 |
| 4,263,536 | A | | 4/1981 | Lee et al. | 318/266 |
| 4,348,625 | A | | 9/1982 | Sharp | 318/757 |
| 4,365,250 | A | | 12/1982 | Matsouka et al. | 340/825.32 |
| 4,369,399 | A | | 1/1983 | Lee et al. | 318/467 |
| 4,467,249 | A | | 8/1984 | Swearingen, Jr. | 318/282 |
| 4,565,029 | A | | 1/1986 | Kornbrekke et al. | 49/25 |
| 4,567,411 | A | | 1/1986 | Reimann et al. | 318/341 |
| 4,597,428 | A | | 7/1986 | Iha | 160/188 |
| 4,625,291 | A | | 11/1986 | Hormann | 364/550 |
| 4,638,433 | A | | 1/1987 | Schindler | 364/400 |
| 4,673,848 | A | | 6/1987 | Hagiwara et al. | 318/266 |
| 4,726,247 | A | | 2/1988 | Hormann | 74/424.6 |
| 4,727,679 | A | | 3/1988 | Kornbrekke et al. | 49/138 |
| 4,775,823 | A | | 10/1988 | Yoshida et al. | 318/266 |
| 4,868,409 | A | | 9/1989 | Tanaka et al. | 307/10.5 |
| 4,888,531 | A | | 12/1989 | Hörmann | 318/282 |
| 4,916,860 | A | | 4/1990 | Richmond et al. | 49/28 |
| 4,922,168 | A | | 5/1990 | Waggamon et al. | 318/286 |
| 4,952,080 | A | | 8/1990 | Boiucaner et al. | 388/811 |
| 5,076,012 | A | | 12/1991 | Richmond et al. | 49/28 |
| 5,136,809 | A | | 8/1992 | Richmond et al. | 49/28 |
| 5,137,500 | A | * | 8/1992 | Lhotak | 474/152 |
| 5,189,412 | A | | 2/1993 | Mehta et al. | 340/825.22 |
| 5,226,257 | A | | 7/1993 | Moss | 49/13 |
| 5,233,185 | A | | 8/1993 | Whitaker | 250/222.1 |
| 5,235,494 | A | | 8/1993 | Chang et al. | 361/736 |
| 5,241,873 | A | | 9/1993 | Hörmann | 74/424.6 |
| 5,278,480 | A | | 1/1994 | Murray | 318/626 |
| 5,282,337 | A | | 2/1994 | Duhame et al. | 49/199 |
| 5,357,183 | A | | 10/1994 | Lin | 318/468 |
| 5,412,297 | A | | 5/1995 | Clark et al. | 318/468 |
| 5,470,185 | A | | 11/1995 | Tsubota et al. | 414/264 |
| 5,576,701 | A | | 11/1996 | Heitschel et al. | 340/825.31 |
| 5,589,747 | A | | 12/1996 | Utke | 318/468 |
| 5,596,840 | A | | 1/1997 | Teich | 49/26 |
| 5,625,980 | A | | 5/1997 | Teich et al. | 49/26 |
| 5,656,900 | A | | 8/1997 | Michel et al. | 286/286 |
| 5,661,804 | A | | 8/1997 | Dykema et al. | 380/21 |
| 5,699,055 | A | | 12/1997 | Dykema et al. | 340/825.22 |
| 5,774,065 | A | | 6/1998 | Mabuchi et al. | 340/825.72 |
| 5,793,300 | A | | 8/1998 | Suman et al. | 340/825.2 |
| 5,903,226 | A | | 5/1999 | Suman et al. | 340/825.69 |
| 5,929,580 | A | * | 7/1999 | Mullet et al. | 318/466 |
| 6,091,217 | A | | 7/2000 | Parsadayan | 318/285 |
| 6,172,475 | B1 | | 1/2001 | Fitzgibbion et al. | |
| 6,229,276 | B1 | | 5/2001 | Fitgibbon et al. | |
| 6,239,569 | B1 | | 5/2001 | Fitgibbon et al. | |
| 6,246,196 | B1 | | 6/2001 | Fitgibbon et al. | |
| 6,278,249 | B1 | | 8/2001 | Fitgibbon et al. | |

* cited by examiner

MOVABLE BARRIER OPERATOR

This is a division of prior application Ser. No. 09/161,840, filed Sep. 28, 1998, now U.S. Pat. No. 6,172,475, which is hereby incorporated herein by reference in its entirety.

This application contains two (2) identical compact discs (CD-ROMs) each containing a computer program listing appendix for the above-captioned application. These discs are in IBM-PC machine format and are MS-Windows operating system compatible. The file on each disc is named "codelisting.txt", is 207 KB in size and was created on Jan. 14, 2002.

BACKGROUND OF THE INVENTION

This invention relates generally to movable barrier operators for operating movable barriers or doors. More particularly, it relates to garage door operators having improved safety and energy efficiency features.

Garage door operators have become more sophisticated over the years providing users with increased convenience and security. However, users continue to desire further improvements and new features such as increased energy efficiency, ease of installation, automatic configuration, and aesthetic features, such as quiet, smooth operation.

In some markets energy costs are significant. Thus energy efficiency options such as lower horsepower motors and user control over the worklight functions are important to garage door operator owners. For example, most garage door operators have a worklight which turns on when the operator is commanded to move the door and shuts off a fixed period of time after the door stops. In the United States, an illumination period of 4½ minutes is considered adequate. In markets outside the United States, 4½ minutes is considered too long. Some garage door operators have special safety features, for example, which enable the worklight whenever the obstacle detection beam is broken by an intruder passing through an open garage door. Some users may wish to disable the worklight in this situation. There is a need for a garage door operator which can be automatically configured for predefined energy saving features, such as work light shut-off time.

Some movable barrier operators include a flasher module which causes a small light to flash or blink whenever the barrier is commanded to move. The flasher module provides some warning when the barrier is moving. There is a need for an improved flasher unit which provides even greater warning to the user when the barrier is commanded to move.

Another feature desired in many markets is a smooth, quiet motor and transmission. Most garage door operators have AC motors because they are less expensive than DC motors. However, AC motors are generally noisier than DC motors.

Most garage door operators employ only one or two speeds of travel. Single speed operation, i.e., the motor immediately ramps up to full operating speed, can create a jarring start to the door. Then during closing, when the door approaches the floor at full operating speed, whether a DC or AC motor is used, the door closes abruptly with a high amount of tension on it from the inertia of the system. This jarring is hard on the transmission and the door and is annoying to the user.

If two operating speeds are used, the motor would be started at a slow speed, usually 20 percent of full operating speed, then after a fixed period of time, the motor speed would increase to full operating speed. Similarly, when the door reaches a fixed point above/below the close/open limit, the operator would decrease the motor speed to 20 percent of the maximum operating speed. While this two speed operation may eliminate some of the hard starts and stops, the speed changes can be noisy and do not occur smoothly, causing stress on the transmission. There is a need for a garage door operator which opens the door smoothly and quietly, with no abruptly apparent sign of speed change during operation.

Garage doors come in many types and sizes and thus different travel speeds are required for them. For example, a one-piece door will be movable through a shorter total travel distance and need to travel slower for safety reasons than a segmented door with a longer total travel distance. To accommodate the two door types, many garage door operators include two sprockets for driving the transmission. At installation, the installer must determine what type of door is to be driven, then select the appropriate sprocket to attach to the transmission. This takes additional time and if the installer is the user, may require several attempts before matching the correct sprocket for the door. There is a need for a garage door operator which automatically configures travel speed depending on size and weight of the door.

National safety standards dictate that a garage door operator perform a safety reversal (auto-reverse) when an object is detected only one inch above the DOWN limit or floor. To satisfy these safety requirements, most garage door operators include an obstacle detection system, located near the bottom of the door travel. This prevents the door from closing on objects or persons that may be in the door path. Such obstacle detection systems often include an infrared source and detector located on opposite sides of the door frame. The obstacle detector sends a signal when the infrared beam between the source and detector is broken, indicating an obstacle is detected. In response to the obstacle signal, the operator causes an automatic safety reversal. The door stops and begins traveling up, away from the obstacle.

There are two different "forces" used in the operation of the garage door operator. The first "force" is usually preset or setable at two force levels: the UP force level setting used to determine the speed at which the door travels in the UP direction and the DOWN force level setting used to determine the speed at which the door travels in the DOWN direction. The second "force" is the force level determined by the decrease in motor speed due to an external force applied to the door, i.e., from an obstacle or the floor. This external force level is also preset or setable and is any set-point type force against which the feedback force signal is compared. When the system determines the set point force has been met, an auto-reverse or stop is commanded.

To overcome differences in door installations, i.e. stickiness and resistance to movement and other varying frictional-type forces, some garage door operators permit the maximum force (the second force) used to drive the speed of travel to be varied manually. This, however, affects the system's auto-reverse operation based on force. The auto-reverse system based on force initiates an auto-reverse if the force on the door exceeds the maximum force setting (the second force) by some predetermined amount. If the user increases the force setting to drive the door through a "sticky" section of travel, the user may inadvertently affect the force to a much greater value than is safe for the unit to operate during normal use. For example, if the DOWN force setting is set so high that it is only a small incremental value less than the force setting which initiates an auto-reverse due to force, this causes the door to engage objects at a higher speed before reaching the auto-reverse force setting. While the obstacle detection system will cause the door to autoreverse, the speed and force at which the door hits the obstacle may cause harm to the obstacle and/or the door.

Barrier movement operators should perform a safety reversal off an obstruction which is only marginally higher than the floor, yet still close the door safely against the floor. In operator systems where the door moves at a high speed, the relatively large momentum of the moving parts, including the door, accomplishes complete closure. In systems with a soft closure, where the door speed decreases from full maximum to a small percentage of full maximum when closing, there may be insufficient momentum in the door or system to accomplish a full closure. For example, even if the door is positioned at the floor, there is sometimes sufficient play in the trolley of the operator to allow the door to move if the user were to try to open it. In particular, in systems employing a DC motor, when the DC motor is shut off, it becomes a dynamic brake. If the door isn't quite at the floor when the DOWN travel limit is reached and the DC motor is shut off, the door and associated moving parts may not have sufficient momentum to overcome the braking force of the DC motor. There is a need for a garage door operator which closes the door completely, eliminating play in the door after closure.

Many garage door operator installations are made t o existing garage doors. The amount of force needed to, drive the door varies depending on type of door and the quality of the door frame and installation. As a result, some doors are "stickier" than others, requiring greater force to move them through the entire length of travel. If the door is started and stopped using the full operating speed, stickiness is not usually a problem. However, if the garage door operator i s capable of operation at two speeds, stickiness becomes a larger problem at the lower speed. In some installations, a force sufficient to run at 20 percent of normal speed is too small to start some doors moving. There is a need for a garage door operator which automatically controls force output and thus start and stop speeds.

SUMMARY OF THE INVENTION

A movable barrier operator having an electric motor for driving a garage door, a gate or other barrier is operated from a source of AC current. The movable barrier operator includes circuitry for automatically detecting the incoming AC line voltage and frequency of the alternating current. By automatically detecting the incoming AC line voltage and determining the frequency, the operator can automatically configure itself to certain user preferences. This occurs without either the user or the installer having to adjust or program the operator. The movable barrier operator includes a worklight for illuminating its immediate surroundings such as the interior of a garage. The barrier operator senses the power line frequency (typically 50 Hz or 60 Hz) to automatically set an appropriate shut-off time for a worklight. Because the power line frequency in Europe is 50 Hz and in the U.S. is 60 Hz, sensing the power line frequency enables the operator to configure itself for either a European or a U.S. market with no user or installer modifications. For U.S. users, the worklight shut-off time is set to preferably 4½ minutes; for European users, the worklight shut-off time is set to preferably 2½ minutes. Thus, a single barrier movement operator can be sold in two different markets with automatic setup, saving installation time.

The movable barrier operator of the present invention automatically detects if an optional flasher module is present. If the module is present, when the door is commanded to move, the operator causes the flasher module to operate. With the flasher module present, the operator also delays operation of the motor for a brief period, say one or two seconds. This delay period with the flasher module blinking before door movement provides an added safety feature to users which warns them of impending door travel (e.g. if activated by an unseen transmitter).

The movable barrier operator of the present invention drives the barrier, which may be a door or a gate, at a variable speed. After motor start, the electric motor reaches a preferred initial speed of 20 percent of the full operating speed. The motor speed then increases slowly in a linearly continuous fashion from 20 percent to 100 percent of full operating speed. This provides a smooth, soft start without jarring the transmission or the door or gate. The motor moves the barrier at maximum speed for the largest portion of its travel, after which the operator slowly decreases speed from 100 percent to 20 percent as the barrier approaches the limit of travel, providing a soft, smooth and quiet stop. A slow, smooth start and stop provides a safer barrier movement operator for the user because there is less momentum to apply an impulse force in the event of an obstruction. In a fast system, relatively high momentum of the door changes to zero at the obstruction before the system can actually detect the obstruction. This leads to the application of a high impulse force. With the system of the invention, a slower stop speed means the system has less momentum to overcome, and therefore a softer, more forgiving force reversal. A slow, smooth start and stop also provide a more aesthetically pleasing effect to the user, and when coupled with a quieter DC motor, a barrier movement operator which operates very quietly.

The operator includes two relays and a pair of field effect transistors (FETs) for controlling the motor. The relays are used to control direction of travel. The FET's, with phase controlled, pulse width modulation, control start up and speed. Speed is responsive to the duration of the pulses applied to the FETs. A longer pulse causes the FETs to be on longer causing the barrier speed to increase. Shorter pulses result in a slower speed. This provides a very fine ramp control and more gentle starts and stops.

The movable barrier operator provides for the automatic measurement and calculation of the total distance the door is to travel. The total door travel distance is the distance between the UP and the DOWN limits (which depend on the type of door). The automatic measurement of door travel distance is a measure of the length of the door. Since shorter doors must travel at slower speeds than normal doors (for safety reasons), this enables the operator to automatically adjust the motor speed so the speed of door travel is the same regardless of door size. The total door travel distance in turn determines the maximum speed at which the operator will travel. By determining the total distance traveled, travel speeds can be automatically changed without having to modify the hardware.

The movable barrier operator provides full door or gate closure, i.e. a firm closure of the door to the floor so that the door is not movable in place after it stops. The operator includes a digital control or processor, specifically a microcontroller which has an internal microprocessor, an internal RAM and an internal ROM and an external EEPROM. The microcontroller executes instructions stored in its internal ROM and provides motor direction control signals to the relays and speed control signals to the FETs. The Operator is first operated in a learn mode to store a DOWN limit position for the door. The DOWN limit position of the door is used as an approximation of the location of the floor (or as a minimum reversal point, below which no auto-reverse will occur). When the door reaches the DOWN limit position, the microcontroller causes the electric motor to drive the door past the DOWN limit a small distance, say for one or two inches. This causes the door to close solidly on the floor.

The operator embodying the present invention provides variable door or gate output speed, i.e., the user can vary the minimum speed at which the motor starts and stops the door. This enables the user to overcome differences in door installations, i.e. stickiness and resistance to movement and other varying functional-type forces. The minimum barrier speeds in the UP and DOWN directions are determined by the user-configured force settings, which are adjusted using UP and DOWN force potentiometers. The force potentiometers set the lengths of the pulses to the FETs, which translate to variable speeds. The user gains a greater force output and a higher minimum starting speed to overcome differences in door installations, i.e. stickiness and resistance to movement and other varying functional-type forces speed, without affecting the maximum speed of travel for the door. The user can configure the door to start at a speed greater than a default value, say 20 percent. This greater start up and slow down speed is transferred to the linearly variable speed function in that instead of traveling at 20 percent speed, increasing to 100 percent speed, then decreasing to 20 percent speed, the door may, for instance, travel at 40 percent speed to 100 percent speed and back down to 40 percent speed.

DETAILED DESCRIPTION OF THE PREFERRED EMBODIMENT

Figure 1:
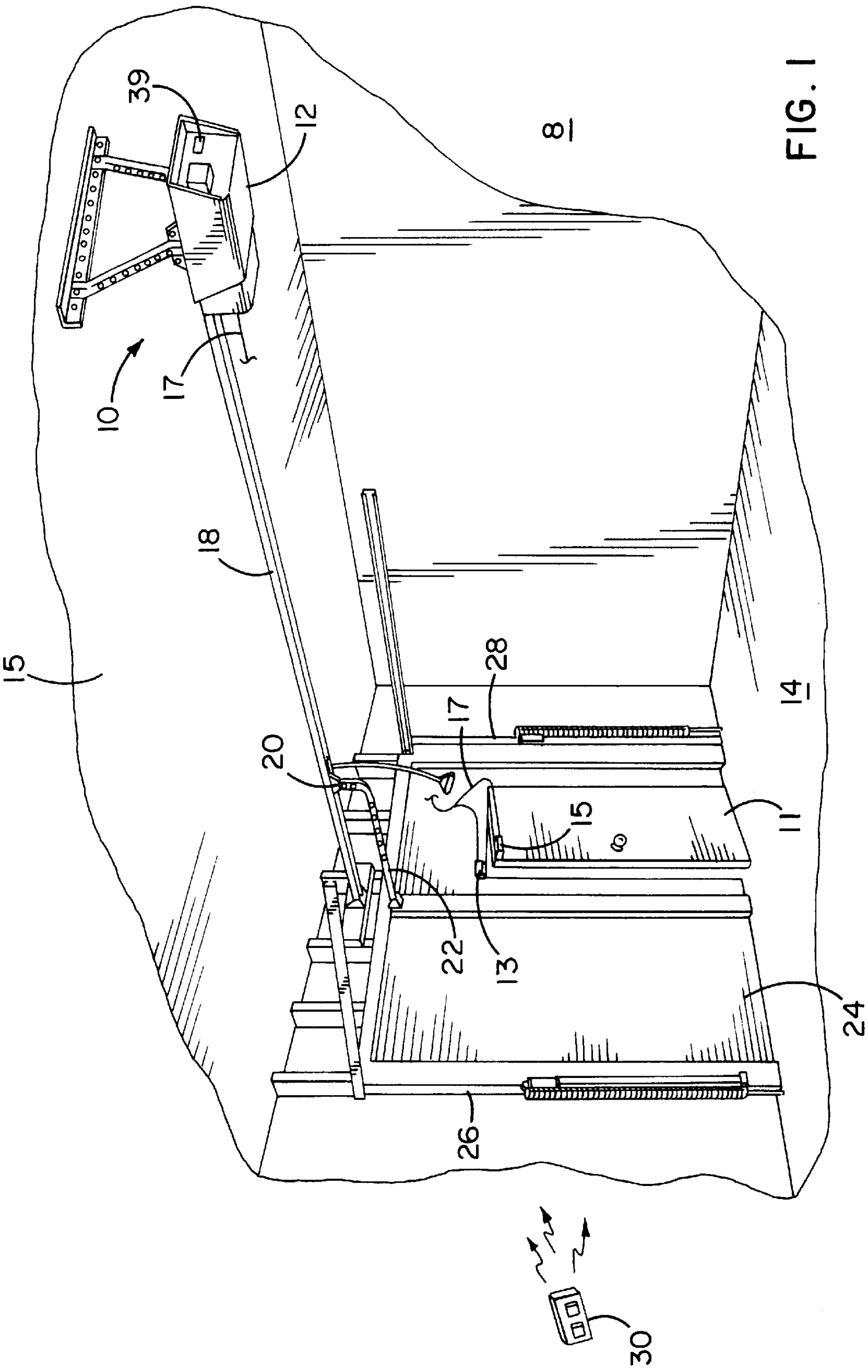
FIG. 1 is a perspective view of a garage having mounted within it a garage door operator embodying the present invention.

Referring now to the drawings and especially to FIG. 1, a movable barrier or garage door operator system is generally shown therein and referred to by numeral 8. The system 8 includes a movable barrier operator or garage door operator 10 having a head unit 12 mounted within a garage 14. More specifically, the head unit 12 is mounted to a ceiling 15 of the garage 14. The operator 10 includes a transmission 18 extending from the head unit 12 with a releasable trolley 20 attached. The releasable trolley 20 releasably connects an arm 22 extending to a single panel garage door 24 positioned for movement along a pair of door rails 26 and 28.

The system 8 includes a hand-held RF transmitter unit 30 adapted to send signals to an antenna 32 (see FIG. 4) positioned on the head unit 12 and coupled to,a receiver within the head unit 12 as will appear hereinafter. A switch module 39 is mounted on the head unit 12. Switch module 39 includes switches for each of the commands available from a remote transmitter or from an optional wall-mounted switch (not shown). Switch module 39 enables an installer to conveniently request the various learn modes during installation of the head unit 12. The switch module 39 includes a learn switch, a light switch, a lock switch and a command switch, which are described below. Switch module 39 may also include terminals for wiring a pedestrian door state sensor comprising a pair of contacts 13 and 15 for a pedestrian door 11, as well as wiring for an optional wall switch (not shown).

The garage door 24 includes the pedestrian door 11. Contact 13 is mounted to door 24 for contact with contact 15 mounted to pedestrian door 11. Both contacts 13 and 15 are connected via a wire 17 to head unit 12. As will be described further below, when the pedestrian door 11 is closed, electrical contact is made between the contacts 13 and 15 closing a pedestrian door circuit in the receiver in head unit 12 and signalling that the pedestriam door state is closed. This circuit must be closed before the receiver will permit other portions of the operator to move the door 24. If circuit in open, indicating that the pedestrian door state is open, the system will not permit door 24 to move.

Figure 2:
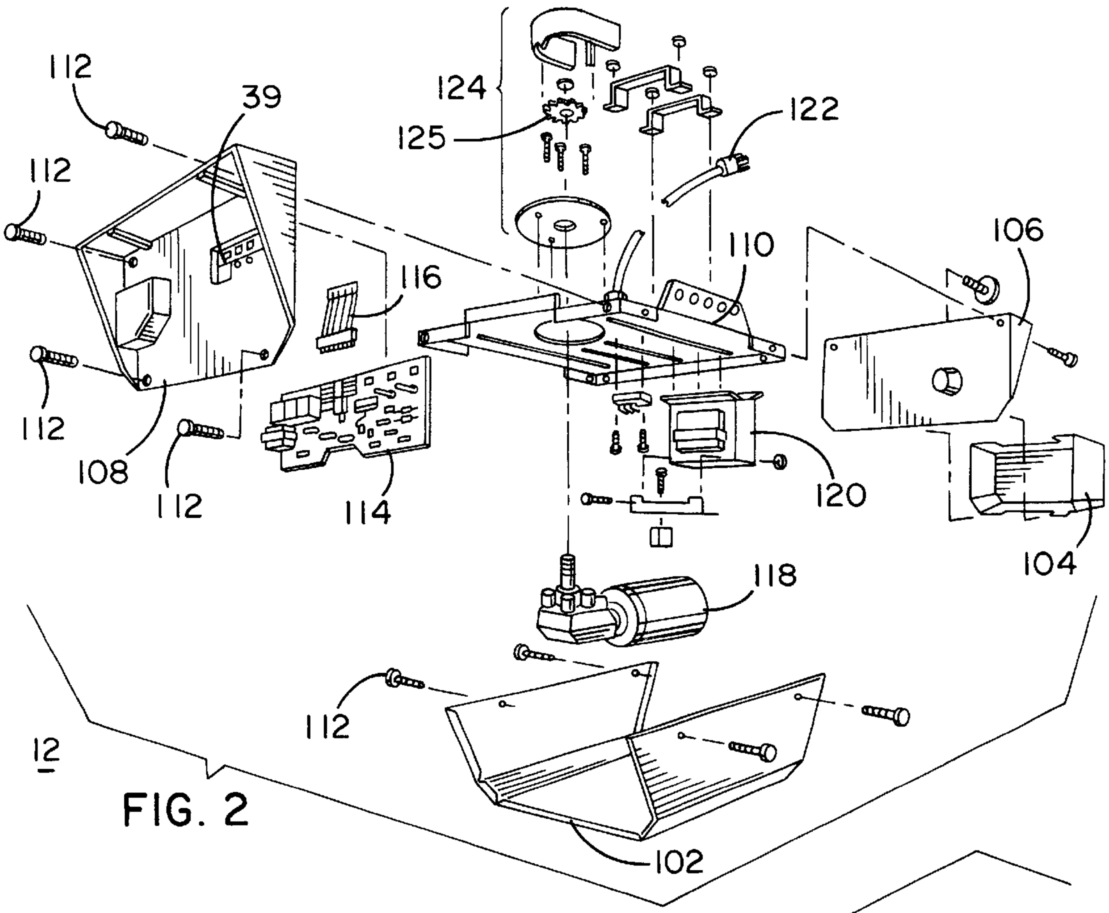
FIG. 2 is an exploded perspective view of a head unit of the garage door operator shown in FIG. 1.
Figure 3:
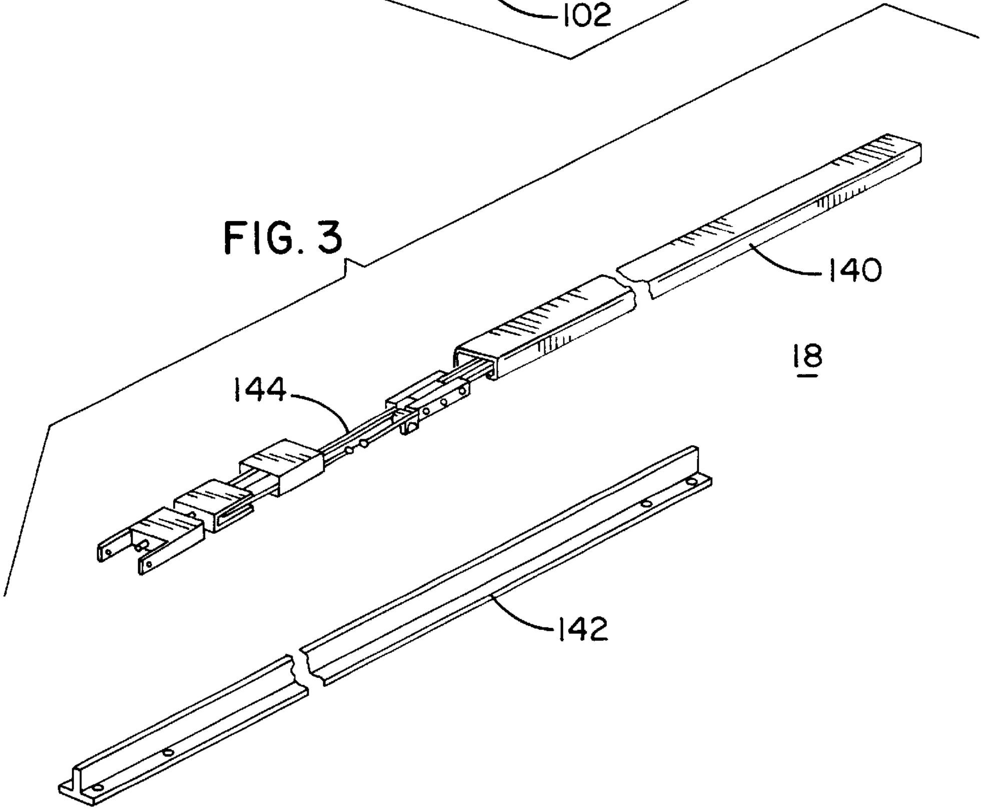
FIG. 3 is an exploded perspective view of a portion of a transmission unit of the garage door operator shown in FIG. 1.

The head unit 12 includes a housing comprising four sections: a bottom section 102, a front section 106, a back section 108 and a top section 110, which are held together by screws 112 as shown in FIG. 2. Cover 104 fits into front section 106 and provides a cover for a worklight. External AC power is supplied to the operator 10 through a power cord 112. The AC power is applied to a step-down transformer 120. An electric motor 118 is selectively energized by rectified AC power and drives a sprocket 125 in sprocket assembly 124. The sprocket 125 drives chain 144 (see FIG. 3). A printed circuit board 114 includes a controller 200 and other electronics for operating the head unit 12. A cable 116 provides input and output connections on signal paths between the printed circuit board 114 and switch module 39. The transmission 18, as shown in FIG. 3, includes a rail 142 which holds chain 144 within a rail and chain housing 140 and holds the chain in tension to transfer mechanical energy from the motor to the door.

Figure 4:
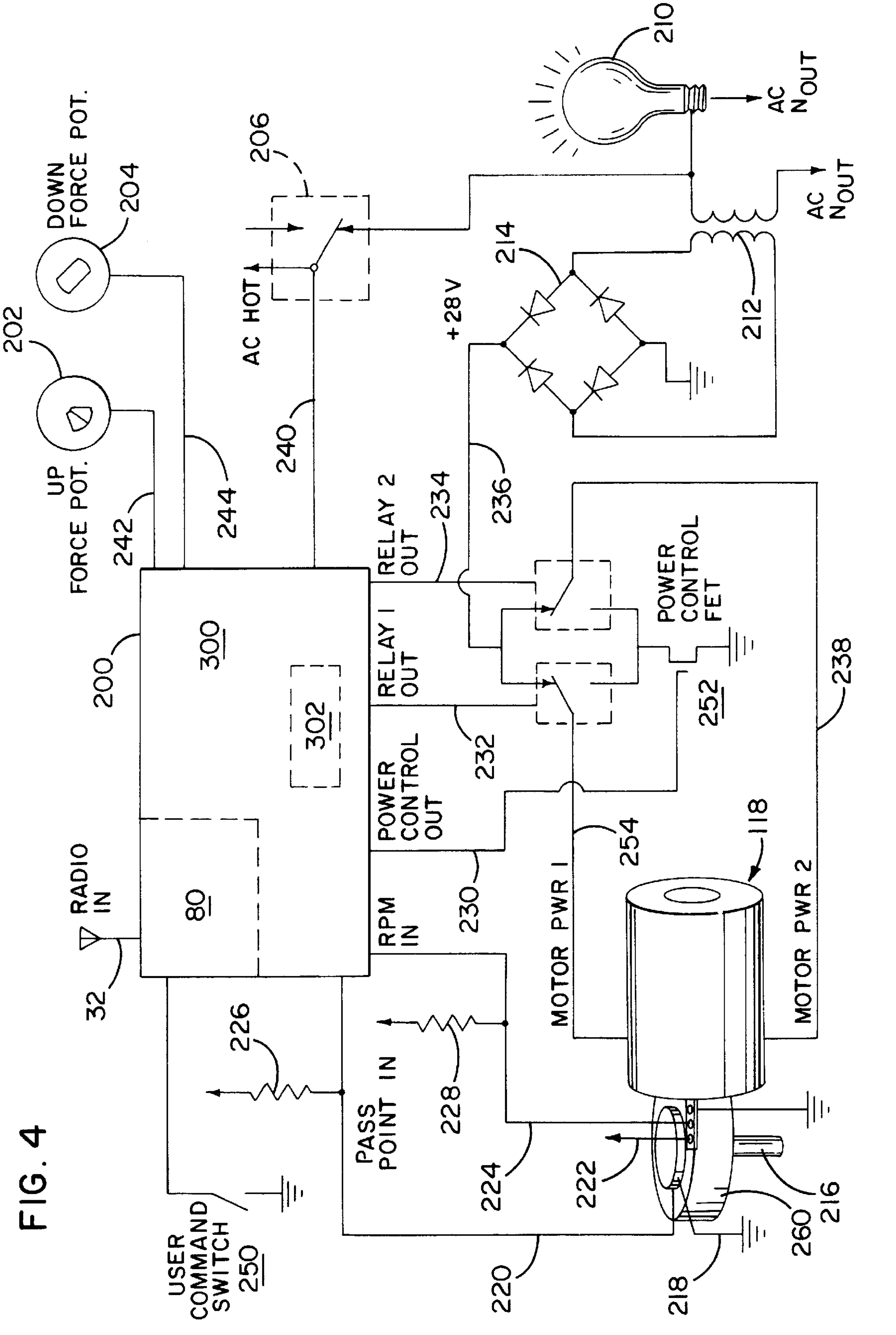
FIG. 4 is a block diagram of a controller and motor mounted within the head unit of the garage door operator shown in FIG. 1.

A block diagram of the controller and motor connections is shown in FIG. 4. Controller 200 includes an RF receiver 80, a microprocessor 300 and an EEPROM 302. RF receiver 80 of controller 200 receives a command to move the door and actuate the motor either from remote transmitter 30, which transmits an RF signal which is received by antenna 32, or from a user command switch 250. User command switch 250 can be a switch on switch panel 39, mounted on the head unit, or a switch from an optional wall switch. Upon receipt of a door movement command signal from either antenna 32 or user switch 250, the controller 200 sends a power enable signal via line 240 to AC hot connection 206 which provides AC line current to transformer 212 and power to work light 210. Rectified AC is provided from rectifier 214 via line 236 to relays 232 and 234. Depending on the commanded direction of travel, controller 200 provides a signal to either relay 232 or relay 234. Relays 232 and 234 are used to control the direction of rotation of motor 118 by controlling the direction of current flow through the windings. One relay is used for clockwise rotation; the other is used for counterclockwise rotation.

Upon receipt of the door movement command signal, controller 200 sends a signal via line 230 to power-control FET 252. Motor speed is determined by the duration or length of the pulses in the signal to a gate electrode of FET 252. The shorter the pulses, the slower the speed. This completes the circuit between relay 232 and FET 252 providing power to motor 118 via line 254. If the door had been commanded to move in the opposite direction, relay 234 would have been enabled, completing the circuit with FET 252 and providing power to motor 118 via line 238.

With power provided, the motor 118 drives the output shaft 216 which provides drive power to transmission sprocket 125. Gear reduction housing 260 includes an internal pass point system which sends a pass point signal via line 220 to controller 220 whenever the pass point is reached. The pass point signal is provided to controller 200 via current limiting resistor 226 to protect controller 200 from electrostatic discharge (ESD). An RPM interrupt signal is provided via line 224, via current limiting resistor 228, to controller 200. Lead 222 provides a plus five volts supply for the Hall effect sensors in the RPM module. Commanded force is input by two force potentiometers 202, 204. Force potentiometer 202 is used to set the commanded force for UP travel; force potentiometer 204 is used to set the commanded force for DOWN travel. Force potentiometers 202 and 204 provide commanded inputs to controller 200 which are used to adjust the length of-the pulsed signal provided to FET 252.

Figure 22A:
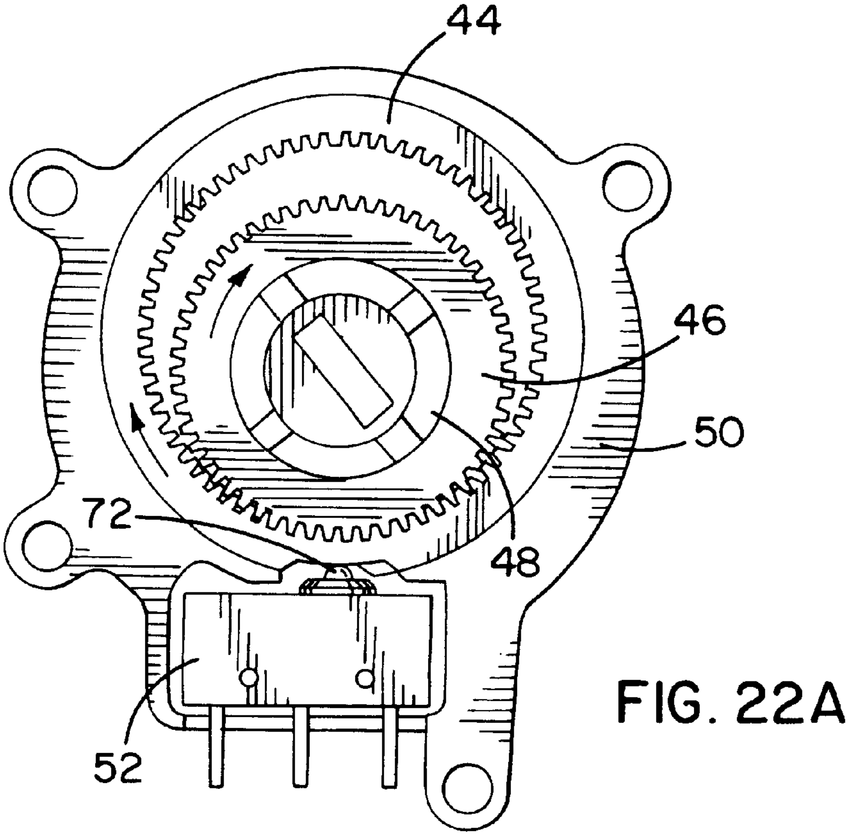
FIG. 22A is a plan view of the pass point detector shown in FIG. 21.
Figure 22B:
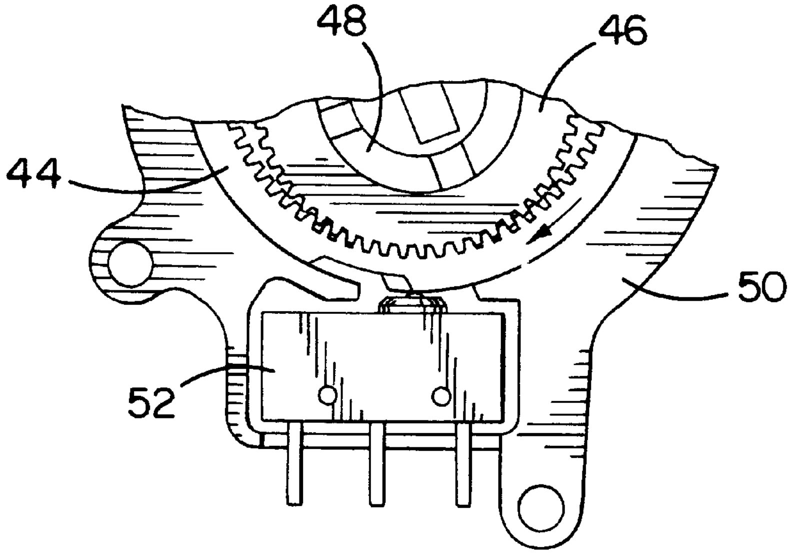
FIG. 22B is a partial plan view of the pass point detector shown in FIG. 21.

The pass point for this system is provided internally in the motor 118. Referring to FIG. 22, the pass point module 40 is attached to gear reduction housing 260 of motor 118. Pass point module 40 includes upper plate 42 which covers the three internal gears and switch within lower housing 50. Lower housing 50 includes recess 62 having two pins 61 which position switch assembly 52 in recess 62. Housing 50 also includes three cutouts which are sized to support and provide for rotation of the three geared elements. Outer gear 44 fits rotatably within cutout 64. Outer gear includes a smooth outer surface for rotating within housing 50 and inner gear teeth for rotating middle gear 46. Middle gear 46 fits rotatably within inner cutout 66. Middle gear 46 includes a smooth outer surface and a raised portion with gear teeth for being driven by the gear teeth of outer ring gear 44. Inner gear 48 fits within middle gear 46 and is driven by an extension of shaft 216. Rotation of the motor 118 causes shaft 216 to rotate and drive inner gear 48.

Outer gear 44 includes a notch 74 in the outer periphery. Middle gear includes a notch 76 in the outer periphery. Referring to FIG. 22A, rotation of inner gear 48 rotates middle gear 46 in the same direction. Rotation of middle gear 46 rotates outer gear 44 in the same direction. Gears 46 and 44 are sized such that pass point indications comprising switch release cutouts 74 and 76 line up only once during the entire travel distance of the door. As seen in FIG. 22A, when switch release cutouts 74 and 76 line up, switch 72 is open generating a pass point presence signal. The location where switch release cutouts 74 and 76 line up is the pass point. At all other times, at least one of the two gears holds switch 72 closed generating a signal indicating that the pass point has not been reached.

Figure 5A:
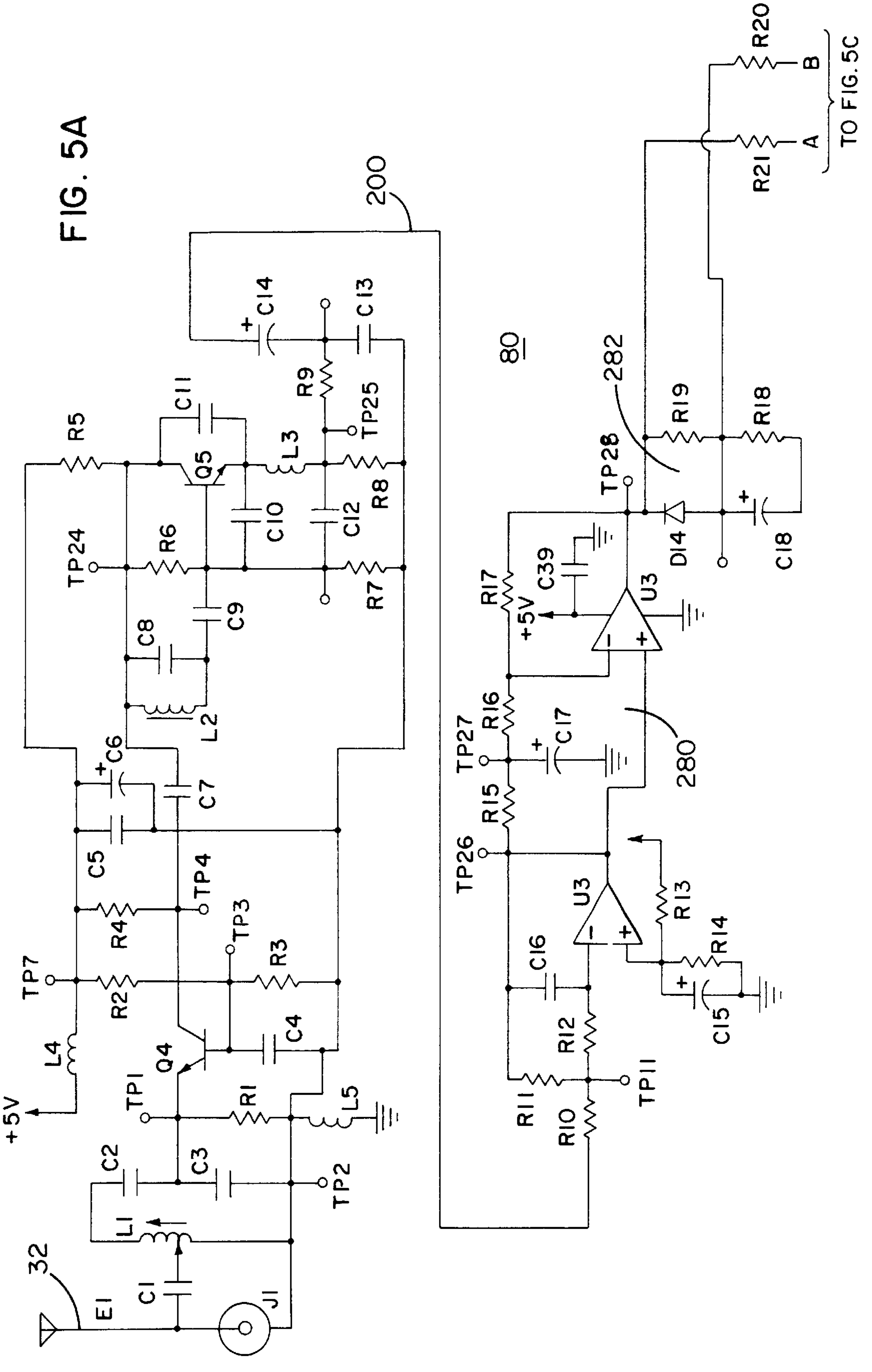
FIGS. 5A–5D are a schematic diagram of the controller shown in block format in FIG. 4.
Figure 5B:
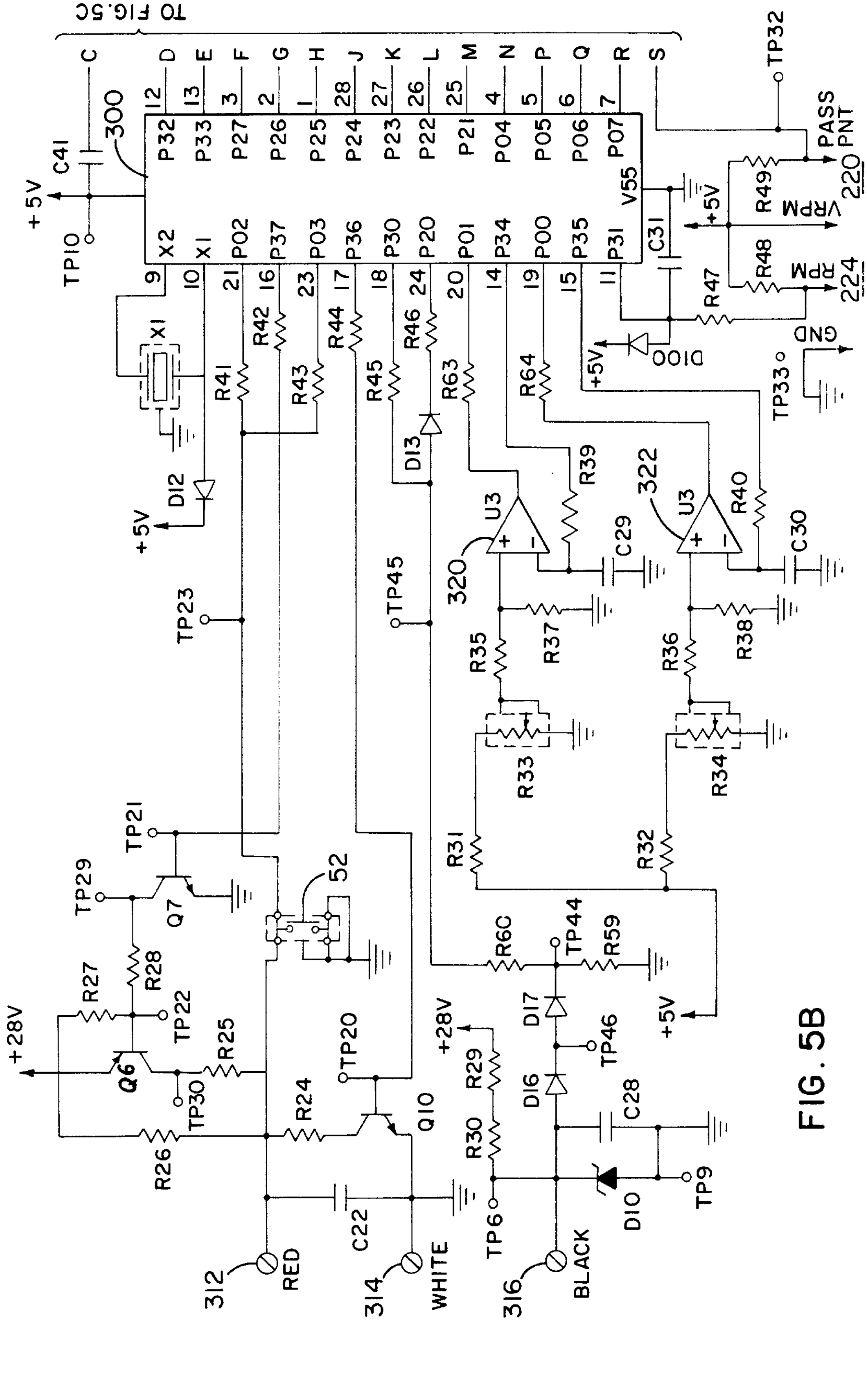
Figure 5C:
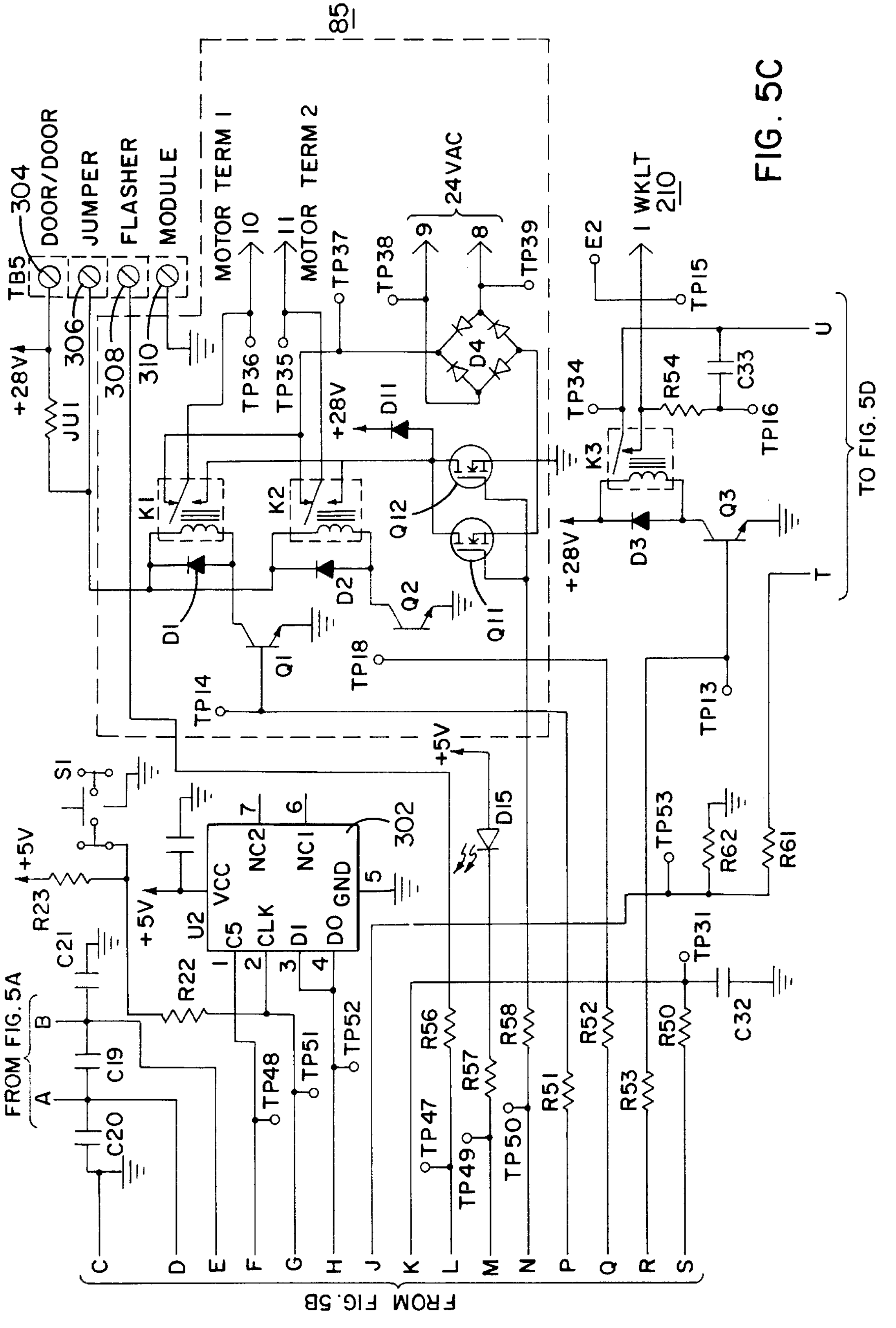
Figure 5D:
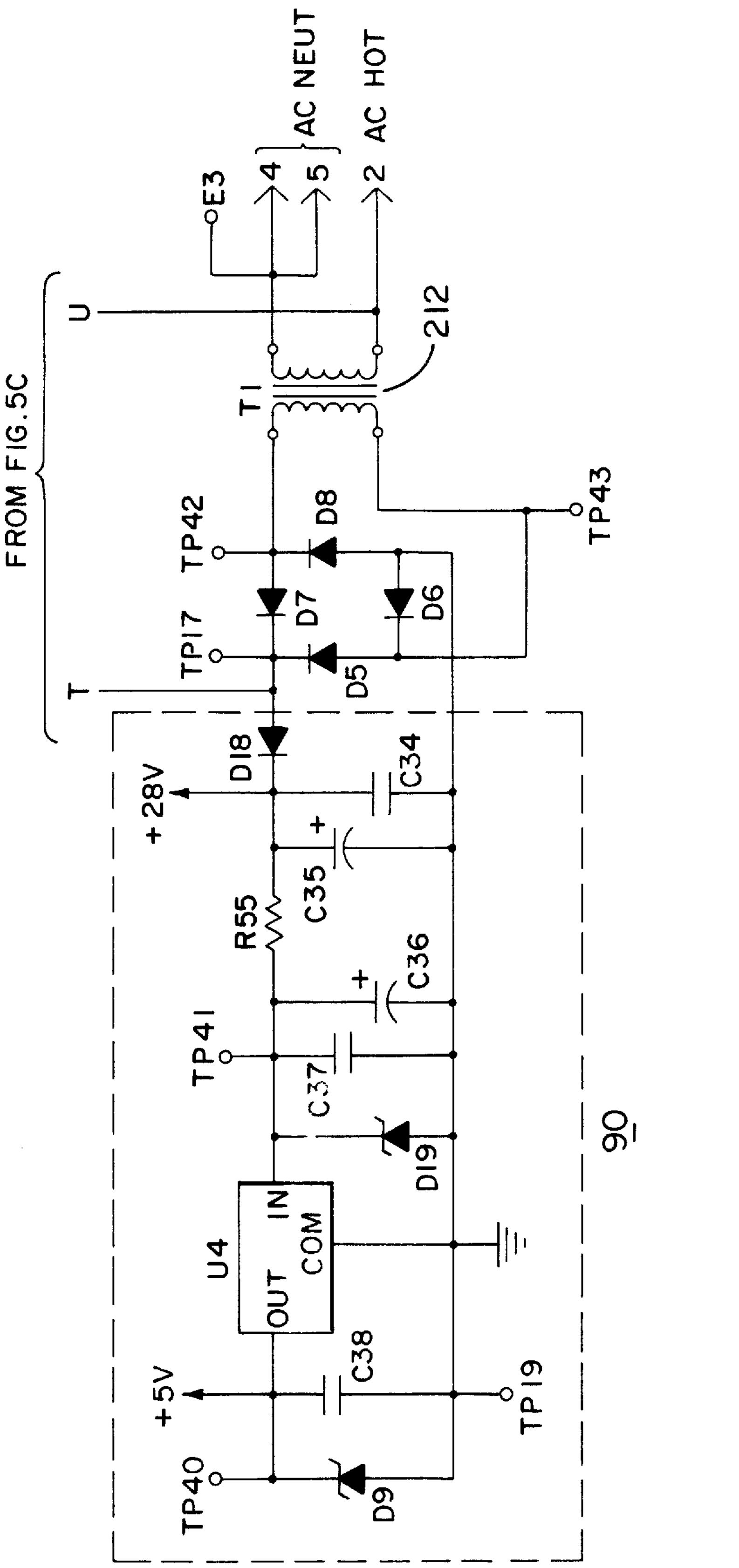

The receiver portion 80 of controller 200 is shown in FIG. 5A. RF signals may be received by the controller 200 at the antenna 32 and fed to the receiver 80. The receiver 80 includes variable inductor L1 and a pair of capacitors C2 and C3 that provide impedance matching between the antenna 32 and other portions of the receiver. An NPN transistor Q4 is connected in common-base configuration as a buffer amplifier. Bias to the buffer amplifier transistor Q4 is provided by resistors R2, R3. The buffered RF output Signal is supplied to a second NPN transistor Q5. The radio frequency signal is coupled to a bandpass amplifier 280 to an average detector 282 which feeds a comparator 284. Referring to FIGS. 5C and 5B, the analog output signal A, B is applied to noise reduction capacitors C19, C20 and C21 then provided to pins P32 and P33 of the microcontroller 300. Microcontroller 300 may be a Z86733 microprocessor.

An external transformer 212 receives AC power from a source such as a utility and steps down the AC voltage to the power supply 90 circuit of controller 200. Transformer 212 provides AC current to full-wave bridge circuit 214, which produces a 28 volt full wave rectified signal across capacitor C35. The AC power may have a frequency of 50 Hz or 60 Hz. An external transformer is especially important when motor 118 is a DC motor. The 28 volt rectified signal is used to drive a wall control switch, a obstacle detector circuit, a door-in-door switch and to power FETs Q11 and Q12 used to start the motor. Zener diode D18 protects against overvoltage due to the pulsed current, in particular, from the FETs rapidly switching off inductive load of the motor. The potential of the full-wave rectified signal is further reduced to provide 5 volts at capacitor C38, which is used to power the microprocessor 300, the receiver circuit 80 and other logic functions.

The 28 volt rectified power supply signal indicated by reference numeral T in FIG. 5C is voltage divided down by resistors R61 and R62, then applied to an input pin P24 of microprocessor 300. This signal is used to provide the phase of the power line current to microprocessor 300. Microprocessor 300 constantly checks for the phase of the line voltage in order to determine if the frequency of the line voltage is 50 Hz or 60 Hz. This information is used to establish the worklight time-out period and to select the look-up table stored in the ROM in the microcontroller for converting pulse width to door speed.

When the door is commanded to move, either through a signal from a remote transmitter received through antenna 32 and processed by receiver 80, or through an optional wall switch, the microprocessor 300 commands the work light to turn on. Microprocessor 300 sends a worklight enable signal from pin P07. The worklight enable signal is applied to the base of transistor Q3, which drives relay K3. AC power from a signal U provides power for operating the worklight 210.

Microprocessor 300 reads from and writes data to an EEPROM 302 via its pins P25, P26 and P27. EEPROM 302 may be a 93C46. Microprocessor 300 provides a light enable signal at pin P21 which is used to enable a learn mode indicator yellow LED D15. LED D15 is enabled or lit when the receiver is in the learn mode. Pin P26 provides double duty. When the user selects switch S1, a learn enable signal is provided to both microprocessor 300 and EEPROM 302. Switch S1 is mounted on the head unit 12 and is part of switch module 39, which is used by the installer to operate the system.

An optional flasher module provides an additional level of safety for users and is controlled by microprocessor 300 at pin P22. The optional flasher module is connected between terminals 308 and 310. In the optional flasher module, after receipt of a door command, the microprocessor 300 sends a signal from P22 which causes the flasher light to blink for 2 seconds. The door does not move during that 2 second period, giving the user notice that the door has been commanded to move and will start to move in 2 seconds. After expiration of the 2 second period, the door moves and the flasher light module blinks during the entire period of door movement. If the operator does not have a flasher module installed in the head unit, when the door is commanded to move, there is no time delay before the door begins to move.

Microprocessor 300 provides the signals which start motor 116, control its direction of rotation (and thus the direction of movement of the door) and the speed of rotation (speed of door travel). FETs Q11 and Q12 are used to start motor 118. Microprocessor 300 applies a pulsed output signal to the gates of FETs Q11 and Q12. The lengths of the pulses determine the time the FETs conduct and thus the amount of time current is applied to start and run the motor 118. The longer the pulse, the longer current is applied, the greater the speed of rotation the motor 118 will develop. Diode D11 is coupled between the 28 volt power supply and is used to clean up flyback voltage to the input bridge D4 when the FETs are conducting. Similarly, Zener diode D19 (see FIG. 5A) is used to protect against overvoltage when the FETs are conducting.

Control of the direction of rotation of motor 118 (and thus direction of travel of the door) is accomplished with two relays, K1 and K2. Relay K1 supplies current to cause the motor to rotate clockwise in an opening direction (door moves UP); relay K2 supplies current to cause the motor to rotate counterclockwise in a closing direction (door moves DOWN). When the door is commanded to move UP, the microprocessor 300 sends an enable signal from pin P05 to the base of transistor Q1, which drives relay K1. When the door is commanded to move DOWN, the microprocessor 300 sends an enable signal from pin P06 to the base of transistor Q2, which drives relay K2.

Door-in-door contacts 13 and 15 are connected to terminals 304 and 306. Terminals 304 and 306 are connected to relays K1 and K2. If the signal between contacts 13 and 15 is broken, the signal across terminals 304 and 306 is open, preventing relays K1 and K2 from energizing. The motor 118 will not rotate and the door 24 will not move until the user closes pedestrian door 11, making contact between contacts 13 and 15.

Figure 21:
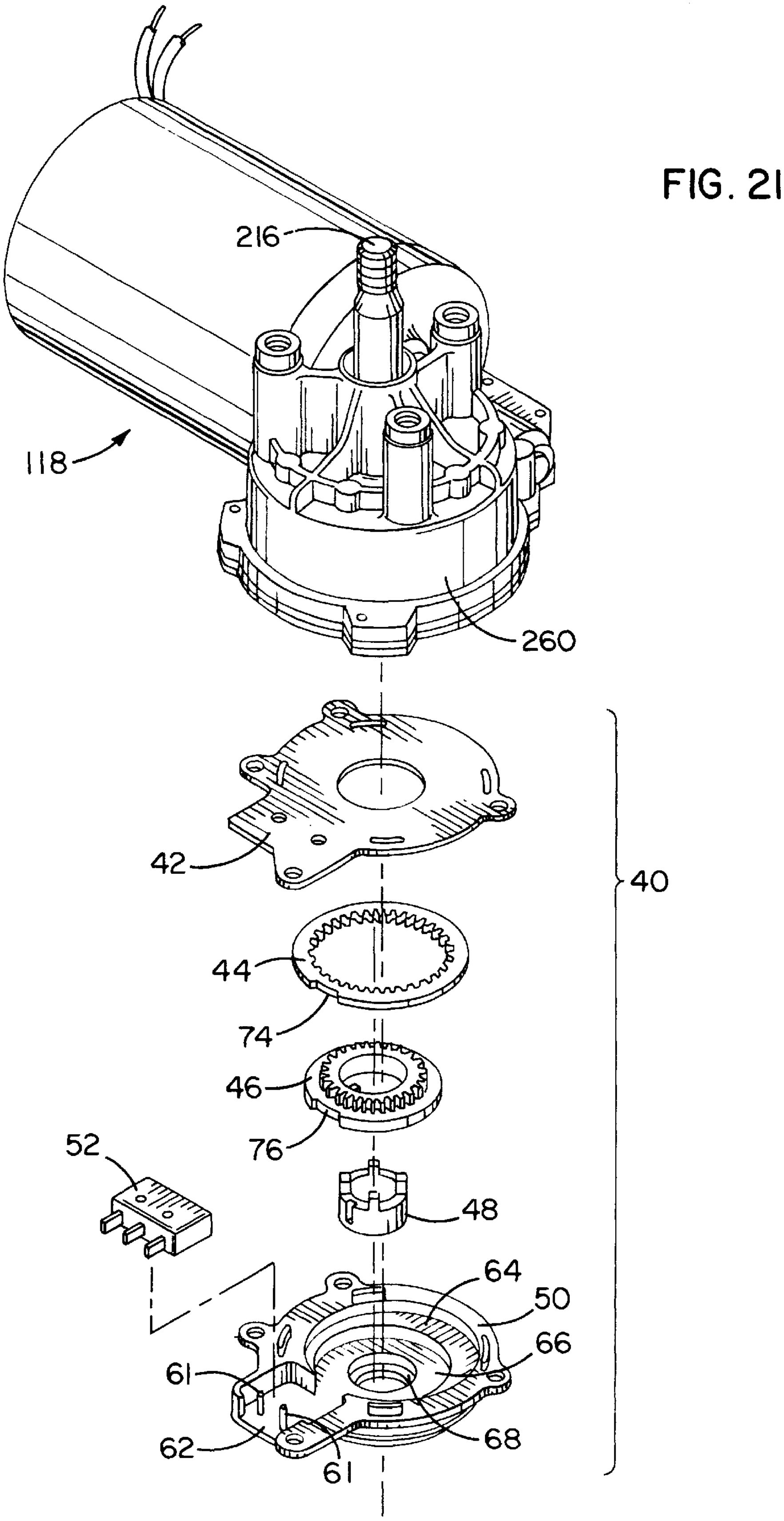
FIG. 21 is an exploded perspective view of a pass point detector and motor of the operator shown in FIG. 2.

The pass point signal 220 from the pass point module 40 (see FIG. 21) of motor 118 is applied to pin P23 of microprocessor 300. The RPM signal 224 from the RPM sensor module in motor 118 is applied to pin P31 of microprocessor 300. Application of the pass point signal and the RPM signal is described with reference to the flow charts.

An optional wall control, which duplicates the switches on remote transmitter 30, may be connected to controller 200 at terminals 312 and 314. When the user presses the door command switch 39, a dead short is made to ground, which the microprocessor 300 detects by the failure to detect voltage. Capacitor C22 is provided for RF noise reduction. The dead short to ground is sensed at pins P02 and P03, for redundancy.

Switches S1 and S2 are part of switch module 39 mounted on head unit 12 and used by the installer for operating the system. As stated above, S1 is the learn switch. S2 is the door command switch. When S2 is pressed, microprocessor 300 detects the dead short at pins P02 and P03.

Input from an obstacle detector (not shown) is provided at terminal 316. This signal is voltage divided down and provided to microprocessor 300 at pins P20 and P30, for redundancy. Except when the door is moving and less than an inch above the floor, when the obstacle detector senses an object in the doorway, the microprocessor executes the auto-reverse routine causing the door to stop and/or reverse depending on the state of the door movement.

Force and speed of door travel are determined by two potentiometers. Potentiometer R33 adjusts the force and speed of UP travel; potentiometer R34 adjusts the force and speed of DOWN travel. Potentiometers R33 and R34,act as analog voltage dividers. The analog signal from R33, R34 is further divided down by voltage divider R35/R37, R36/R38 before it is applied to the input of comparators 320 and 322. Reference pulses from pins P34 and P35 of microprocessor 300 are compared with the force input from potentiometers R33 and R34 in comparators 320 and 322. The output of comparators 320 and 322 is applied to pins P01 and P00.

To perform the A/D conversion, the microprocessor 300 samples the output of the comparators 320 and 322 at pins P00 and P01 to determine which voltage is higher: the voltage from the potentiometer R33 or R34 (IN) or the voltage from the reference pin P34 or P35 (REF). If the potentiometer voltage is higher than the reference, then the microprocessor outputs a pulse. If not, the output voltage is held low. The RC filter (R39, C29/R40, C30) converts the pulses into a DC voltage equivalent to the duty cycle of the pulses. By outputting the pulses in the manner described above, the microprocessor creates a voltage at REF which dithers around the voltage at IN. The microprocessor then calculates the duty cycle of the pulse output which directly correlates to the voltage seen at IN.

Figure 6A:
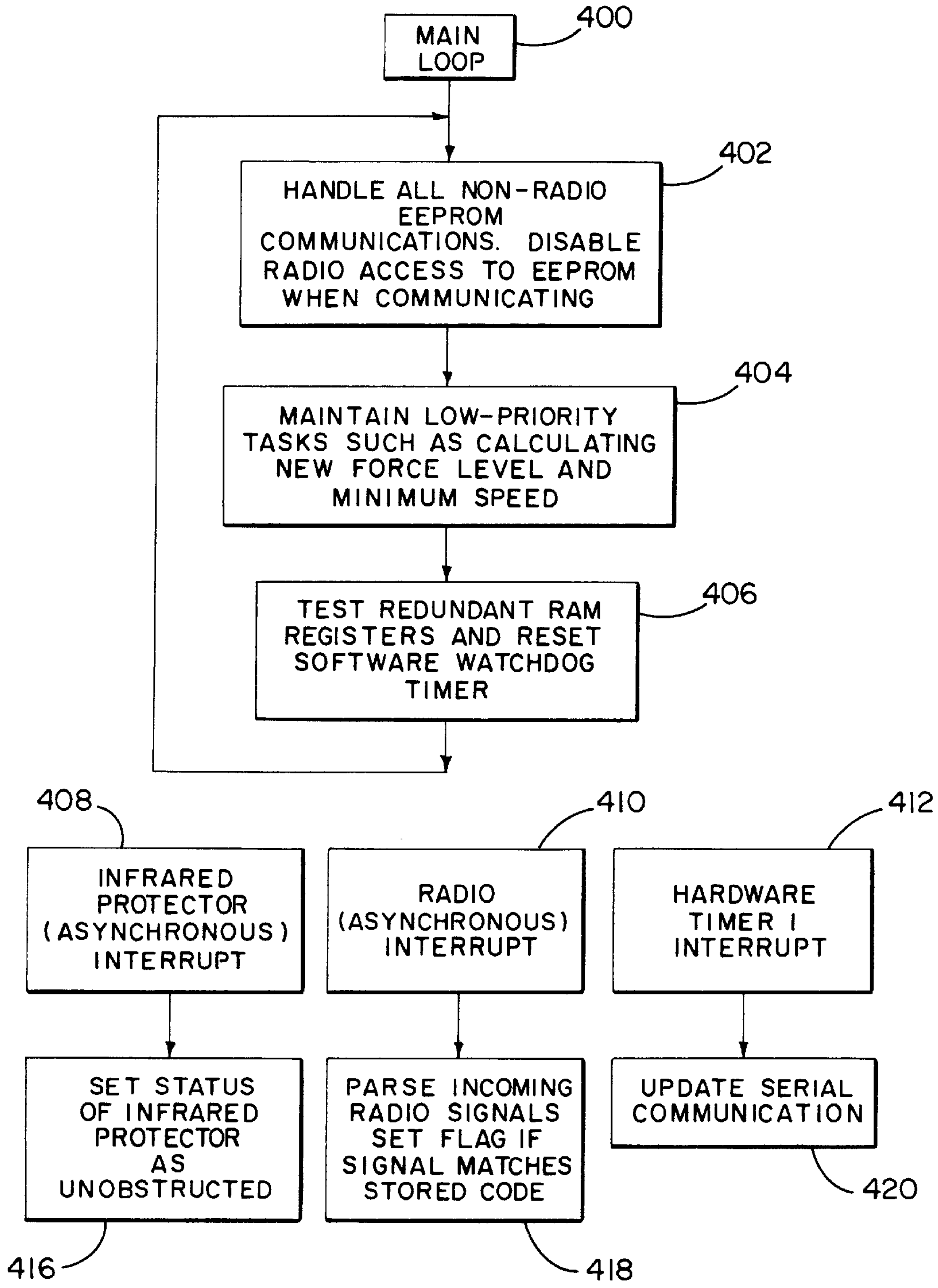
FIGS. 6A–6B are a flow chart of an overall routine that executes in a microprocessor of the controller shown in FIGS. 5A–5D.
Figure 6B:
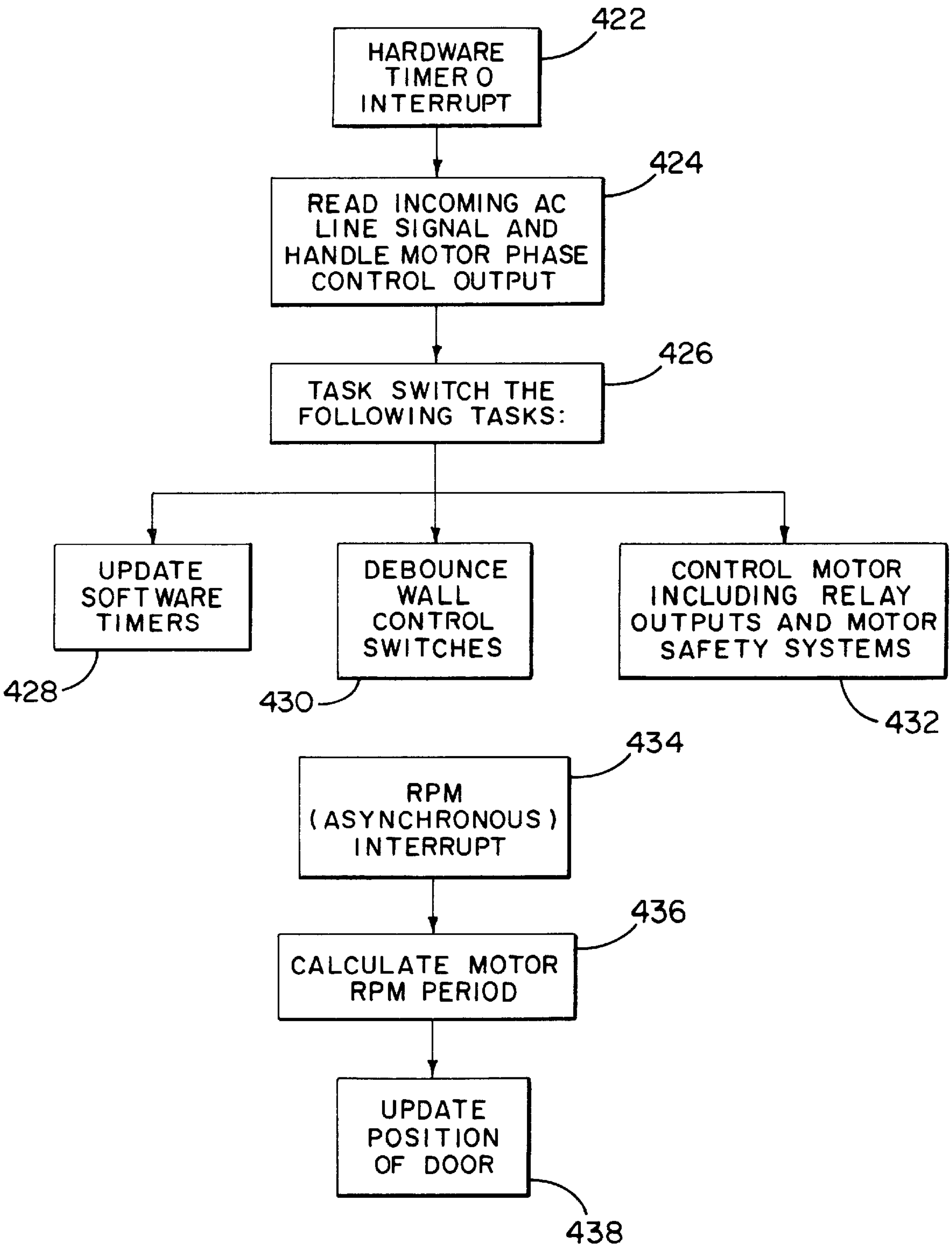
Figure 7A:
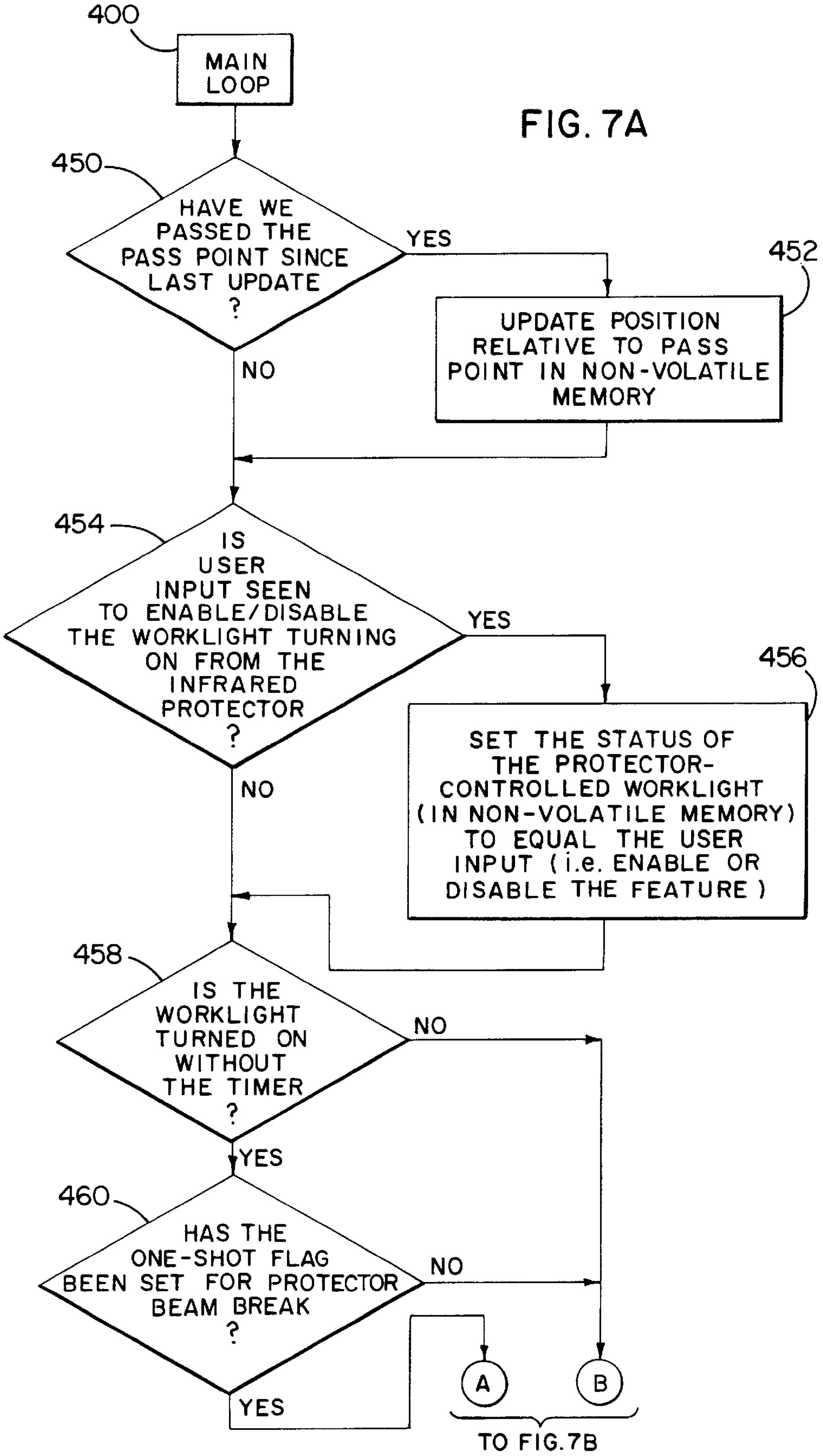
FIGS. 7A–7H are a flow chart of the main routine executed in the microprocessor.
Figure 7B:
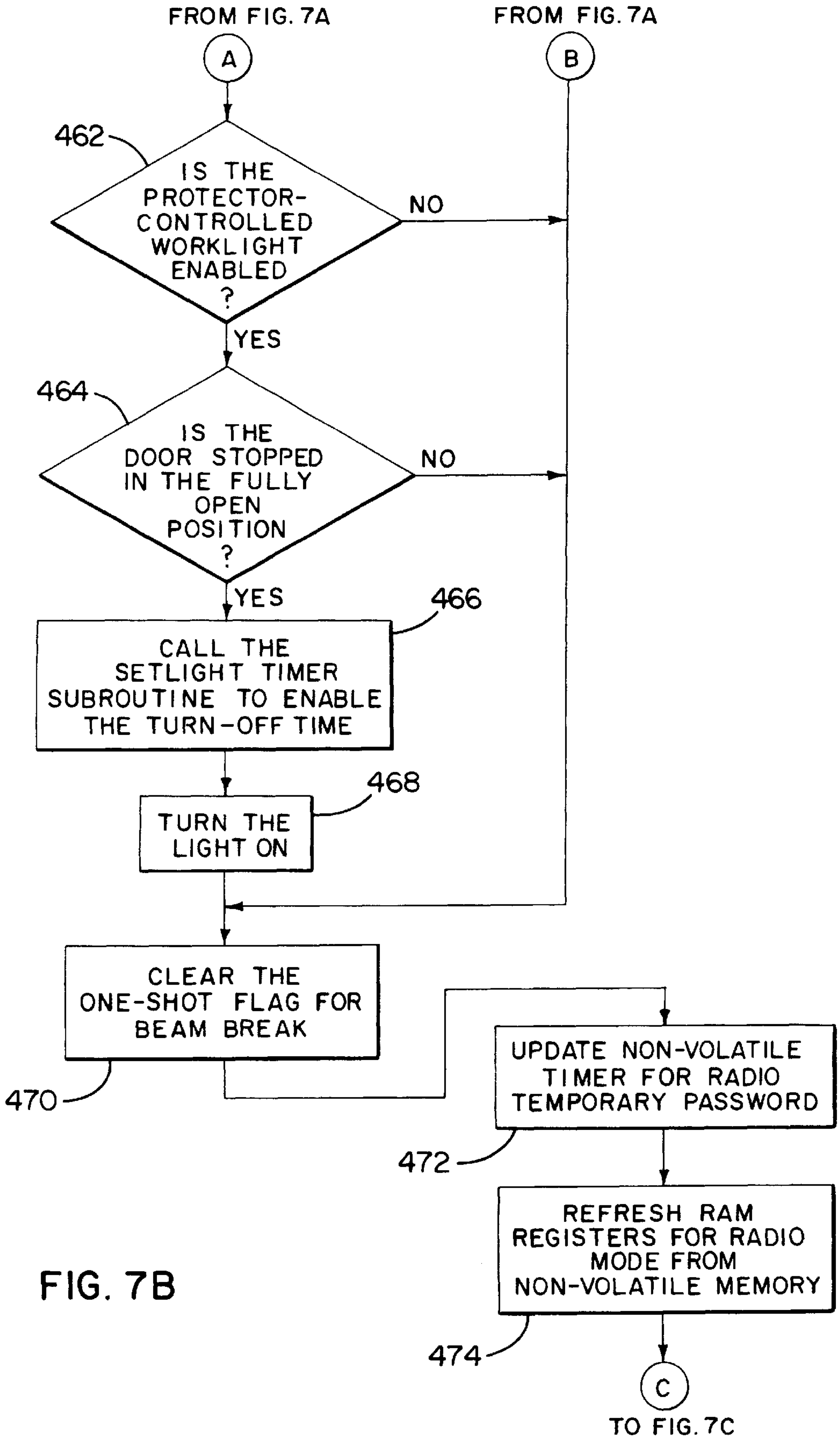
Figure 7C:
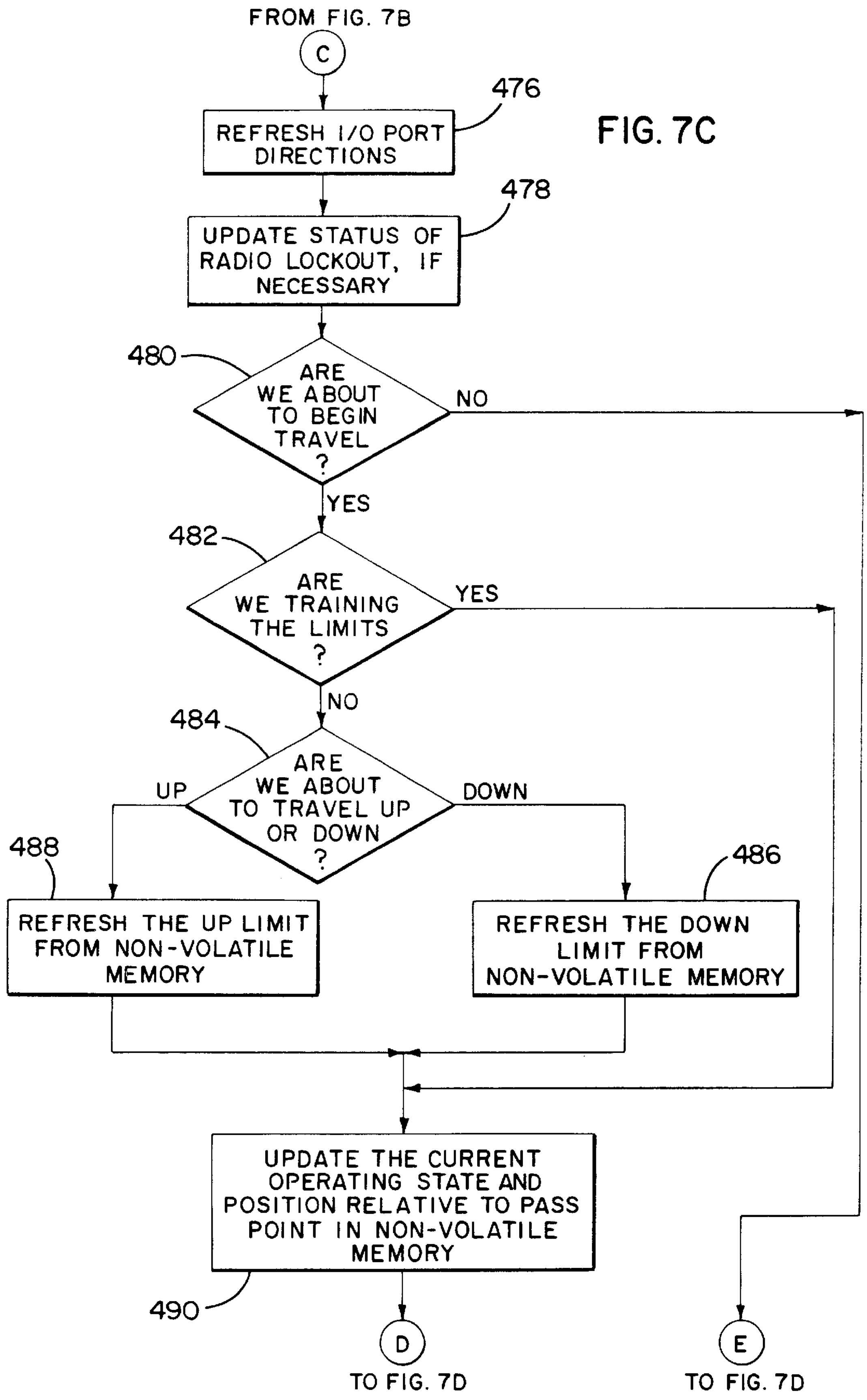
Figure 7D:
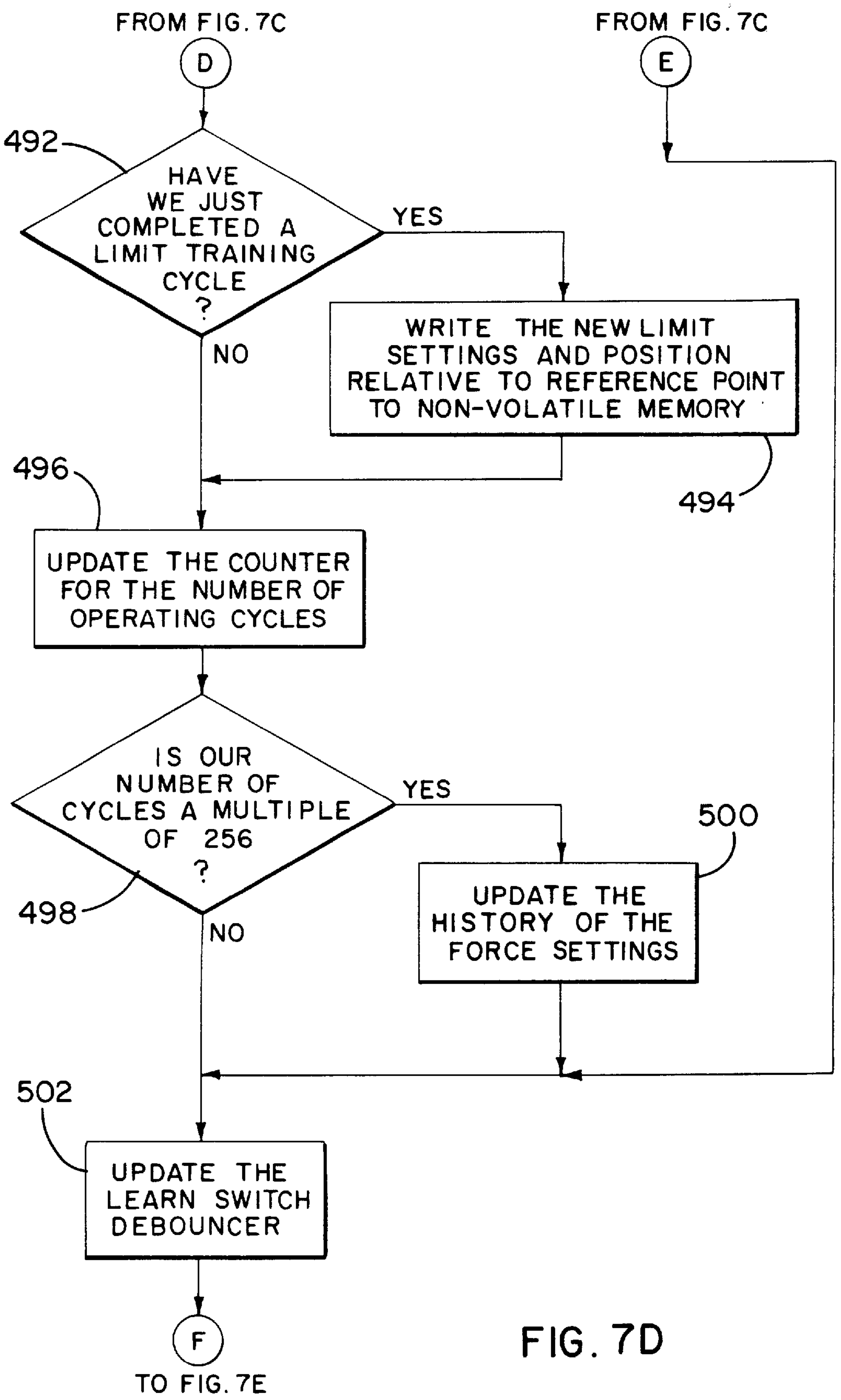
Figure 7E:
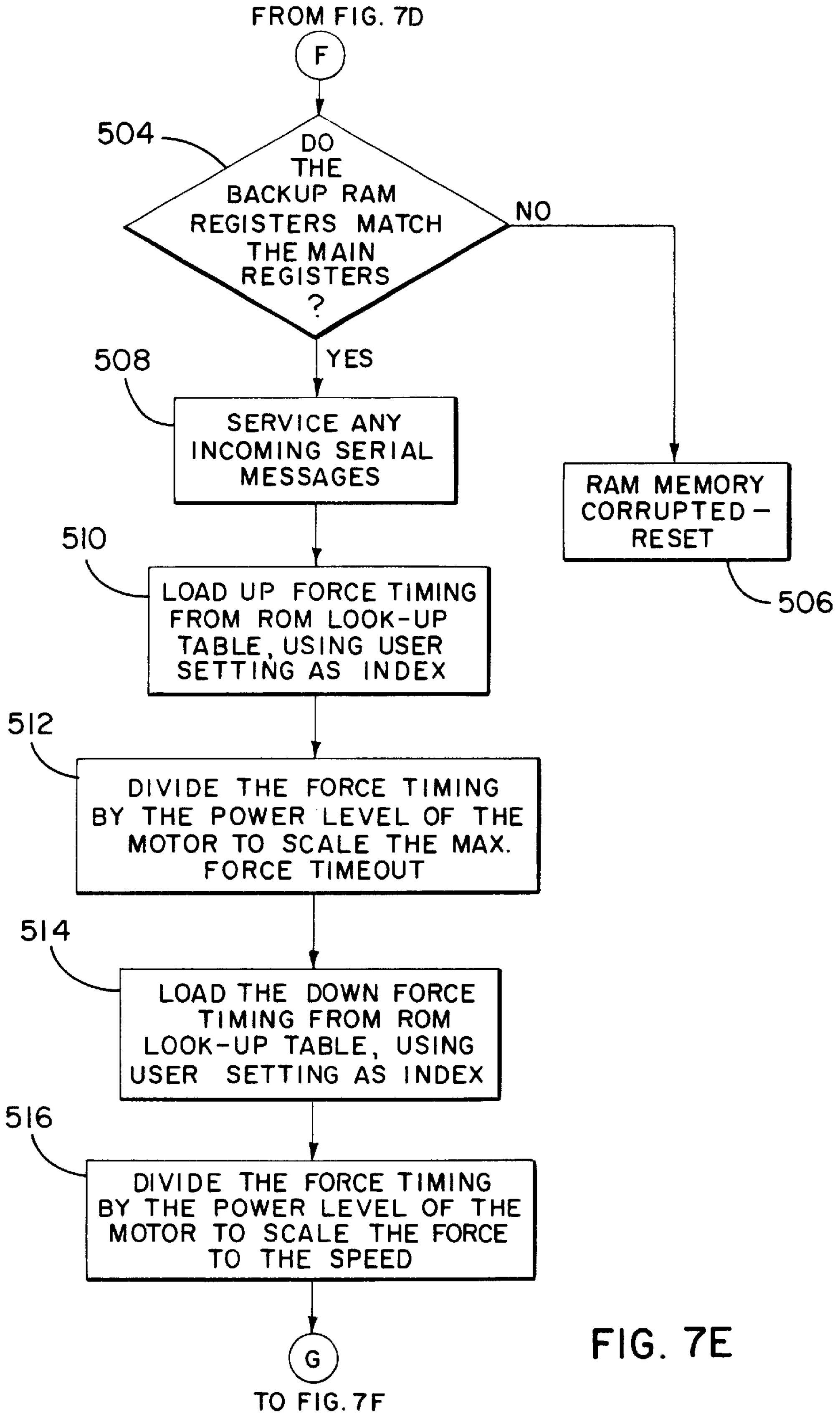
Figure 7F:
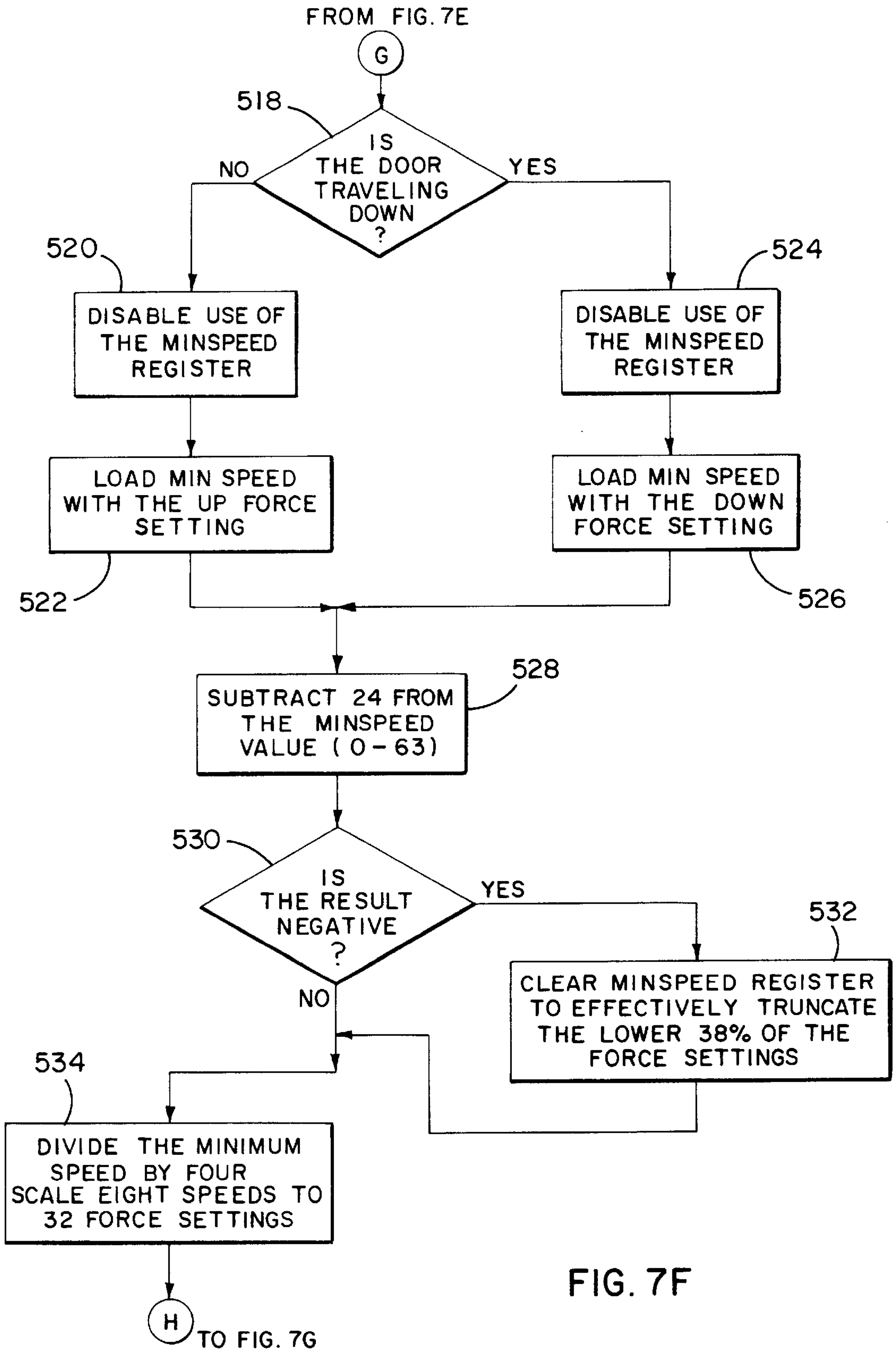
Figure 7G:
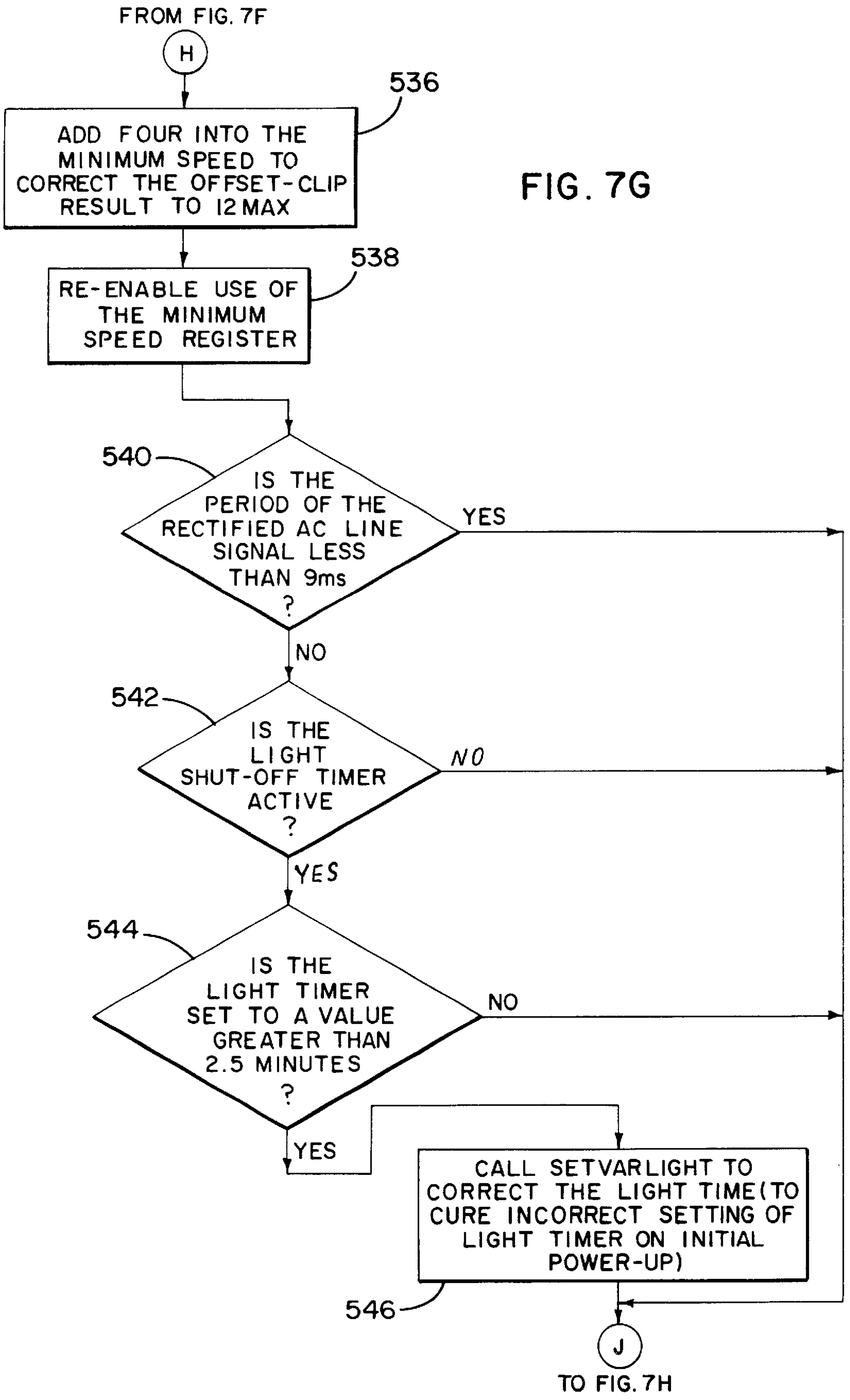
Figure 7H:
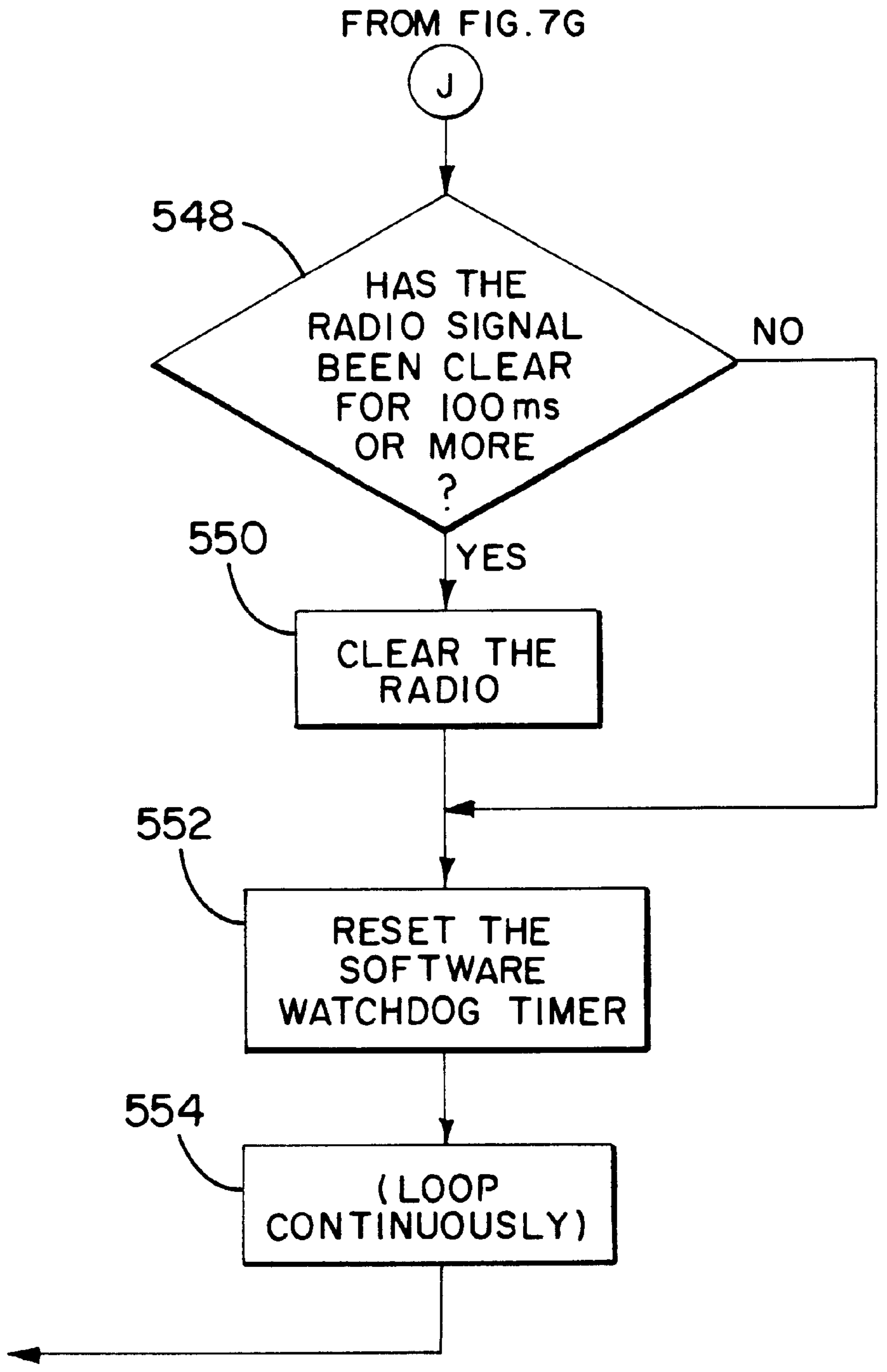

When power is applied to the head unit 12 including controller 200, microprocessor 300 executes a series of routines. With power applied, microprocessor 300 executes the main routines shown in FIGS. 6A and 6B. The main loop 400 includes three basic functions, which are looped continuously until power is removed. In block 402 the microprocessor 300 handles all non-radio EEPROM communications and disables radio access to the EEPROM 302 when communicating. This ensures that during normal operation, i.e., when the garage door operator is not being programmed, the remote transmitter does not have access to the EEPROM, where transmitter codes are stored. Radio transmissions are processed upon receipt of a radio interrupt (see below).

In block 404, microprocessor 300 maintains all low priority tasks, such as calculating new force levels and minimum speed. Preferably, a set of redundant RAM registers is provided. In the event of an unforeseen event (e.g., an ESD event) which corrupts regular RAM, the main RAM registers and the redundant RAM registers will not match. Thus, when the values in RAM do not match, the routine knows the regular RAM has been corrupted. (See block 504 below.) In block 406, microprocessor 300 tests redundant RAM registers. Several interrupt routines can take priority over blocks 402, 404 and 406.

The infrared obstacle detector generates an asynchronous IR interrupt signal which is a series of pulses. The absence of the obstacle detector pulses indicates an obstruction in the beam. After processing the IR interrupt, microprocessor 300 sets the status of the obstacle detector as unobstructed at block 416.

Receipt of a transmission from remote transmitter 30 generates an asynchronous radio interrupt at block 410. At block 418, if in the door command mode, microprocessor 300 parses incoming radio signals and sets a flag if the signal matches a stored code. If in the learn mode, microprocessor 300 stores the new transmitter codes in the EEPROM.

An asynchronous interrupt is generated if a remote communications unit is connected to an optional RS-232 communications port located on the head unit. Upon receipt of the hardware interrupt, microprocessor 300 executes a serial data communications routine for transferring and storing data from the remote hardware.

Hardware timer 0 interrupt is shown in block 422. In block 422, microprocessor 300 reads the incoming AC line signal from pin P24 and handles the motor phase control output. The incoming line signal is used to determine if the line voltage is 50 Hz for the foreign market or 60 Hz for the domestic market. With each interrupt, microprocessor 300, at block 426, task switches among three tasks. In block 428, microprocessor 300 updates software timers. In block 430, microprocessor 200 debounces wall control switch signals. In block 432, microprocessor 300 controls the motor state, including motor direction relay outputs and motor safety systems.

When the motor 118 is running, it generates an asynchronous RPM interrupt at block 434. When microprocessor 300 receives the asynchronous RPM interrupt at pin P31, it calculates the motor RPM period at block 436; then updates the position of the door at block 438.

Further details of main loop 400 are shown in FIGS. 7A through 7H. The first step executed in main loop 400 is block 450, where the microprocessor checks to see if the pass point has been passed since the last update. If it has, the routine branches to block 452, where the microprocessor 300 updates the position of the door relative to the pass point in EEPROM 302 or non-volatile memory. The routine then continues at block 454. An optional safety feature of the garage door operator system enables the worklight, when the door is open and stopped and the infrared beam in the obstacle detector is broken.

At block 454, the microprocessor checks if the enable/disable of the worklight for this feature has been changed. Some users want the added safety feature; others prefer to save the electricity used. If new input has been provided, the routine branches to block 456 and sets the status of the obstacle detector-controlled worklight in non-volatile memory in accordance with the new input. Then the routine continues to block 458 where the routine checks to determine if the worklight has been turned on without the timer. A separate switch is provided on both the remote transmitter 30 and the head unit at module 39 to enable the user to switch on the worklight without operating the door command switch. If no, the routine skips to block 470.

If yes, the routine checks at block 460 to see if the one-shot flag has been set for an obstacle detector beam break. If no, the routine skips to block 470. If yes, the routine checks if the obstacle detector controlled worklight is enabled at block 462. If not, the routine skips to block 470. If it is, the routine checks if the door is stopped in the fully open position at block 464. If no, the routine skips to block 470. If yes, the routine calls the SetVarLight subroutine (see FIG. 8) to enable the appropriate turn off time (4.5 minutes for 60 Hz systems or 2.5 minutes for 50 Hz systems). At block 468, the routine turns on the worklight.

At block 470, the microprocessor 300 clears the one-shot flag for the infrared beam break. This resets the obstacle detector, so that a later beam break can generate an interrupt. At block 472, if the user has installed a temporary password usable for a fixed period of time, the microprocessor 300 updates the non-volatile timer for the radio temporary password. At block 474, the microprocessor 300 refreshes the RAM registers for radio mode from non-volatile memory (EEPROM 302). At block 476, the microprocessor 300 refreshes I/O port directions, i.e., whether each of the ports is to be input or output. At block 478, the microprocessor 300 updates the status of the radio lockout flag, if necessary. The radio lockout flag prevents the microprocessor from responding to a signal from a remote transmitter. A radio interrupt (described below) will disable the radio lockout flag and enable the remote transmitter to communicate with the receiver.

At block 480, the microprocessor 300 checks if the door is about to travel. If not, the routine skips to block 502. If the door is about to travel, the microprocessor 300 checks if the limits are being trained at block 482. If they are, the routine skips to block 502. If not, the routine asks at block 484 if travel is UP or DOWN. If DOWN, the routine refreshes the DOWN limit from non-volatile memory (EEPROM 302) at block 486. If UP, the routine refreshes the UP limit from non-volatile memory (EEPROM 302) at block 488. The routine updates the current operating state and position relative to the pass point in non-volatile memory at block 490. This is a redundant read for stability of the system.

At block 492, the routine checks for completion of a limit training cycle. If training is complete, the routine branches to block 494 where the new limit settings and position relative to the pass point are written to non-volatile memory.

The routine then updates the counter for the number of operating cycles at block 496. This information can be downloaded at a later time and used to determine when certain parts need to be replaced. At block 498 the routine checks if the number of cycles is a multiple of 256. Limiting the storage of this information to multiples of 256 limits the number of times the system has to write to that register. If yes it updates the history of force settings at block 500. If not, the routine continues to block 502.

At block 502 the routine updates the learn switch debouncer. At block 504 the routine performs a continuity check by comparing the backup (redundant) RAM registers with the main registers. If they do not match, the routine branches to block 506. If the registers do not match, the RAM memory has been corrupted and the system is not safe to operate, so a reset is commanded. At this point, the system powers up as if power had been removed and reapplied and the first step is a self test of the system (all installation settings are unchanged).

If the answer to block 504 is yes, the routine continues to block 508 where the routine services any incoming serial messages from the optional wall control (serial messages might be user input start or stop commands). The routine then loads the UP force timing from the ROM look-up table, using the user setting as an index at block 510. Force potentiometers R33 and R34 are set by the user. The analog values set by the user are converted to digital values. The digital values are used as an index to the look-up table stored in memory. The value indexed from the look-up table is then used as the minimum motor speed measurement. When the motor runs, the routine compares the selected value from the look-up table with the digital timing from the RPM routine to ensure the force is acceptable.

Instead of calculating the force each time the force potentiometers are set, a look-up table is provided for each potentiometer. The range of values based on the range of user inputs is stored in ROM and used to save microprocessor processing time. The system includes two force limits: one for the UP force and one for the DOWN force. Two force limits provide a safer system. A heavy door may require more UP force to lift, but need a lower DOWN force setting (and therefore a slower closing speed) to provide a soft closure. A light door will need less UP force to open the door and possibly a greater DOWN force to provide a full closure.

Next the force timing is divided by power level of the motor for the door to scale the maximum force timeout at block 512. This step scales the force reversal point based on the maximum force for the door. The maximum force for the door is determined based on the size of the door, i.e. the distance the door travels. Single piece doors travel a greater distance than segmented doors. Short doors require less force to move than normal doors. The maximum force for a short door is scaled down to 60 percent of the maximum force available for a normal door. So, at block 512, if the force setting is set by the user, for example at 40 percent, and the door is a normal door (i.e., a segmented door or multi-paneled door), the force is scaled to 40 percent of 100 percent. If the door is a short door (i.e., a single panel door), the force is scaled to 40 percent of 60 percent, or 24 percent.

At block 514, the routine loads the DOWN force timing from the ROM look-up table, using the user setting as an index. At block 516, the routine divides the force timing by the power level of the motor for the door to scale the force to the speed.

At block 518 the routine checks if the door is traveling DOWN. If yes, the routine disables use of the MinSpeed Register at block 524 and loads the MinSpeed Register with the DOWN force setting, i.e., the value read from the DOWN force potentiometer at block 526. If not, the routine disables use of the MinSpeed Register at block 520 and loads the MinSpeed Register with the UP force setting from the force potentiometer at block 522.

The routine continues at block 528 where the routine subtracts 20 from the MinSpeed value. The MinSpeed value ranges from 0 to 63. The system uses 64 levels of force. If the result is negative at block 530, the routine clears the MinSpeed Register at block 532 to effectively truncate the lower 38 percent of the force settings. If no, the routine divides the minimum speed by 4 to scale 8 speeds to 32 force settings at block 534. At block 536, the routine adds 4 into the minimum speed to correct the offset, and clips the result to a maximum of 12. At block 538 the routine enables use of the MinSpeed Register.

At block 540 the routine checks if the period of the rectified AC line signal (input to microprocessor 300 at pin P24) is less than 9 milliseconds (indicating the line frequency is 60 Hz). If it is, the routine skips to block 548. If not, the routine checks if the light shut-off timer is active at block 542. If not, the routine skips to block 548. If yes, the routine checks if the light time value is greater than 2.5 minutes at block 544. If no( the routine skips to block 548. If yes, the routine calls the SetVarLight subroutine (see FIG. 8), to correct the light timing setting, at block 546.

At block 548 the routine checks if the radio signal has been clear for 100 milliseconds or more. If not, the routine skips to block 552. If yes, the routine clears the radio at block 550. At block 552, the routine resets the watchdog timer. At block 554, the routine loops to the beginning of the main loop.

Figure 8:
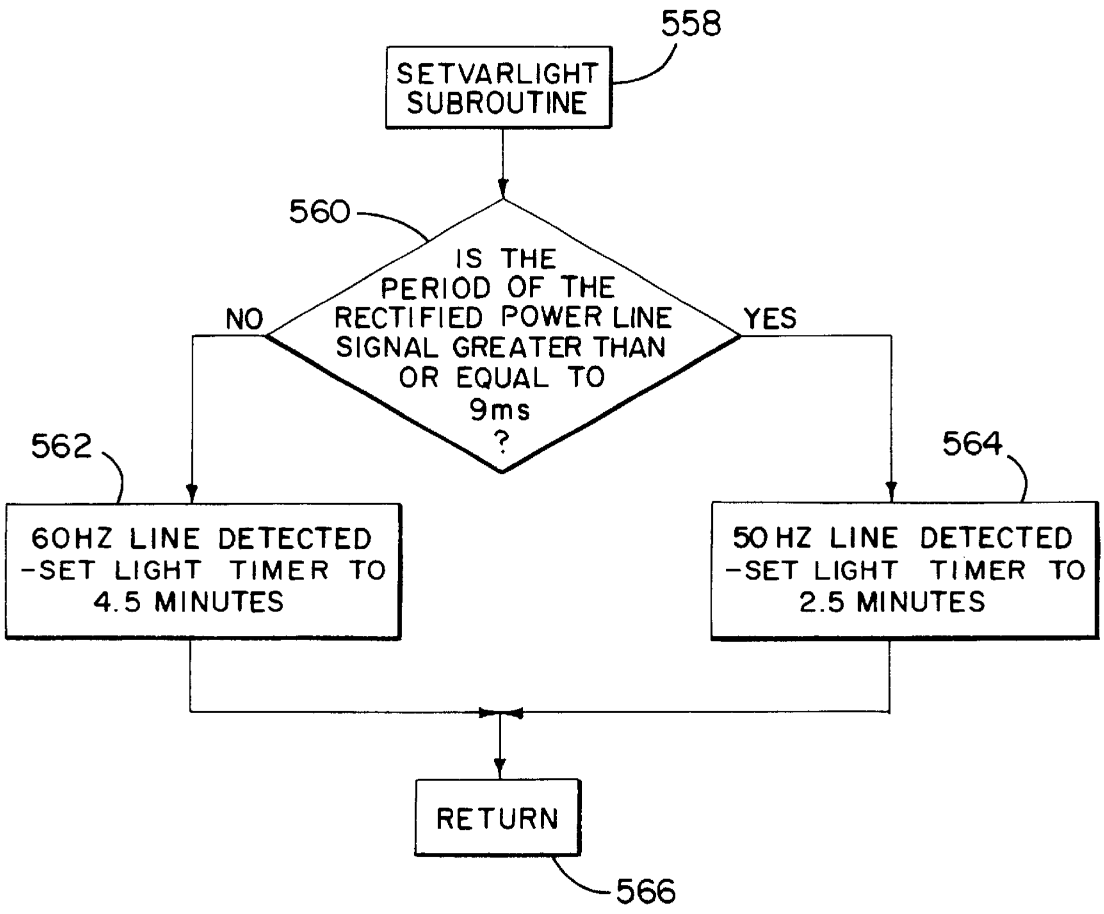
FIG. 8 is a flow chart of a set variable light shut-off timer routine executed by the microprocessor.

The SetVarLight subroutine, FIG. 8, is called whenever the door is commanded to move and the worklight is to be turned on. When the SetVarLight subroutine, block 558 is called, the subroutine checks if the period of the rectified power line signal (pin P24 of microprocessor 300) is greater than or equal to 9 milliseconds. If yes, the line frequency is 50 Hz, and the timer is set to 2.5 minutes at block 564. If no, the line frequency is 60 Hz and the timer is set to 4.5 minutes at block 562. After setting, the subroutine returns to the call point at block 566.

Figure 9A:
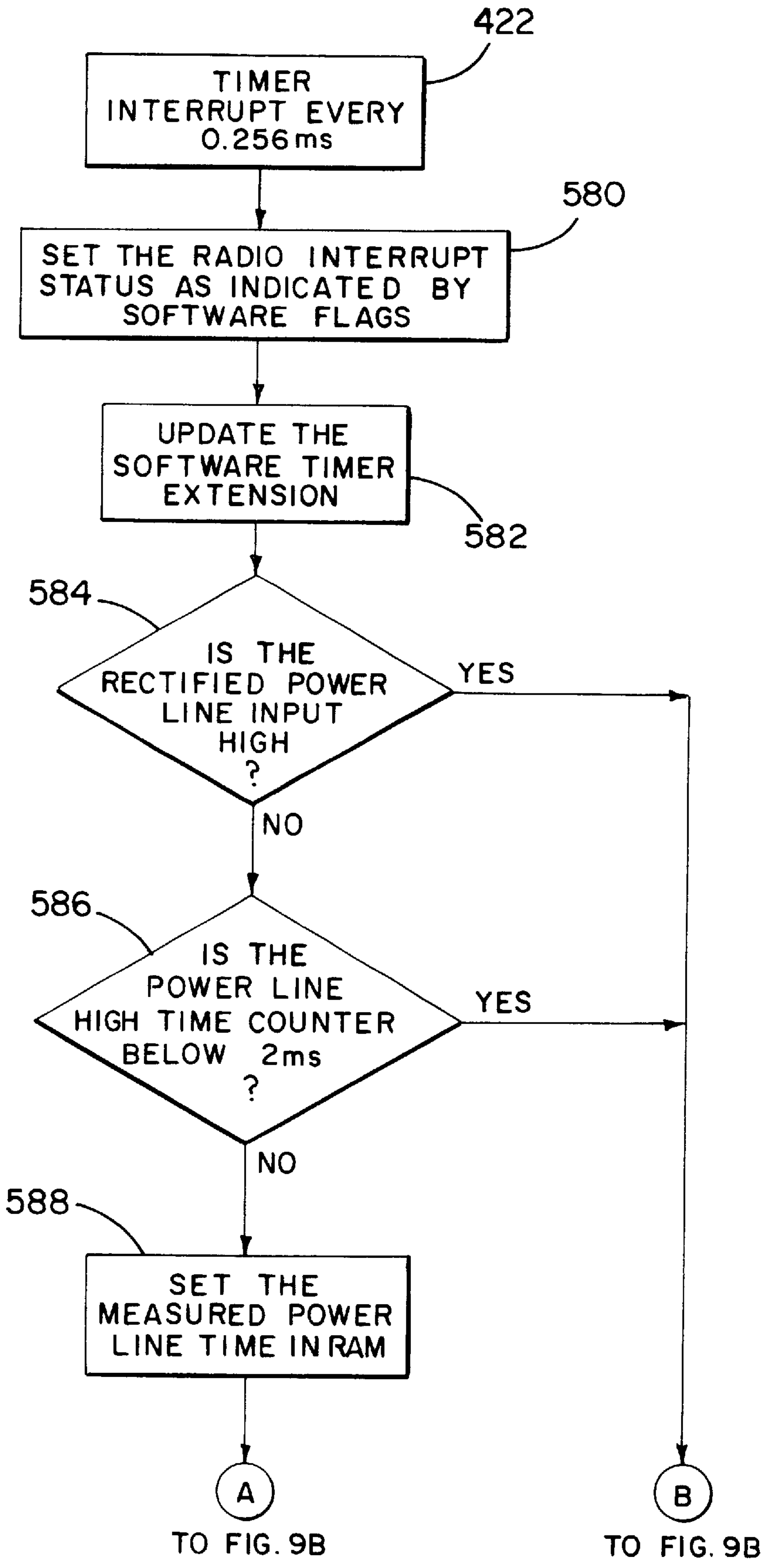
FIGS. 9A–9C are a flow chart of a hardware timer interrupt routine executed in the microprocessor.
Figure 9B:
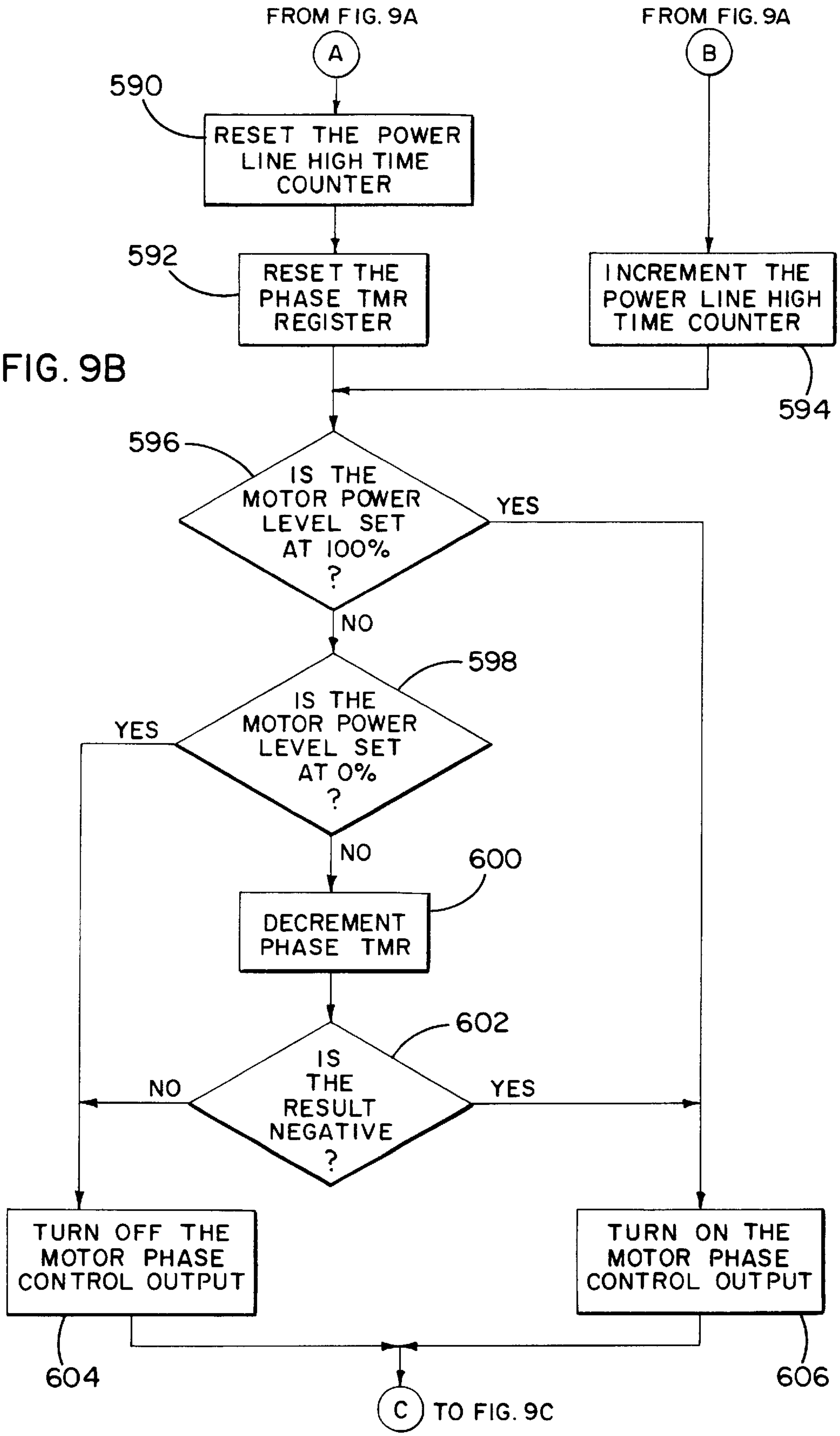
Figure 9C:
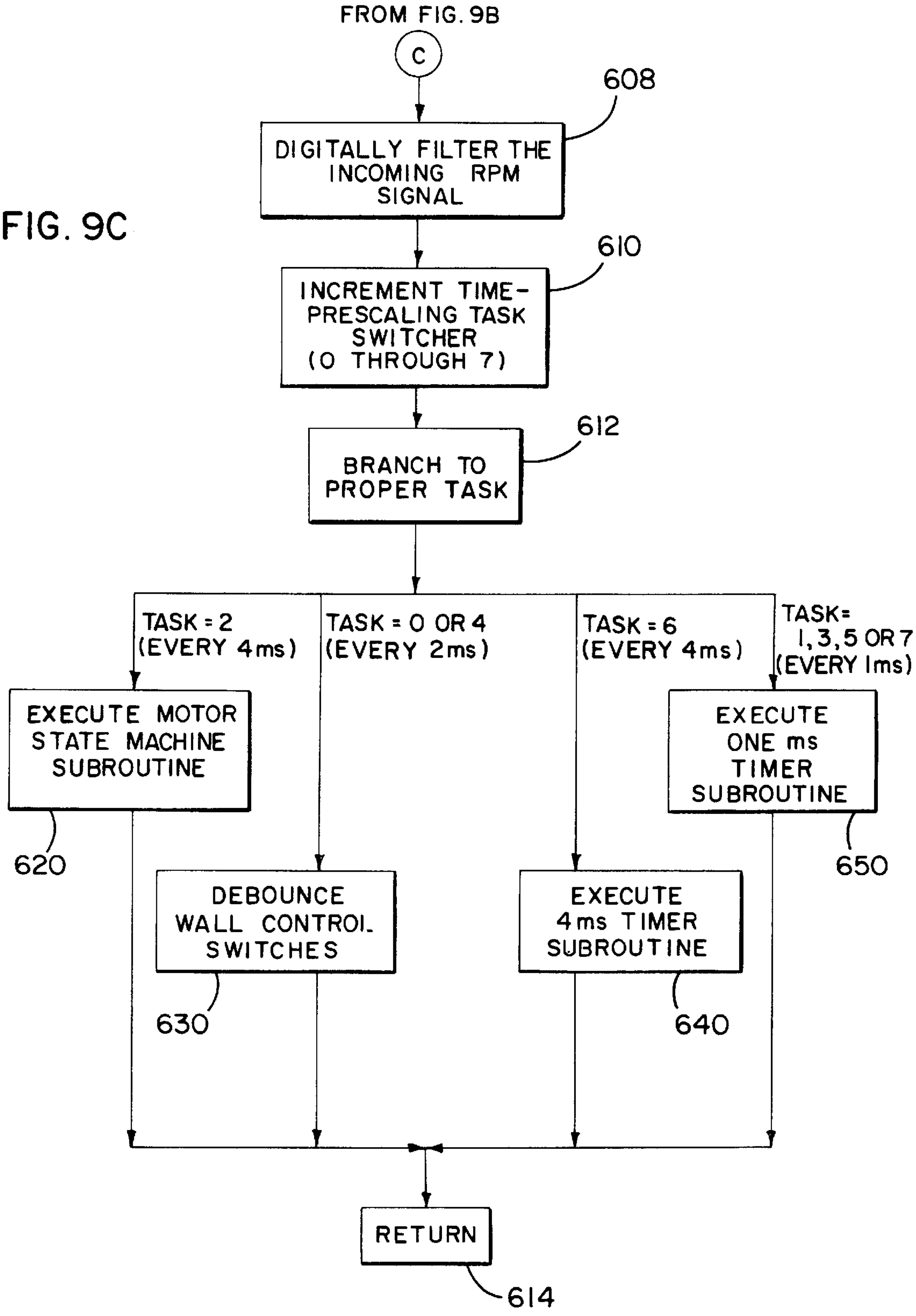

The hardware timer interrupt subroutine operated by microprocessor 300, shown at block 422, runs every 0.256 milliseconds. Referring to FIGS. 9A–9C, when the subroutine is first called, it sets the radio interrupt status as indicated by the software flags at block 580. At block 582, the subroutine updates the software timer extension. The next series of steps monitor the AC power line frequency (pin P24 of microprocessor 300). At step 584, the subroutine checks if the rectified power line input is high (checks for a leading edge). If yes, the subroutine skips to block 594, where it increments the power line high time counter, then continues to block 596. If no, the subroutine checks if the high time counter is below 2 milliseconds at block 586. If yes, the subroutine skips to block 594. If no, the subroutine sets the measured power line time in RAM at block 588. The subroutine then resets the power line high time counter at block 590 and resets the phase timer register in block 592.

At block 596, the subroutine checks if the motor power level is set at 100 percent. If yes, the subroutine turns on the motor phase control output at block 606. If no, the subroutine checks if the motor power level is set at 0 percent at block 599. If yes, the subroutine turns off the motor phase control output at block 604. If no, the phase timer register is decremented at block 600 and the result is checked for sign. If positive the subroutine branches to block 606; if negative the subroutine branches to block 604.

The subroutine continues at block 608 where the incoming RPM signal (at pin P31 of microprocessor 300) is digitally filtered. Then the time prescaling task switcher (which loops through 8 tasks identified at blocks 620, 630, 640, 650) is incremented at block 610. The task switcher varies from 0 to 7. At block 612, the subroutine branches to the proper task depending on the value of the task switcher.

If the task switcher is at value 2 (this occurs every 4 milliseconds), the execute motor state machine subroutine is called at block 620. If the task is value 0 or 4 (this occurs every 2 milliseconds), the wall control switches are debounced at block 630. If the task value is 6 (this occurs every 4 milliseconds), the execute 4 ms timer subroutine is called at block 640. If the task is value 1, 3, 5 or 7, the 1 millisecond timer subroutine is called at block 650. Upon completion of the called subroutine, the 0.256 millisecond timer subroutine returns at block 614.

Figure 10A:
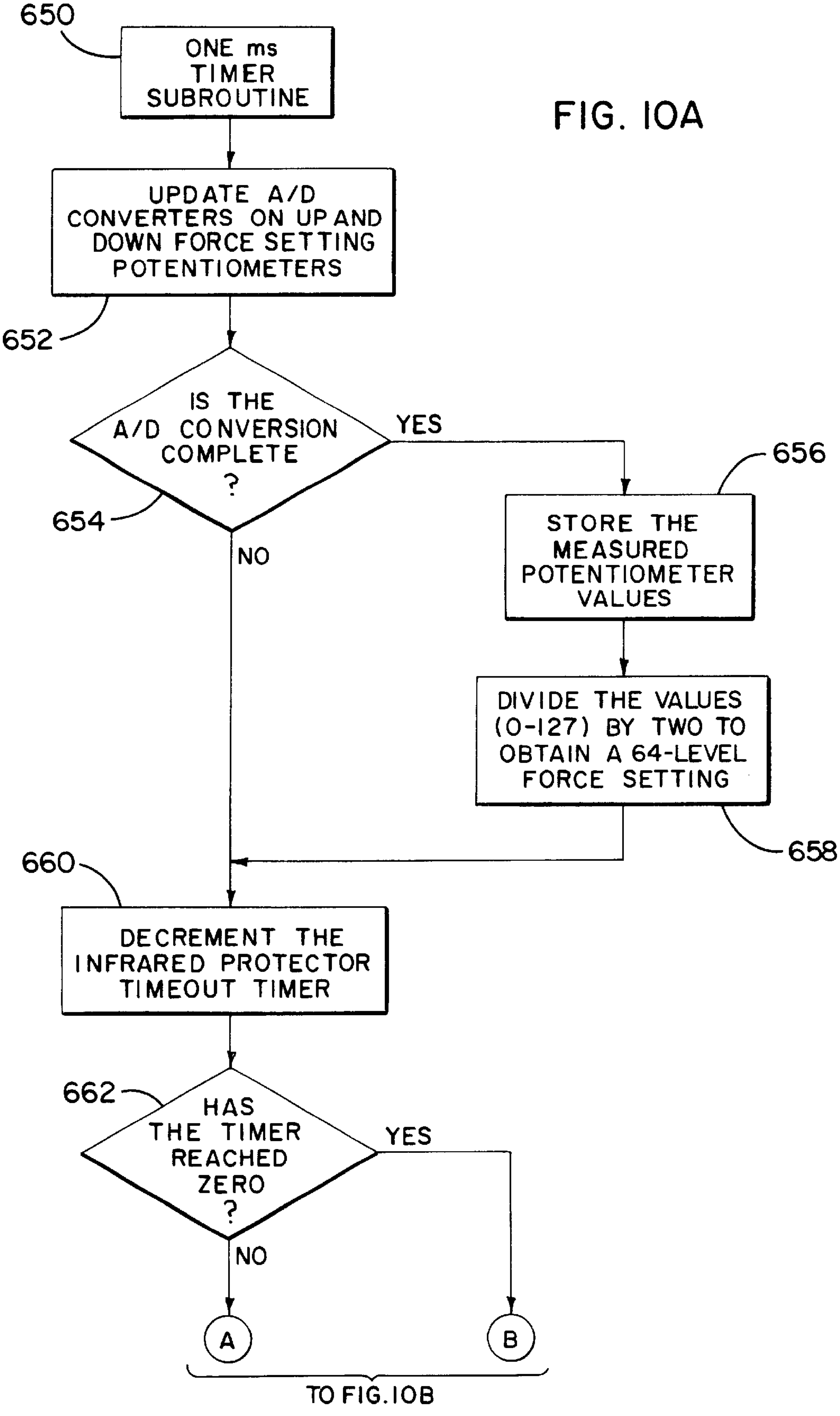
FIGS. 10A–10C are a flow chart of a 1 millisecond timer routine executed in the microprocessor.
Figure 10B:
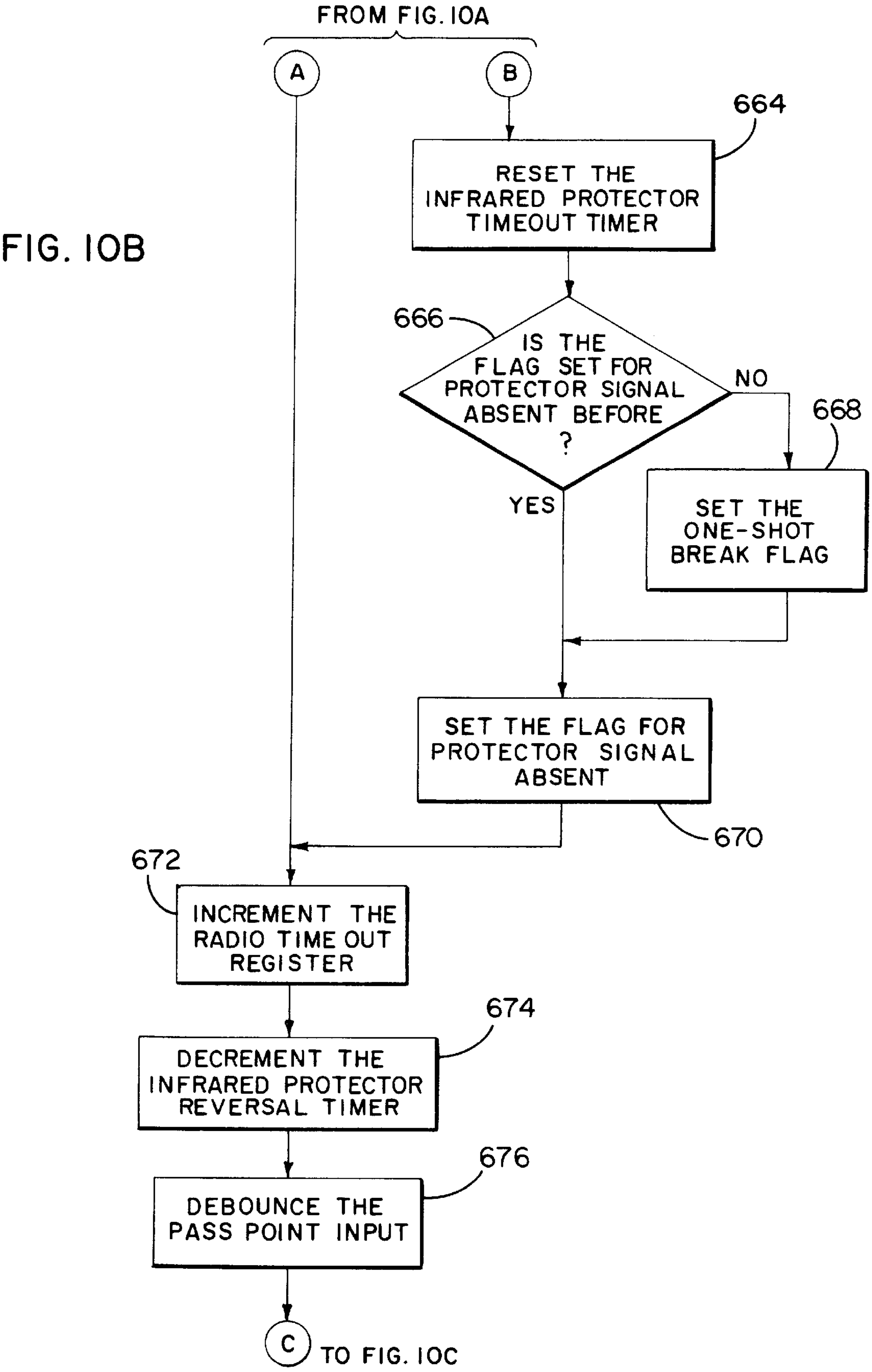
Figure 10C:
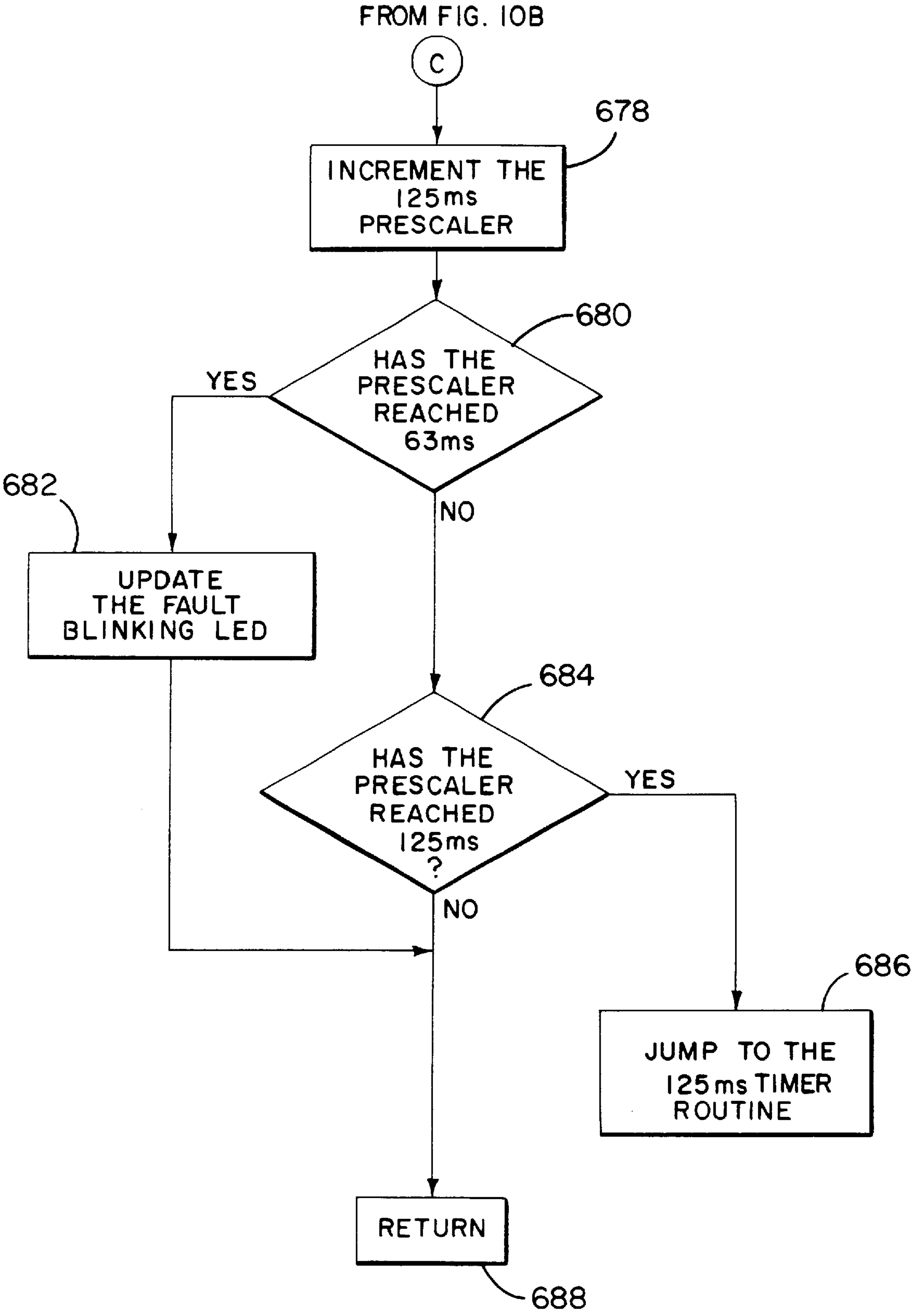
Figure 11A:
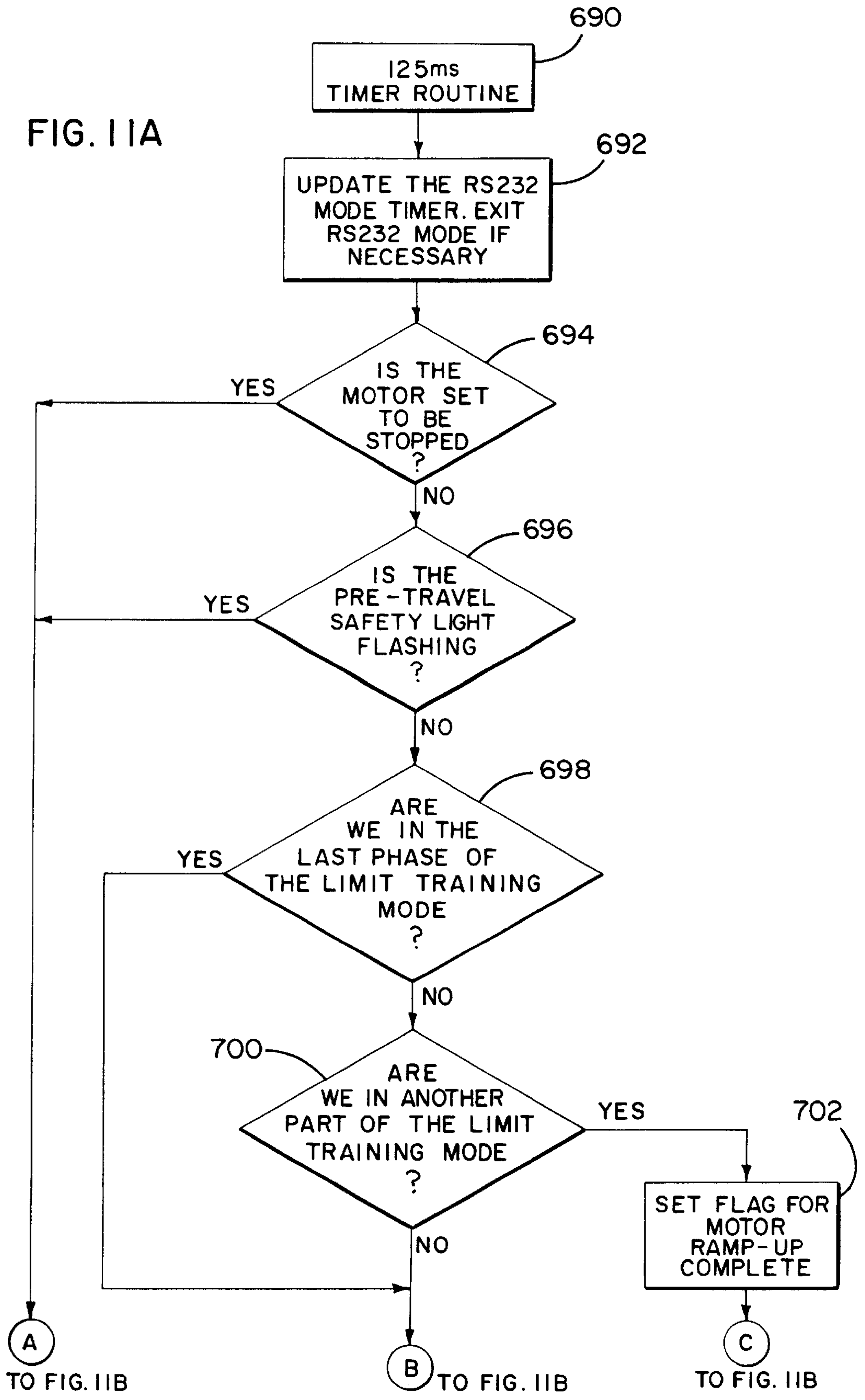
FIGS. 11A–11C are a flow chart of a 125 millisecond timer routine executed in the microprocessor.
Figure 11B:
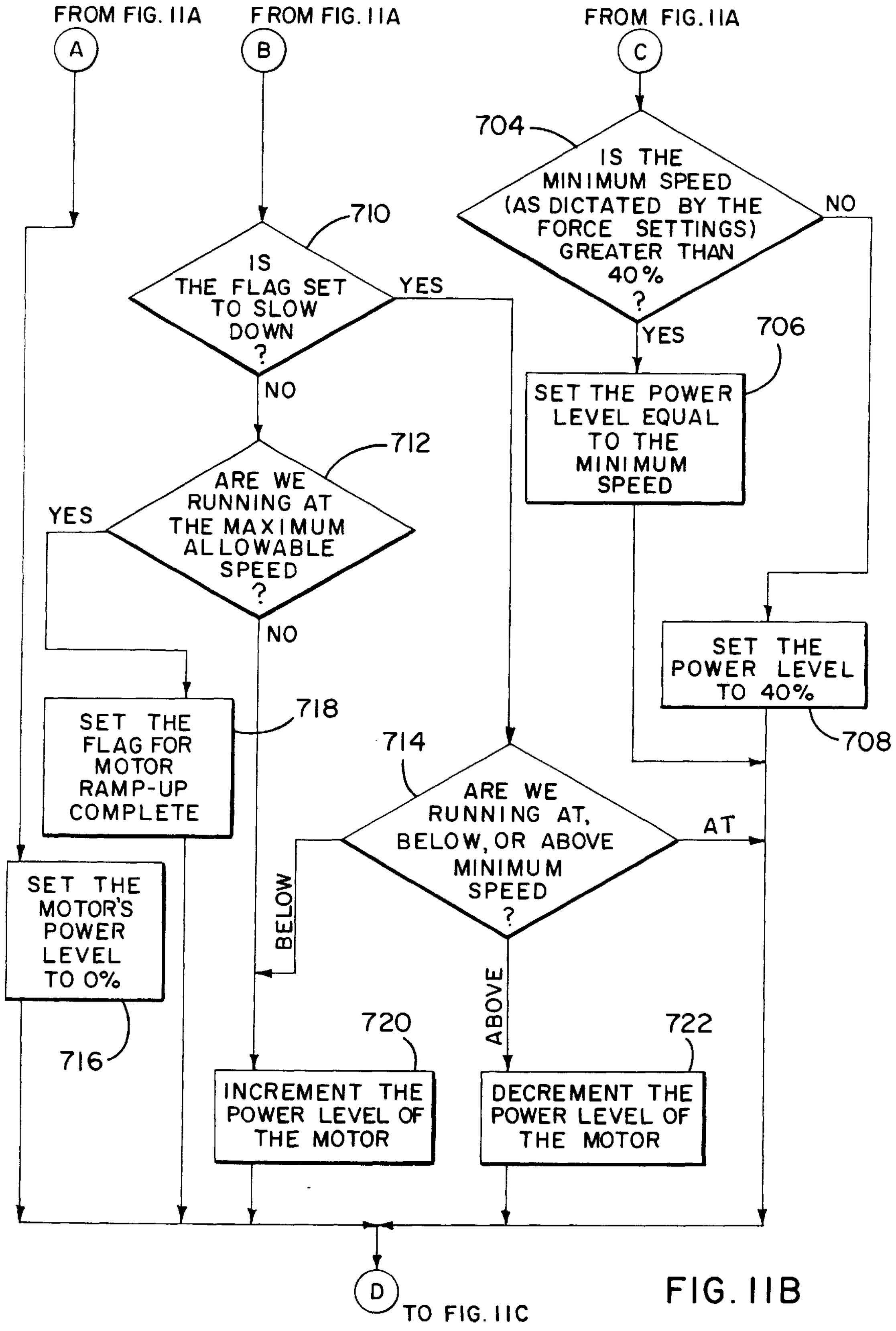
Figure 11C:
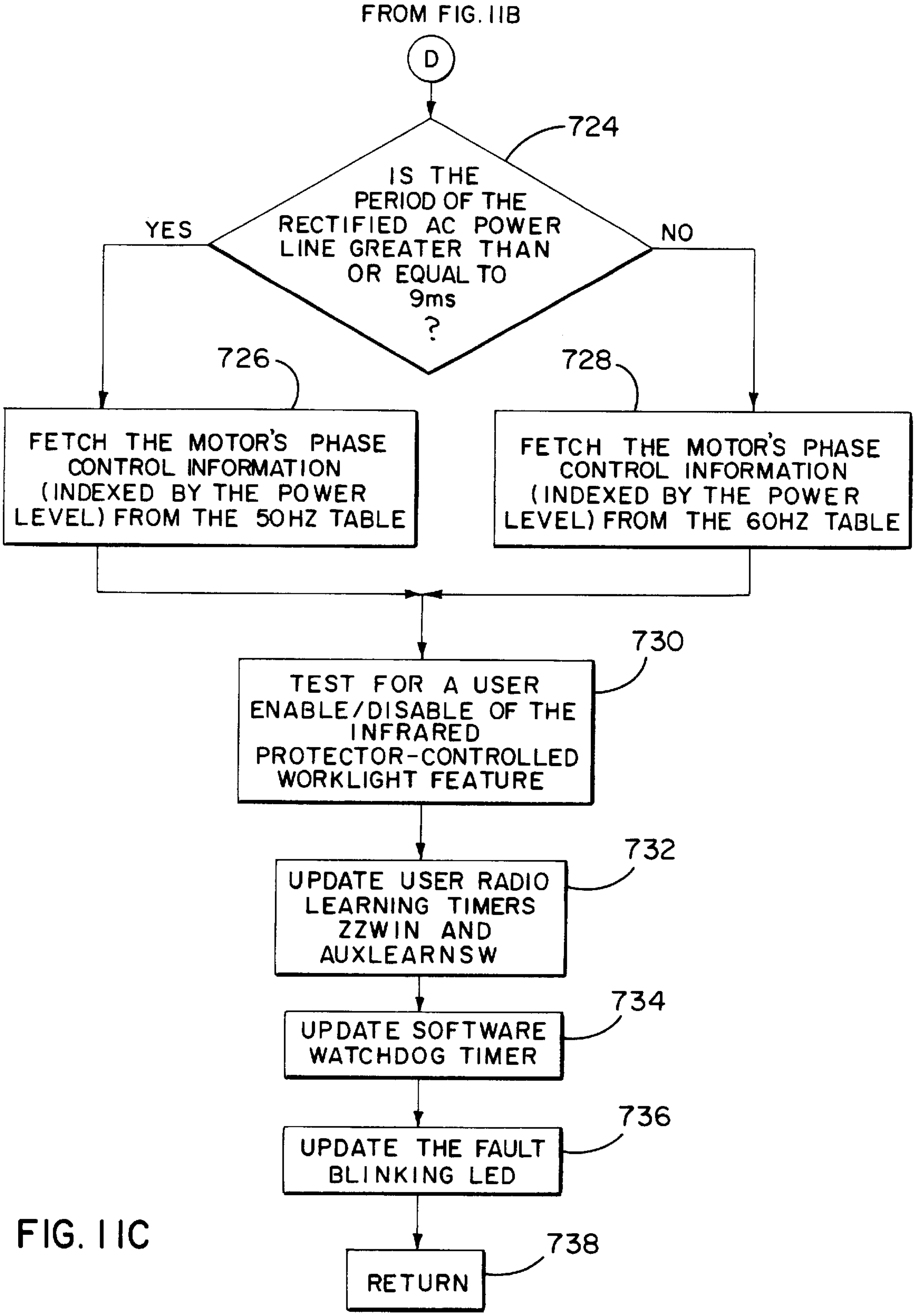

Details of the 1 ms timer subroutine (block 650) are shown in FIGS. 10A–10C. When this subroutine is called, the first step is to update the A/D converters on the UP and DOWN force setting potentiometers (P34 and P35 of microprocessor 300) at block 652. At block 654, the subroutine checks if the A/D conversion (comparison at comparators 320 and 322) is complete. If yes, the measured potentiometer values are stored at block 656. Then the stored values (which vary from 0 to 127) are divided by 2 to obtain the 64 level force setting at block 658. If no, the subroutine decrements the infrared obstacle detector timeout timer at block 660. In block 662, the subroutine checks if the timer has reached zero. If no, the subroutine skips to block 672. If yes, the subroutine resets the infrared obstacle detector timeout timer at block 664. The flag setting for the obstacle detector signal is checked at block 666. If no, the one-shot break flag is set at block 668. If yes, the flag is set indicating the obstacle detector signal is absent at block 670.

At block 672, the subroutine increments the radio time out register. Then the infrared obstacle detector reversal timer is decremented at block 674. The pass point input is debounced at block 676. The 125 millisecond prescaler is incremented at block 678. Then the prescaler is checked if it has reached 63 milliseconds at block 680. If yes, the fault blinking LED is updated at block 682. If no, the prescaler is checked if it has reached 125 ms at block 684. If yes, the 125 ms timer subroutine is executed at block 686. If no, the routine returns at block 688.

The 125 millisecond timer subroutine (block 690) is used to manage the power level of the motor 118. At block 692, the subroutine updates the RS-232 mode timer and exits the RS-232 mode timer if necessary. The same pair of wires is used for both wall control switches and RS-232 communication. If RS-232 communication is received while in the wall control mode, the RS-232 mode is entered. If four seconds passes since the last RS-232 word was received, then the RS-232 timer times out and reverts to the wall control mode. At block 694 the subroutine checks if the motor is set to be stopped. If yes, the subroutine skips to block 716 and sets the motor's power level to 0 percent. If no, the subroutine checks if the pre-travel safety light is flashing at block 696 (if the optional flasher module has been installed, a light will flash for 2 seconds before the motor is permitted to travel and then flash at a predetermined interval during motor travel). If yes, the subroutine skips to block 716 and sets the motor's power level to 0 percent.

If no, the subroutine checks if the microprocessor 300 is in the last phase of a limit training mode at block 698. If yes, the subroutine skips to block 710. If no, the subroutine checks if the microprocessor 300 is in another part of the limit training mode at block 700. If no, the subroutine skips to block 710. If yes, the subroutine checks if the minimum speed (as determined by the force settings) is greater than 40 percent at block 704. If no, the power level is set to 40 percent at block 708. If yes, the power level is set equal to the minimum speed stored in MinSpeed Register at block 706.

At block 710 the subroutine checks if the flag is set to slow down. If yes, the subroutine checks if the motor is running above or below minimum speed at block 714. If above minimum speed, the power level of the motor is decremented one step increment (one step increment is preferably 5% of maximum motor speed) at block 722. If below the minimum speed, the power level of the motor is incremented one step increment (which is preferably 5% of maximum motor speed) to minimum speed at block 720.

If the flag is not set to slow down at block 710, the subroutine checks if the motor is running at maximum allowable speed at block 712. If no, the power level of the motor is incremented one step increment (which is preferably 5% of maximum motor speed) at block 720. If yes, the flag is set for motor ramp-up speed complete.

The subroutine continues at block 724 where it checks if the period of the rectified AC power line (pin P24 of microprocessor 300) is greater than or equal to 9 ms. If no, the subroutine fetches the motor's phase control information (indexed from the power level) from the 60 Hz look-up table stored in ROM at block 728. If yes, the subroutine fetches the motor's phase control information (indexed from the power level) from the 50 Hz look-up table stored in ROM at block 726.

The subroutine tests for a user enable/disable of the infrared obstacle detector-controlled worklight feature at block 730. Then the user radio learning timers, ZZWIN (at the wall keypad if installed) and AUXLEARNSW (radio on air and worklight command) are updated at block 732. The software watchdog timer is updated at block 734 and the fault blinking LED is updated at block 736. The subroutine returns at block 738.

Figure 12A:
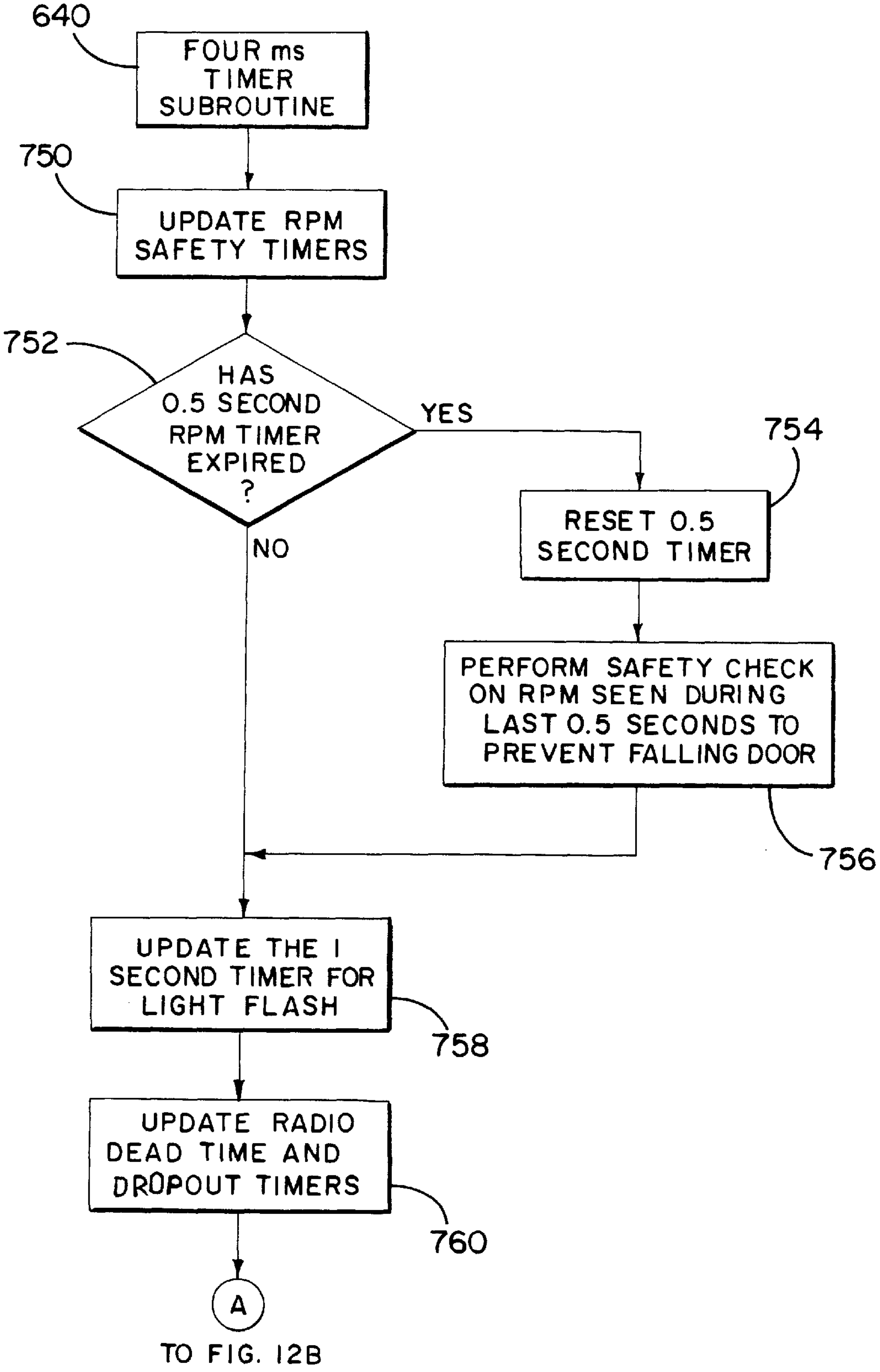
FIGS. 12A–12B are a flow chart of a 4 millisecond timer routine executed in the microprocessor.
Figure 12B:
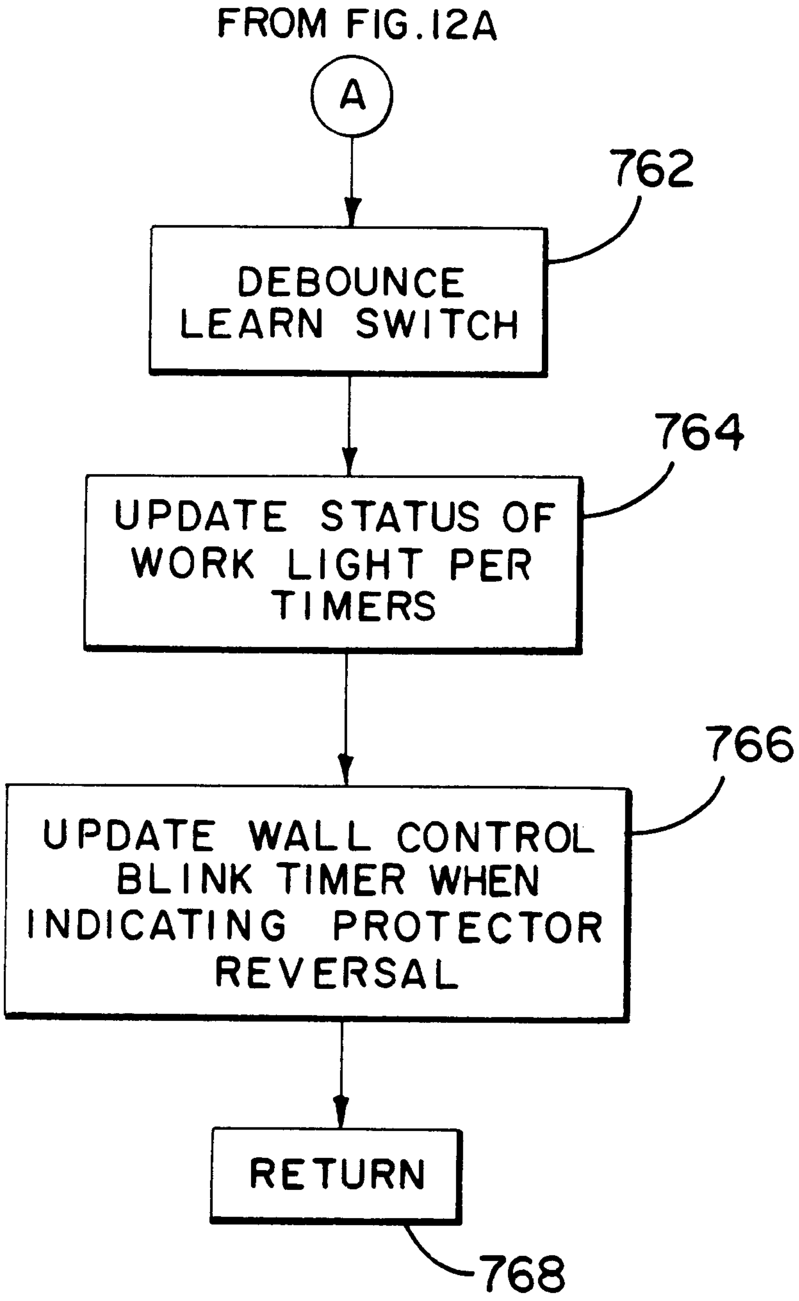

The 4 millisecond timer subroutine is used to check on various systems which do not require updating as often as more critical systems. Referring to FIGS. 12A and 12B, the subroutine is called at block 640. At block 750, the RPM safety timers are updated. These timers are used to determine if the door has engaged the floor. The RPM safety timer is a one second delay before the operator begins to look for a falling door, i.e., one second after stopping. There are two different forces used in the garage door operator. The first type force are the forces determined by the UP and DOWN force potentiometers. These force levels determine the speed at which the door travels in the UP and DOWN directions. The second type of force is determined by the decrease in motor speed due to an external force being applied to the door (an obstacle or the floor). This programmed or preselected external force is the maximum force that the system will accept before an auto-reverse or stop is commanded.

At block 752 the 0.5 second RPM timer is checked to see if it has expired. If yes, the 0.5 second timer is reset at block 754. At block 756 safety checks are performed on the RPM seen during the last 0.5 seconds to prevent the door from falling. The 0.5 second timer is chosen so the maximum force achieved at the trolley will reach 50 kilograms in 0.5 seconds if the motor is operating at 100 percent of power.

At block 758, the subroutine updates the 1 second timer for the optional light flasher module. In this embodiment, the preferred flash period is 1 second. At block 760 the radio dead time and dropout timers are updated. At block 762 the learn switch is debounced. At block 764 the status of the worklight is updated in accordance with the various light timers. At block 766 the optional wall control blink timer is updated. The optional wall control includes a light which blinks when the door is being commanded to auto-reverse in response to an infrared obstacle detector signal break. At block 768 the subroutine returns.

Figure 13A:
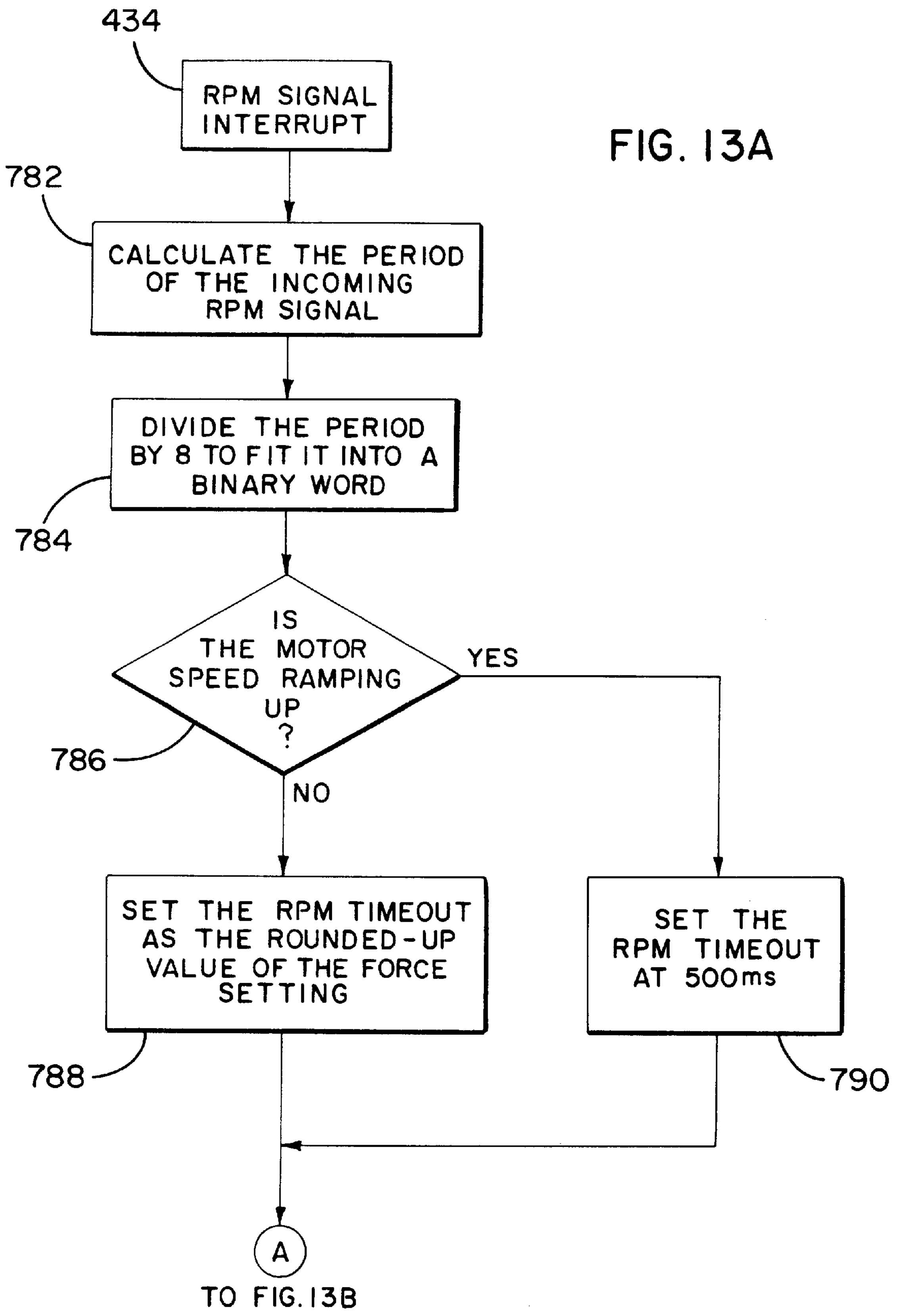
FIGS. 13A–13B are a flow chart of an RPM interrupt routine executed in the microprocessor.
Figure 13B:
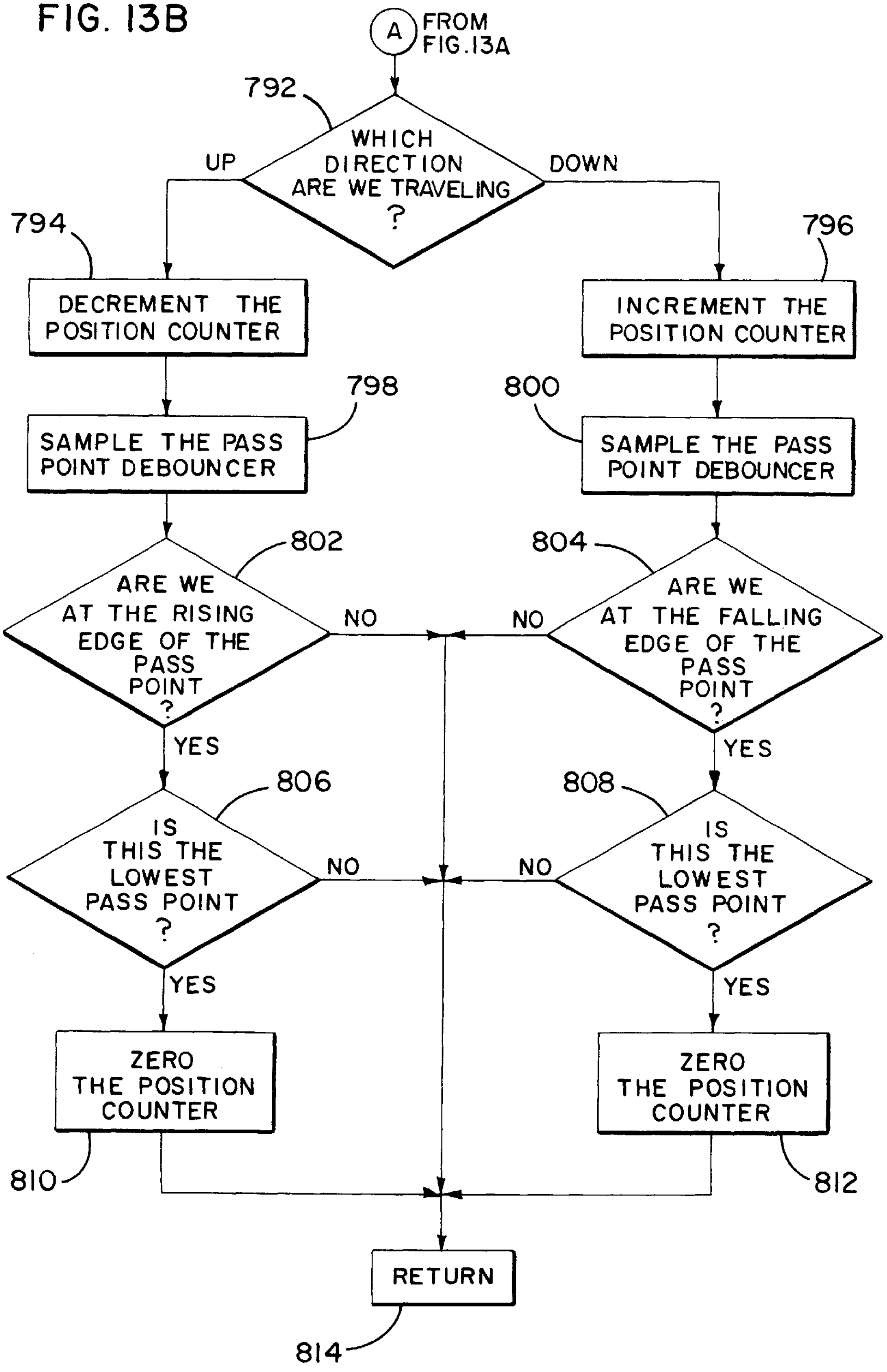

Further details of the asynchronous RPM signal interrupt, block 434, are shown in FIGS. 13A and 13B. This signal, which is provided to microprocessor 300 at pin P31, is used to control the motor speed and the position detector. Door position is determined by a value relative to the pass point. The pass point is set at 0. Positions above the pass point are negative; positions below the pass point are positive. When the door travels to the UP limit, the position detector (or counter) determines the position based on the number of RPM pulses to the UP limit number. When the door travels DOWN to the DOWN limit, the position detector counts the number of RPM pulses to the DOWN limit number. The UP and DOWN limit numbers are stored in a register.

At block 782 the RPM interrupt subroutine calculates the period of the incoming RPM signal. If the door is traveling UP, the subroutine calculates the difference between two successive pulses. If the door is traveling DOWN, the subroutine calculates the difference between two successive pulses. At block 784, the subroutine divides the period by 8 to fit into a binary word. At block 786 the subroutine checks if the motor speed is ramping up. This is the max force mode. RPM timeout will vary from 10 to 500 milliseconds. Note that these times are recommended for a DC motor. If an AC motor is used, the maximum time would be scaled down to typically 24 milliseconds. A 24 millisecond period is slower than the breakdown RPM of the motor and therefore beyond the maximum possible force of most preferred motors. If yes, the RPM timeout is set at 500 milliseconds (0.5 seconds) at block 790. If no, the subroutine sets the RPM timeout as the rounded-up value of the force setting in block 788.

At block 792 the subroutine checks for the direction of travel. This is found in the state machine register. If the door is traveling DOWN, the position counter is incremented at block 796 and the pass point debouncer is sampled at block 800. At block 804, the subroutine checks for the falling edge of the pass point signal. If the falling edge is present, the subroutine returns at block 814. If there is a pass point falling edge, the subroutine checks for the lowest pass point (in cases where more than one pass point is used). If this is not the lowest pass point, the subroutine returns at block 814. If it is the only pass point or the lowest pass point, the position counter is zeroed and the subroutine returns at block 814.

If the door is traveling UP, the subroutine decrements the position counter at block 794 and samples the pass point debouncer at block 798. Then it checks for the rising edge of the pass point signal at block 802. If there is no pass point signal rising edge, the subroutine returns at block 814. If there is, it checks for the lowest pass point at block 806. If no the subroutine returns at block 814. If yes, the subroutine zeroes the position counter and returns at block 814.

Figure 14:
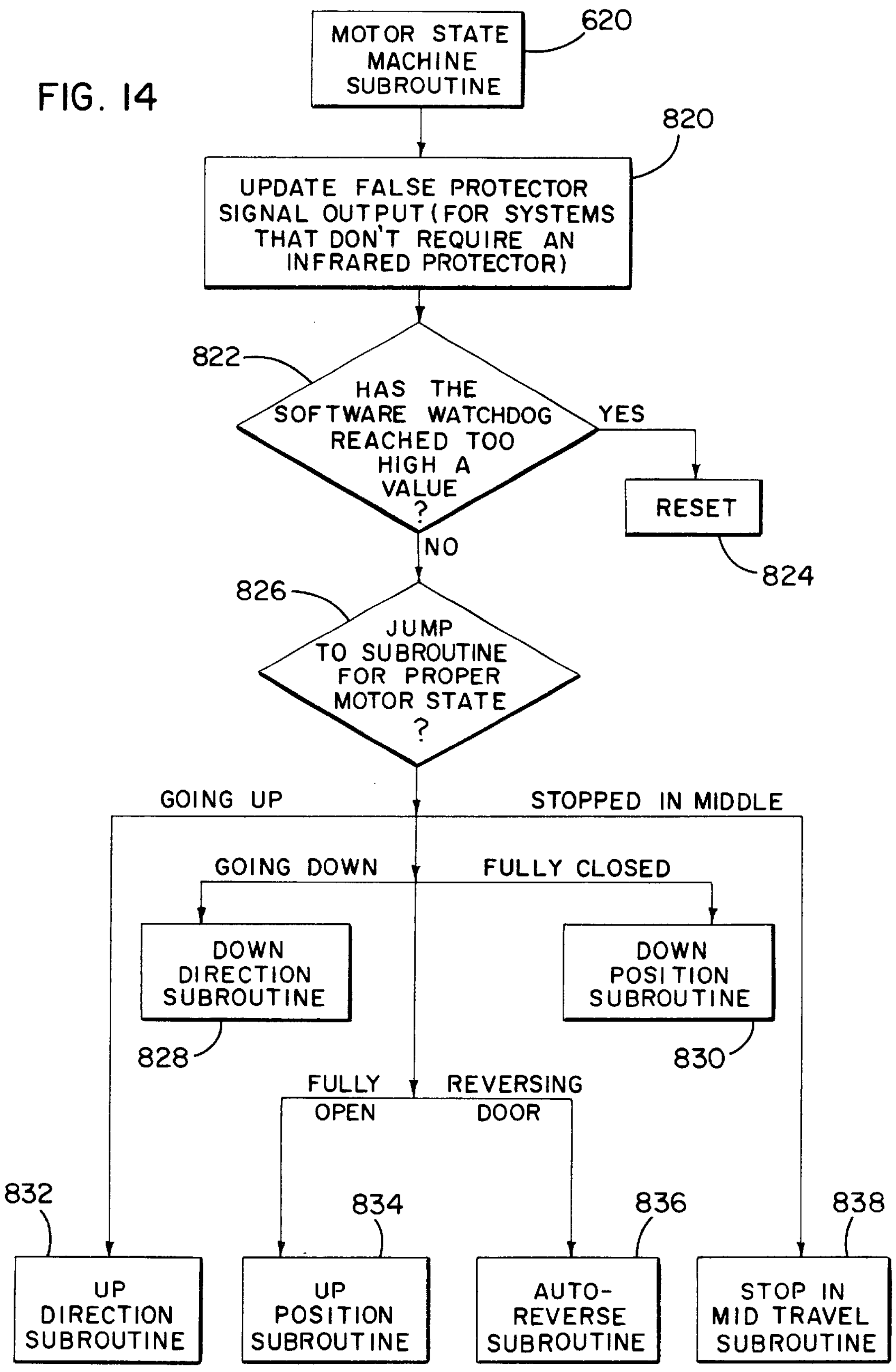
FIG. 14 is a flow chart of a motor state machine routine executed in the microprocessor.

The motor state machine subroutine, block 620, is shown in FIG. 14. It keeps track of the state of the motor. At block 820, the subroutine updates the false obstacle detector signal output, which is used in systems that do not require an infrared obstacle detector. At block 822, the subroutine checks if the software watchdog timer has reached too high a value. If yes, a system reset is commanded at block 824. If no, at block 826, it checks the state of the motor stored in the motor state register located in EEPROM 302 and executes the appropriate subroutine.

If the door is traveling UP, the UP direction subroutine at block 832 is executed. If the door is traveling DOWN, the DOWN direction subroutine is executed at block 828. If the door is stopped in the middle of the travel path, the stop in midtravel subroutine is executed at block 838. If the door is fully closed, the DOWN position subroutine is executed at block 830. If the door is fully open, the UP position subroutine is executed at block 834. If the door is reversing, the auto-reverse subroutine is executed at block 836.

Figure 15:
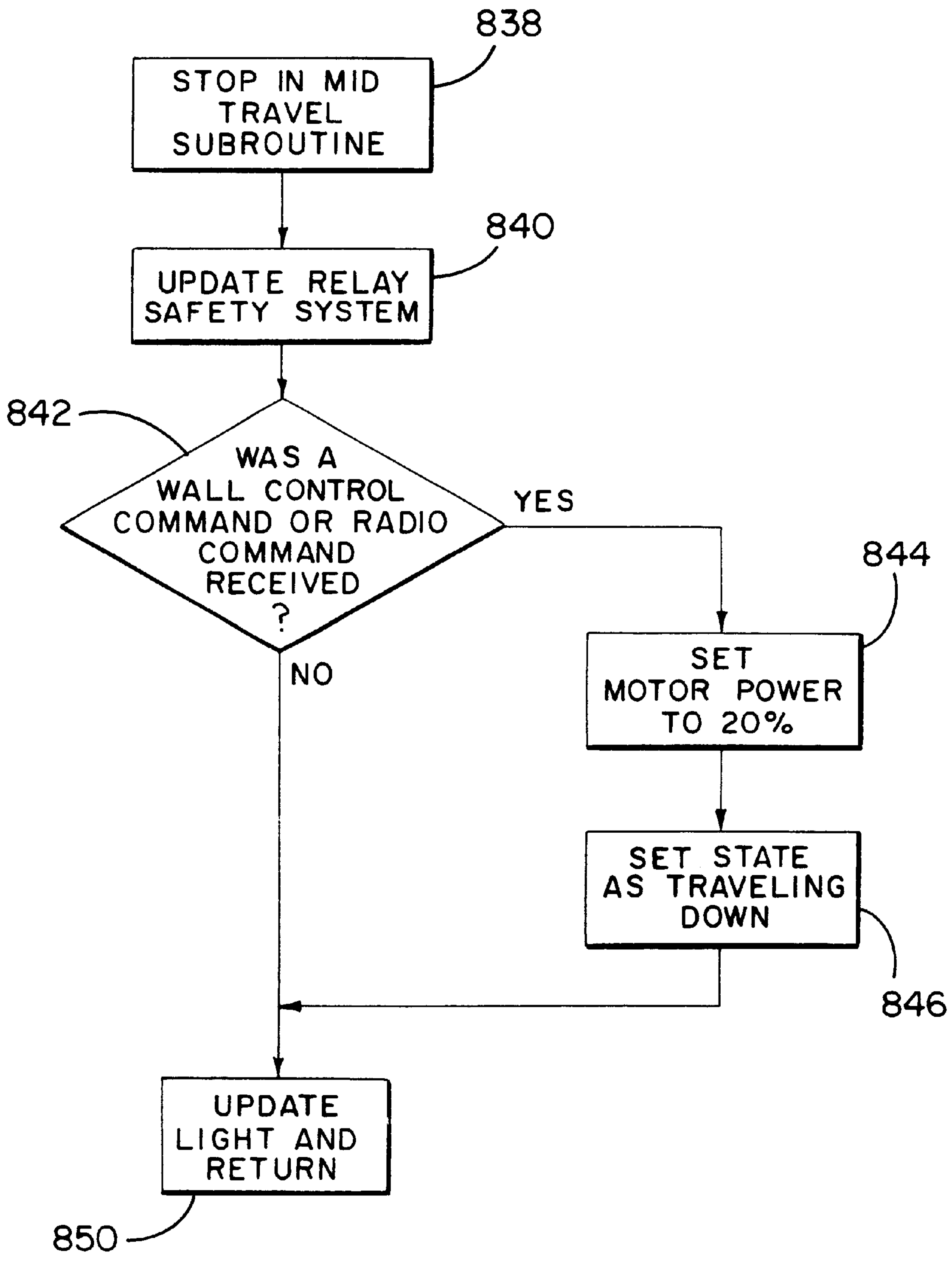
FIG. 15 is a flow chart of a stop in midtravel routine executed in the microprocessor.

When the door is stopped in midtravel, the subroutine at block 838 is called, as shown in FIG. 15. In block 840 the subroutine updates the relay safety system (ensuring that relays K1 and K2 are open). The subroutine checks for a received wall command or radio command. If there is no received command, the subroutine updates the worklight status and returns. If yes, the motor power is set to 20 percent at block 844 and the motor state is set to traveling DOWN at block 846. The worklight status is updated and the subroutine returns at block 850. If the door is stopped in midtravel and a door command is received, the door is set to close. The next time the system calls the motor state machine subroutine, the motor state machine will call the DOWN direction subroutine. The door must close to the DOWN limit before it can be opened to the full UP limit.

Figure 16:
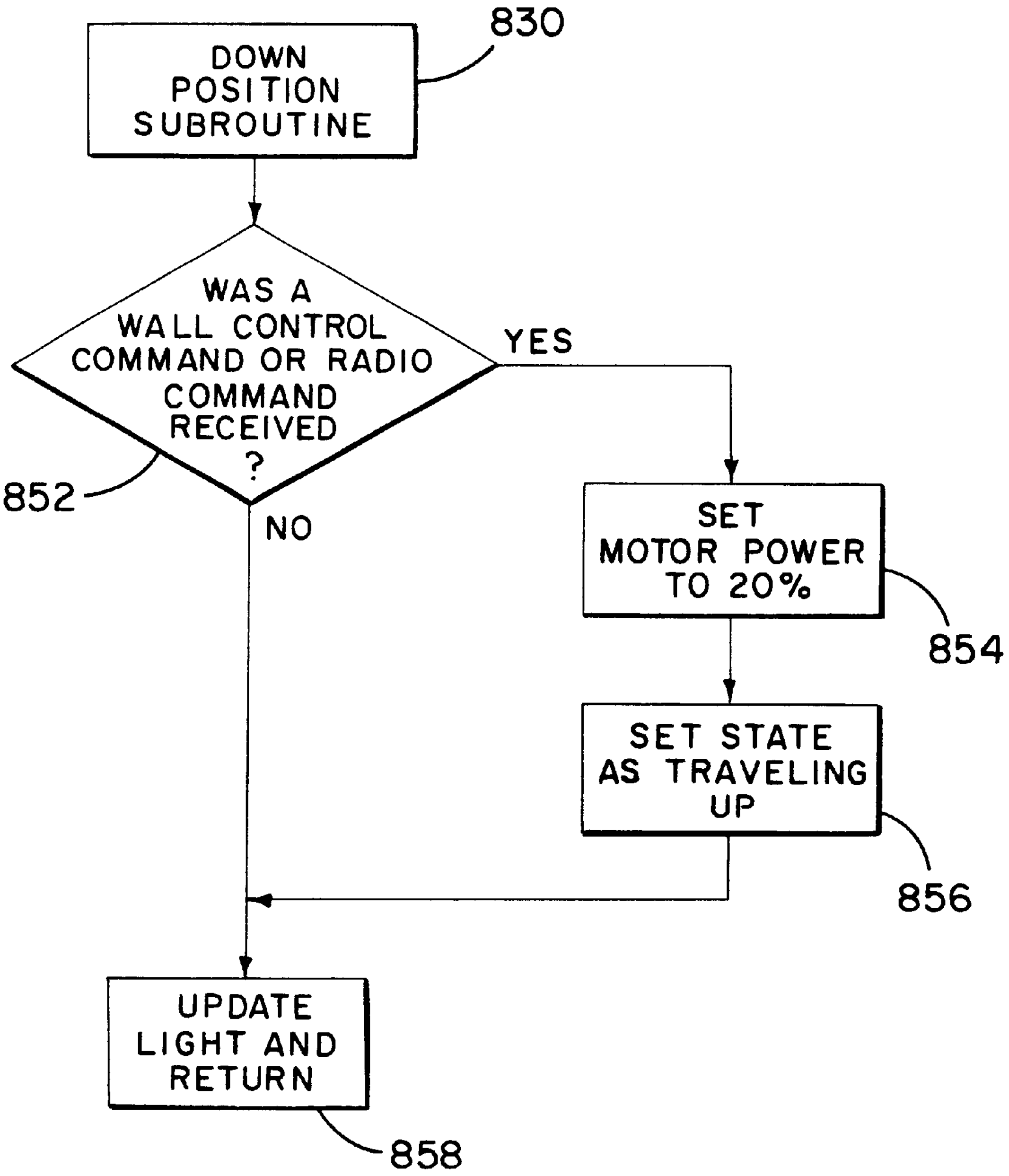
FIG. 16 is a flow chart of a DOWN position routine executed in the microprocessor.

If the state machine indicates the door is in the DOWN position (i.e. the DOWN limit position), the DOWN position subroutine, block 830, at FIG. 16 is called. When the door is in the DOWN position, the subroutine checks if a wall control or radio command has been received. If no, the subroutine updates the light and returns at block 858. If yes, the motor power is set to 20 percent at block 854 and the motor state register is set to show the state is traveling UP at block 856. The subroutine then updates the light and returns at block 858.

Figure 17A:
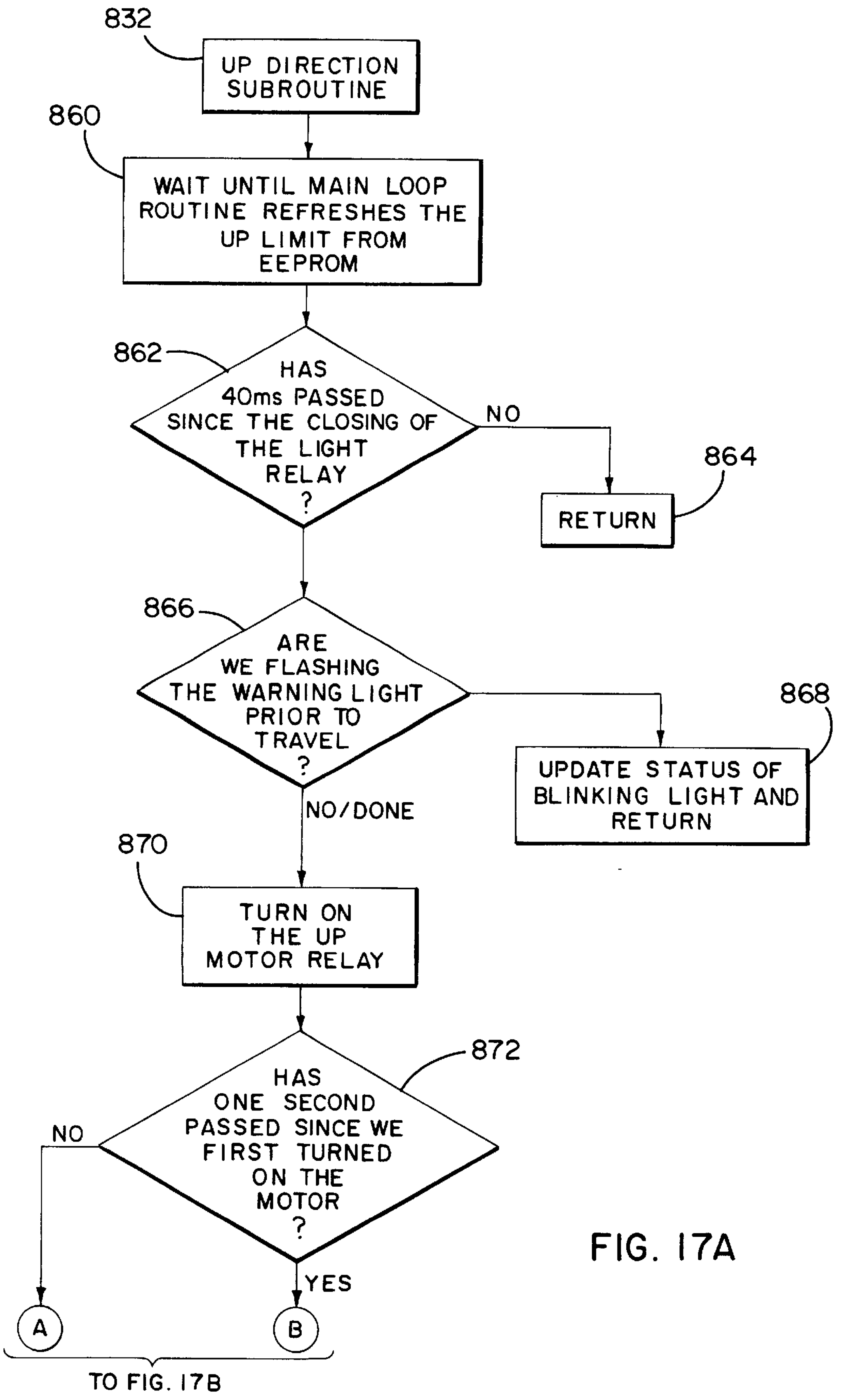
FIGS. 17A–17C are a flow chart of an UP direction routine executed in the microprocessor.
Figure 17B:
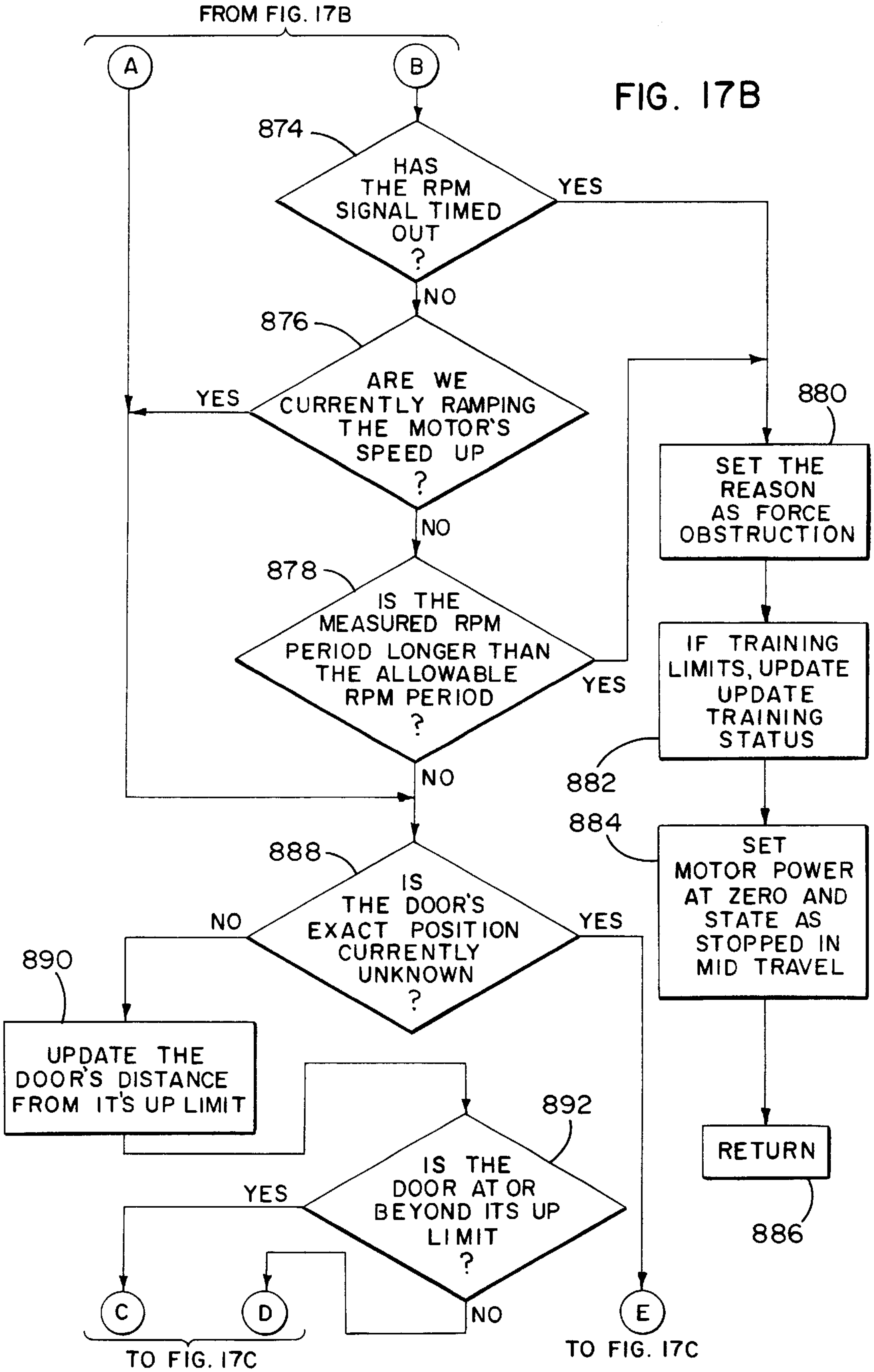
Figure 17C:
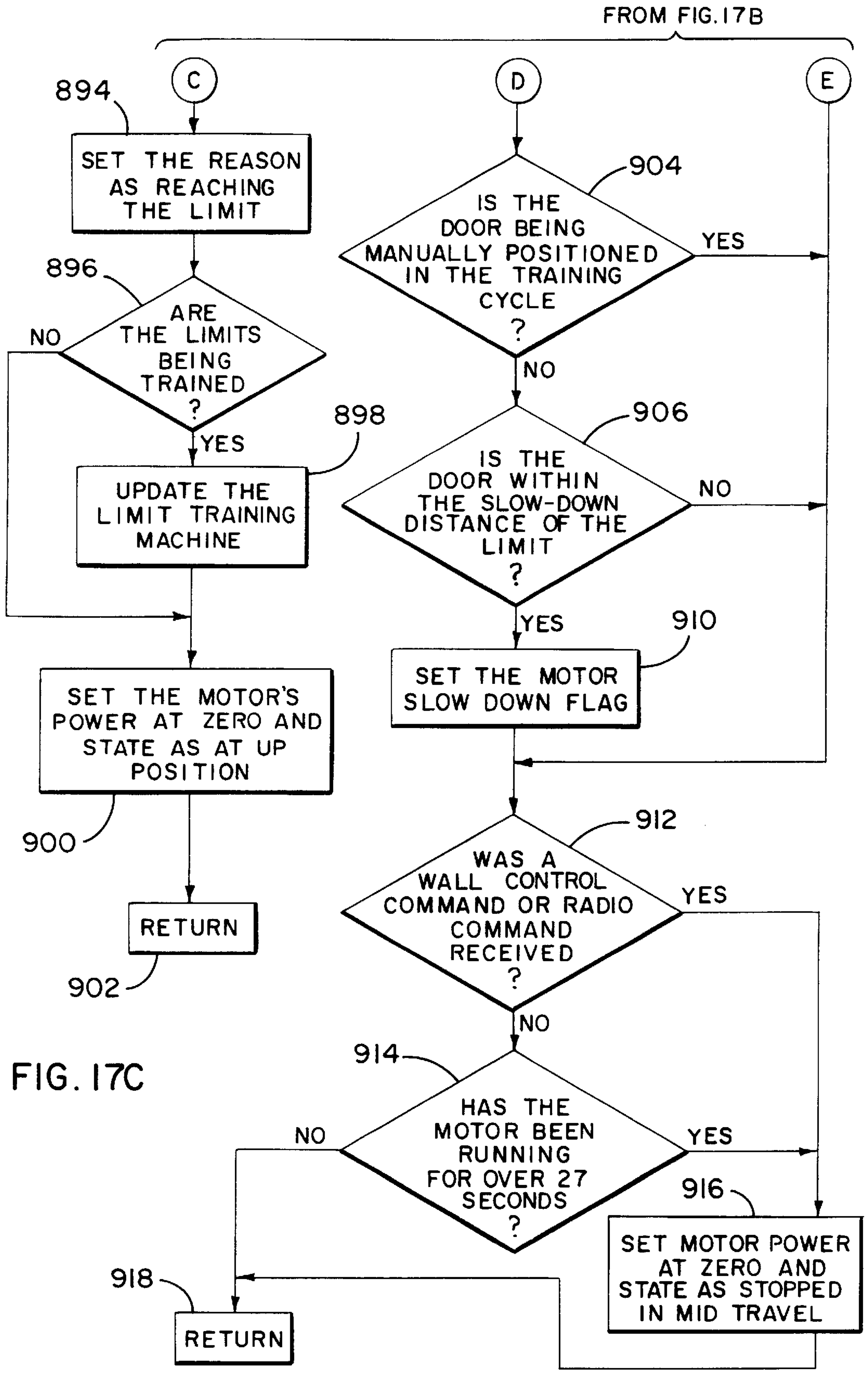

The UP direction subroutine, block 832, is shown in FIGS. 17A–17C. At block 860 the subroutine waits until the main loop refreshes the UP limit from EEPROM 302. Then it checks if 40 milliseconds have passed since closing of the light relay K3 at block 862. If not, the subroutine returns. If yes, the subroutine checks for flashing the warning light prior to travel at block 866 (only if the optional flasher module is installed). If the light is flashing, the status of the blinking light is updated and the subroutine returns at block 868. If not, the flashing is terminated, the motor UP relay is turned on at block 870. Then the subroutine waits until 1 second has passed after the motor was turned on at block 872. If no, the subroutine skips to block 888. If yes, the subroutine checks for the RPM signal timeout. If no, the subroutine checks if the motor speed is ramping up at block 876 by checking the value of the RAMPFLAG register in RAM (i.e., UP, DOWN, FULLSPEED, STOP). If yes, the subroutine skips to block 888. If no, the subroutine checks if the measured RPM is longer than the allowable RPM period at block 878. If no, the subroutine continues at block 888.

If the RPM signal has timed out at block 874 or the measured time period is longer than allowable at block 878, the subroutine branches to block 880. At block 880, the reason is set as force obstruction. At block 882, if the training limits are being set, the training status is updated. At block 884 the motor power is set to zero and the state is set as stopped in midtravel. At block 886 the subroutine returns.

At block 888 the subroutine checks if the door's exact position is known. If it is not, the door's distance from the UP limit is updated in block 890 by subtracting the UP limit stored in RAM from the position of the door also stored in RAM. Then the subroutine checks at block 892 if the door is beyond its UP limit. If yes, the subroutine sets the reason as reaching the limit in block 894. Then the subroutine checks if the limits are being trained. If yes, the limit training machine is updated at block 898. If no, the motor's power is set as zero and the motor state is set at the UP position in block 900. Then the subroutine returns at block 902.

If the door is not beyond its UP limit, the subroutine checks if the door is being manually positioned in the training cycle at block 904. If not, the door position within the slowdown distance of the limit is checked at block 906. If yes, the motor slow down flag is set at block 910. If the door is being positioned manually at block 904 or the door is not within the slow down distance, the subroutine skips to block 912. At block 912 the subroutine checks if a wall control or radio command has been received. If yes, the motor power is set at zero and the state is set at stopped in midtravel at block 916. If no, the system checks if the motor has been running for over 27 seconds at block 914. If yes, the motor power is set at zero and the motor state is set at stopped in midtravel at block 916. Then the subroutine returns at block 918.

Figure 18:
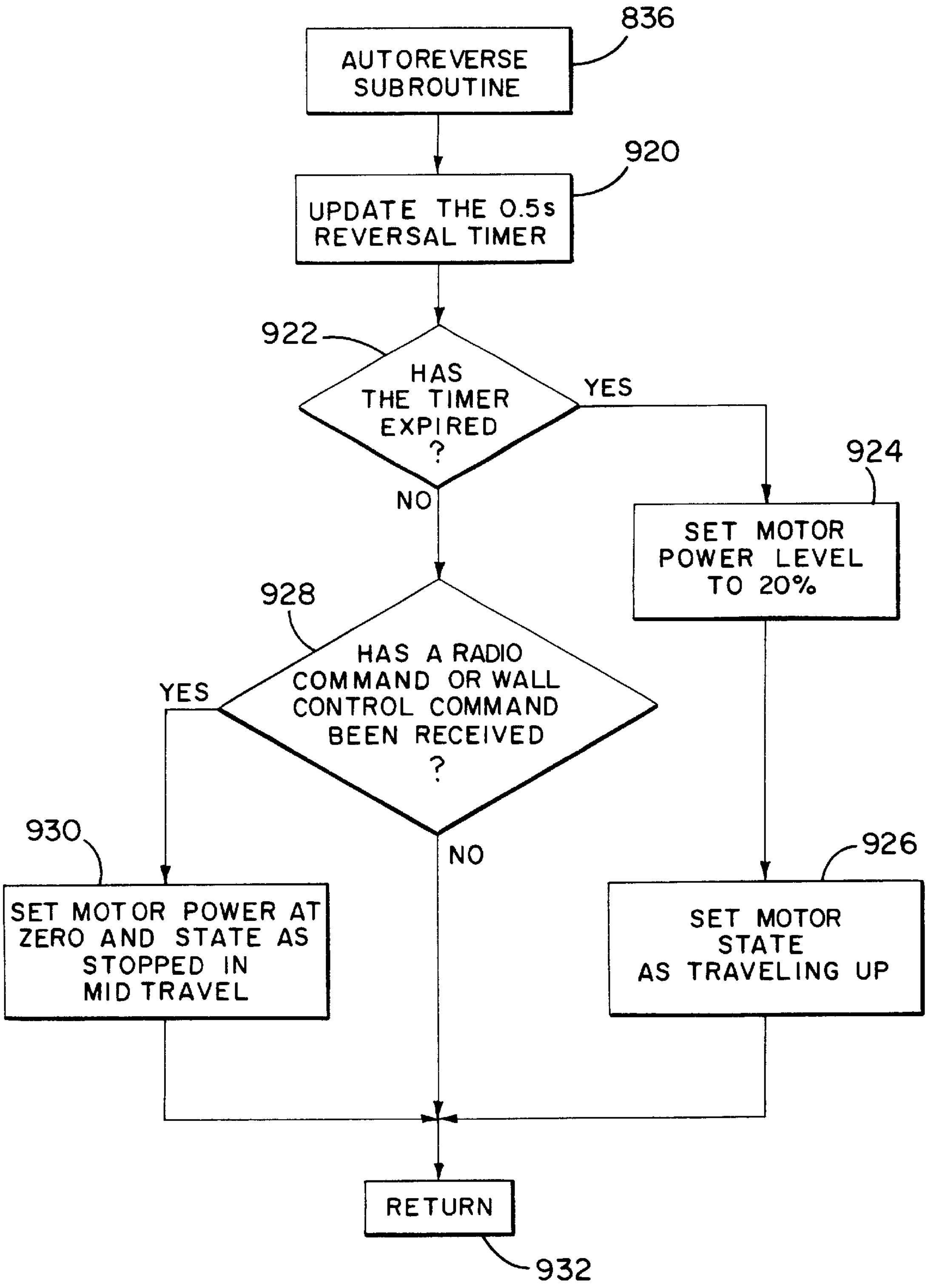
FIG. 18 is a flow chart of an auto-reverse routine executed in the microprocessor.

Referring to FIG. 18, the auto-reverse subroutine block 836 is described. (Force reversal is stopping the motor for 0.5 seconds, then traveling UP.) At block 920 the subroutine updates the 0.5 second reversal timer (the force reversal timer described above). Then the subroutine checks at block 922 for expiration of the force-reversal timer. If yes, the motor power is set to 20 percent at block 924 and the motor state is set to traveling UP at block 926 and the subroutine returns at block 932. If the timer has not expired, the subroutine checks for receipt of a wall command or radio command at block 928. If yes, the motor power is set to zero and the state is set at stopped in midtravel at block 930, then the subroutine returns at block 932. If no, the subroutine returns at block 932.

Figure 19:
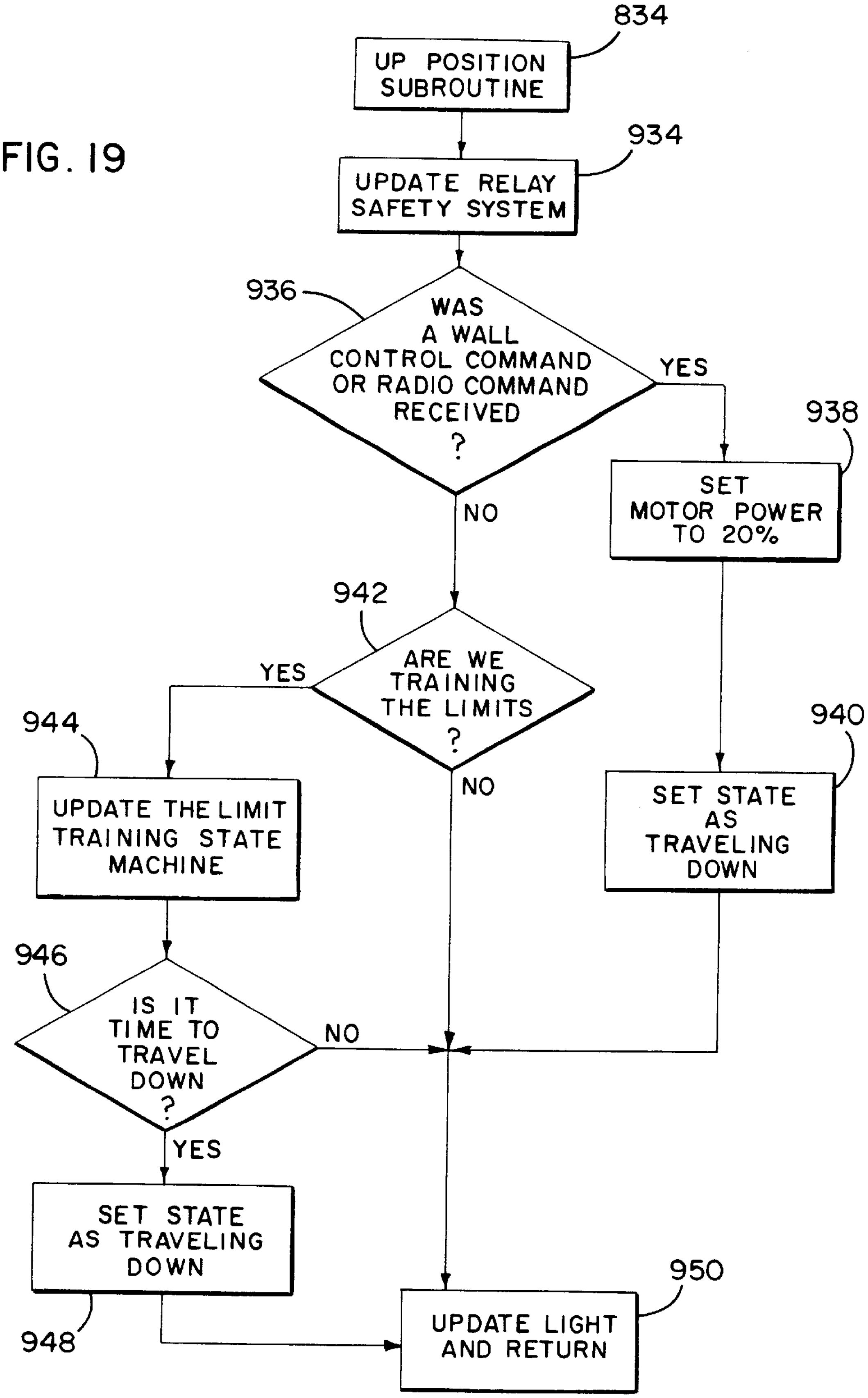
FIG. 19 is a flow chart of an UP position routine executed in the microprocessor.
Figure 20A:
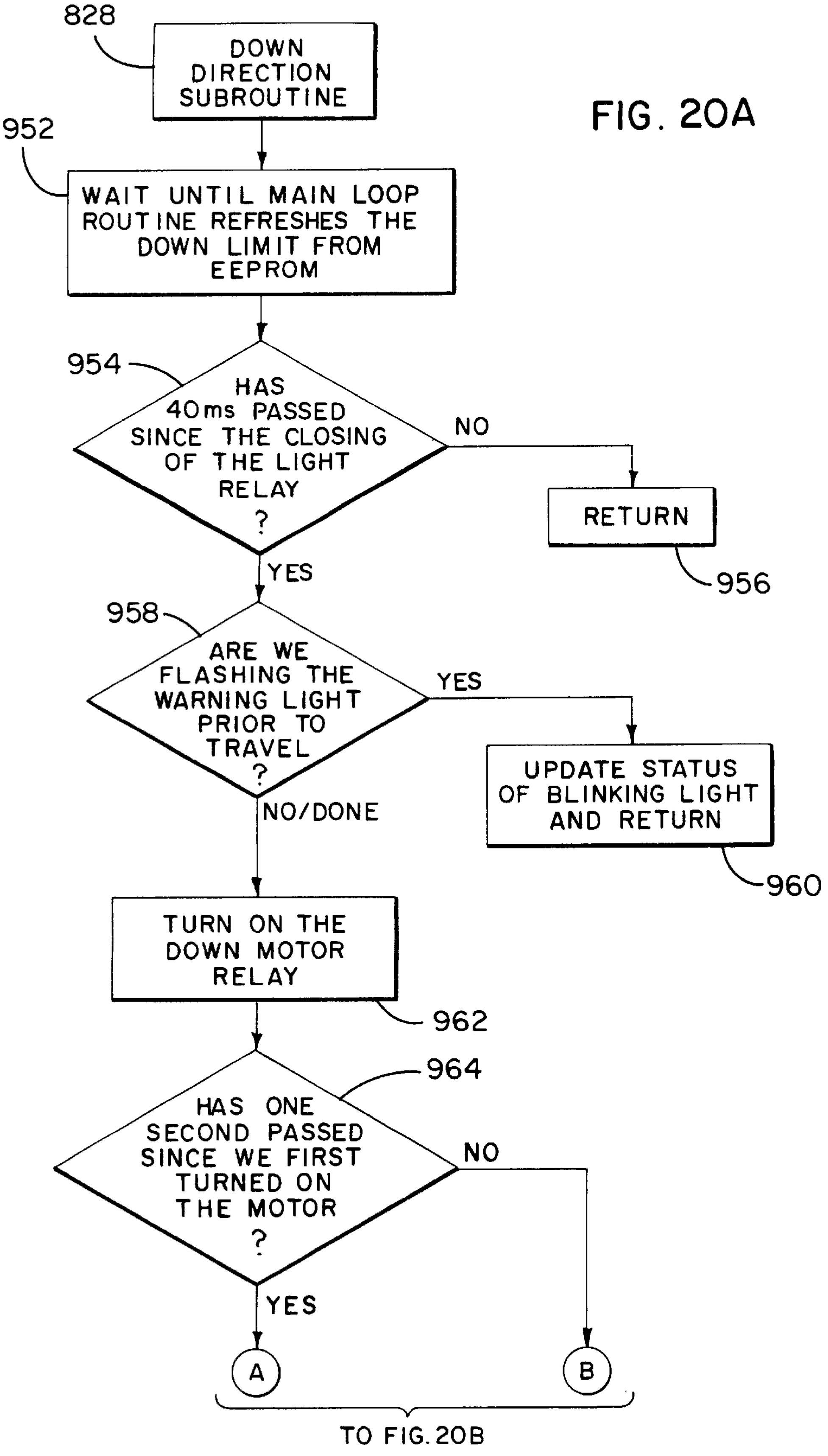
FIGS. 20A–20D are a flow chart of the DOWN direction routine executed in the microprocessor.
Figure 20B:
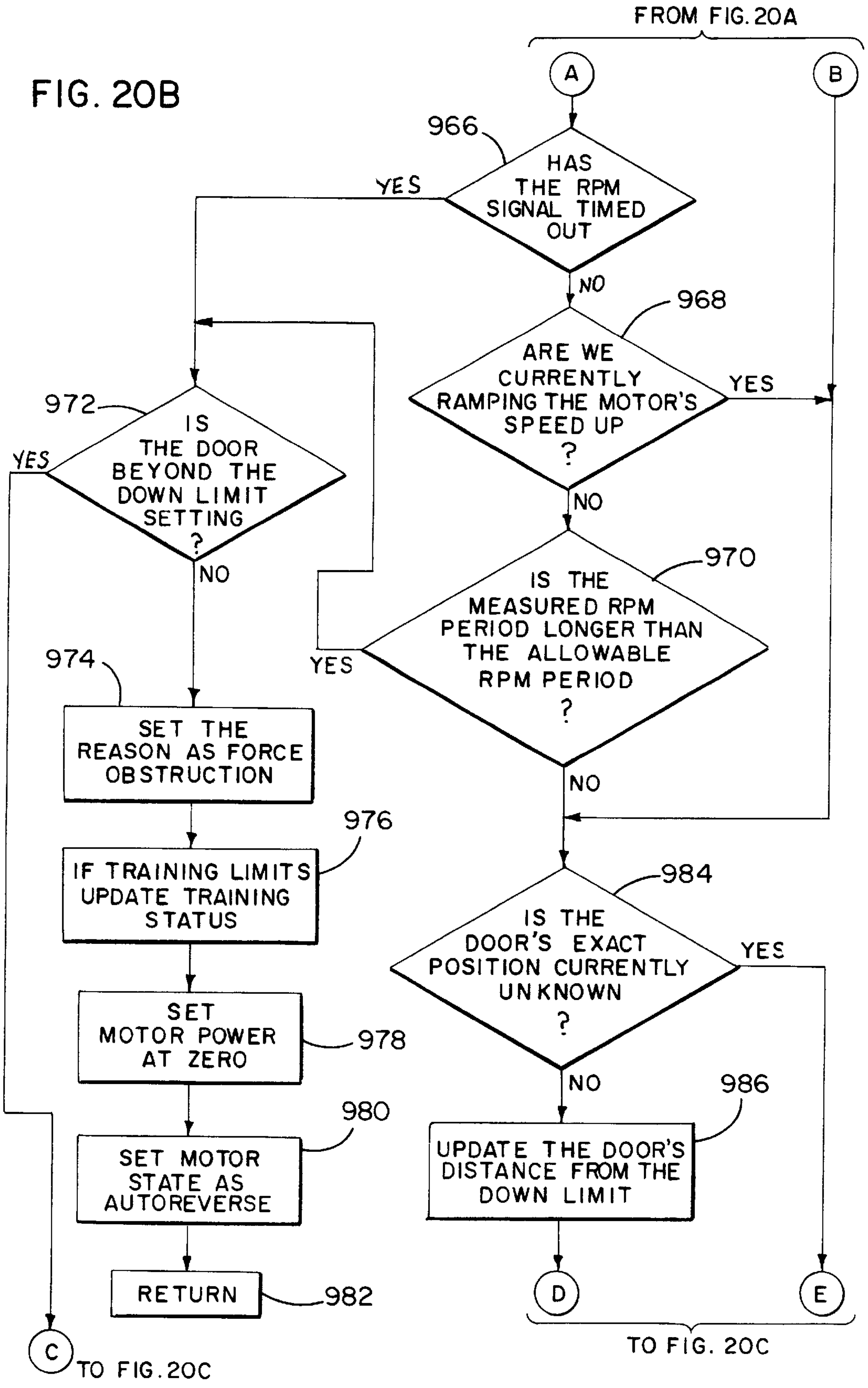
Figure 20C:
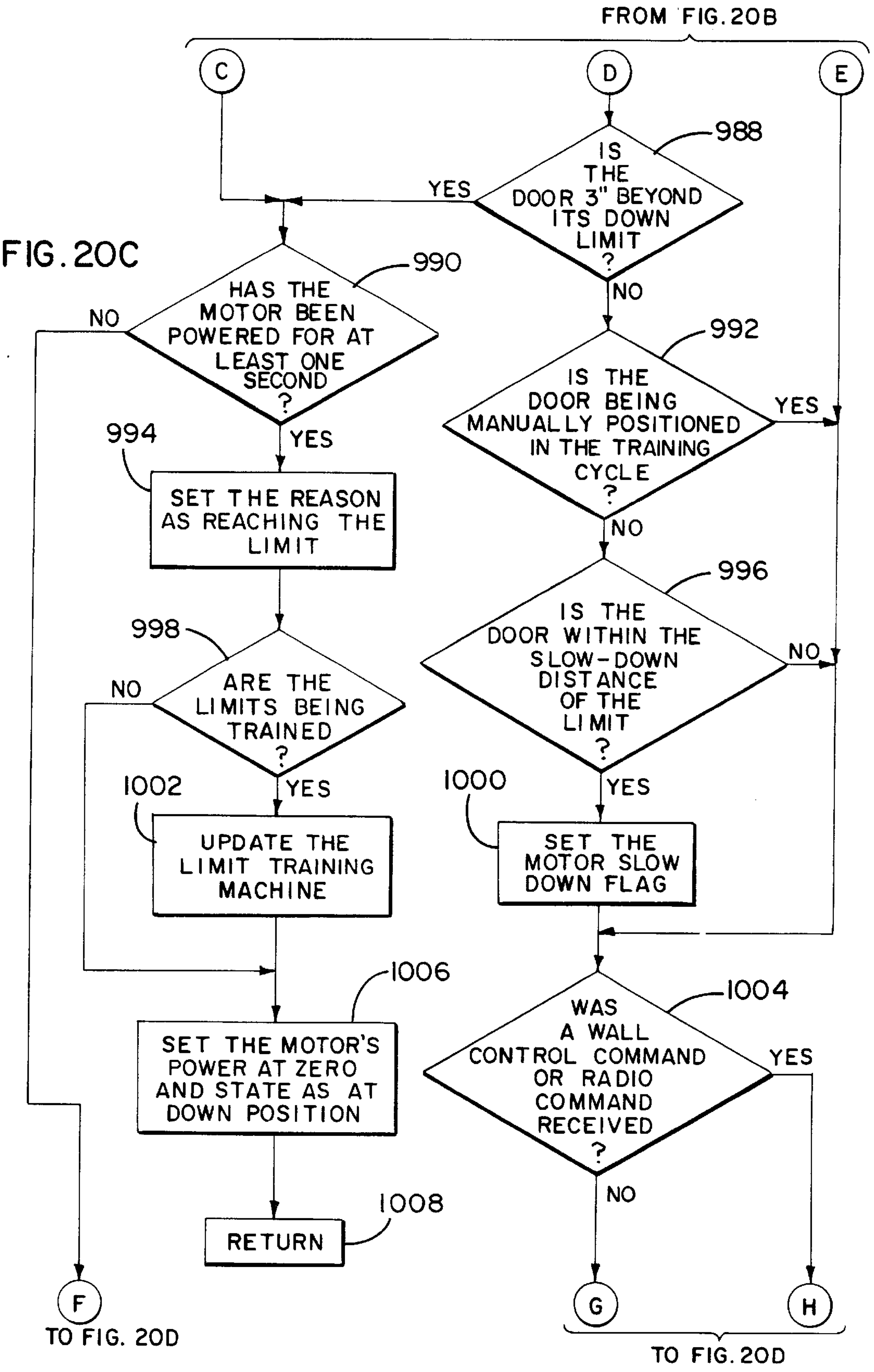
Figure 20D:
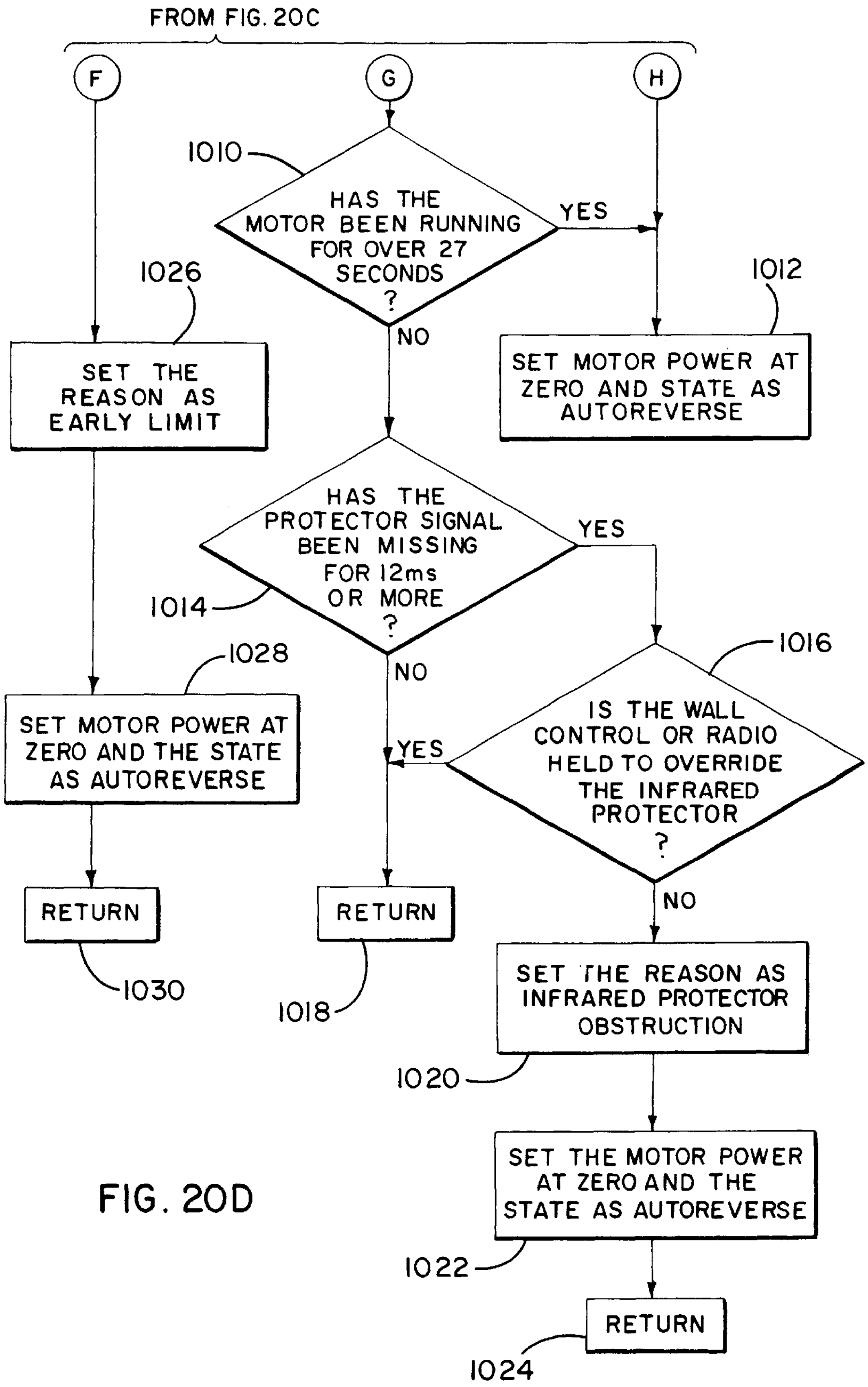

The UP position routine, block 834, is shown in FIG. 19. Door travel limits training is started with the door in the UP position. At block 934, the subroutine updates the relay safety system. Then the subroutine checks for receipt of a wall command or radio command at block 936 indicating an intervening user command. If yes, the motor power is set to 20 percent at block 938 and the state is set at traveling DOWN in block 940. Then the light is updated and the subroutine returns at block 950. If no wall command has been received, the subroutine checks for training the limits at block 942. If no, the light is updated and the subroutine returns at block 950. If yes, the limit training state machine is updated at block 944. Then the-subroutine checks if it is time to travel DOWN at block 946. If no, the subroutine updates the light and returns at block 950. If it is time to travel DOWN, the state is set at traveling DOWN at block 948 and the system returns at block 950.

The DOWN direction subroutine, block 828, is shown in FIGS. 20A–20D. At block 952, the subroutine waits until the main loop routine refreshes the DOWN limit from EEPROM 302. For safety purposes, only the main loop or the remote transmitter (radio) can access data stored in or written to the EEPROM 302. Because EEPROM communication is handled within software, it is necessary to ensure that two software routines do not try to communicate with the EEPROM at the same time (and have a data collision). Therefore, EEPROM communication is allowed only in the Main Loop and in the Radio routine, with the Main loop having a busy flag to prevent the radio from communicating with the EEPROM at the same time. At block 954, the subroutine checks if 40 milliseconds has passed since closing of the light relay K3. If no, the subroutine returns at block 956. If yes, the subroutine checks if the warning light is flashing (for 2 seconds if the optional flasher module is installed) prior to travel at block 958. If yes, the subroutine updates the status of the flashing light and returns at block 960. If no, or the flashing is completed, the subroutine turns on the DOWN motor relay K2 at block 962. At block 964 the subroutine checks if one second has passed since the motor is first turned on. The system ignores the force on the motor for the first one second. This allows the motor time to overcome the inertia of the door (and exceed the programmed force settings) without having to adjust the programmed force settings for ramp up, normal travel and slow down. Force is effectively set to maximum during ramp up to overcome sticky doors.

If the one second time has not passed, the subroutine skips to block 984. If the one second time limit has passed, the subroutine checks for the RPM signal time out at block 966. If no, the subroutine checks if the motor speed is currently being ramped up at block 968 (this is a maximum force condition). If yes, the routine skips to block 984. If no, the subroutine checks if the measured RPM period is longer than the allowable RPM period. If no, the Subroutine continues at block 984.

If either the RPM signal has timed out (block 966) or the RPM period is longer than allowable (block 970), this is an indication of an obstruction or the door has reached the DOWN limit position, and the subroutine skips to block 972. At block 972, the subroutine checks if the door is positioned beyond the DOWN limit setting. If it is, the subroutine skips to block 990 where it checks if the motor has been powered for at least one second. This one second power period after the DOWN limit has been reached provides for the door to close fully against the floor. This is especially important when DC motors are used. The one second period overcomes the internal braking effect of the DC motor on shut-off. Auto-reverse is disabled after the position detector reaches the DOWN limit.

If the motor has been running for one second, at block 990, the subroutine sets the reason as reaching the limit at block 994. The subroutine then checks if the limits are being trained at block 998. If yes, the limit training machine is updated at block 1002. If no, the motor's power is set to zero and the motor state is set at the DOWN position in block 1006. In block 1008 the subroutine returns.

If the motor has not been running for at least one second at block 990, the subroutine sets the reason as early limit at block 1026. Then the subroutine sets the motor power at zero and the motor state as auto-reverse at block 1028 and returns at block 1030.

Returning to block 984, the subroutine checks if the door's position is currently unknown. If yes, the subroutine skips to block 1004. If no, the subroutine updates the door's distance from the DOWN limit using internal RAM in microprocessor 300 in block 986. Then the subroutine checks at block 988 if the door is three inches beyond the DOWN limit. If yes, the subroutine skips to block 990. If no, the subroutine checks if the door is being positioned manually in the training cycle at block 992. If yes, the subroutine skips to block 1004. If no, the subroutine checks if the door is within the slow DOWN distance of the limit at block 996. If no, the subroutine skips to block 1004. If yes, the subroutine sets the motor slow down flag at block 1000.

At block 1004, the subroutine checks if a wall control command or radio command has been received. If yes, the subroutine sets the motor power at zero and the state as auto-reverse at block 1012. If no, the subroutine checks if the motor has been running for over 27 seconds at block 1010. If yes, the subroutine sets the motor power at zero and the state at auto-reverse. If no, the subroutine checks if the obstacle detector signal has been missing for 12 milliseconds or more at block 1014 indicating the presence of the obstacle or the failure of the detector. If no, the subroutine returns at block 1018. If yes, the subroutine checks if the wall control or radio signal is being held to override the infrared obstacle detector at block 1016. If yes, the subroutine returns at block 1018. If no, the subroutine sets the reason as infrared obstacle detector obstruction at block 1020. The subroutine then sets the motor power at zero and the state as auto-reverse at block 1022 and returns at block 1024. (The auto-reverse routine stops the motor for 0.5 seconds then causes the door to travel up.)

The appendix attached hereto includes a source listing of a series of routines used to operate a movable barrier operator in accordance with the present invention.

APPENDIX

```
;--------------------------------------------------------------------------
;
;       PRO7000 DC Motor Operator
;       Manual forces, automatic limits
;       New learn switch for learning the limits
;
;       Code based on Flex GDO
;
;--------------------------------------------------------------------------
;
;--------------------------------------------------------------------------
;       Notes:
;--------------------------------------------------------------------------
;  -- Motor is controlled via two Form C relays to control direction
;  -- Motor speed is controlled via a fet (2 IRF540's in parallel) with a
;       phase control PWM applies.
;  -- Wall control (and RS232) are P98 with a redundant smart button and
;       command button on the logic board
;--------------------------------------------------------------------------
;
;------------------------------------------------------------------------------
;       Flex GDO Logic Board
;       Fixed AND Rolling Code Functionality
;       Learn from keyless entry transmitter
;       Posi-lock
;       Turn on light from broken IR beam (when at up limit)
;       Keyless entry temporary password based on number of hours or number
;       of activations.  (Rolling code mode only)
;
;       GDO is initialized to a 'clean slate' mode when the memory is erased.
;       In this mode, the GDO will receive either fixed or rolling codes.
;       When the first radio code is learned, the GDO locks itself into that
;       mode (fixed or rolling) until the memory is again erased.
;
;       Rolling code derived from the Leaded67 code
;       Using the 8K zilog 233 chip
;       Timer interrupt needed to be 2X faster
;
;------------------------------------------------------------------------------
;       Revision History
;------------------------------------------------------------------------------
;       Revision 1.1:
;       -- Changed light from broken IR beam to work in both fixed and rolling
;          modes.
;       -- Changed light from IR beam to work only on beam break, not on beam
;          block.
;
;       Revision 1.2:
;       -- Learning rolling code formerly erased fixed code.  Mode is now
;          determined by first transmitter learned after radio erase.
;
;       Revision 1.3:
;       -- Moved radio interrupt disable to reception of 20 bits.
;       -- Changed mode of radio switching.  Formerly toggled upon radio error,
;          now switches in pseudo-random fashion depending upon value of
;          125 ms timer.
;
;       Revision 1.4:
;       -- Optimized portion of radio after bit value is determined.  Used
;          relative addressing to speed code and minimize ROM size.
;
;       Revision 1.5:
;       -- Changed mode of learning transmitters. Learn command is now
;          light-command, learn light is now light-lock, and learn open/close/
;          stop is lock-command.   (Command was press light, press command,
;          release light, release command, worklight was press light, press command,
;          release command, release light, o/c/s was press lock, press command,
;          release command, release lock.  This caused DOG2 to reset.
;
```

```
;       Revision 1.6:
;       -- Light button and light transmitter now ignored during travel.
;          Switch data cleared only after a command switch is checked.
;
;       Revision 1.7:
;       -- Rejected fixed mode (and fixed mode test) when learning light and
;          open/close/stop transmitters.
;
;       Revision 1.8:
;       -- Changed learn from wall control to work only when both switches are
;          held.  Modified force pot. read routine (moved enabling of blank
;          time and disabling of interrupts . Fixed mode now learns command
;          with any combination of wall control switches.
;
;       Revision 1.9:
;       -- Changed PWM output to go from 0-50% duty cycle.  This eliminated the
;          problem of PWM interrupts causing problems near 100% duty cycle.
;          THIS REVISION REQUIRES A HARDWARE CHANGE.
;
;       Revision 1.9A:
;       -- Enabled ROM checksum.  Cleaned up documentation.
;
;       Revision 2.0:
;       -- Blank time noise immunity.  If noise signal is detected during blank time the data
;          already recieved is not thrown out.  The data is retained, and the noise
;          pulse is identified as such.  The interrupt is enabled to contine to look
;          for the sync pulse.
;
;       Revision 2.0A:
;       -- On the event that the noise pulse is of the same duration as the sync pulse,
;          the time between sync and first data pulse (inactive time) is measured.  The
;          inactive time is 5.14ms for billion code and 2.4ms for rolling code.  If it is
;          determined that the previously received sync is indeed a noise pulse, the pulse
;          is thrown out and the micro continuies to look for a sync pulse as in Rev. 2.0.
;
;       Revision 2.1:
;       -- To make the blank time more impervious to noise, the sync pulses are
;          differentiated between.  Fixed max width is 4.6ms, roll max width is 2.3ms.
;          This is simular to the inactive time check done in Rev.2.0A.
;
;       Revision 2.2:
;       -- The worklight function; when the IR beam is broken and the door is at the up limit
;          the light will turn on for 4.5 min.  This revision allows the worklight function to
;          be enabled and disabled by the user.  The function will come enabled from the factory.
;          To disable, with the light off press and hold the light button for 7 sec.  The light will
;          come on and after 7 sec. the function is disabled the light will turn off.  To enable the
;          function, turn the light on, release the button, then press and hold the light button
;          down for 7 sec.  The light will turn off and after the function has been enable in 7 sec.
;          the light will turn on.
;
;       Revision 3.0:
;       -- Integrated in functionality for Siminor rolling code transmitter.  The Siminor
;          transmitter may be received whenever a C code transmitter may be received.
;          Siminor transmitters are able to perform as a standard command or as a light
;          control transmitter, but not as an open/close/stop transmitter.
;
;       Revision 3.1:
;       -- Modified handling of rolling code counter (in mirroring and adding) to improve
;          efficiency and hopefully kill all short cycles when a radio is jammed on the
;          air.
;--------------------------------
;       PROTOOO
;--------------------------------
;       Revision 0.1:
;       -- Removed physical limit tests
;       -- Disabled radio temporarily
;       -- Put in sign bit test for limits
;       -- Automatic limits working
;
```

```
;       Revision 0.2:
;       -- Provided for traveling up when too close to limit
;
;       Revision 0.3:
;       -- Changed force pot. read to new routine.
;       -- Disabled T1 interrupt and all old force pot. code
;       -- Disabled all RS232 output
;
;       Revision 0.4:
;       -- Added in (veerrrry) rough force into pot. read routine
;
;       Revision 0.5:
;       -- Changed EEPROM in comments to add in up limit, last operation, and
;          down limit.
;       -- Created OnePass register
;       -- Added in limit read from nonvolatile when going to a moving state
;       -- Added in limit read on power-up
;       -- Created passcounter register to keep track of pass point(s)
;       -- Installed basic wake-up routine to restore position based on last state
;
;       Revision 0.6:
;       -- Changed RPM time read to routine used in P98 to save RAM
;       -- Changed operation of RPM forced up travel
;       -- Implemented pass point for one-pass-point travel
;
;       Revision 0.7:
;       -- Changed pass point from single to multiple (no EEPROM support)
;
;       Revision 0.8:
;       -- Changed all SKIPRADIO loads from 0xFF to NOEECOMM
;       -- Installed EEPROM support for multiple pass points
;
;       Revision 0.9:
;       -- Changed state machine to handle wake-up (i.e. always head towards
;          the lowest pass point to re-orient the GDO)
;
;       Revision 0.10:
;       -- Changed the AC line input routine to work off full-wave rectified
;          AC coming in
;
;       Revision 0.11:
;       -- Installed the phase control for motor speed control
;
;       Revision 0.12:
;       -- Installed traveling down if too near up limit
;       -- Installed speed-up when starting travel
;       -- Installed slow-down when ending travel
;
;       Revision 0.13:
;       -- Re-activated the C code
;
;       Revision 0.14:
;       -- Added in conditional assembly for Siminor radio codes
;
;       Revision 0.15:
;       -- Disabled old wall control code
;       -- Changed all pins to conform with new layout
;       -- Removed unused constants
;       -- Commented out old wall control routine
;       -- Changed code to run at 6MHz
;
;       Revision 0.16
;       -- Fixed bugs in Flex radio
;
;       Revision 0.17
;       -- Re-enabled old wall control.  Changed command charging time to 12 ms
;          to fix FMEA problems with IR protectors.
;
;       Revision 0.18
```

```
;       -- Turned on learn switch connected to EEPROM clock line
;
;       Revision 0.19
;       -- Eliminated unused registers
;       -- Moved new registers out of radio group
;       -- Re-enabled radio interrupt
;
;       Revision 0.20
;       -- Changed limit test to account for "lost" position
;       -- Re-wrote pass point routine
;
;       Revision 0.21
;       -- Changed limit tests in state setting routines
;       -- Changed criteria for looking for lost position
;       -- Changed lost operation to stop until position is known
;
;       Revision 0.22:
;       -- Added in L_A_C state machine to learn the limits
;               -- Installed learn-command to go into LAC mode
;               -- Added in command button and learn button jog commands
;               -- Disabled limit testing when in learn mode
;               -- Added in LED flashing for in learn mode
;               -- Added in EVERYTHING with respect to learning limits
;       -- NOTE:  LAC still isn't working properly!!!
;
;       Revision 0.23:
;       -- Added in RS232 functionality over wall control lines
;
;       Revision 0.24:
;       -- Touched up RS232 over wall control routine
;       -- Removed 50Hz force table
;       -- Added in fixes to LAC state machine
;
;       Revision 0.25:
;       -- Added switch set and release for wall control (NOT smart switch)
;          into RS232 commands (Turned debouncer set and release in to subs)
;       -- Added smart switch into RS232 commands (smart switch is also a sub)
;       -- Re-enabled pass point test in ':' RS232 command
;       -- Disabled smart switch scan when in RS232 mode
;       -- Corrected relative references in debouncer subroutines
;       -- RS232 'F' command still needs to be fixed
;
;       Revision 0.26:
;       -- Added in max. force operation until motor ramp-up is done
;       -- Added in clearing of slowdown flag in set_any routine
;       -- Changed RPM timeout from 30 to 60 ms
;
;       Revision 0.27:
;       -- Switched phase control to off, then on (was on, then off) inside
;          each half cycle of the AC line (for noise reduction)
;       -- Changed from 40ms unit max. period to 32 (will need further changes)
;       -- Fixed bug in force ignore during ramp (previously jumped from down to
;          up state machine!)
;       -- Added in complete force ignore at very slow part of ramp (need to change
;          this to ignore when very close to limit)
;       -- Removed that again
;       -- Bug fix -- changed force skip during ramp-up.  Before, it kept counting
;          down the force ignore timer.
;
;       Revision 0.28:
;       -- Modified the wall control documentation
;       -- Installed blinking the wall control on an IR reversal instead of the
;          worklight
;       -- Installed blinking the wall control when a pass point is seen
;
;       Revision 0.29:
;       -- Changed max. RPM timeout to 100 ms
;       -- Fixed wall control blink bug
;       -- Raised minimum speed setting
```

```
;       NOTE:  Forces still need to be set to accurate levels
;
;       Revision 0.30:
;       -- Removed 'ei' before setting of pcon register
;       -- Bypassed slow-down to limit during learn mode
;
;       Revision 0.31:
;       -- Changed force ramp to a linear FORCE ramp, not a linear time ramp
;           -- Installed a look-up table to make the ramp more linear.
;       -- Disabled interrupts during radio pointer match
;       -- Changed slowdown flag to a up-down-stop ramping flag
;
;       Revision 0.32:
;       -- Changed down limit to drive lightly into floor
;       -- Changed down limit when learning to back off of floor a few pulses
;
;       Revision 0.33:
;       -- Changed max. speed to 2/3 when a short door is detected
;
;       Revision 0.34:
;       -- Changed light timer to 2.5 minutes for a 50 Hz line, 4.5 minutes for
;          a 60 Hz line.  Currently, the light timer is 4.5 minutes WHEN THE UNIT
;          FIRST POWERS UP.
;       -- Fixed problem with leaving RP set to an extended group
;
;       Revision 0.35:
;       -- Changed starting position of pass point counter to 0x30
;
;       Revision 0.36:
;       -- Changed algorithm for finding down limit to cure stopping at the floor
;          during the learn cycle
;       -- Fixed bug in learning limits:  Up limit was being updated from EEPROM
;          during the learn cycle!
;       -- Changed method of checking when limit is reached:  calculation for
;          distance to limit is now ALWAYS performed
;       -- Added in skipping of limit test when position is lost
;
;       Revision 0.37:
;       -- Revised minimum travel distance and short door constants to reflect
;          approximately 10 RPM pulses / inch
;
;       Revision 0.38:
;       -- Moved slowstart number closer to the limit.
;       -- Changed backoff number from 10 to 8
;
;       Revision 0.39:
;       -- Changed backoff number from 8 to 12
;
;       Revision 0.40:
;       -- Changed task switcher to unburden processor
;       -- Consolidated tasks 0 and 4
;       -- Took extra unused code out of tasks 1, 3, 5, 7
;       -- Moved aux light and 4 ms timer into task 6
;       -- Put state machine into task 2 only
;       -- Adjusted auto_delay, motdel, rpm_time_out, force_ignore, motor_timer,
;          obs_count for new state machine tick
;       -- Removed force_pre prescaler (no longer needed with 4ms state machine)
;       -- Moved updating of obs_count to one ms timer for accuracy
;       -- Changed autoreverse delay timer into a byte-wide timer because it was
;          only storing an 8 bit number anyways...
;       -- Changed flash delay and light timer constants to adjust for 4ms tick
;
;       Revision 0.41
;       -- Switched back to 4MHz operation to account for the fact that Zilog's
;          Z86733 OTP won't run at 6MHz reliably
;
;       Revision 0.42:
;       -- Extended RPM timer so that it could measure from 0 - 524 ms with
;          a resolution of 8us
```

(

```
;
;       Revision 0.43:
;       -- Put in the new look-up table for the force pots (max RPM pulse period
;          multiplied by 20 to scale it for the various speeds).
;       -- Removed taskswitch because it was a redundant register
;       -- Removed extra call to the auxlight routine
;       -- Removed register 'temp' because, as far as I can tell, it does nothing
;       -- Removed light_pre register
;       -- Eliminated 'phase' register because it was never used
;       -- Put in preliminary divide for scaling the force and speed
;       -- Created speedlevel AND IDEAL speed registers, which are not yet used
;
;       Revision 0.47:
;       -- Undid the work of revisions 0.44 through 0.46
;       -- Changed ramp-up and ramp-down to an adaptive ramp system
;       -- Changed force compare from subtract to a compare
;       -- Removed force ignore during ramp (was a kludge)
;       -- Changed max. RPM time out to 500 ms static
;       -- Put WDT kick in just before main loop
;       -- Fixed the word-wise T0EXT register
;       -- Set default RPM to max. to fix problem of not ramping up
;
;       Revision 0.48:
;       -- Took out adaptive ramp
;       -- Created look-ahead speed feedback in RPM pulses
;
;       Revision 0.49:
;       -- Removed speed feedback (again)
;          NOTE:  Speed feedback isn't necessarily impossible, but, after all my
;                 efforts, I've concluded that the design time necessary (a large
;                 amount) isn't worth the benefit it gives, especially given the
;                 current time constraints of this project.
;       -- Removed RPM_SET_DIFF lo and hi registers, along with IDEAL_SPEED lo
;          and hi registers (only need them for speed feedback)
;       -- Deleted speedlevel register (no longer needed)
;       -- Separated the start of slowdown for the up and down directions
;       -- Lowered the max. speed for short doors
;       -- Set the learn button to NOT erase the memory when jogging limits
;
;       Revision 0.50:
;       -- Fixed the force pot read to actually return a value of 0-64
;       -- Set the max. RPM period time out to be equivalent to the force setting
;
;       Revision 0.51:
;       -- Added in P2M_SHADOW register to make the following possible:
;       -- Added in flashing warning light (with auto-detect)
;
;       Revision 0.52:
;       -- Fixed the variable worklight timer to have the correct value on
;          power-up
;       -- Re-enabled the reason register and stackreason
;       -- Enabled up limit to back off by one pulse if it appears to be
;          crashing the up stop bolt.
;       -- Set the door to ignore commands and radio when lost
;       -- Changed start of down ramp to 220
;       -- Changed backoff from 12 to 9
;       -- Changed drive-past of down limit to 9 pulses
;
;       Revision 0.53:
;       -- Fixed RS232 '9' and 'F' commands
;       -- Implemented RS232 'K' command
;       -- Removed 'M', 'P', and 'S' commands
;       -- Set the learn LED to always turn off at the end of the
;          learn limits mode
;
;       Revision 0.54:
;       -- Reversed the direction of the pot. read to correct the direction
;          of the min. and max. forces when dialing the pots.
;       -- Added in "U" command (currently does nothing)
```

```
;       -- Added in "V" command to read force pot. values
;
;       Revision 0.55:
;       -- Changed number of pulses added in to down limit from 9 to 16
;
;       Revision 0.56:
;       -- Changed backoff number from 16 back to 9 (not 8!)
;       -- Changed minimum force/speed from 4/20 to 10/20
;
;       Revision 0.57:
;       -- Changed backoff number back to 16 again
;       -- Changed minimum force/speed from 10/20 back to 4/20
;       -- Changed learning speed from 10/20 to 20/20
;
;       Revision 0.58:
;       -- Changed learning speed from 20/20 to 12/20 (same as short door)
;       -- Changed force to max. during ramp-up period
;       -- Changed RPM timeout to a static value of 500 ms
;       -- Changed drive-past of limit from 1" to 2" of trolley travel
;          (Actually, changed the number from 10 pulses to 20 pulses)
;       -- Changed start of ramp-up from 1 to 4 (i.e. the power level)
;       -- Changed the algorithm when near the limit -- the door will no
;          longer avoid going toward the limit, even if it is too close
;
;       Revision 0.59:
;       -- Removed ramp-up bug from autoreverse of GDO
;
;       Revision 0.60:
;       -- Added in check for pass point counter of -1 to find position when lost
;       -- Change in waking up when lost.  GDO now heads toward pass point only on
;          first operation after a power outage.  Heads down on all subsequent
;          operations.
;       -- Created the "limits unknown" fault and prevented the GDO from traveling
;          when the limits are not set at a reasonable value
;       -- Cleared the fault code on entering learn limits mode
;       -- Implemented RS232 'H' command
;
;       Revision 0.61:
;       -- Changed limit test to look for trolley exactly at the limit position
;       -- Changed search for pass point to erase limit memory
;       -- Changed setup position to 2" above the pass point
;       -- Set the learn LED to turn off whenever the L_A_C is cleared
;       -- Set the learn limits mode to shut off whenever the worklight times out
;
;       Revision 0.62:
;       -- Removed test for being exactly at down limit (it disabled the drive into
;          the limit feature
;       -- Fixed bug causing the GDO to ignore force when it should autoreverse
;       -- Added in ignoring commands when lost and traveling up
;
;       Revision 0.63:
;       -- Installed MinSpeed register to vary minimum speed with force pot
;          setting
;       -- Created main loop routine to scale the min speed based on force pot.
;       -- Changed drive-past of down limit from 20 to 30 pulses (2" to 3")
;
;       Revision 0.64:
;       -- Changed learning algorithm to utilize block.  (Changed autoreverse to
;          add in 1/2" to position instead of backing the trolley off of the floor)
;       -- Enabled ramp-down when nearing the up limit in learn mode
;
;       Revision 0.65:
;       -- Put special case in speed check to enable slow down near the up limit
;
;       Revision 0.66:
;       -- Changed ramp-up:  Ramping up of speed is now constant -- the ramp-down
;          is the only ramp affected by the force pot. setting
;       -- Changed ramp-up and ramp-down tests to ensure that the GDO will get UP
;          to the minimum speed when we are inside the ramp-down zone (The above
```

```
;          change necessitated this)
;       -- Changed down limit to add in 0.2" instead of 0.5"
;
;       Revision 0.67:
;       -- Removed minimum travel test in set_arev_state
;       -- Moved minimum distance of down limit from pass point from 5" to 2"
;       -- Disabled moving pass point when only one pass point has been seen
;
;       Revision 0.68:
;       -- Set error in learn state if no pass point is seen
;
;       Revision 0.69:
;       -- Added in decrement of pass point counter in learn mode to kill bugs
;       -- Fixed bug:  Force pots were being ignored in the learn mode
;       -- Added in filtering of the RPM (RPM_FILTER register and a routine in
;          the one ms timer)
;       -- Added in check of RPM filter inside RPM interrupt
;       -- Added in polling RPM pin inside RPM interrupt
;       -- Re-enabled stopping when in learn mode and position is lost
;
;       Revision 0.70:
;       -- Removed old method of filtering RPM
;       -- Added in a "debouncer" to filter the RPM
;
;       Revision 0.71:
;       -- Changed "debouncer" to automatically vector low whenever an RPM pulse
;          is considered valid
;
;       Revision 0.72:
;       -- Changed number of pulses added in to down limit to 0.  Since the actual
;          down limit test checks for the position to be BEYOND the down limit
;          this is the equivalent of adding one pulse into the down limit
;
;       Revision 0.74:
;       -- Undid the work of rev. 0.73
;       -- Changed number of pulses added in to down limit to 1.  Noting the comment
;          in rev. 0.72, this means that we are adding in 2 pulses
;       -- Changed learning speed to vary between 8/20 and 12/20, depending upon
;          the force pot. setting
;
;       Revision 0.75:
;       -- Installed power-up chip ID on P22, P23, P24, and P25
;          Note:  ID is on P24, P23, and P22.  P25 is a strobe to signal valid data
;                 First chip ID is 001 (with strobe, it's 1001)
;       -- Changed set_any routine to re-enable the wall control just in case we
;          stopped while the wall control was being turned off (to avoid disabling
;          the wall control completely)
;       -- Changed speed during learn mode to be 2/3 speed for first seven seconds,
;          then to slow down to the minimum speed to make the limit learning the same
;          as operation during normal travel.
;
;       Revision 0.76:
;       -- Restored learning to operate only at 60% speed
;
;       Revision 0.77:
;       -- Set unit to reverse off of floor and subtract 1" of travel
;       -- Reverted to learning at 40% - 60% of full speed
;
;       Revision 0.78:
;       -- Changed rampflag to have a constant for running at full speed
;       -- Used the above change to simplify the force ignore routine
;       -- Also used it to change the RPM time out.  The time out is now set equal
;          to the pot setting, except during the ramp up when it is set to 500 ms.
;       -- Changed highest force pot setting to be exactly equal to 500ms.
;
;       Revision 0.79:
;       -- Changed setup routine to reverse off block (yet again).  Added in one pulse.
;
;       Revision 1.0:
```

```
;       -- Enabled RS232 version number return
;       -- Enabled ROM checksum.  Cleaned up documentation
;
;       Revision 1.1:
;       -- Tweaked light times for 8.192 ms prescale instead of 8.0 ms prescale
;       -- Changed compare statement inside setvarlight to 'uge' for consistency
;       -- Changed one-shot low time to 2 ms for power line
;       -- Changed one-shot low time to truly count falling-edge-to-falling-edge
;
;       Revision 1.2:
;       -- Eliminated testing for lost GDO in set_up_dir_state (is already taken
;          care of by set_dn_dir_state)
;       -- Created special time for max. run motor timer in learn mode:  50 seconds
;
;       Revision 1.3:
;       -- Fixed bug in set_any to fix stack imbalance
;       -- Changed short door discrimination point to 78"
;
;       Revision 1.4:
;       -- Changed second 'di' to 'ei' in KnowSimCode
;       -- Changed IR protector to ignore for first 0.5 second of travel
;       -- Changed blinking time constant to take it back to 2 seconds before travel
;       -- Changed blinking code to ALWAYS flash during travel, with pre-travel flash
;          when module is properly detected
;       -- Put in bounds checking on pass point counter to keep it in line
;       -- Changed driving into down limit to consider the system lost if floor not seen
;
;       Revision 1.5:
;       -- Changed blinking of wall control at pass point to be a one-shot timer
;          to correct problems with bad passpoint connections and stopping at pass
;          point to cause wall control ignore.
;
;       Revision 1.6:
;       -- Fixed blinking of wall control when indicating IR protector reversal
;          to give the blink a true 50% duty cycle.
;       -- Changed blinker output to output a constant high instead of pulsing.
;       -- Changed P2S_POR to 1010 (Indicate Siminor unit)
;
;       Revision 1.7:
;       -- Disabled Siminor Radio
;       -- Changed P2S_POR to 1111 (Indicate Lift-Master unit)
;       -- Added in one more conditional assembly point to avoid use of simradio label
;
;       Revision 1.8:
;       -- Re-enabled Siminor Radio
;       -- Changed P2S_POR back to 1010 (Siminor)
;       -- Re-fixed blinking of wall control LED for protector reversal
;       -- Changed blinking of wall control LED for indicating pass point
;       -- Fixed error in calculating highest pass point value
;       -- Fixed error in calculating lowest pass point value
;
;       Revision 1.9:
;       -- Lengthened blink time for indicating pass point
;       -- Installed a max. travel distance when lost
;               -- Removed skipping up limit test when lost
;               -- Reset the position when lost and force reversing
;       -- Installed sample of pass point signal when changing states
;
;       Revision 2.0:
;       -- Moved main loop test for max. travel distance (was causing a memory
;          fault before)
;
;       Revision 2.1:
;       -- Changed limit test to use 11000000b instead of 10000000b to ensure
;          only setting up limit when we're actually close.
;
;       Revision 2.2:
;       -- Changed minimum speed scaling to move it further down the pot. rotation.
;          Formula is now:  ((force - 24) / 4) + 4, truncated to 12
```

(

```
;       -- Changed max. travel test to be inside motor state machine.  Max. travel
;          test calculates for limit position differently when the system is lost.
;       -- Reverted limit test to use 10000000b
;       -- Changed some jp's to jr's to conserve code space
;       -- Changed loading of reason byte with 0 to clearing of reason byte (very
;          desperate for space)
;
;       Revision 2.3:
;       -- Disabled Siminor Radio
;       -- Changed P2S_POR to 1011 (Lift-Master)
;
;       Revision 2.4:
;       -- Re-enabled Siminor Radio
;       -- Changed P2S_POR to 1010 (Siminor)
;       -- Changed wall control LED to also flash during learn mode
;       -- Changed reaction to single pass point near floor.  If only one pass point
;          is seen during the learn cycle, and it is too close to the floor, the
;          learn cycle will now fail.
;       -- Removed an ei from the pass point when learning to avoid a race condition
;
;       Revision 2.5:
;       -- Changed backing off of up limit to only occur during learn cycle.  Backs
;          off by 1/2" if learn cycle force stops within 1/2" of stop bolt.
;       -- Removed considering system lost if floor not seen.
;       -- Changed drive-past of down limit to 36 pulses (3")
;       -- Added in clearing of power level whenever motor gets stopped (to turn off
;          the FET's sooner)
;       -- Added in a 40ms delay (using the same MOTDEL register as for the traveling
;          states) to delay the shut-off of the motor relay.  This should enable the
;          motor to discharge some energy before the relay has to break the current
;          flow)
;       -- Created STOPNOFLASH label -- it looks like it should have been there all along
;       -- Moved incrementing MOTDEL timer into head of state machine to conserve space
;
;       Revision 2.6:
;       -- Fixed back-off of up limit to back off in the proper direction
;       -- Added in testing for actual stop state in back-off (before was always backing
;          off the limit)
;       -- Simplified testing for light being on in 'set any' routine; eliminated lights
;          register
;
;       Revision 2.7: (Test-only revision)
;       -- Moved ei when testing for down limit
;       -- Eliminated testing for negative number in radio time calculation
;       -- Installed a primitive debouncer for the pass point (out of paranoia)
;       -- Changed a pass point in the down direction to correspond to a position of 1
;       -- Installed a temporary echo of the RPM signal on the blinker pin
;       -- Temporarily disabled ROM checksum
;       -- Moved three subroutines before address 0101 to save space (2.7B)
;       -- Framed lock up using upforce and dnforce registers with di and ei to
;          prevent corruption of upforce or dnforce while doing math (2.7C)
;       -- Fixed error in definition of pot_count register (2.7C)
;       -- Disabled actual number check of RPM perdod for debug (2.7D)
;       -- Added in di at test_up_sw and test_dn_sw for ramping up period(2.7D)
;       -- Set RPM_TIME_OUT to always be loaded to max value for debug (2.7E)
;       -- Set RPM_TIME_OUT to round up by two instead of one (2.7F)
;       -- Removed 2.7E revision (2.7F)
;       -- Fixed RPM_TIME_OUT to round up in both the up and down direction(2.7G)
;       -- Installed constant RS232 output of RPM_TIME_OUT register (2.7H)
;       -- Enabled RS232 'U' and 'V' commands (2.7I)
;       -- Disabled consant output of 2.7H (2.7I)
;       -- Set RS232 'U' to output RPM_TIME_OUT(2.7I)
;       -- Removed disable of actual RPM number check (2.7J)
;       -- Removed pulsing to indicate RPM interrupt (2.7J)
;       -- 2.7J note -- need to remove 'u' command function
;
;       Revision 2.8:
;       -- Removed interrupt enable before resetting rpm_time_out.  This will introduce
;          roughly 30us of extra delay in time measurement, but should take care of
```

```
;        nuisance stops.
;     -- Removed push-ing and pop-ing of RP in tasks 2 and 6 to save stack space (2.8B)
;     -- Removed temporary functionality for 'u' command (2.8 Release)
;     -- Re-enabled ROM checksum (2.8 Release)
;
;--------------------------------------------------------------------------
;
;     L_A_C State Machine
;
;
;                73                       77
;             *******                   ****
;   |                 *                 *
;   |     72       74*           76 *
;   |    Back to       *             *
;  70    Up Lim     ----           ----
;   |      71          ----   ----
;   |     Error           ******
;   |                       75
; Position
;  the limit
;
;--------------------------------------------------------------------------
;     NON-VOL MEMORY MAP
;--------------------------------------------------------------------------
;
;     00    A0                        D0          Multi-function transmitters
;     01    A0                        D0
;     02    A1                        D0
;     03    A1                        D0
;     04    A2                        D1
;     05    A2                        D1
;     06    A3                        D1
;     07    A3                        D1
;     08    A4                        D2
;     09    A4                        D2
;     0A    A5                        D2
;     0B    A5                        D2
;     0C    A6                        D3
;     0D    A6                        D3
;     0E    A7                        D3
;     0F    A7                        D3
;     10    A8                        D4
;     11    A8                        D4
;     12    A9                        D4
;     13    A9                        D4
;     14    A10                       D5
;     15    A10                       D5
;     16    A11                       D5
;     17    A11                       D5
;     18    B                         D6
;     19    B                         D6
;     1A    C                         D6
;     1B    C                         D6
;     1C    unused              D7
;     1D    unused              D7
;     1E    unused              D7
;     1F    unused              D7
;     20    unused              DTCP          Keyless permanent 4 digit code
;     21    unused              DTCID         Keyless ID code
;     22    unused              DTCR1         Keyless Roll value
;     23    unused              DTCR2
;     24    unused              DTCT          Keyless temporary 4 digit code
;     25    unused              Duration      Keyless temporary duration
;                                                    Upper byte = Mode:  hours/activations
;                                                    Lower byte = # of hours/activations
;     26    unused              Radio type
;                                     77665544 33221100
;                                     00 = CMD     01 = LIGHT
```

```
;                                        10 = OPEN/CLOSE/STOP
;       27      unused              Fixed / roll
;                                        Upper word = fixed/roll byte
;                                        Lower word = unused
;       28      CYCLE COUNTER 1ST 16 BITS
;       29      CYCLE COUNTER 2ND 16 BITS
;       2A      VACATION FLAG
;
;               Vacation Flag , Last Operation
;               0000          XXXX  in vacation
;               1111          XXXX out of vacation
;
;       2B      A MEMORY ADDRESS LAST WRITTEN
;       2C      IRLIGHHTADDR 4-22-97
;       2D      Up Limit
;       2E      Pass point counter / Last operating state
;       2F      Down Limit
;
;       30-3F   Force Back trace
;
;---------------------------------------------------------------------------
;       RS232 DATA
;---------------------------------------------------------------------------
;
;       REASON
;       00      COMMAND
;       10      RADIO COMMAND
;       20      FORCE
;       30      AUX OBS
;       40      A REVERSE DELAY
;       50      LIMIT
;       60      EARLY LIMIT
;       70      MOTOR MAX TIME, TIME OUT
;       80      MOTOR COMMANDED OFF RPM CAUSING AREV
;       90      DOWN LIMIT WITH COMMAND HELD
;       A0      DOWN LIMIT WITH THE RADIO HELD
;       B0      RELEASE OF COMMAND OR RADIO AFTER A FORCED
;       UP MOTOR ON DUE TO RPM PULSE WITHG MOTOR OFF
;
;       STATE
;
;       00      AUTOREVERSE DELAY
;       01      TRAVELING UP DIRECTION
;       02      AT THE UP LIMIT AND STOPED
;       03      ERROR RESET
;       04      TRAVELING DOWN DIRECTION
;       05      AT THE DOWN LIMIT
;       06      STOPPED IN MID TRAVEL
;
;
;---------------------------------------------------------------------------
;       DIAG
;---------------------------------------------------------------------------
;
;       1) AOBS SHORTED
;       2) AOBS OPEN / MISS ALIGNED
;       3) COMMAND SHORTED
;       4) PROTECTOR INTERMITTENENT
;       5) CALL DEALER
;          NO RPM IN THE FIRST SECOND
;       6) RPM FORCED A REVERSE
;       7) LIMITS NOT LEARNED YET
;
;
;
;---------------------------------------------------------------------------
;       DOG 2
;---------------------------------------------------------------------------
;
```

```
;       DOG 2 IS A SECONDARY WATCHDOG USED TO
;       RESET THE SYSTEM IF THE LOWEST LEVEL "MAINLOOP"
;       IS NOT REACHED WITHIN A 3 SECOND

;----------------------------------------------------------------------------
;       Conditional Assembly
;----------------------------------------------------------------------------

        GLOBALS ON                              ; Enable a symbol file
Yes                     .equ    1
No                      .equ    0
TwoThirtyThree          .equ    Yes
UseSiminor              .equ    Yes


;
;----------------------------------------------------------------------------
;       EQUATE STATEMENTS
;----------------------------------------------------------------------------

check_sum_value         .equ    065H            ; CRC checksum for ROM code
TIMER_1_EN              .equ    0CH             ; TMR mask to start timer 1

MOTORTIME               .equ    (27000 / 4)     ; Max. run for motor = 27 sec (4 ms tick)
LACTIME                 .equ    (500 / 4)       ; Delay before learning limits is 0.5 seconds
LEARNTIME               .equ    (50000 / 4)     ; Max. run for motor in learn mode

PWM_CHARGE              .equ    00H             ; PWM state for old force pots.
LIGHT                   .equ    0FFH            ; Flag for light on constantly
LIGHT_ON                .equ    10000000B       ; P0 pin turning on worklight
MOTOR_UP                .equ    01000000B       ; P0 pin turning on the up motor
MOTOR_DN                .equ    00100000B       ; P0 pin turning on the down motor

UP_OUT                  .equ    00010000B       ; P3 pin output for up force pot.
DOWN_OUT                .equ    00100000B       ; P3 pin output for down force pot.
DOWN_COMP               .equ    00000001B       ; P0 pin input for down force pot.
UP_COMP                 .equ    00000010B       ; P0 pin input for up force pot.

FALSEIR                 .equ    00000001B       ; P2 pin for false AOBS output
LINEINPIN               .equ    00010000B       ; P2 pin for reading in AC line

PPointPort              .equ    p2              ; Port for pass point input
PassPoint               .equ    00011000B       ; Bit mask for pass point input

PhasePrt                .equ    p0              ; Port for phase control output
PhaseHigh               .equ    00010000B       ; Pin for controlling FET's

CHARGE_SW               .equ    10000000B       ; P3 Pin for charging the wall control
DIS_SW          .equ    01000000B       ; P3 Pin for discharging the wall control
SWITCHES1               .equ    00001000B       ; P0 Pin for first wall control input
SWITCHES2               .equ    00000100B       ; P0 Pin for second wall control input


P01M_INIT               .equ    00000101B       ; set mode p00-p03 in p04-p07 out
P2M_INIT                .equ    01011100B       ; P2M initialization for operation
P2M_POP                 .equ    01000000B       ; P2M initialization for output of chip ID
P3M_INIT                .equ    00000011B       ; set port3 p30-p33 input ANALOG mode

P01S_INIT               .equ    10000000B       ; Set init. state as worklight on, motor off
P2S_INIT                .equ    00000110B       ; Init p2 to have LED off
P2S_POR                 .equ    00101010B       ; P2 init to output a chip ID (P25, P24, P23, P22)
P3S_INIT                .equ    00000000B       ; Init p3 to have everything off

BLINK_PIN               .equ    00000100B       ; Pin which controls flasher module

P2M_ALLOUTS             .equ    01111100B       ; Pins which need to be refreshed to outputs
P2M_ALLINS              .equ    01011000B       ; Pins which need to be refreshed to inputs

RsPerHalf               .equ    104             ; RS232 period 1200 Baud half time 416uS
```

```
RsPerFull           .equ    208                 ; RS232 period full time 832us
RsPer1P22           .equ    00                  ; RS232 period 1.22 unit times 1.024ms (00 = 256)

FLASH               .equ    0FFH                ;
WORKLIGHT           .equ    LIGHT_ON            ; Pin for toggling state of worklight

PPOINTPULSES .equ   897                 ; Number of RPM pulses between pass points

SetupPos            .equ    (65535 - 20) ; Setup position -- 2" above pass point

CMD_TEST            .equ    00                  ; States for old wall control routine
WL_TEST             .equ    01
VAC_TEST            .equ    02
CHARGE              .equ    03
RSSTATUS            .equ    04                  ; Hold wall control ckt. in RS232 mode
WALLOFF             .equ    05                  ; Turn off wall control LED for blinks

AUTO_REV            .equ    00H                 ; States for GDO state machine
UP_DIRECTION .equ   01H
UP_POSITION  .equ   02H
DN_DIRECTION .equ   04H
DN_POSITION  .equ   05H
STOP                .equ    06H
CMD_SW              .equ    01H                 ; Flags for switches hit
LIGHT_SW            .equ    02H
VAC_SW              .equ    04H

TRUE                .equ    0FFH                ; Generic constants
FALSE               .equ    00H

FIXED_MODE          .equ    10101010b                   ;Fixed mode radio
ROLL_MODE           .equ    01010101b                   ;Rolling mode radio
FIXED_TEST          .equ    00000000b                   ;Unsure of mode -- test fixed
ROLL_TEST           .equ    00000001b                   ;Unsure of mode -- test roll
FIXED_MASK          .equ    FIXED_TEST                  ;Bit mask for fixed mode
ROLL_MASK           .equ    ROLL_TEST                   ;Bit mask for rolling mode

FIXTHR       .equ   03H                 ;Fixed code decision threshold
DTHR                .equ    02H                         ;Rolling code decision threshold
FIXSYNC             .equ    08H                         ;Fixed code sync threshold
DSYNC               .equ    04H                         ;Rolling code sync threshold
FIXBITS             .equ    11                          ;Fixed code number of bits
DBITS               .equ    21                          ;Rolling code number of bits

EQUAL               .equ    00                          ;Counter compare result constants
BACKWIN             .equ    7FH                         ;
FWDWIN       .equ   80H                 ;
OUTOFWIN            .equ    0FFH                        ;

AddressCounter      .equ    27H
AddressAPointer     .equ    2BH

CYCCOUNT            .equ    28H

TOUCHID             .equ    21H                         ;Touch code ID
TOUCHROLL           .equ    22H                         ;Touch code roll value
TOUCHPERM           .equ    20H                         ;Touch code permanent password
TOUCHTEMP           .equ    24H                         ;Touch code temporary password
DURAT               .equ    25H                         ;Touch code temp. duration

VERSIONNUM          .equ    088H                        ;Version:  PRO7000 V2.8
;4-22-97
IRLIGHTADDR         .EQU    2CH                         ;work light feature on or off
DISABLED            .EQU    00H                         ;00 = disabled, FF = enabled
;
RTYPEADDR           .equ    26H                         ;Radio transmitter type
VACATIONADDR .equ   2AH
MODEADDR            .equ    27H                         ;Rolling/Fixed mode in EEPROM
                                                        ;High byte = don't care (now)
```

```
                                                  ;Low byte = RadioMode flag
UPLIMADDR           .equ    2DH                   ;Address of up limit
LASTSTATEADDR .equ  2EH                      ;Address of last state
DNLIMADDR           .equ    2FH                   ;Address of down limit

NOEECOMM            .equ    01111111b             ;Flag:  skip radio read/write
NOINT               .equ    10000000b             ;Flag:  skip radio interrupts

RDROPTIME           .equ    125                   ;Radio drop-out time:  0.5s

LRNOCS        .equ  0AAH                     ;Learn open/close/stop
BRECEIVED           .equ    077H                  ;B code received flag
LRNLIGHT            .equ    0BBH                  ;Light command trans.
LRNTEMP             .equ    0CCH                  ;Learn touchcode temporary
LRNDURTN            .equ    0DDH                  ;Learn t.c. temp. duration
REGLEARN            .equ    0EEH                  ;Regular learn mode
NORMAL        .equ  00H                      ;Normal command trans.

ENTER               .equ    00H                   ;Touch code ENTER key
POUND               .equ    01H                   ;Touch code # key
STAR                .equ    02H                   ;Touch code * key

ACTIVATIONS         .equ    0AAH                  ;Number of activations mode
HOURS               .equ    055H                  ;Number of hours mode

      ;Flags for Ramp Flag Register

STILL               .equ    00H                   ; Motor not moving
RAMPUP        .equ  0AAH                     ; Ramp speed up to maximum
RAMPDOWN            .equ    0FFH                  ; Slow down the motor to minimum
FULLSPEED           .equ    0CCH                  ; Running at full speed

UPSLOWSTART         .equ    200                   ; Distance (in pulses) from limit when slow-
down
DNSLOWSTART         .equ    220                   ; of GDO motor starts (for up and down
direction)

BACKOFF             .equ    16                    ; Distance (in pulses) to back trolley off of
floor
                                                  ; when learning limits by reversing off of
floor

SHORTDOOR           .equ    936                   ; Travel distance (in pulses) that
discriminates a
                                                  ; one piece door (slow travel) from a normal
door
                                                  ; (normal travel)  (Roughly 78"

;---------------------------------------------------------------------------
;     PERIODS
;---------------------------------------------------------------------------

AUTO_REV_TIME       .equ    124                   ; (4 ms prescale)
MIN_COUNT           .equ    02H                   ; pwm start point
TOTAL_PWM_COUNT     .equ    03FH                  ; pwm end = start + 2*total-1
FLASH_TIME          .equ    61                    ; 0.25 sec flash time

      ;4.5 MINUTE USA LIGHT TIMER

USA_LIGHT_HI  .equ  080H                     ; 4.5 MIN
USA_LIGHT_LO  .equ  0BEH                     ; 4.5 MIN

      ;2.5 MINUTE EUROPEAN LIGHT TIMER

EURO_LIGHT_HI       .equ    047H                  ; 2.5 MIN
EURO_LIGHT_LO       .equ    086H                  ; 2.5 MIN

ONE_SEC             .equ    0F4H                  ; WITH A /4 IN FRONT
```

```
CMD_MAKE            .equ   8                         ; cycle count *10mS
CMD_BREAK           .equ   (255-8)
LIGHT_MAKE          .equ   8                         ; cycle count *11mS
LIGHT_BREAK   .equ  (255-8)
VAC_MAKE_OUT  .equ  4                          ; cycle count *100mS
VAC_BREAK_OUT       .equ   (255-4)
VAC_MAKE_IN   .equ  2
VAC_BREAK_IN  .equ  (255-2)

VAC_DEL             .equ   8                         ; Delay 16 ms for vacation
CMD_DEL_EX          .equ   6                         ; Delay 12 ms ( 5*2 + 2)
VAC_DEL_EX          .equ   50                        ; Delay 100 ms


;*******************************************************************
;      PREDEFINED REG
;*******************************************************************
ALL_ON_IMR          .equ   00111101b                 ; turn on int for timers rpm auxobs radio
RETURN_IMR          .equ   00111100b                 ; return on the IMR

RadioImr            .equu  00000001b                 ; turn on the radio only

;---------------------------------------------------------------------------
;      GLOBAL REGISTERS
;---------------------------------------------------------------------------

STATUS              .equ   04H                       ; CMD_TEST 00
                                                     ; WL_TEST 01
                                                     ; VAC_TEST 02
                                                     ; CHARGE 03

STATE               .equ   05H                       ; state register
LineCtr             .equ   06H                       ;
RampFlag            .equ   07H                       ; Ramp up, ramp down, or stop
AUTO_DELAY          .equ   08H
LinePer             .equ   09H                       ; Period of AC line coming in
MOTOR_TIMER_HI      .equ   0AH
MOTOR_TIMER_LO      .equ   0BH
MOTOR_TIMER   .equ  0AH
LIGHT_TIMER_HI      .equ   0CH
LIGHT_TIMER_LO      .equ   0DH
LIGHT_TIMER   .equ  0CH
AOBSF               .equ   0EH
PrevPass            .equ   0FH



CHECK_GRP           .equ   10H
check_sum           .equ   r0                        ; check sum pointer
rom_data            .equ   r1
test_adr_hi   .equ  r2
test_adr_lo   .equ  r3
test_adr            .equ   rr2
CHECK_SUM           .equ   CHECK_GRP+0               ; check sum reg for por
ROM_DATA            .equ   CHECK_GRP+1       ; data read
LIM_TEST_HI         .equ   CHECK_GRP+0               ; Compare registers for measuring
LIM_TEST_LO         .equ   CHECK_GRP+1               ; distance to limit
LIM_TEST            .equ   CHECK_GRP+0               ;
AUXLEARNSW    .equ  CHECK_GRP+2         ;
RRTO                .equ   CHECK_GRP+3       ;
RPM_ACOUNT    .equ  CHECK_GRP+4         ; to test for active rpm
RS_COUNTER          .equ   CHECK_GRP+5       ; rs232 byte counter
RS232DAT            .equ   CHECK_GRP+6       ; rs232 data

RADIO_CMD           .equ   CHECK_GRP+7       ; radio command
R_DEAD_TIME   .equ  CHECK_GRP+8         ;
FAULT               .equ   CHECK_GRP+9       ;
VACFLAG             .equ   CHECK_GRP+10              ; VACATION mode flag
VACFLASH            .equ   CHECK_GRP+11
```

```
VACCHANGE           .equ   CHECK_GRP+12
FAULTTIME           .equ   CHECK_GRP+13
FORCE_IGNORE  .equ  CHECK_GRP+14
FAULTCODE           .equ   CHECK_GRP+15


TIMER_GROUP   .equ  20H
position_hi         .equ   r0
position_lo         .equ   r1
position            .equ   rr0
up_limit_hi         .equ   r2
up_limit_lo         .equ   r3
up_limit            .equ   rr2
switch_delay  .equ  r4
obs_count           .equ   r6
rscommand           .equ   r9
rs_temp_hi          .equ   r10
rs_temp_lo          .equ   r11
rs_temp             .equ   rr10

POSITION_HI         .equ   TIMER_GROUP+0
POSITION_LO         .equ   TIMER_GROUP+1
POSITION            .equ   TIMER_GROUP+0
UP_LIMIT_HI         .equ   TIMER_GROUP+2
UP_LIMIT_LO         .equ   TIMER_GROUP+3
UP_LIMIT            .equ   TIMER_GROUP+2
SWITCH_DELAY  .equ  TIMER_GROUP+4
OnePass             .equ   TIMER_GROUP+5
OBS_COUNT           .equ   TIMER_GROUP+6
RsMode              .equ   TIMER_GROUP+7
Divisor             .equ   TIMER_GROUP+8        ; Number to divide by
RSCOMMAND           .equ   TIMER_GROUP+9
RS_TEMP_HI          .equ   TIMER_GROUP+10
RS_TEMP_LO          .equ   TIMER_GROUP+11
RS_TEMP             .equ   TIMER_GROUP+10
PowerLevel          .equ   TIMER_GROUP+12            ; Current step in 20-step phase ramp-up
PhaseTMR            .equ   TIMER_GROUP+13            ; Timer for turning on and off phase control
PhaseTime           .equ   TIMER_GROUP+14            ; Current time reload value for phase timer
MaxSpeed            .equ   TIMER_GROUP+15            ; Maximum speed for this kind of door

;*********************************************************************
; LEARN EE GROUP FOR LOOPS ECT
;*********************************************************************
LEARNEE_GRP   .equ  30H                         ;
TEMPH         .equ  LEARNEE_GRP           ;
TEMPL         .equ  LEARNEE_GRP+1               ;
P2M_SHADOW          .equ   LEARNEE_GRP+2             ; Readable shadow of P2M register
LEARNDB             .equ   LEARNEE_GRP+3             ; learn debouncer
LEARNT              .equ   LEARNEE_GRP+4             ; learn timer
ERASET              .equ   LEARNEE_GRP+5             ; erase timer
MTEMPH              .equ   LEARNEE_GRP+6        ; memory temp
MTEMPL              .equ   LEARNEE_GRP+7             ; memory temp
MTEMP         .equ  LEARNEE_GRP+8               ; memory temp
SERIAL              .equ   LEARNEE_GRP+9             ; data to & from nonvol memory
ADDRESS             .equ   LEARNEE_GRP+10            ; address for the serial nonvol memory
ZZWIN         .equ  LEARNEE_GRP+11              ; radio 00 code window
T0_OFLOW            .equ   LEARNEE_GRP+12            ; Third byte of T0 counter
T0EXT         .equ  LEARNEE_GRP+13              ; t0 extend dec'd every T0 int
T0EXTWORD           .equ   LEARNEE_GRP+12            ; Word-wide T0 extension
T125MS              .equ   LEARNEE_GRP+14            ; 125mS counter
SKIPRADIO           .equ   LEARNEE_GRP+15            ; flag to skip radio read, write if
                                                     ; learn or vacation talking to it

temph         .equ  r0                          ;
templ         .equ  r1                          ;
learndb             .equ   r3                        ; learn debouncer
learnt              .equ   r4                        ; learn timer
eraset              .equ   r5                        ; erase timer
mtemph              .equ   r6                        ; memory temp
```

```
mtempl              .equ    r7          ; memory temp
mtemp       .equ    r8                  ; memory temp
serial      .equ    r9                  ; data to and from nonvol mem
address             .equ    r10         ; addr for serial nonvol memory
zzwin       .equ    r11                 ;
t0_oflow            .equ    r12         ; Overflow counter for T0
t0ext       .equ    r13                 ; t0 extend dec'd every T0 int
t0extword           .equ    rr12        ; Word-wide T0 extension
t125ms              .equ    r14         ; 125mS counter
skipradio           .equ    r15         ; flag to skip radio read, write if
                                        ; learn or vacation talking to it


FORCE_GROUP         .equ    40H
dnforce             .equ    r0
upforce             .equ    r1
loopreg             .equ    r3
up_force_hi  .equ   r4
up_force_lo  .equ   r5
up_force            .equ    rr4
dn_force_hi  .equ   r6
dn_force_lo  .equ   r7
dn_force            .equ    rr6
force_add_hi .equ   r8
force_add_lo .equ   r9
force_add           .equ    rr8
up_temp             .equ    r10
dn_temp             .equ    r11
pot_count           .equ    r12
force_temp_of .equ  r13
force_temp_hi .equ  r14
force_temp_lo .equ  r15

DNFORCE             .equ    40H
UPFORCE             .equ    41H
AOBSTEST            .equ    42H
LoopReg             .equ    43H
UP_FORCE_HI  .equ   44H
UP_FORCE_LO  .equ   45H
DN_FORCE_HI  .equ   46H
DN_FORCE_LO  .equ   47H
UP_TEMP             .equ    4AH
DN_TEMP             .equ    4BH
POT_COUNT           .equ    4CH
FORCE_TEMP_OF .equ  4CH
FORCE_TEMP_HI       .equ    4EH
FORCE_TEMP_LO       .equ    4FH


RPM_GROUP           .equ    50H

rtypes2             .equ    r0
stackflag           .equ    r1
rpm_temp_of         .equ    r2
rpm_temp_hi  .equ   r3
rpm_temp_hiword     .equ    rr2
rpm_temp_lo  .equ   r4
rpm_past_hi  .equ   r5
rpm_past_lo  .equ   r6
rpm_period_hi       .equ    r7
rpm_period_lo       .equ    r8
divcounter          .equ    r11         ; Counter for dividing RPM time
rpm_count           .equ    r12
rpm_time_out .equ   r13

RTypes2             .equ    RPM_GROUP+0
STACKFLAG           .equ    RPM_GROUP+1
```

```
RPM_TEMP_OF          .equ   RPM_GROUP+2          ; Overflow for RPM Time
RPM_TEMP_HI    .equ  RPM_GROUP+3          ;
RPM_TEMP_HWORD       .equ   RPM_GROUP+2          ; High word of RPM Time
RPM_TEMP_LO    .equ  RPM_GROUP+4
RPM_PAST_HI    .equ  RPM_GROUP+5
RPM_PAST_LO    .equ  RPM_GROUP+6
RPM_PERIOD_HI        .equ   RPM_GROUP+7
RPM_PERIOD_LO        .equ   RPM_GROUP+8
DN_LIMIT_HI          .equ   RPM_GROUP+9          ;
DN_LIMIT_LO          .equ   RPM_GROUP+10         ;
DIVCOUNTER           .equ   RPM_GROUP+11         ; Counter for dividing RPM time
RPM_FILTER           .equ   RPM_GROUP+11         ; DOUBLE MAPPED register for filtering signal
RPM_COUNT            .equ   RPM_GROUP+12
RPM_TIME_OUT   .equ  RPM_GROUP+13
BLINK_HI             .equ   RPM_GROUP+14         ; Blink timer for flashing the
BLINK_LO             .equ   RPM_GROUP+15         ; about-to-travel warning light
BLINK                .equ   RPM_GROUP+14         ; Word-wise blink timer


;*******************************************************************
; RADIO GROUP
;*******************************************************************
RadioGroup     .equ  60H                         ;
RTemp                .equ   RadioGroup           ; radio temp storage
RTempH         .equ  RadioGroup+1         ; radio temp storage high
RTempL         .equ  RadioGroup+2         ; radio temp storage low
RTimeAH              .equ   RadioGroup+3         ; radio active time high byte
RTimeAL              .equ   RadioGroup+4         ; radio active time low byte
RTimeIH              .equ   RadioGroup+5         ; radio inactive time high byte
RTimeIL              .equ   RadioGroup+6         ; radio inactive time low byte
Radio1H              .equ   RadioGroup+7         ; sync 1 code storage
Radio1L              .equ   RadioGroup+8         ; sync 1 code storage
RadioC         .equ  RadioGroup+9         ; radio word count
PointerH             .equ   RadioGroup+10        ;
PointerL             .equ   RadioGroup+11        ;
AddValueH            .equ   RadioGroup+12        ;
AddValueL            .equ   RadioGroup+13        ;
Radio3H              .equ   RadioGroup+14        ; sync 3 code storage
Radio3L              .equ   RadioGroup+15        ; sync 3 code storage
rtemp                .equ   r0                   ; radio temp storage
rtemph         .equ  r1                   ; radio temp storage high
rtempl         .equ  r2                   ; radio temp storage low
rtimeah              .equ   r3                   ; radio active time high byte
rtimeal              .equ   r4                   ; radio active time low byte
rtimeih              .equ   r5                   ; radio inactive time high byte
rtimeil              .equ   r6                   ; radio inactive time low byte
radio1h              .equ   r7                   ; sync 1 code storage
radio1l              .equ   r8                   ; sync 1 code storage
radioc         .equ  r9                   ; radio word count
pointerh             .equ   r10                  ;
pointerl             .equ   r11                  ;
pointer              .equ   rr10                 ; Overall pointer for ROM
addvalueh            .equ   r12                  ;
addvaluel            .equ   r13                  ;
radio3h              .equ   r14                  ; sync 3 code storage
radio3l              .equ   r15                  ; sync 3 code storage
w2                   .equ   rr14                 ; For Siminor revision


CounterGroup   .equ  070h                        ; counter group
TestReg              .equ   CounterGroup         ; Test area when dividing
BitMask              .equ   CounterGroup+01      ; Mask for transmitters
LastMatch            .equ   CounterGroup+02      ; last matching code address
LoopCount            .equ   CounterGroup+03      ; loop counter
CounterA             .equ   CounterGroup+04      ; counter translation MSB
CounterB             .equ   CounterGroup+05      ;
CounterC             .equ   CounterGroup+06      ;
```

```
CounterD         .equ   CounterGroup+07      ; counter translation LSB
MirrorA          .equ   CounterGroup+08      ; back translation MSB
MirrorB          .equ   CounterGroup+09      ;
MirrorC          .equ   CounterGroup+010     ;
MirrorD          .equ   CounterGroup+011     ; back translation LSB
COUNT1H          .equ   CounterGroup+012     ; received count
COUNT1L          .equ   CounterGroup+013
COUNT3H          .equ   CounterGroup+014
COUNT3L          .equ   CounterGroup+015

loopcount        .equ   r3                   ;
countera         .equ   r4                   ;
counterb         .equ   r5                   ;
counterc         .equ   r6                   ;
counterd         .equ   r7                   ;
mirrora          .equ   r8                   ;
mirrorb          .equ   r9                   ;
mirrorc          .equ   r10                  ;
mirrord          .equ   r11                  ;

Radio2Group      .equ   080H

PREVFIX          .equ   Radio2Group + 0
PREVTMP          .equ   Radio2Group + 1
ROLLBIT          .equ   Radio2Group + 2
RTimeDH          .equ   Radio2Group + 3
RTimeDL          .equ   Radio2Group + 4
RTimePH          .equ   Radio2Group + 5
RTimePL          .equ   Radio2Group + 6
ID_B             .equ   Radio2Group + 7
SW_B             .equ   Radio2Group + 8
RADIOBIT         .equ   Radio2Group + 9
RadioTimeOut  .equ   Radio2Group + 10
RadioMode        .equ   Radio2Group + 11     ;Fixed or rolling mode
BitThresh        .equ   Radio2Group + 12     ;Bit decision threshold
SyncThresh       .equ   Radio2Group + 13     ;Sync pulse decision threshold
MaxBits          .equ   Radio2Group + 14     ;Maximum number of bits
RFlag            .equ   Radio2Group + 15     ;Radio flags

prevfix          .equ   r0
prevtmp          .equ   r1
rollbit          .equ   r2
id_b             .equ   r7
sw_b             .equ   r8
radiobit         .equ   r9
radiotimeout  .equ   r10
radiomode        .equ   r11
rflag            .equ   r15

OrginalGroup  .equ   90H
SW_DATA          .equ   OrginalGroup+0
ONEP2            .equ   OrginalGroup+1       ; 1.2 SEC TIMER TICK .125
LAST_CMD         .equ   OrginalGroup+2       ; LAST COMMAND FROM
                                             ; = 55 WALL CONTROL
                                             ; = 00 RADIO
CodeFlag         .equ   OrginalGroup+3       ; Radio code type flag
                                             ; FF = Learning open/close/stop
                                             ; 77 = b code
                                             ; AA = open/close/stop code
                                             ; 55 = Light control transmitter
                                             ; 00 = Command or unknown
RPMONES          .equ   OrginalGroup+4       ; RPM Pulse One Sec. Disable
RPMCLEAR         .equ   OrginalGroup+5       ; RPM PULSE CLEAR & TEST TIMER
FAREVFLAG        .equ   OrginalGroup+6       ; RPM FORCED AREV FLAG
                                             ; 88H FOR A FORCED REVERSE

FLASH_FLAG       .equ   OrginalGroup+7
FLASH_DELAY   .equ   OrginalGroup+8
```

```
REASON          .equ   OrginalGroup+9
FLASH_COUNTER          .equ   OrginalGroup+10
RadioTypes             .equ   OrginalGroup+11        ; Types for one page of tx's
LIGHT_FLAG             .equ   OrginalGroup+12
CMD_DEB                .equ   OrginalGroup+13
LIGHT_DEB              .equ   OrginalGroup+14
VAC_DEB                .equ   OrginalGroup+15

NextGroup              .equ   0A0H
SDISABLE               .equ   NextGroup+0     ; system disable timer
PRADIO3H               .equ   NextGroup+1     ; 3 mS code storage high byte
PRADIO3L               .equ   NextGroup+2     ; 3 mS code storage low byte
PRADIO1H               .equ   NextGroup+3     ; 1 mS code storage high byte
PRADIO1L               .equ   NextGroup+4     ; 1 mS code storage low byte
RTO                    .equ   NextGroup+5     ; radio time out
;RFlag                 .equ   NextGroup+6     ; radio flags
EnableWorkLight        .equ   NextGroup+6           ;4-22-97 work light function on or off?
RINFILTER              .equ   NextGroup+7     ; radio input filter

LIGHT1S                .equ   NextGroup+8     ; light timer for 1second flash
DOG2                   .equ   NextGroup+9     ; second watchdog
FAULTFLAG              .equ   NextGroup+10    ; flag for fault blink, no rad. blink
MOTDEL                 .equ   NextGroup+11    ; motor time delay
PPOINT_DEB             .equ   NextGroup+12    ; Pass Point debouncer
DELAYC                 .equ   NextGroup+13    ; for the time delay for command
L_A_C                  .equ   NextGroup+14    ; Limits are changing register
CMP                    .equ   NextGroup+15    ; Counter compare result

BACKUP_GRP             .equ   0B0H
PCounterA              .equ   BACKUP_GRP
PCounterB              .equ   BACKUP_GRP+1
PCounterC              .equ   BACKUP_GRP+2
PCounterD              .equ   BACKUP_GRP+3
HOUR_TIMER             .equ   BACKUP_GRP+4
HOUR_TIMER_HI .equ    BACKUP_GRP+4
HOUR_TIMER_LO .equ    BACKUP_GRP+5
PassCounter            .equ   BACKUP_GRP+6
STACKREASON            .equ   BACKUP_GRP+7
FirstRun               .equ   BACKUP_GRP+8    ; Flag for first operation after power-up
MinSpeed               .equ   BACKUP_GRP+9
BRPM_COUNT             .equ   BACKUP_GRP+10
BRPM_TIME_OUT          .equ   BACKUP_GRP+11
BFORCE_IGNORE          .equ   BACKUP_GRP+12
BAUTO_DELAY   .equ    BACKUP_GRP+13
BCMD_DEB               .equ   BACKUP_GRP+14
BSTATE                 .equ   BACKUP_GRP+15

;      Double-mapped registers for M6800 test
COUNT_HI               .equ   BRPM_COUNT
COUNT_LO               .equ   BRPM_TIME_OUT
COUNT                  .equ   BFORCE_IGNORE
REGTEMP                .equ   BAUTO_DELAY
REGTEMP2               .equ   BCMD_DEB

;      Double-mapped registers for Siminor Code Reception

CodeT0        .equ   COUNT1L                  ; Binary radio code received
CodeT1        .equ   Radio1L
CodeT2        .equ   MirrorC
CodeT3        .equ   MirrorD
CodeT4        .equ   COUNT3H
CodeT5        .equ   COUNT3L

Ix                     .equ   COUNT1H                ; Index per Siminor's code

W1High        .equ   AddValueH                ; Word 1 per Siminor's code
W1Low                  .equ   AddValueL              ; description
w1high        .equ   addvalueh
w1low                  .equ   addvaluel
```

```
W2High        .equ   Radio3H                ; Word 2 per Siminor's code
W2Low                .equ   Radio3L                ; description
w2high        .equ   radio3h
w2low                .equ   radio3l

STACKTOP             .equ   238                    ; start of the stack
STACKEND             .equ   0C0H                   ; end of the stack

RS232IP              .equ   P0                     ; RS232 input port
RS232IM              .equ   SWITCHES1              ; RS232 mask

csh                  .equ   10000000B              ; chip select high for the 93c46
csl                  .equ   ~csh                   ; chip select low for 93c46
clockh               .equ   01000000B              ; clock high for 93c46
clockl               .equ   ~clockh                ; clock low for 93c46
doh                  .equ   00100000B              ; data out high for 93c46
dol                  .equ   ~doh                   ; data out low for 93c46
ledh                 .equ   00000010B              ; turn the led pin high "off
ledl                 .equ   ~ledh           ; turn the led pin low "on
psmask               .equ   01000000B              ; mask for the program switch
csport               .equ   P2                     ; chip select port
dioport              .equ   P2                     ; data i/o port
clkport              .equ   P2                     ; clock port
ledport              .equ   P2                     ; led port
psport               .equ   P2                     ; program switch port

WATCHDOG_GROUP       .equ   0FH
pcon                 .equ   r0
smr                  .equ   r11
wdtmr                .equ   r15

;       .IF    TwoThirtyThree
;
;WDT    .macro
;       .byte  5fh
;       .endm
;
;       .ELSE
;
;WDT    .macro
;       xor    P1, #00000001b              ; Kick external watchdog
;       .endm
;
;       .ENDIF

FILL    .macro
        .byte  0FFh
        .endm

FILL10  .macro
        FILL
        FILL
        FILL
        FILL
        FILL
        FILL
        FILL
        FILL
        FILL
        FILL
        .endm

FILL100         .macro
        FILL10
        FILL10
        FILL10
        FILL10
```

(

```
        FILL10
        FILL10
        FILL10
        FILL10
        FILL10
        FILL10
        .endm

FILL1000     .macro
        FILL100
        FILL100
        FILL100
        FILL100
        FILL100
        FILL100
        FILL100
        FILL100
        FILL100
        FILL100
        .endm

TRAP    .macro
        jp      start
        jp      start
        jp      start
        jp      start
        jp      start
        .endm
TRAP10  .macro
        TRAP
        TRAP
        TRAP
        TRAP
        TRAP
        TRAP
        TRAP
        TRAP
        TRAP
        TRAP
        .endm

SetRpToRadio2Group   .macro
        .byte   031H
        .byte   060H
                        .endm

;*********************************************************************
;*
;* Interrupt Vector Table
;*
;*********************************************************************

        .org    0000H

        .IF     TwoThirtyThree

        .word   RADIO_INT                       ;IRQ0
        .word   000CH                           ;IRQ1, P3.3
        .word   RPM                             ;IRQ2, P3.1
        .word   AUX_OBS                         ;IRQ3, P3.0
        .word   TIMER10                         ;IRQ4, T0
        .word   RS232                           ;IRQ5, T1

        .ELSE

        .word   RADIO_INT                       ;IRQ0
        .word   RADIO_INT                       ;IRQ1, P3.3
        .word   RPM                             ;IRQ2, P3.1
```

```
        .word  AUX_OBS                              ;IRQ3, P3.0
        .word  TIMERUD                              ;IRQ4, T0
        .word  000CH                                ;IRQ5, T1

        .ENDIF

        .page
        .org    000CH
        jp     START                                ;jmps to start at location 0101, 0202 etc

;-------------------------------------------------------------------------------
;       RS232 DATA ROUTINES
;
;       RS_COUNTER REGISTER:
;       0000XXXX - 0011XXXX Input byte counter (inputting bytes 1-4)
;       00XX0000                Waiting for a start bit
;       00XX0001 - XXXX1001 Input bit counter (Bits 1-9, including stop)
;       00XX1111                Idle -- whole byte received
;
;       1000XXXX - 1111XXXX Output byte counter (outputting bytes 1-8)
;       1XXX0000                Tell the routine to output a byte
;       1XXX0001 - 1XXX1001 Outputting a byte (Bits 1-9, including stop)
;       1XXX1111                Idle -- whole byte output
;
;-------------------------------------------------------------------------------

OutputMode:

        tm      RS_COUNTER, #00001111B              ; Check for outputting start bit
        jr      z, OutputStart                      ;

        tcm     RS_COUNTER, #00001001B              ; Check for outputting stop bit
        jr      z, OutputStop                       ; (bit 9), if so, don't increment

OutputData:

        scf                                         ; Set carry to ensure high stop bit
        rrc     RS232DAT                            ; Test the bit for output
        jr      c, OutputHigh                       ;

OutputLow:

        and     p3, #~CHARGE_SW                     ; Turn off the pull-up
        or      P3, #DIS_SW                         ; Turn on the pull-down
        jr      DataBitDone                         ;

OutputStart:

        ld      T1,#RsPerFull                       ; Set the timer to a full bit period
        ld      TMR, #00001110B                     ; Load the full time period
        and     p3, #~CHARGE_SW                     ; Send a start bit
        or      P3, #DIS_SW                         ;
        inc     RS_COUNTER                          ; Set the counter to first bit
        iret                                        ;

OutputHigh:

        and     p3, #~DIS_SW                        ; Turn off the pull-down
        or      P3, #CHARGE_SW                      ; Turn on the pull-up

DataBitDone:

        inc     RS_COUNTER                          ; Advance to the next data bit
        iret                                        ;

OutputStop:

        and     p3, #~DIS_SW                        ; Output a stop (high) bit
        or      P3, #CHARGE_SW                      ;
```

```
        or      RS_COUNTER, #00001111B          ; Set the flag for word being done
        cp      RS_COUNTER, #11111111B          ; Test for last output byte
        jr      nz, MoreOutput                  ; If not, wait for more output
        clr     RS_COUNTER                      ; Start waiting for input bytes
MoreOutput:
RSExit:
        iret                                    ;

RS232:

        cp      RsMode, #00                     ; Check for in RS232 mode,
        jr      nz, InRsMode            ; If so, keep receiving data
        cp      STATUS, #CHARGE                 ; Else, only receive data when
        jr      nz, WallModeBad                 ; charging the wall contol

InRsMode:

        tcm     RS_COUNTER, #00001111B          ; Test for idle state
        jr      z, RSExit                       ; If so, don't do anything

        tm      RS_COUNTER, #11000000B          ; test for input or output mode
        jr      nz, OutputMode

RSInput:

        tm      RS_COUNTER, #00001111B          ; Check for waiting for start
        jr      z, WaitForStart                 ; If so, test for start bit

        tcm     RS_COUNTER, #00001001B          ; Test for receiving the stop bit
        jr      z, StopBit                      ; If so, end the word

        scf                                     ; Initially set the data in bit
        tm      RS232IP,#RS232IM                ; Check for high or low bit at input
        jr      nz, GotRsBit            ; If high, leave carry high

        rcf                                     ; Input bit was low

GotRsBit:

        rrc     RS232DAT                        ; Shift the bit into the byte
        inc     RS_COUNTER                      ; Advance to the next bit
        iret

StopBit:

        tm      RS232IP,#RS232IM                ; Test for a valid stop bit
        jr      z, DataBad                      ; If invalid, throw out the word

DataGood:

        tm      RS_COUNTER, #11110000B          ; If we're not reading the first word,
        jr      nz, IsData                      ; then this is not a command
        ld      RSCOMMAND, RS232DAT     ; Load the new command word
IsData:
        or      RS_COUNTER, #00001111B          ; Indicate idle at end of word
        iret

WallModeBad:

        clr     RS_COUNTER                      ; Reset the RS232 state

DataBad:

        and     RS_COUNTER, #00110000B          ; Clear the byte counter
        iret

WaitForStart:

        tm      RS232IP,#RS232IM                ; Check for a start bit
```

```
        jr      nz, NoStartBit                     ; If high, keep waiting

        inc     RS_COUNTER                         ; Set to receive bit 1
        ld      T1, #RsPer1P22                     ; Long time until next sample
        ld      TMR, #00001110B                    ; Load the timer
        ld      T1, #RsPerFull                     ; Sample at 1X afterwards
        iret                                       ;

NoStartBit:

        ld      T1, #RsPerHalf                     ; Sample at 2X for start bit
        iret

;-------------------------------------------------------------------------
;       Set the worklight timer to 4.5 minutes for 60Hz line
;       and 2.5 minutes for 50 Hz line
;-------------------------------------------------------------------------
SetVarLight:
        cp      LinePer, #36                ; Test for 50Hz or 60Hz
        jr      uge, EuroLight                     ; Load the proper table
USALight:
        ld      LIGHT_TIMER_HI,#USA_LIGHT_HI       ; set the light period
        ld      LIGHT_TIMER_LO,#USA_LIGHT_LO       ;
        ret                                        ; Return
EuroLight:
        ld      LIGHT_TIMER_HI,#EURO_LIGHT_HI      ; set the light period
        ld      LIGHT_TIMER_LO,#EURO_LIGHT_LO      ;
        ret                                        ; Return
;-------------------------------------------------------------------------
;       THIS THE AUXILARY OBSTRUCTION INTERRUPT ROUTINE
;-------------------------------------------------------------------------

AUX_OBS:
        ld      OBS_COUNT,#11                      ; reset pulse counter (no obstruction)
        and     imr,#11110111b                     ; turn off the interupt for up to 500uS
        ld      AOBSTEST,#11               ; reset the test timer
        or      AOBSF,#00000010B                   ; set the flag for got a aobs
        and     AOBSF,#11011111B                   ; Clear the bad aobs flag
        iret                                       ; return from int

;---------------------------------------------
;       Test for the presence of a blinker module
;---------------------------------------------
LookForFlasher:
        and     P2M_SHADOW, #~BLINK_PIN            ;Set high for autolatch test
        ld      P2M, P2M_SHADOW                    ;
        or      P2, #BLINK_PIN                     ;
        or      P2M_SHADOW, #BLINK_PIN             ;Look for Flasher module
        ld      P2M, P2M_SHADOW                    ;
        ret

        ; Fill 41 bytes of unused memory

        FILL10
        FILL10
        FILL10
        FILL10
        FILL

;*********************************************************************
; REGISTER INITILIZATION
;*********************************************************************

        .org    0101H                              ; address has both bytes the same
start:
START: di                                  ; turn off the interrupt for init

        .IF     TwoThirtyThree
```

(

```
        ld      RP,#WATCHDOG_GROUP
        ld      wdtmr,#00001111B                ; rc dog 100mS

        .ELSE

        clr     P1

        .ENDIF

        WDT                                     ; kick the dog
        clr     RP                              ; clear the register pointer
;*****************************************************************
; PORT INITILIZATION
;*****************************************************************

        ld      P0,#P01S_INIT           ; RESET all ports
        ld      P2,#P2S_POR             ; Output the chip ID code
        ld      P3,#P3S_INIT            ;
        ld      P01M,#P01M_INIT                 ; set mode p00-p03 out p04-p07in
        ld      P3M,#P3M_INIT                   ; set port3 p30-p33 input analog mode
                                                ; p34-p37 outputs
        ld      P2M,#P2M_POR            ; set port 2 mode for chip ID out
;*****************************************************************
;* Internal RAM Test and Reset All RAM = mS *
;*****************************************************************
        srp     #0F0h                           ; point to control group use stack
        ld      r15,#4                          ;r15= pointer (minimum of RAM)
write_again:
        WDT                                     ; KICK THE DOG
        ld      r14,#1
write_again1:
        ld      @r15,r14                        ;write 1,2,4,8,10,20,40,80
        cp      r14,@r15                        ;then compare
        jr      ne,system_error
        rl      r14
        jr      nc,write_again1
        clr     @r15                            ;write RAM(r5)=0 to memory
        inc     r15
        cp      r15,#240
        jr      ult,write_again


;*****************************************************************
;*      Checksum Test           *
;*****************************************************************
CHECKSUMTEST:
        srp     #CHECK_GRP
        ld      test_adr_hi,#01FH
        ld      test_adr_lo,#0FFH       ;maximum address=fffh
add_sum:
        WDT                                     ; KICK THE DOG
        ldc     rom_data,@test_adr              ;read ROM code one by one
        add     check_sum,rom_data              ;add it to checksum register
        decw    test_adr                        ;increment ROM address
        jr      nz,add_sum              ;address=0 ?
        cp      check_sum,#check_sum_value
        jr      z,system_ok             ;check final checksum = 00 ?
system_error:
        and     ledport,#led1           ; turn on the LED to indicate fault
        jr      system_error

        .byte   256-check_sum_value
system_ok:
```

```
        WDT                                         ; kick the dog

        ld      STACKEND,#STACKTOP          ; start at the top of the stack
SETSTACKLOOP:
        ld      @STACKEND,#01H                      ; set the value for the stack vector
        dec     STACKEND                            ; next address
        cp      STACKEND,#STACKEND          ; test for the last address
        jr      nz,SETSTACKLOOP                     ; loop till done

CLEARDONE:


;       ld      STATE,#06                           ; set the state to stop
;       ld      BSTATE,#06                          ;
;       ld      OnePass,STATE               ; Set the one-shot
        ld      STATUS,#CHARGE                      ; set start to charge
        ld      SWITCH_DELAY,#CMD_DEL_EX    ; set the delay time to cmd
        ld      LIGHT_TIMER_HI,#USA_LIGHT_HI        ; set the light period
        ld      LIGHT_TIMER_LO,#USA_LIGHT_LO        ; for the 4.5 min timer
        ld      RPMONES,#244                ; set the hold off
        srp     #LEARNEE_GRP                ;
        ld      learndb,#0FFH               ; set the learn debouncer
        ld      zzwin,learndb               ; turn off the learning
        ld      CMD_DEB,learndb                     ; in case of shorted switches
        ld      BCMD_DEB,learndb                    ; in case of shorted switches
        ld      VAC_DEB,learndb                     ;
        ld      LIGHT_DEB,learndb           ;
        ld      ERASET,learndb                      ; set the erase timer
        ld      learnt,learndb                      ; set the learn timer
        ld      RTO,learndb                         ; set the radio time out
        ld      AUXLEARNSW,learndb          ; turn off the aux learn switch
        ld      RRTO,learndb                ; set the radio timer

;*******************************************************************
; STACK INITIALIZATION
;*******************************************************************
        clr     254
        ld      255,#238                            ; set the start of the stack
        .IF     TwoThirtyThree
        .ELSE
        clr     P1
        .ENDIF


;*******************************************************************
; TIMER INITILIZATION
;*******************************************************************

        ld      PRE0,#00000101B                     ; set the prescaler to  /1 for 4MHz
        ld      PRE1,#00010011B                     ; set the prescaler to  /4 for 4MHz
        clr     T0                                  ; set the counter to count FF through 0
        ld      T1,#RsPerHalf               ; set the period to rs232 period for start bit sample
        ld      TMR,#00001111B                      ; turn on the timers

;*******************************************************************
; PORT INITILIZATION
;*******************************************************************
        ld      P0,#P01S_INIT               ; RESET all ports
        ld      P2,#P2S_INIT                ;
        ld      P3,#P3S_INIT                ;
        ld      P01M,#P01M_INIT                     ; set mode p00-p03 out p04-p07in
        ld      P3M,#P3M_INIT                       ; set port3 p30-p33 input analog mode
                                                    ; p34-p37 outputs
        ld      P2M_SHADOW,#P2M_INIT                ; Shadow P2M for read ability
        ld      P2M,#P2M_INIT               ; set port 2 mode

        .IF     TwoThirtyThree
        .ELSE
```

```
        clr     P1
        .ENDIF

;*********************************************************************
; READ THE MEMORY 2X AND GET THE VACFLAG
;*********************************************************************

        ld      SKIPRADIO,#NOEECOMM         ;
        ld      ADDRESS,#VACATIONADDR       ; set non vol address to the VAC flag
        call    READMEMORY                  ; read the value 2X 1X INIT 2ND read
        call    READMEMORY                  ; read the value
        ld      VACFLAG,MTEMPH              ; save into volital

WakeUpLimits:

        ld      ADDRESS, #UPLIMADDR         ; Read the up and down limits into memory
        call    READMEMORY                  ;
        ld      UP_LIMIT_HI, MTEMPH         ;
        ld      UP_LIMIT_LO, MTEMPL         ;
        ld      ADDRESS, #DNLIMADDR         ;
        call    READMEMORY                  ;
        ld      DN_LIMIT_HI, MTEMPH         ;
        ld      DN_LIMIT_LO, MTEMPL         ;
        WDT                                 ; Kick the dog

WakeUpState:
        ld      ADDRESS, #LASTSTATEADDR     ; Read the previous operating state into memory
        call    READMEMORY                  ;
        ld      STATE, MTEMPL               ; Load the state
        ld      PassCounter, MTEMPH         ; Load the pass point counter
        cp      STATE, #UP_POSITION         ; If at up limit, set position
        jr      z, WakeUpLimit              ;
        cp      STATE, #DN_POSITION         ; If at down limit, set position
        jr      z, WakeDnLimit              ;

WakeUpLost:
        ld      STATE, #STOP                ; Set state as stopped in mid travel
        ld      POSITION_HI, #07FH          ; Set position as lost
        ld      POSITION_LO, #080H          ;
        jr      GotWakeUp                   ;

WakeUpLimit:
        ld      POSITION_HI, UP_LIMIT_HI    ; Set position as at the up limit
        ld      POSITION_LO, UP_LIMIT_LO    ;
        jr      GotWakeUp

WakeDnLimit:
        ld      POSITION_HI, DN_LIMIT_HI    ; Set position as at the down limit
        ld      POSITION_LO, DN_LIMIT_LO    ;

GotWakeUp:

        ld      BSTATE, STATE               ; Back up the state and
        ld      OnePass, STATE              ; clear the one-shot

;*********************************************************************
; SET ROLLING/FIXED MODE FROM NON-VOLATILE MEMORY
;*********************************************************************

        call    SetRadioMode                ; Set the radio mode
        jr      SETINTERRUPTS               ; Continue on

SetRadioMode:

        ld      SKIPRADIO, #NOEECOMM        ; Set skip radio flag
        ld      ADDRESS, #MODEADDR          ; Point to the radio mode flag
        call    READMEMORY                  ; Read the radio mode
        ld      RadioMode, MTEMPL           ; Set the proper radio mode
```

```
        clr     SKIPRADIO                       ; Re-enable the radio
        tm      RadioMode, #ROLL_MASK           ; Do we want rolling numbers
        jr      nz, StartRoll

        call    FixedNums
        ret

StartRoll:

        call    RollNums
        ret

;*******************************************************************
; INITERRUPT INITILIZATION
;*******************************************************************
SETINTERRUPTS:
        ld      IPR,#00011010B                  ; set the priority to timer
        ld      IMR,#ALL_ON_IMR                 ; turn on the interrupt

        .IF     TwoThirtyThree
        ld      IRQ,#01000000B                  ; set the edge clear int
        .ELSE
        ld      IRQ,#00000000b                  ; Set the edge, clear ints
        .ENDIF

        ei                                      ; enable interrupt
;*******************************************************************
; RESET SYSTEM REG
;*******************************************************************

                .IF     TwoThirtyThree

        ld      RP,#WATCHDOG_GROUP
        ld      smr,#00100010B                  ; reset the xtal / number
        ld      pcon,#01111110B                 ; reset the pcon no comparator output
                                                ; no low emi mode
        clr     RP                              ; Reset the RP

                .ENDIF

        ld      PRE0,#00000101B                 ; set the prescaler to / 1 for 4Mhz
        WDT                                     ; Kick the dog

;*******************************************************************
; MAIN LOOP
;*******************************************************************
MAINLOOP:

        cp      PrevPass, PassCounter           ;Compare pass point counter to backup
        jr      z, PassPointCurrent     ;If equal, EEPROM is up to date

PassPointChanged:

        ld      SKIPRADIO, #NOEECOMM            ; Disable radio EEPROM communications
        ld      ADDRESS, #LASTSTATEADDR         ; Point to the pass point storage
        call    READMEMORY                      ; Get the current GDO state
        di                                      ; Lock in the pass point state
        ld      MTEMPH, PassCounter     ; Store the current pass point state
        ld      PrevPass, PassCounter           ; Clear the one-shot
        ei                                      ;
        call    WRITEMEMORY                     ; Write it back to the EEPROM
        clr     SKIPRADIO                       ;

PassPointCurrent:
;
;4-22-97
```

```
        CP      EnableWorkLight,#10000000B ;is the debouncer set? if so write and
                                        ;give feedback
        JR      NE,LightOpen
        TM      p0,#LIGHT_ON
        JR      NZ,GetRidOfIt
        LD      MTEMPL,#0FFH            ;turn on the IR beam work light function
        LD      MTEMPH,#0FFH
        JR      CommitToMem
GetRidOfIt:
        LD      MTEMPL,#00H                     ;turn off the IR beam work light function
        LD      MTEMPH,#00H
CommitToMem:
        LD      SKIPRADIO,#NOEECOMM     ;write to memory to store if enabled or not
        LD      ADDRESS,#IRLIGHTADDR            ;set address for write
        CALL    WRITEMEMORY
        CLR     SKIPRADIO
        XOR     p0,#WORKLIGHT           ;toggle current state of work light for feedback
        LD      EnableWorkLight,#01100000B
;

LightOpen:
        cp      LIGHT_TIMER_HI,#0FFH            ; if light timer not done test beam break
        jr      nz,TestBeamBreak
        tm      p0,#LIGHT_ON            ; if the light is off test beam break
        jr      nz,LightSkip

TestBeamBreak:
        tm      AOBSF,#10000000b                ; Test for broken beam
        jr      z,LightSkip             ; if no pulses Staying blocked
                                                ; else we are intermittent
;4-22-97
        LD      SKIPRADIO,#NOEECOMM     ;Trun off radio interrupt to read from e2
        LD      ADDRESS,#IRLIGHTADDR            ;
        CALL    READMEMORY
        CLR     SKIPRADIO                       ; don't forget to zero the one shot
        CP      MTEMPL,#DISABLED                ;Does e2 report that IR work light function
        JR      EQ,LightSkip            ;is disabled?  IF so jump over light on and

        cp      STATE,#2                        ; test for the up limit
        jr      nz,LightSkip            ; if not goto output the code
        call    SetVarLight                     ; Set worklight to proper time
        or      p0,#LIGHT_ON            ; turn on the light
LightSkip:
;4-22-97
        AND     AOBSF,#01111111B                ;Clear the one shot,for IR beam
                                                ;break detect.
;
        cp      HOUR_TIMER_HI, #01CH            ; If an hour has passed,
        jr      ult, NoDecrement                ; then decrement the
        cp      HOUR_TIMER_LO, #020H            ; temporary password timer
        jr      ult, NoDecrement                ;

        clr     HOUR_TIMER_HI           ; Reset hour timer
        clr     HOUR_TIMER_LO           ;
        ld      SKIPRADIO, #NOEECOMM            ; Disable radio EE read
        ld      ADDRESS, #DURAT                 ; Load the temporary password
        call    READMEMORY                      ; duration from non-volatile
        cp      MTEMPH, #HOURS                  ; If not in timer mode,
        jr      nz, NoDecrement2                ; then don't update
        cp      MTEMPL, #00                     ; If timer is not done,
        jr      z, NoDecrement2                 ; decrement it

        dec     MTEMPL                  ; Update the number of hours
        call    WRITEMEMORY                     ;

NoDecrement:

        tm      AOBSF, #01000000b               ; If the poll radio mode flag is
        jr      z, NoDecrement2                 ; set, poll the radio mode
```

```
        call    SetRadioMode            ; Set the radio mode
        and     AOBSF, #10111111b               ; Clear the flag

NoDecrement2:

        clr     SKIPRADIO                       ; Re-enable radio reads
        and     AOBSF,#00100011b                ; Clear the single break flag
        clr     DOG2                            ; clear the second watchdog
        ld      P01M,#P01M_INIT                 ; set mode p00-p03 out p04-p07in
        ld      P3M,#P3M_INIT                   ; set port3 p30-p33 input analog mode
                                                ; p34-p37 outputs
        or      P2M_SHADOW,#P2M_ALLINS          ; Refresh all the P2M pins which have are
        and     P2M_SHADOW,#P2M_ALLOUTS         ; always the same when we get here
        ld      P2M,P2M_SHADOW                  ; set port 2 mode
        cp      VACCHANGE,#0AAH                 ; test for the vacation change flag
        jr      nz,NOVACCHG             ; if no change the skip
        cp      VACFLAG,#0FFH                   ; test for in vacation
        jr      z,MCLEARVAC             ; if in vac clear
        ld      VACFLAG,#0FFH                   ; set vacation
        jr      SETVACCHANGE            ; set the change
MCLEARVAC:
        clr     VACFLAG                         ; clear vacation mode
SETVACCHANGE:
        clr     VACCHANGE                       ; one shot
        ld      SKIPRADIO,#NOEECOMM             ; set skip flag
        ld      ADDRESS,#VACATIONADDR           ; set the non vol address to the VAC flag
        ld      MTEMPH,VACFLAG                  ; store the vacation flag
        ld      MTEMPL,VACFLAG                  ;
        call    WRITEMEMORY             ; write the value
        clr     SKIPRADIO                       ; clear skip flag
NOVACCHG:
        cp      STACKFLAG,#0FFH                 ; test for the change flag
        jr      nz,NOCHANGEST                   ; if no change skip updating

        cp      L_A_C, #070H            ; If we're in learn mode
        jr      uge, SkipReadLimits     ; then don't refresh the limits!

        cp      STATE, #UP_DIRECTION            ; If we are going to travel up
        jr      z, ReadUpLimit                  ; then read the up limit

        cp      STATE, #DN_DIRECTION            ; If we are going to travel down
        jr      z, ReadDnLimit                  ; then read the down limit

        jr      SkipReadLimits                  ; No limit on this travel...

ReadUpLimit:

        ld      SKIPRADIO, #NOEECOMM            ; Skip radio EEPROM reads
        ld      ADDRESS, #UPLIMADDR     ; Read the up limit
        call    READMEMORY                      ;
        di                                      ;
        ld      UP_LIMIT_HI, MTEMPH     ;
        ld      UP_LIMIT_LO, MTEMPL     ;
        clr     FirstRun                        ; Calculate the highest possible value for pass count
        add     MTEMPL, #10                     ; Bias back by 1" to provide margin of error
        adc     MTEMPH, #00                     ;
CalcMaxLoop:
        inc     FirstRun                        ;
        add     MTEMPL, #LOW(PPOINTPULSES) ;
        adc     MTEMPH, #HIGH(PPOINTPULSES)     ;
        jr      nc, CalcMaxLoop                 ; Count pass points until value goes positive
GotMaxPPoint:
        ei                                      ;
        clr     SKIPRADIO                       ;
        tm      PassCounter, #01000000b         ; Test for a negative pass point counter
        jr      z, CounterGood1                 ; If not, no lower bounds check needed
        cp      DN_LIMIT_HI, #HIGH(PPOINTPULSES - 35)   ; If the down limit is low enough,
        jr      ugt, CounterIsNeg1      ; then the counter can be negative
```

```
        jr      ult, ClearCount                 ; Else, it should be zero
        cp      DN_LIMIT_LO, #LOW(PPOINTPULSES - 35)
        jr      uge, CounterIsNeg1              ;
ClearCount:
        and     PassCounter, #10000000b         ; Reset the pass point counter to zero
        jr      CounterGood1                    ;
CounterIsNeg1:
        or      PassCounter, #01111111b         ; Set the pass point counter to -1
CounterGood1:
        cp      UP_LIMIT_HI, #0FFH              ; Test to make sure up limit is at a
        jr      nz, TestUpLimit2                ; a learned and legal value
        cp      UP_LIMIT_LO, #0FFH              ;
        jr      z, LimitIsBad                   ;
        jr      LimitsAreDone                   ;
TestUpLimit2:
        cp      UP_LIMIT_HI, #0D0H              ; Look for up limit set to illegal value
        jr      ule, LimitIsBad                 ; If so, set the limit fault
        jr      LimitsAreDone                   ;

ReadDnLimit:

        ld      SKIPRADIO, #NOEECOMM            ; Skip radio EEPROM reads
        ld      ADDRESS, #DNLIMADDR             ; Read the down limit
        call    READMEMORY                      ;
        di                                      ;
        ld      DN_LIMIT_HI, MTEMPH             ;
        ld      DN_LIMIT_LO, MTEMPL             ;
        ei                                      ;
        clr     SKIPRADIO                       ;
        cp      DN_LIMIT_HI, #00H               ; Test to make sure down limit is at a
        jr      nz, TestDownLimit2              ; a learned and legal value
        cp      DN_LIMIT_LO, #00H               ;
        jr      z, LimitIsBad                   ;
        jr      LimitsAreDone                   ;
TestDownLimit2:
        cp      DN_LIMIT_HI, #020H              ; Look for down limit set to illegal value
        jr      ult, LimitsAreDone              ; If not, proceed as normal
LimitIsBad:
        ld      FAULTCODE, #7                   ; Set the "no limits" fault
        call    SET_STOP_STATE                  ; Stop the GDO
        jr      LimitsAreDone                   ;

SkipReadLimits:
LimitsAreDone:

        ld      SKIPRADIO, #NOEECOMM            ; Turn off the radio read
        ld      ADDRESS, #LASTSTATEADDR         ; Write the current state and pass count
        call    READMEMORY                      ;
;       ld      MTEMPH, PassCounter             ; DON'T update the pass point here!
        ld      MTEMPL, STATE                   ;
        call    WRITEMEMORY                     ;
        clr     SKIPRADIO                       ;

        ld      OnePass, STATE                  ; Clear the one-shot

        cp      L_A_C, #077H                    ; Test for successful learn cycle
        jr      nz, DontWriteLimits             ; If not, skip writing limits
WriteNewLimits:
        cp      STATE, #STOP                    ;
        jr      nz, WriteUpLimit                ;
        cp      LIM_TEST_HI, #00                ; Test for (force) stop within 0.5" of
        jr      nz, WriteUpLimit                ; the original up limit position
        cp      LIM_TEST_LO, #1d                ;
        jr      ugt, WriteUpLimit               ;
BackOffUpLimit:                                 ;
        add     UP_LIMIT_LO, #1d                ; Back off the up limit by 0.5"
        adc     UP_LIMIT_HI, #00                ;
WriteUpLimit:
        ld      SKIPRADIO, #NOEECOMM            ; Skip radio EEPROM reads
```

```
        ld      ADDRESS, #UPLIMADDR         ; Read the up limit
        di                                          ;
        ld      MTEMPH, UP_LIMIT_HI         ;
        ld      MTEMPL, UP_LIMIT_LO         ;
        ei                                          ;
        call    WRITEMEMORY                         ;
WriteDnLimit:
        ld      ADDRESS, #DNLIMADDR         ; Read the up limit
        di                                          ;
        ld      MTEMPH, DN_LIMIT_HI         ;
        ld      MTEMPL, DN_LIMIT_LO         ;
        ei                                          ;
        call    WRITEMEMORY                         ;
WritePassCount:
        ld      ADDRESS, #LASTSTATEADDR             ; Write the current state and pass count
        ld      MTEMPH, PassCounter         ; Update the pass point
        ld      MTEMPL, STATE               ;
        call    WRITEMEMORY                         ;
        clr     SKIPRADIO                           ;
        clr     L_A_C                               ; Leave the learn mode
        or      ledport,#ledh               ; turn off the LED for program mode

DontWriteLimits:

        srp     #LEARNEE_GRP                ; set the register pointer
        clr     STACKFLAG                           ; clear the flag
        ld      SKIPRADIO,#NOEECOMM                 ; set skip flag
        ld      address,#CYCCOUNT                   ; set the non vol address to the cycle c
        call    READMEMORY                          ; read the value
        inc     mtempl                      ; increase the counter lower byte
        jr      nz,COUNTER1DONE                     ;
        inc     mtemph                              ; increase the counter high byte
        jr      nz,COUNTER2DONE                     ;
        call    WRITEMEMORY                 ; store the value
        inc     address                             ; get the next bytes
        call    READMEMORY                          ; read the data
        inc     mtempl                      ; increase the counter low byte
        jr      nz,COUNTER2DONE                     ;
        inc     mtemph                      ; increase the vounter high byte
COUNTER2DONE:
        call    WRITEMEMORY                 ; save the value
        ld      address,#CYCCOUNT                   ;
        call    READMEMORY                          ; read the data

        and     mtemph,#00001111B           ; find the force address
        or      mtemph,#30H                 ;
        ld      ADDRESS,MTEMPH                      ; set the address
        ld      mtempl,DNFORCE                      ; read the forces
        ld      mtemph,UPFORCE                      ;
        call    WRITEMEMORY                 ; write the value
        jr      CDONE                       ; done set the back trace
COUNTER1DONE:
        call    WRITEMEMORY                 ; got the new address
CDONE:
        clr     SKIPRADIO                           ; clear skip flag

NOCHANGEST:
        call    LEARN                               ; do the learn switch
        di
        cp      BRPM_COUNT,RPM_COUNT
        jr      z,TESTRPM
RESET:
        jp      START
TESTRPM:
        cp      BRPM_TIME_OUT,RPM_TIME_OUT
        jr      nz,RESET
        cp      BFORCE_IGNORE,FORCE_IGNORE
        jr      nz,RESET
        ei
```

```
        di
        cp      BAUTO_DELAY,AUTO_DELAY
        jr      nz,RESET
        cp      BCMD_DEB,CMD_DEB
        jr      nz,RESET
        cp      BSTATE,STATE
        jr      nz,RESET
        ei
TESTRS232:
        SRP     #TIMER_GROUP
        tcm     RS_COUNTER, #00001111B          ; If we are at the end of a word,
        jp      nz, SKIPRS232                   ; then handle the RS232 word

        cp      rscommand,#'V'                  ;
        jp      ugt,ClearRS232                  ;
        cp      rscommand,#'0'                  ; test for in range
        jp      ult,ClearRS232                  ; if out of range skip
        cp      rscommand,#'<'                  ; If we are reading
        jr      nz,NotRs3C                      ; go straight there
        call    GotRs3C                         ;
        jp      SKIPRS232                       ;
NotRs3C:
        cp      rscommand,#'>'                  ; If we are writing EEPROM
        jr      nz,NotRs3E                      ; go straight there
        call    GotRs3E                         ;
        jp      SKIPRS232                       ;
NotRs3E:
        ld      rs_temp_hi,#HIGH (RS232JumpTable-(3*'0'))     ; address pointer to table
        ld      rs_temp_lo,#LOW (RS232JumpTable-(3*'0'))      ; Offset for ASCII adjust

        add     rs_temp_lo,rscommand            ; look up the jump 3x
        adc     rs_temp_hi,#00                  ;
        add     rs_temp_lo,rscommand            ; look up the jump 3x
        adc     rs_temp_hi,#00                  ;
        add     rs_temp_lo,rscommand            ; look up the jump 3x
        adc     rs_temp_hi,#00                  ;
        call    @rs_temp                        ; call this address
        jp      SKIPRS232                       ; done

RS232JumpTable:
        jp      GotRs30
        jp      GotRs31
        jp      GotRs32
        jp      GotRs33
        jp      GotRs34
        jp      GotRs35
        jp      GotRs36
        jp      GotRs37
        jp      GotRs38
        jp      GotRs39
        jp      GotRs3A
        jp      GotRs3B
        jp      GotRs3C
        jp      GotRs3D
        jp      GotRs3E
        jp      GotRs3F
        jp      GotRs40
        jp      GotRs41
        jp      GotRs42
        jp      GotRs43
        jp      GotRs44
        jp      GotRs45
        jp      GotRs46
        jp      GotRs47
        jp      GotRs48
        jp      GotRs49
        jp      GotRs4A
        jp      GotRs4B
        jp      GotRs4C
```

```
        jp      GotRs4D
        jp      GotRs4E
        jp      GotRs4F
        jp      GotRs50
        jp      GotRs51
        jp      GotRs52
        jp      GotRs53
        jp      GotRs54
        jp      GotRs55
        jp      GotRs56

ClearRS232:

        and     RS_COUNTER, #11110000b              ; Clear the RS232 state

SKIPRS232:

UpdateForceAndSpeed:

        ; Update the UP force from the look-up table

        srp     #FORCE_GROUP                    ; Point to the proper registers
        ld      force_add_hi, #HIGH(force_table) ; Fetch the proper unscaled
        ld      force_add_lo, #LOW(force_table)  ; value from the ROM table
        di                                              ;
        add     force_add_lo, upforce                   ; Offset to point to the
        adc     force_add_hi, #00                       ; proper place in the table
        add     force_add_lo, upforce                   ; x2
        adc     force_add_hi, #00                       ;
        add     force_add_lo, upforce                   ; x3 (three bytes wide)
        adc     force_add_hi, #00                       ;
        ei                                              ;

        ldc     force_temp_of, @force_add       ; Fetch the ROM bytes
        incw    force_add                               ;
        ldc     force_temp_hi, @force_add       ;
        incw    force_add                               ;
        ldc     force_temp_lo, @force_add       ;

        ld      Divisor, PowerLevel             ; Divide by our current force level
        call    ScaleTheSpeed                   ; Scale to get our proper force number

        di                                              ; Update the force registers
        ld      UP_FORCE_HI, force_temp_hi      ;
        ld      UP_FORCE_LO, force_temp_lo      ;
        ei                                              ;

        ; Update the DOWN force from the look-up table

        ld      force_add_hi, #HIGH(force_table) ; Fetch the proper unscaled
        ld      force_add_lo, #LOW(force_table)  ; value from the ROM table
        di                                              ;
        add     force_add_lo, dnforce                   ; Offset to point to the
        adc     force_add_hi, #00                       ; proper place in the table
        add     force_add_lo, dnforce                   ; x2
        adc     force_add_hi, #00                       ;
        add     force_add_lo, dnforce                   ; x3 (three bytes wide)
        adc     force_add_hi, #00                       ;
        ei                                              ;

        ldc     force_temp_of, @force_add       ; Fetch the ROM bytes
        incw    force_add                               ;
        ldc     force_temp_hi, @force_add       ;
        incw    force_add                               ;
        ldc     force_temp_lo, @force_add       ;

        ld      Divisor, PowerLevel             ; Divide by our current force level
        call    ScaleTheSpeed                   ; Scale to get our proper force number
```

```
        di                                          ; Update the force registers
        ld      DN_FORCE_HI, force_temp_hi        ;
        ld      DN_FORCE_LO, force_temp_lo        ;
        ei                                          ;

        ; Scale the minimum speed based on force setting
        cp      STATE, #DN_DIRECTION               ; If we're traveling down,
        jr      z, SetDownMinSpeed         ; then use the down force pot for min. speed
SetUpMinSpeed:
        di                                          ; Disable interrupts during update
        ld      MinSpeed, UPFORCE                   ; Scale up force pot
        jr      MinSpeedMath               ;
SetDownMinSpeed:
        di                                          ;
        ld      MinSpeed, DNFORCE                   ; Scale down force pot
MinSpeedMath:
        sub     MinSpeed, #24              ;   pot level - 24
        jr      nc, UpStep2                         ;   truncate off the negative number
        clr     MinSpeed                            ;
UpStep2:
        rcf                                         ;   Divide by four
        rrc     MinSpeed                            ;
        rcf                                         ;
        rrc     MinSpeed                            ;
        add     MinSpeed, #4               ;   Add four to find the minimum speed
        cp      MinSpeed, #12              ;   Perform bounds check on minimum speed.
        jr      ule, MinSpeedOkay                   ;   Truncate if necessary
        ld      MinSpeed, #12              ;
MinSpeedOkay:
        ei                                          ;   Re-enable interrupts

        ; Make sure the worklight is at the proper time on power-up

        cp      LinePer, #36               ; Test for a 50 Hz system
        jr      ult, TestRadioDeadTime            ; if not, we don't have a problem
        cp      LIGHT_TIMER_HI, #0FFH             ; If the light timer is running
        jr      z, TestRadioDeadTime              ; and it is greater than
        cp      LIGHT_TIMER_HI, #EURO_LIGHT_HI   ; the European time, fix it
        jr      ule, TestRadioDeadTime            ;
        call    SetVarLight                       ;

TestRadioDeadTime:

        cp      R_DEAD_TIME,#25            ; test for too long dead
        jp      nz,MAINLOOP        ; if not loop
        clr     RadioC                     ; clear the radio counter
        clr     RFlag                      ; clear the radio flag
        jp      MAINLOOP                   ; loop forever

;-----------------------------------------------------------------------
;       Speed scaling (i.e. Division) routine
;-----------------------------------------------------------------------

ScaleTheSpeed:

        clr     TestReg
        ld      loopreg, #24               ; Loop for all 24 bits
DivideLoop:
        rcf                                         ; Rotate the next bit into
        rlc     force_temp_lo              ; the test field
        rlc     force_temp_hi              ;
        rlc     force_temp_of              ;
        rlc     TestReg                             ;
        cp      TestReg, Divisor                    ; Test to see if we can subtract
        jr      ult, BitIsDone                      ; If we can't, we're all done
        sub     TestReg, Divisor                    ; Subtract the divisor
        or      force_temp_lo, #00000001b  ; Set the LSB to mark the subtract
BitIsDone:
        djnz    loopreg, DivideLoop        ; Loop for all bits
```

```
DivideDone:
        ; Make sure the result is under our 500 ms limit
        cp      force_temp_of, #00              ; Overflow byte must be zero
        jr      nz, ScaleDown                   ;
        cp      force_temp_hi, #0F4H                    ;
        jr      ugt,ScaleDown                   ;
        jr      ult, DivideIsGood                       ; If we're less, then we're okay
        cp      force_temp_lo, #024H                    ; Test low byte
        jr      ugt,ScaleDown                   ; if low byte is okay,
DivideIsGood:
        ret                                             ; Number is good

ScaleDown:
        ld      force_temp_hi, #0F4H                    ; Overflow is never used anyway
        ld      force_temp_lo, #024H                    ;
        ret


;*********************************************************************
; RS232 SUBROUTINES
;*********************************************************************
; "0"
; Set Command Switch
GotRs30:
        ld      LAST_CMD,#0AAH                          ; set the last command as rs wall cmd

        call    CmdSet                          ; set the command switch
        jp      NoPos

; "1"
; Clear Command Switch
GotRs31:
        call    CmdRel                          ; release the command switch
        jp      NoPos

; "2"
; Set Worklight Switch
GotRs32:
        call    LightSet                                ; set the light switch
        jp      NoPos

; "3"
; Clear Worklight Switch
GotRs33:
        clr     LIGHT_DEB                               ; Release the light switch
        jp      NoPos

; "4"
; Set Vacation Switch
GotRs34:
        call    VacSet                          ; Set the vacation switch
        jp      NoPos

; "5"
; Clear Vacation Switch
GotRs35:
        clr     VAC_DEB                                 ; release the vacation switch
        jp      NoPos

; "6"
; Set smart switch
GotRs36:
        call    SmartSet
        jp      NoPos


; "7"
; Clear Smart switch set
GotRs37:
```

```
        call    SmartRelease
        jp      NoPos

; "8"
; Return Present state and reason for that state
GotRs38:
        ld      RS232DAT,STATE
        or      RS232DAT,STACKREASON
        jp      LastPos

; "9"
; Return Force Adder and Fault
GotRs39:
        ld      RS232DAT,FAULTCODE              ; insert the fault code
        jp      LastPos

; ":"
; Status Bits
GotRs3A:
        clr     RS232DAT                        ; Reset data
        tm      P2, #01000000b                  ; Check the strap
        jr      z, LookForBlink                 ; If none, next check
        or      RS232DAT, #00000001b            ; Set flag for strap high

LookForBlink:

        call    LookForFlasher                  ;
        tm      P2, #BLINK_PIN                  ; If flasher is present,
        jr      nz, ReadLight                   ;
        or      RS232DAT,#00000010b             ; then indicate it

ReadLight:

        tm      P0,#00000010B                   ; read the light
        jr      z,C3ADone
        or      RS232DAT,#00000100b
C3ADone:

        cp      CodeFlag, #REGLEARN             ; Test for being in a learn mode
        jr      ult, LookForPass                ; If so, set the bit
        or      RS232DAT,#00010000b             ;

LookForPass:

        tm      PassCounter,#01111111b          ; Check for above pass point
        jr      z, LookForProt                  ; If so, set the bit
        tcm     PassCounter,#01111111b          ;
        jr      z, LookForProt
        or      RS232DAT,#00100000b             ;

LookForProt:

        tm      ACBSF, #10000000b               ; Check for protector break/block
        jr      nz, LookForVac                  ; If blocked, don't set the flag
        or      RS232DAT,#01000000b             ; Set flag for protector signal good

LookForVac:

        cp      VACFLAG,#00B                    ; test for the vacation mode
        jp      nz,LastPos
        or      RS232DAT,#00001000b
        jp      LastPos

; ";"
; Return L_A_C
GotRs3B:
        ld      RS232DAT,L_A_C                  ; read the L_A_C
        jp      LastPos
```

```
; "<"
; Read a word of data from an EEPROM address input by the user
GotRs3C:
        cp      RS_COUNTER, #010H                   ; If we have only received the
        jr      ult, FirstByte                      ; first word, wait for more
        cp      RS_COUNTER, #080H                   ; If we are outputting,
        jr      ugt, OutputSecond                   ; output the second byte

SecondByte:

        ld      SKIPRADIO, #0FFH                    ; Read the memory at the specified
        ld      ADDRESS, RS232DAT                   ; address
        call    READMEMORY                          ;
        ld      RS232DAT, MTEMPH                    ; Store into temporary registers
        ld      RS_TEMP_LO, MTEMPL          ;
        clr     SKIPRADIO                           ;
        jp      MidPos                      ;

OutputSecond:

        ld      RS232DAT, RS_TEMP_LO                ; Output the second byte of the read
        jp      LastPos                             ;

FirstByte:

        inc     RS_COUNTER                          ; Set to receive second word
        ret                                         ;

; "="
; Exit learn limits mode
GotRs3D:
        cp      L_A_C, #00                          ; If not in learn mode,
        jp      z, NoPos                            ; then don't touch the learn LED
        clr     L_A_C                               ; Reset the learn limits state machine
        or      ledport,#ledh               ; turn off the LED for program mode
        jp      NoPos                               ;

; ">"
; Write a word of data to the address input by the user
GotRs3E:

        cp      RS_COUNTER, #01FH                   ;
        jr      z, SecondByteW                      ;
        cp      RS_COUNTER, #02FH                   ;
        jr      z, ThirdByteW               ;
        cp      RS_COUNTER, #03FH                   ;
        jr      z, FourthByteW                      ;

FirstByteW:
DataDone:

        inc     RS_COUNTER                          ; Set to receive next byte
        ret                                         ;

SecondByteW:

        ld      RS_TEMP_HI, RS232DAT                ; Store the address
        jr      DataDone                            ;

ThirdByteW:

        ld      RS_TEMP_LO, RS232DAT                ; Store the high byte
        jr      DataDone                            ;

FourthByteW:

        cp      RS_TEMP_HI, #03FH                   ; Test for illegal address
        jr      ugt, FailedWrite                    ; If so, don't write
```

```
        ld      SKIPRADIO, #0FFH                ; Turn off radio reads
        ld      ADDRESS, RS_TEMP_HI          ; Load the address
        ld      MTEMPH, RS_TEMP_LO           ; and the data for the
        ld      MTEMPL, RS232DAT                ; EEPROM write
        call    WRITEMEMORY                     ;
        clr     SKIPRADIO                       ; Re-enable radio reads
        ld      RS232DAT, #00H                  ; Flag write okay
        jp      LastPos                         ;

FailedWrite:

        ld      RS232DAT, #0FFH                 ; Flag bad write
        jp      LastPos

; "?"
; Suspend all communication for 30 seconds
GotRs3F:
        clr     RSCOMMAND                       ; Throw out any command currently
                                                ; running
        jp      NoPos                           ; Ignore all RS232 data

; "@"
; Force Up State
GotRs40:
        cp      STATE, #DN_DIRECTION            ; If traveling down, make sure that
        jr      z, dontup                       ; the door autoreverses first
        cp      STATE, #AUTO_REV                ; If the door is autoreversing or
        jp      z, NoPos                        ; at the up limit, don't let the
        cp      STATE, #UP_POSITION          ; up direction state be set
        jp      z, NoPos                        ;
        ld      REASON, #00H                 ; Set the reason as command
        call    SET_UP_DIR_STATE
        jp      NoPos
dontup:
        ld      REASON, #00H                 ; Set the reason as command
        call    SET_AREV_STATE                  ; Autoreverse the door
        jp      NoPos                           ;

; "A"
; Force Down State
GotRs41:
        cp      STATE,#5h                       ; test for the down position
        jp      z,NoPos                         ;

        clr     REASON                          ; Set the reason as command
        call    SET_DN_DIR_STATE
        jp      NoPos

; "B"
; Force Stop State
GotRs42:
        clr     REASON                          ; Set the reason as command
        call    SET_STOP_STATE
        jp      NoPos

; "C"
; Force Up Limit State
GotRs43:
        clr     REASON                          ; Set the reason as command
        call    SET_UP_POS_STATE
        jp      NoPos

; "D"
; Force Down Limit State
GotRs44:
        clr     REASON                          ; Set the reason as command
        call    SET_DN_POS_STATE
        jp      NoPos
```

```
; "E"
; Return min. force during travel
GotRs45:
;       ld      RS232DAT,MIN_RPM_HI             ; Return high and low
;       cp      RS_COUNTER,#090h                        ; bytes of min. force read
;       jp      ult,MidPos                              ;
;       ld      RS232DAT,MIN_RPM_LO             ;
        jp      LastPos                                 ;


; "F"
; Leave RS232 mode -- go back to scanning for wall control switches
GotRs46:

        clr     RsMode                          ; Exit the rs232 mode
        ld      STATUS, #CHARGE                         ; Scan for switches again
        clr     RS_COUNTER                              ; Wait for input again
        ld      rscommand,#0FFH                         ; turn off command
        ret


; "G"
; (No Function)
;
GotRs47:
        jp      NoPos

; "H"
; 45 Second search for pass point the setup for the door
;
GotRs48:
        ld      SKIPRADIO, #0FFH                        ; Disable radio EEPROM reads / writes
        ld      MTEMPH, #0FFH                   ; Erase the up limit and down limit
        ld      MTEMPL, #0FFH                   ; in EEPROM memory
        ld      ADDRESS, #UPLIMADDR             ;
        call    WRITEMEMORY                             ;
        ld      ADDRESS, #DNLIMADDR             ;
        call    WRITEMEMORY                             ;
        ld      UP_LIMIT_HI, #HIGH(SetupPos)            ; Set the door to travel
        ld      UP_LIMIT_LO, #LOW(SetupPos)             ; to the setup position
        ld      POSITION_HI, #040H              ; Set the current position to unknown
        and     PassCounter, #10000000b                 ; Reset to activate on first pass point seen
        call    SET_UP_DIR_STATE                        ; Force the door to travel
        ld      OnePass, STATE                          ; without a limit refresh
        jp      NoPos

; "I"
; Return radio drop-out timer
GotRs49:
        clr     RS232DAT                                ; Initially say no radio on
        cp      RTO,#RDROPTIME                          ; If there's no radio on,
        jp      uge, LastPos                    ; then broadcast that
        com     RS232DAT                                ; Set data to FF
        jp      LastPos

; "J"
; Return current position
GotRs4A:
        ld      RS232DAT,POSITION_HI
        cp      RS_COUNTER,#090H                        ; Test for no words out yet
        jp      ult,MidPos                              ; If not, transmit high byte
        ld      RS232DAT,POSITION_LO
        jp      LastPos


; "K"
; Set radio Received
GotRs4B:
        cp      L_A_C, #070H            ; If we were positioning the up limit,
```

```
        jr      ult, NormalRSRadio  ; then start the learn cycle
        jr      z, FirstRSLearn          ;
        cp      L_A_C, #071H        ; If we had an error,
        jp      nz, NoPos                ; re-learn, otherwise ignore
ReLearnRS:
        ld      L_A_C, #072H        ; Set the re-learn state
        call    SET_UP_DIR_STATE         ;
        jp      NoPos                    ;
FirstRSLearn:
        ld      L_A_C, #073H        ; Set the learn state
        call    SET_UP_POS_STATE         ; Start from the "up limit"
        jp      NoPos                    ;
NormalRSRadio:
        clr     LAST_CMD                 ; mark the last command as radio
        ld      RADIO_CMD,#0AAH          ; set the radio command
        jp      NoPos                    ; return

; "L"
; Direct-connect sensitivity test -- toggle worklight for any code
GotRs4C:
;       clr     RTO                          ; Reset the drop-out timer
;       ld      CodeFlag, #SENS_TEST         ; Set the flag to test sensitivity
        jp      NoPos

; "M"
GotRs4D:
        jp      NoPos

; "N"
; If we are within the first 4 seconds and RS232 mode is not yet enabled,
; then echo the nybble on P30 - P33 on all other nybbles
; (A.K.A. The 6800 test)
GotRs4E:

        cp      SDISABLE, #32           ; If the 4 second init timer
        jp      ult, ExitNoTest               ; is done, don't do the test

        di
        ld      COUNT_HI, #002H               ; Shut down all other GDO operations
        clr     COUNT_LO                      ; Set up to loop for 512 iterations,
        ld      P01M, #00000100b              ; totaling 13.056 milliseconds
        ld      P2M, #00000000b               ; Set all possible pins of micro.
        ld      P3M, #00000001b               ; to outputs for testing
        WDT                                   ;
                                              ; Kick the dog

TimingLoop:

        clr     REGTEMP                       ; Create a byte of identical nybbles
        ld      REGTEMP2, P3            ; from P30 - P33 to write to all ports
        and     REGTEMP2, #00001111b          ;
        or      REGTEMP, REGTEMP2             ;
        swap    REGTEMP2                      ;
        or      REGTEMP, REGTEMP2             ;
        ld      P0, REGTEMP                   ; Echo the nybble to all ports
        ld      P2, REGTEMP                   ;
        ld      P3, REGTEMP                   ;
        decw    COUNT                         ; Loop for 512 iterations
        jr      nz, TimingLoop                ;
        jp      START                         ; When done, reset the system


; "O"
;       Return max. force during travel
;
GotRs4F:
;       ld      RS232DAT,P32_MAX_HI     ; Return high and low
;       cp      RS_COUNTER,#090h              ; bytes of max. force read
;       jp      ult,MidPos                    ;
```

```
;       ld      RS232DAT,P32_MAX_LO          ;
        jp      LastPos                          ;


; "P"
; Return the measured temperature range
GotRs50:

        jr      NoPos                            ;

; "Q"
; Return address of last memory matching
; radio code received
GotRs51:

;       ld      RS232DAT, RTEMP                  ; Send back the last matching address
        jr      LastPos                          ;


; "R"
; Set Rs232 mode -- No ultra board present
; Return Version
GotRs52:
;       clr     UltraBrd                         ; Clear flag for ultra board present
SetIntoRs232:
        ld      RS232DAT,#VERSIONNUM             ; Initially return the version
        cp      RsMode,#00                       ; If this is the first time we're
        jr      ugt, LockedInNoCR                ; locking RS232, signal it
        ld      RS232DAT,#0BBH                   ; Return a flag for initial RS232 lock

LockedInNoCR:
        ld      RsMode,#32
        jr      LastPos

; "S"
; Set Rs232 mode -- Ultra board present
; Return Version
GotRs53:

        jr      NoPos

; "T"
; Range test -- toggle worklight whenever a good memory-matching code
; is received
GotRs54:

;       clr     RTO                              ; Reset the drop-out timer
;       ld      CodeFlag, #RANGETEST             ; Set the flag to test sensitivity
        jr      NoPos

; "U"
; (No Function)
GotRs55:

        jr      NoPos

; "V"
; Return current values of up and down force pots
GotRs56:

        ld      RS232DAT,UPFORCE                 ; Return values of up and down
        cp      RS_COUNTER,#090h                 ; force pots.
        jp      ult,MidPos                       ;
        ld      RS232DAT,DNFORCE                 ;
        jr      LastPos

MidPos:
        or      RS_COUNTER, #10000000B           ; Set the output mode
        inc     RS_COUNTER                       ; Transmit the next byte
```

```
        jr      RSDone                          ; exit

LastPos:
        ld      RS_COUNTER, #11110000B          ; set the start flag for last byte
        ld      rscommand,#0FFH                 ; Clear the command
        jr      RSDone                          ; Exit
ExitNoTest:
NoPos:
        clr     RS_COUNTER                      ; Wait for input again
        ld      rscommand,#0FFH                 ; turn off command
RSDone:
        ld      RsMode,#32                      ;
        ld      STATUS, #RSSTATUS               ; Set the wall control to RS232
        or      P3, #CHARGE_SW                  ; Turn on the pull-ups
        and     P3, #~DIS_SW                    ;
        ret


;*******************************************************************
; Radio interrupt from a edge of the radio signal
;*******************************************************************

RADIO_INT:
        push    RP                              ; save the radio pair
        srp     #RadioGroup                     ; set the register pointer

        ld      rtemph,T0EXT                    ; read the upper byte
        ld      rtempl,T0                       ; read the lower byte
        tm      IRQ,#00010000B                  ; test for pending int
        jr      z,RTIMEOK                       ; if not then ok time
        tm      rtempl,#10000000B               ; test for timer reload
        jr      z,RTIMEOK                       ; if not reloaded then ok
        dec     rtemph                          ; if reloaded then dec high for sync
RTIMEOK:
        clr     R_DEAD_TIME                     ; clear the dead time

        .IF     TwoThirtyThree
        and     IMR,#11111110B                  ; turn off the radio interrupt
        .ELSE
        and     IMR,#11111100B                  ; Turn off the radio interrupt
        .ENDIF

        ld      RTimeDH,RTimePH                 ; find the difference
        ld      RTimeDL,RTimePL                 ;
        sub     RTimeDL,rtempl                  ;
        sbc     RTimeDH,rtemph                  ; in past time and the past time in temp
RTIMEDONE:
        tm      P3,#00000100B                   ; test the port for the edge
        jr      nz,ACTIVETIME                   ; if it was the active time then branch
INACTIVETIME:
        cp      RINFILTER,#0FFH                 ; test for active last time
        jr      z,GOINACTIVE                    ; if so continue
        jp      RADIO_EXIT                      ; if not the return
GOINACTIVE:

        .IF     TwoThirtyThree
        or      IRQ,#01000000B                  ; set the bit setting direction to pos edge
        .ENDIF

        clr     RINFILTER                       ; set flag to inactive
        ld      rtimeih,RTimeDH                 ; transfer difference to inactive
        ld      rtimeil,RTimeDL                 ;
        ld      RTimePH,rtemph                  ; transfer temp into the past
        ld      RTimePL,rtempl                  ;
;
        CP      radioc,#01H                     ;inactive time after sync bit
        JP      NZ,RADIO_EXIT                   ;exit if it was not sync
;
```

```
        TM      RadioMode, #ROLL_MASK       ;If in fixed mode,
        JR      z, FixedBlank           ;no number counter exists
        CP      rtimeih,#0AH            ;2.56ms for rolling code mode
        JP      ULT,RADIO_EXIT                  ;pulse ok exit as normal
        CLR     radioc                  ;if pulse is longer, bogus sync, restart sync search
        jp      RADIO_EXIT                              ; return
FixedBlank:
        CP      rtimeih,#014H           ; test for the max width 5.16ms
        JP      ULT,RADIO_EXIT                  ;pulse ok exit as normal
        CLR     radioc                  ;if pulse is longer, bogus sync, restart sync search
;
        jp      RADIO_EXIT                      ; return
ACTIVETIME:
        cp      RINFILTER,#00H                  ; test for active last time
        jr      z,GOACTIVE                      ; if so continue
        jr      RADIO_EXIT                      ; if not the return
GOACTIVE:

        .IF     TwoThirtyThree
        and     IRQ,#00111111B                  ; clear bit setting direction to neg edge
        .ENDIF

        ld      RINFILTER,#0FFH                 ;
        ld      rtimeah,RTimeDH                 ; transfer difference to active
        ld      rtimeal,RTimeDL                 ;
        ld      RTimePH,rtemph                  ; transfer temp into the past
        ld      RTimePL,rtempl                  ;
GotBothEdges:
                ei                              ; enable the interrupts
                cp      radioc,#1               ; test for the blank timing
                jp      ugt,INSIG               ; if not then in the middle of signal
        .IF UseSiminor
                jp      z, CheckSiminor         ; Test for a Siminor tx on the first bit
        .ENDIF
                inc     radioc          ; set the counter to the next number

                TM      RFlag,#00100000B        ;Has a valid blank time occured
                JR      NZ,BlankSkip

                cp      RadioTimeOut,#10        ; test for the min 10 ms blank time
                jr      ult,ClearJump   ; if not then clear the radic
;
                OR      RFlag,#00100000B        ;blank time valid! no need to check
BlankSkip:
                cp      rtimeah,#00h    ; test first the min sync
                jr      z,JustNoise             ; if high byte 0 then clear the radio
SyncOk:
;
                TM      RadioMode,#ROLL_MASK    ;checking sync pulse width,fix or Roll
                JR      z,Fixedsync
                CP      rtimeah,#09h    ;time for roll 1/2 fixed, 2.3ms
                JR      uge,JustNoise
                JR      SET1
;
Fixedsync:      cp      rtimeah,#012h   ; test for the max time 4.6mS
                jr      uge,JustNoise   ; if not clear

SET1:
                clr     PREVFIX                 ;Clear the previous "fixed" bit
                cp      rtimeah, SyncThresh ; test for 1 or three time units
                jr      uge,SYNC3FLAG           ; set the sync 3 flag
SYNC1FLAG:
                tm      RFlag, #01000000b       ;Was a sync 1 word the last received?
                jr      z, SETADCODE    ;   if not, then this is an A (or D) code

SETBCCODE:

                ld      radio3h, radio1h        ;Store the last sync 1 word
```

```
            ld      radio3l, radio1l
            or      RFlag, #00000110b          ;Set the B/C Code flags
            and     RFlag, #11110111b          ;Clear the A/D Code Flag
            jr      BCCODE
JustNoise:
            CLR     radioc                ;Edge was noise keep waiting for sync bit
            JP      RADIO_EXIT

SETADCODE:

            or      RFlag, #00001000b

BCCODE:

            or      RFlag,#01000000b           ; set the sync 1 memory flag
            clr     radio1h                    ; clear the memory
            clr     radio1l                    ;
            clr     COUNT1H                    ; clear the memory
            clr     COUNT1L                    ;
            jr      DONESET1                   ; do the 2X
SYNC3FLAG:
            and     RFlag,#10111111b           ; set the sync 3 memory flag
            clr     radio3h                    ; clear the memory
            clr     radio3l                    ;
            clr     COUNT3H                    ; clear the memory
            clr     COUNT3L                    ;
            clr     ID_B                       ; Clear the ID bits
DONESET1:
RADIO_EXIT:
            and     SKIPRADIO, # LOW(~NOINT)   ;Re-enable radio ints
            pop     rp
            iret                               ; done return

ClearJump:
            or      P2,#10000000b         ; turn of the flag bit for clear radio
            jp      ClearRadio                 ; clear the radio signal

      .IF   UseSiminor

SimRadio:

            tm      rtimeah, #10000000b ; Test for inactive greater than active
            jr      nz, SimBitZero             ; If so, binary zero received

SimBitOne:

            scf                                ; Set the bit
            jr      RotateInBit                ;

SimBitZero:

            rcf

RotateInBit:

            rrc     CodeT0                ; Shift the new bit into the
            rrc     CodeT1                ; radio word
            rrc     CodeT2                ;
            rrc     CodeT3                ;
            rrc     CodeT4                ;
            rrc     CodeT5                ;

            inc     radioc                ; increase the counter

            cp      radioc, # 49 - 128 .; Test for all 49 bits received
            jp      ugt, CLEARRADIO            ;
            jp      z, KnowSimCode             ;
            jp      RADIO_EXIT                 ;
```

```
CheckSiminor:
            tm      RadioMode, #ROLL_MASK      ; If not in a rolling mode,
            jr      z, INSIG                   ; then it can't be a Siminor transmitter
            cp      RadioTimeOut, #35   ; If the blank time is longer than 35 ms,
            jr      ugt, INSIG                 ; then it can't be a Siminor unit

            or      RadioC, #10000000b  ; Set the flag for a Siminor signal
            clr     ID_B                       ; No ID bits for Siminor
        .ENDIF
INSIG:
            AND     RFlag,#11011111B           ;clear blank time good flag
            cp      rtimeih,#014H       ; test for the max width 5.16
            jr      uge,ClearJump       ; if too wide clear
            cp      rtimeih,#00h        ; test for the min width
            jr      z,ClearJump                ; if high byte is zero, pulse too narrow
ISigOk:
            cp      rtimeah,#014H       ; test for the max width
            jr      uge,ClearJump       ; if too wide clear
            cp      rtimeah,#00h        ; if greater then 0 then signal ok
            jr      z,ClearJump                ; if too narrow clear
ASigOk:
            sub     rtimeal,rtimeil            ; find the difference
            sbc     rtimeah,rtimeih

        .IF     UseSiminor

            tm      RadioC, #10000000b  ; If this is a Siminor code,
            jr      nz, SimRadio        ; then handle it appropriately

        .ENDIF

            tm      rtimeah,#10000000b  ; find out if neg
            jr      nz,NEGDIFF2                ; use 1 for ABC or D
            jr      POSDIFF2
POSDIFF2:
            cp      rtimeah, BitThresh  ; test for 3/2
            jr      ult,BITIS2                 ; mark as a 2
            jr      BITIS3

NEGDIFF2:
            com     rtimeah                    ; invert
            cp      rtimeah, BitThresh  ; test for 2/1
            jr      ult,BIT2COMP        ; mark as a 2
            jr      BITIS1
BITIS3:
            ld      RADIOBIT,#2h        ; set the value
            jr      GOTRADBIT
BIT2COMP:
            com     rtimeah                    ; invert
BITIS2:
            ld      RADIOBIT,#1h        ; set the value
            jr      GOTRADBIT
BITIS1:
            com     rtimeah                    ; invert
            ld      RADIOBIT,#0h        ; set the value
GOTRADBIT:
            clr     rtimeah                    ; clear the time
            clr     rtimeal
            clr     rtimeih
            clr     rtimeil
;           ei                                 ; enable interrupts --REDUNDANT
ADDRADBIT:
            SetRpToRadio2Group          ;Macro for assembler error
;           srp     #Radio2Group        ;   -- this is what it does
            tm      rflag,#01000000b           ; test for radio 1 / 3
            jr      nz,RC1INC                  ;

RC3INC:
            tm      RadioMode, #ROLL_MASK      ;If in fixed mode,
```

```
        jr      z, Radio3F              ;   no number counter exists
        tm      RadioC,#00000001b       ; test for even odd number
        jr      nz,COUNT3INC        ; if EVEN number counter
Radio3INC:
                                        ; else radio

        call    GETTRUEFIX              ;Get the true fixed bit
        cp      RadioC,#14              ; test the radio counter for the specials
        jr      uge,SPECIAL_BITS        ; save the special bits seperate
Radio3R:
Radio3F:
        srp     #RadioGroup
        di                              ; Disable interrupts to avoid pointer collision
        ld      pointerh,#Radio3H       ; get the pointer
        ld      pointerl,#Radio3L       ;
        jr      AddAll
SPECIAL_BITS:
        cp      RadioC,#20              ; test for the switch id
        jr      z,SWITCHID              ; if so then branch

        ld      RTempH,id_b             ; save the special bit
        add     id_b,RTempH             ; *3
        add     id_b,RTempH             ; *3
        add     id_b,radiobit       ; add in the new value
        jr      Radio3R
SWITCHID:
        cp      id_b,#18                ; If this was a touch code,
        jr      uge, Radio3R        ; then we already have the ID bit
        ld      sw_b,radiobit       ; save the switch ID
        jr      Radio3F
R1INC:
        tm      RadioMode, #ROLL_MASK   ;If in fixed mode, no number counter
        jr      z, Radio1F
        tm      RadioC,#00000001b       ; test for even odd number
        jr      nz,COUNT1INC        ; if odd number counter
Radio1INC:
                                        ; else radio
        call    GETTRUEFIX              ;Get the real fixed code
        cp      RadioC, #02             ;If this is bit 1 of the lms code,
        jr      nz, Radio1F             ;then see if we need the switch ID bit
        tm      rflag, #00000000b       ;If this is the first word received,
        jr      z, SwitchBit1       ;then save the switch bit regardless
        cp      id_b, #18               ;If we have a touch code,
        jr      ult, Radio1F        ;then this is our switch ID bit.
SwitchBit1:
        ld      sw_b, radiobit          ;Save touch code ID bit
Radio1F:
        srp     #RadioGroup
        di                              ; Disable interrupts to avoid pointer collision
        ld      pointerh,#Radio1H       ; get the pointer
        ld      pointerl,#Radio1L       ;
        jr      AddAll

GETTRUEFIX:

        ; Chamberlain proprietary fixed code
        ; bit decryption algorithm goes here

        ret

COUNT3INC:
        ld      rollbit, radiobit       ;Store the rolling bit
        srp     #RadioGroup
        di                              ; Disable interrupts to avoid pointer collision
        ld      pointerh,#COUNT3H       ; get the pointer
        ld      pointerl,#COUNT3L       ;
        jr      AddAll
COUNT1INC:
```

```
            ld      rollbit, radiobit           ;Store the rolling bit
            srp     #RadioGroup
            di                                  ; Disable interrupts to avoid pointer collision
            ld      pointerh,#COUNT1H           ; get the pointers
            ld      pointerl,#COUNT1L           ;
;           jr      AddAll

AddAll:
            ld      addvalueh,@pointerh ; get the value
            ld      addvaluel,@pointerl ;

            add     addvaluel,@pointerl ; add x2
            adc     addvalueh,@pointerh ;
            add     addvaluel,@pointerl ; add x3
            adc     addvalueh,@pointerh ;
            add     addvaluel,RADIOBIT  ; add in new number
            adc     addvalueh,#00h          ;
            ld      @pointerh,addvalueh ; save the value
            ld      @pointerl,addvaluel ;
            ei                                  ; Re-enable interrupts
ALLADDED:
            inc     radioc              ; increase the counter
FULLWORD?:
            cp      radioc, MaxBits             ; test for full (10/20 bit) word
            jp      nz,RRETURN                  ; if not then return

            ;;;;;Disable interrupts until word is handled
            or      SKIPRADIO, #NOINT           ; Set the flag to disable radio interrupts
            .IF     TwoThirtyThree
            and     IMR,#11111110B              ; turn off the radio interrupt
            .ELSE
            and     IMR,#11111100B              ; Turn off the radio interrupt
            .ENDIF

            clr     RadioTimeOut        ; Reset the blank time
            cp      RADIOBIT, #00H              ; If the last bit is zero,
            jp      z, ISCCODE                  ;   then the code is the obsolete C code
            and     RFlag,#11111101B            ; Last digit isn't zero, clear B code flag
ISCCODE:
            tm      RFlag,#00100000B            ; test flag for previous word received
            jr      nz,KNOWCODE                 ; if the second word received
FIRST20:
            or      RFlag,#00100000B            ; set the flag
            clr     radioc              ; clear the radio counter
            jp      RRETURN                     ; return

    .IF UseSiminor

KnowSimCode:

    ; Siminor proprietary rolling code decryption algorithm goes here

    ld      radiolh, #0FFH                      ; Set the code to be incompatible with
    clr     MirrorA                             ; the Chamberlain rolling code
    clr     MirrorB                             ;
    jp      CounterCorrected                    ;

    .ENDIF


KNOWCODE:

    tm      RadioMode, #ROLL_MASK       ;If not in rolling mode,
    jr      z, CounterCorrected ;   forget the number counter

    ; Chamberlain proprietary counter decryption algorithm goes here
```

```
CounterCorrected:

        srp     #RadioGroup                 ;
        clr     RRTO                        ; clear the got a radio flag
        tm      SKIPRADIO,#NOEECOMM ; test for the skip flag
        jp      nz,CLEARRADIO       ; if skip flag is active then donot look at EE mem

        cp      ID_B, #18                   ;If the ID bits total more than 18,
        jr      ult, NoTCode        ;
        or      RFlag, #00000100b           ;then indicate a touch code
NoTCode:
        ld      ADDRESS,#VACATIONADDR       ; set the non vol address to the VAC flag
        call    READMEMORY                  ; read the value
        ld      VACFLAG,MTEMPH              ; save into volital
        cp      CodeFlag,#REGLEARN  ; test for in learn mode
        jp      nz,TESTCODE                 ; if out of learn mode then test for matching
STORECODE:
        tm      RadioMode, #ROLL_MASK       ;If we are in fixed mode,
        jr      z, FixedOnly        ;then don't compare the counters

CompareCounters:

        cp      PCounterA, MirrorA  ; Test for counter match to previous
        jp      nz, STORENOTMATCH           ; if no match, try again
        cp      PCounterB, MirrorB  ; Test for counter match to previous
        jp      nz, STORENOTMATCH           ; if no match, try again
        cp      PCounterC, MirrorC  ; Test for counter match to previous
        jp      nz, STORENOTMATCH           ; if no match, try again
        cp      PCounterD, MirrorD  ; Test for counter match to previous
        jp      nz, STORENOTMATCH           ; if no match, try again
FixedOnly:
        cp      PRADIO1H,radio1h            ; test for the match
        jp      nz,STORENOTMATCH            ; if not a match then loop again
        cp      PRADIO1L,radio1l            ; test for the match
        jp      nz,STORENOTMATCH            ; if not a match then loop again
        cp      PRADIO3H,radio3h            ; test for the match
        jp      nz,STORENOTMATCH            ; if not a match then loop again
        cp      PRADIO3L,radio3l            ; test for the match
        jp      nz,STORENOTMATCH            ; if not a match then loop again

        cp      AUXLEARNSW, #116            ; If learn was not from wall control,
        jr      ugt, CMDONLY        ; then learn a command only

CmdNotOpen:

        tm      CMD_DEB, #10000000b ; If the command switch is held,
        jr      nz, CmdOrOCS        ;   then we are learning command or o/c/s

CheckLight:

        tm      LIGHT_DEB, #10000000b       ; If the light switch and the lock
        jp      z, CLEARRADIO2              ;    switch are being held,
        tm      VAC_DEB, #10000000b ;    then learn a light trans.
        jp      z, CLEARRADIO2              ;
LearningLight:
        tm      RadioMode, #ROLL_MASK       ; Only learn a light trans. if we are in
        jr      z, CMDONLY                  ;    the rolling mode.
        ld      CodeFlag, #LRNLIGHT ;
        ld      BitMask, #01010101b ;
        jr      CMDONLY

CmdOrOCS:

        tm      LIGHT_DEB, #10000000b       ; If the light switch isn't being held,
        jr      nz, CMDONLY                 ; then see if we are learning o/c/s

CheckOCS:
```

(

```
        tm      VAC_DEB, #10000000b ; If the vacation switch isn't held,
        jp      z, CLEARRADIO2          ; then it must be a normal command
        tm      RadioMode, #ROLL_MASK   ; Only learn an o/c/s if we are in
        jr      z, CMDONLY              ;    the rolling mode.
        tm      RadioC, #10000000b  ; If the bit for siminor is set,
        jr      nz, CMDONLY             ; then don't learn as an o/c/s Tx
        ld      CodeFlag, #LRNOCS       ; Set flag to learn o/c/s
        ld      BitMask, #10101010b ;

CMDONLY:
        call    TESTCODES               ; test the code to see if in memory now
        cp      ADDRESS, #0FFH          ; If the code isn't in memory
        jr      z, STOREMATCH       ;
WriteOverOCS:
        dec     ADDRESS                 ;
        jp      READYTOWRITE        ;

STOREMATCH:
        cp      RadioMode, #ROLL_TEST   ; If we are not testing a new mode,
        jr      ugt, SameRadioMode  ; then don't switch

        ld      ADDRESS, #MODEADDR  ; Fetch the old radio mode,
        call    READMEMORY              ; change only the low order
        tm      RadioMode, #ROLL_MASK   ; byte, and write in its new value.
        jr      nz, SetAsRoll       ;
SetAsFixed:
        ld      RadioMode, #FIXED_MODE  ;
        call    FixedNums               ; Set the fixed thresholds permanently
        jr      WriteMode               ;
SetAsRoll:
        ld      RadioMode, #ROLL_MODE   ;
        call    RollNums                ; Set the rolling thresholds permanently
WriteMode:
        ld      MTEMPL, RadioMode       ;
        call    WRITEMEMORY             ;

SameRadioMode:

        tm      RFlag, #10000010B       ; If the flag for the C code is set,
        jp      nz, CCODE               ;    then set the C Code address
        tm      RFlag,#00000100B        ; test for the b code
        jr      nz,BCODE                ; if a B code jump
ACODE:
        ld      ADDRESS,#2BH        ; set the address to read the last written
        call    READMEMORY              ; read the memory
        inc     MTEMPH              ; add 1 to the last written
        inc     MTEMPH              ;
        tm      RadioMode, #ROLL_MASK   ; If the radio is in fixed mode,
        jr      z, FixedMem             ; then handle the fixed mode memory

RollMem:
        inc     MTEMPH              ; Add another 2 to the last written
        inc     MTEMPH
        and     MTEMPH,#11111100B       ; Set to a multiple of four
        cp      MTEMPH,#1FH             ; test for the last address
        jr      ult, GOTAADDRESS        ; If not the last address jump
        jr      AddressZero             ; Address is now zero

FixedMem:
        and     MTEMPH,#11111110B       ; set the address on a even number
        cp      MTEMPH,#17H             ; test for the last address
        jr      ult,GOTAADDRESS         ; if not the last address jump

AddressZero:
        ld      MTEMPH,#00              ; set the address to 0
GOTAADDRESS:
        ld      ADDRESS,#2BH        ; set the address to write the last written
        ld      RTemp,MTEMPH        ; save the address
        LD      MTEMPL,MTEMPH       ; both bytes same
```

```
        call    WRITEMEMORY             ; write it
        ld      ADDRESS,rtemp           ; set the address
        jr      READYTOWRITE            ;
CCODE:
        tm      RadioMode, #ROLL_MASK   ; If in rolling code mode,
        jp      nz, CLEARRADIO          ; then HOW DID WE GET A C CODE?
        ld      ADDRESS, #01AH          ; Set the C code address
        jr      READYTOWRITE            ; Store the C code

BCODE:
        tm      RadioMode, #ROLL_MASK   ; If in fixed mode,
        jr      z, BFixed               ; handle normal touch code
BRoll:
        cp      SW_B, #ENTER            ; If the user is trying to learn a key
        jp      nz, CLEARRADIO          ; other than enter, THROW IT OUT
        ld      ADDRESS, #20H           ; Set the address for the rolling touch code
        jr      READYTOWRITE
BFixed:
        cp      radio3h,#90H            ; test for the 00 code
        jr      nz,BCODEOK              ;
        cp      radio3l,#29H            ; test for the 00 code
        jr      nz,BCODEOK              ;
        jp      CLEARRADIO              ; SKIP MAGIC NUMBER
BCODEOK:
        ld      ADDRESS,#18H            ; set the address for the B code
READYTOWRITE:
        call    WRITECODE               ; write the code in radio1 and radio3
NOFIXSTORE:
        tm      RadioMode, #ROLL_MASK   ; If we are in fixed mode,
        jr      z, NOWRITESTORE         ; then we are done
        inc     ADDRESS                 ; Point to the counter address
        ld      Radio1H, MirrorA        ; Store the counter into the radio
        ld      Radio1L, MirrorB        ; for the writecode routine
        ld      Radio3H, MirrorC        ;
        ld      Radio3L, MirrorD        ;
        call    WRITECODE

        call    SetMask
        com     BitMask
        ld      ADDRESS, #RTYPEADDR ; Fetch the radio types
        call    READMEMORY              ;

        tm      RFlag, #10000000b       ; Find the proper byte of the type
        jr      nz, UpByte              ;
LowByte:
        and     MTEMPL, BitMask         ; Wipe out the proper bits
        jr      MaskDone                ;
UpByte:
        and     MTEMPH, BitMask         ;
MaskDone:
        com     BitMask                 ;

        cp      CodeFlag, #LRNLIGHT ; If we are learning a light
        jr      z, LearnLight       ; set the appropriate bits
        cp      CodeFlag, #LRNOCS       ; If we are learning an o/c/s,
        jr      z, LearnOCS             ; set the appropriate bits

Normal:
        clr     BitMask                 ; Set the proper bits as command
        jr      BMReady

LearnLight:
        and     BitMask, #11011101b ; Set the proper bits as worklight
        jr      BMReady                 ; Bit mask is ready
LearnOCS:
        cp      SW_B, #02H              ; If 'open' switch is not being held,
        jp      nz, CLEARRADIO2         ; then don't accept the transmitter
        and     BitMask,#10101010b  ; Set the proper bits as open/close/stop
```

```
BMReady:
            tm      RFlag, #10000000b          ; Find the proper byte of the type
            jr      nz, UpByt2                 ;
LowByt2:
            or      MTEMPL, BitMask            ; Write the transmitter type in
            jr      MaskDon2                   ;
UpByt2:
            or      MTEMPH, BitMask            ; Write the transmitter type in
MaskDon2:
            call    WRITEMEMORY                ; Store the transmitter types

NOWRITESTORE:
            xor     p0,#WORKLIGHT         ; toggle light
            or      ledport,#ledh         ; turn off the LED for program mode
            ld      LIGHT1S,#244          ; turn on the 1 second blink
            ld      LEARNT,#0FFH          ; set learnmode timer
            clr     RTO                        ; disallow cmd from learn
            clr     CodeFlag                   ; Clear any learning flags
            jp      CLEARRADIO                 ; return
STORENOTMATCH:
            ld      PRADIO1H,radio1h           ; transfer radio into past
            ld      PRADIO1L,radio1l           ;
            ld      PRADIO3H,radio3h           ;
            ld      PRADIO3L,radio3l           ;
            tm      RadioMode, #ROLL_MASK      ; If we are in fixed mode,
            jp      z, CLEARRADIO         ; get the next code
            ld      PCounterA, MirrorA    ; transfer counter into past
            ld      PCounterB, MirrorB    ;
            ld      PCounterC, MirrorC    ;
            ld      PCounterD, MirrorD    ;
            jp      CLEARRADIO
TESTCODE:
            cp      ID_B, #18                  ; If this was a touch code,
            jp      uge, TCReceived            ; handle appropriately

            tm      RFlag, #00000100b          ; If we have received a B code,
            jr      z, AorDCode                ; then check for the learn mode

            cp      ZZWIN, #64                 ; Test 0000 learn window
            jr      ugt, AorDCode         ; if out of window no learn

            cp      Radio1H, #90H         ;
            jr      nz, AorDCode          ;
            cp      Radio1L, #29H         ;
            jr      nz, AorDCode          ;

ZZLearn:

            push    RP
            srp     #LEARNEE_GRP
            call    SETLEARN
            pop     RP
            jp      CLEARRADIO

AorDCode:

            cp      L_A_C, #070H          ; Test for in learn limits mode
            jr      uge, FS1                   ; If so, don't blink the LED
            cp      FAULTFLAG,#0FFH            ; test for a active fault
            jr      z,FS1                      ; if a avtive fault skip led set and reset
            and     ledport,#ledl         ; turn on the LED for flashing from signal
FS1:
            call    TESTCODES                  ; test the codes
            cp      L_A_C, #070H          ; Test for in learn limits mode
            jr      uge, FS2                   ; If so, don't blink the LED
            cp      FAULTFLAG,#0FFH            ; test for a active fault
            jr      z,FS2                      ; if a avtive fault skip led set and reset
            or      ledport,#ledh         ; turn off the LED for flashing from signal
FS2:
```

```
                cp      ADDRESS,#0FFH         ; test for the not matching state
                jr      nz,GOTMATCH                   ; if matching the send a command if needed
                jp      CLEARRADIO                    ; clear the radio

SimRollCheck:

                inc     ADDRESS                       ; Point to the rolling code
                                                      ; (Note:  High word always zero)
                inc     ADDRESS                       ; Point to rest of the counter
                call    READMEMORY                    ; Fetch lower word of counter
                ld      CounterC, MTEMPH              ;
                ld      CounterD, MTEMPL              ;

                cp      CodeT2, CounterC              ; If the two counters are equal,
                jr      nz, UpdateSCode               ; then don't activate
                cp      CodeT3, CounterD              ;
                jr      nz, UpdateSCode               ;
                jp      CLEARRADIO                    ; Counters equal -- throw it out

UpdateSCode:

                ld      MTEMPH, CodeT2                ; Always update the counter if the
                ld      MTEMPL, CodeT3                ; fixed portions match
                call    WRITEMEMORY                   ;

                sub     CodeT3, CounterD              ; Compare the two codes
                sbc     CodeT2, CounterC              ;

                tm      CodeT2, #10000000b  ; If the result is negative,
                jp      nz, CLEARRADIO                ; then don't activate
                jp      MatchGoodSim        ; Match good -- handle normally
GOTMATCH:
                tm      RadioMode, #ROLL_MASK         ; If we are in fixed mode,
                jr      z, MatchGood2       ; then the match is already valid

                tm      RadioC, #10000000b  ; If this was a Siminor transmitter,
                jr      nz, SimRollCheck              ; then test the roll in its own way

                tm      BitMask, #10101010b ; If this was NOT an open/close/stop trans,
                jr      z, RollCheckB       ; then we must check the rolling value

                cp      SW_B, #02                     ; If the o/c/s had a key other than '2'
                jr      nz, MatchGoodOCS              ; then don't check / update the roll

RollCheckB:

                call    TestCounter                   ; Rolling mode -- compare the counter values
                cp      CMP, #EQUAL                   ; If the code is equal,
                jp      z, NOTNEWMATCH                ; then just keep it
                cp      CMP, #FWDWIN        ; If we are not in forward window,
                jp      nz, CheckPast       ; then forget the code
MatchGood:
                ld      Radio1H, MirrorA              ; Store the counter into memory
                ld      Radio1L, MirrorB              ; to keep the roll current
                ld      Radio3H, MirrorC              ;
                ld      Radio3L, MirrorD              ;
                dec     ADDRESS                       ; Line up the address for writing
                call    WRITECODE                     ;

MatchGoodOCS:
MatchGoodSim:

                or      RFlag,#00000001B              ; set the flag for recieving without error
                cp      RTC,#RDROPTIME                ; test for the timer time out
                jp      ult,NOTNEWMATCH               ; if the timer is active then donot reissue cmd

                cp      ADDRESS, #23H       ; If the code was the rolling touch code,
                jr      z, MatchGood2       ; then we already know the transmitter type
```

```
            call    SetMask                     ; Set the mask bits properly
            ld      ADDRESS, #RTYPEADDR ; Fetch the transmitter config. bits
            call    READMEMORY                  ;
            tm      RFlag, #10000000b           ; If we are in the upper word,
            jr      nz, UpperD                  ; check the upper transmitters
LowerD:
            and     BitMask, MTEMPL             ; Isolate our transmitter
            jr      TransType                   ; Check out transmitter type
UpperD:
            and     BitMask, MTEMPH             ; Isolate our transmitter
TransType:
            tm      BitMask, #01010101b ; Test for light transmitter
            jr      nz, LightTrans              ; Execute light transmitter
            tm      BitMask, #10101010b ; Test for Open/Close/Stop Transmitter
            jr      nz, OCSTrans        ; Execute open/close/stop transmitter
                                        ; Otherwise, standard command transmitter
MatchGood2:
            or      RFlag,#00000001B            ; set the flag for recieving without error
            cp      RTO,#RDROPTIME              ; test for the timer time out
            jp      ult,NOTNEWMATCH             ; if the timer is active then donot reissue cmd
TESTVAC:
            cp      VACFLAG,#00B        ; test for the vacation mode
            jp      z,TSTSDISABLE       ; if not in vacation mode test the system disable

            tm      RadioMode, #ROLL_MASK       ;
            jr      z, FixedB

            cp      ADDRESS,#23H        ; If this was a touch code,
            jp      nz, NOTNEWMATCH             ; then do a command
            jp      TSTSDISABLE                 ;

FixedB:

            cp      ADDRESS,#19H        ; test for the B code
            jp      nz,NOTNEWMATCH              ; if not a B not a match

TSTSDISABLE:
            cp      SDISABLE,#32        ; test for 4 second
            jp      ult,NOTNEWMATCH             ; if 6 s not up not a new code
            clr     RTO                         ; clear the radio timeout
            cp      ONEP2,#00                   ; test for the 1.2 second time out
            jp      nz,NOTNEWMATCH              ; if the timer is active then skip the command
RADIOCOMMAND:
            clr     RTO                         ; clear the radio timeout
            tm      RFlag,#00000100b            ; test for a B code
            jr      z,BDONTSET                  ; if not a b code donot set flag
zzwinclr:
            clr     ZZWIN                       ; flag got matching B code

            ld      CodeFlag,#BRECEIVED ; flag for aobs bypass
BDONTSET:

            cp      L_A_C, #070H        ; If we were positioning the up limit,
            jr      ult, NormalRadio            ; then start the learn cycle
            jr      z, FirstLearn       ;
            cp      L_A_C, #071H        ; If we had an error,
            jp      nz, CLEARRADIO              ; re-learn, otherwise ignore
ReLearning:
            ld      L_A_C, #072H        ; Set the re-learn state
            call    SET_UP_DIR_STATE            ;
            jp      CLEARRADIO                  ;
FirstLearn:
            ld      L_A_C, #073H        ; Set the learn state
            call    SET_UP_POS_STATE            ; Start from the "up limit"
            jp      CLEARRADIO                  ;

NormalRadio:
            clr     LAST_CMD                    ; mark the last command as radio
```

```
        ld      RADIO_CMD,#0AAH         ; set the radio command
        jp      CLEARRADIO              ; return

LightTrans:
        clr     RTO                     ; Clear the radio timeout
        cp      ONEP2,#00               ; Test for the 1.2 sec. time out
        jp      nz, NOTNEWMATCH         ; If it isn't timed out, leave
        ld      SW_DATA, #LIGHT_SW  ; Set a light command
        jp      CLEARRADIO              ; return

OCSTrans:
        cp      SDISABLE, #32       ; Test for 4 second system disable
        jp      ult, NOTNEWMATCH        ; if not done not a new code
        cp      VACFLAG, #00H       ; If we are in vacation mode,
        jp      nz, NOTNEWMATCH         ; don't obey the transmitter
        clr     RTO                     ; Clear the radio timeout
        cp      ONEP2, #00              ; test for the 1.2 second timeout
        jp      nz, NOTNEWMATCH         ; If the timer is active the skip command

        cp      SW_B, #02               ; If the open button is pressed,
        jr      nz, CloseOrStop         ; then proces  it

OpenButton:

        cp      STATE, #STOP        ; If we are stopped or
        jr      z, OpenUp               ; at the down limit, then
        cp      STATE, #DN_POSITION ; begin to move up
        jr      z, OpenUp               ;
        cp      STATE, #DN_DIRECTION    ; If we are moving down,
        jr      nz, OCSExit             ; then autoreverse
        ld      REASON, #010H       ; Set the reason as radio
        call    SET_AREV_STATE          ;
        jr      OCSExit                 ;

OpenUp:
        ld      REASON, #010H       ; Set the reason as radio
        call    SET_UP_DIR_STATE        ;
OCSExit:
        jp      CLEARRADIO              ;

CloseOrStop:

        cp      SW_B, #01               ; If the stop button is pressed,
        jr      nz, CloseButton         ; then process it

StopButton:

        cp      STATE, #UP_DIRECTION    ; If we are moving or in
        jr      z, StopIt               ; the autoreverse state,
        cp      STATE, #DN_DIRECTION    ; then stop the door
        jr      z, StopIt               ;
        cp      STATE, #AUTO_REV        ;
        jr      z, StopIt
        jr      OCSExit

StopIt:

        ld      REASON, #010H       ; Set the reason as radio
        call    SET_STOP_STATE
        jr      OCSExit

CloseButton:

        cp      STATE, #UP_POSITION ; If we are at the up limit
        jr      z, CloseIt              ; or stopped in travel,
        cp      STATE, #STOP        ; then send the door down
        jr      z, CloseIt              ;
        jr      OCSExit
```

```
CloseIt:

                ld      REASON, #010H         ; Set the reason as radio
                call    SET_DN_DIR_STATE
                jr      OCSExit

SetMask:

                and     RFlag, #01111111b           ; Reset the page 1 bit
                tm      ADDRESS, #11110000b ; If our address is on page 1,
                jr      z, InLowerByte              ; then set the proper flag
                or      RFlag, #10000000b           ;
InLowerByte:
                tm      ADDRESS, #00001000b ; Binary search to set the
                jr      z, ZeroOrFour        ; proper bits in the bit mask
EightOrTwelve:
                ld      BitMask, #11110000b
                jr      LSNybble
ZeroOrFour:
                ld      BitMask, #00001111b ;
LSNybble:
                tm      ADDRESS, #00000100b
                jr      z, ZeroOrEight
FourOrTwelve:
                and     BitMask, #11001100b ;
                ret
ZeroOrEight:
                and     BitMask, #00110011b ;
                ret

TESTCODES:
                ld      ADDRESS, #RTYPEADDR ; Get the radio types
                call    READMEMORY                  ;
                ld      RadioTypes, MTEMPL  ;
                ld      RTypes2, MTEMPH             ;
                tm      RadioMode, #ROLL_MASK       ;
                jr      nz, RollCheck       ;
                clr     RadioTypes                  ;
                clr     RTypes2
RollCheck:
                clr     ADDRESS                     ; start address is 0
NEXTCODE:
                call    SetMask                     ; Get the appropriate bit mask
                and     BitMask, RadioTypes ; Isolate the current transmitter types
HAVEMASK:
                call    READMEMORY                  ; read the word at this address
                cp      MTEMPH,radio1h              ; test for the match
                jr      nz,NOMATCH                  ; if not matching then do next address
                cp      MTEMPL,radio1l              ; test for the match
                jr      nz,NOMATCH                  ; if not matching then do next address
                inc     ADDRESS                     ; set the second half of the code
                call    READMEMORY                  ; read the word at this address
                tm      BitMask, #10101010b ; If this is an Open/Close/Stop trans.,
                jr      nz, CheckOCS1       ; then do the different check
                cp      CodeFlag, #LRNOCS           ; If we are in open/close/stop learn mode,
                jr      z, CheckOCS1        ; then do the different check
                cp      MTEMPH,radio3h              ; test for the match
                jr      nz,NOMATCH2                 ; if not matching then do the next address
                cp      MTEMPL,radio3l              ; test for the match
                jr      nz,NOMATCH2                 ; if not matching then do the next address

                ret                                 ; return with the address of the match

CheckOCS1:

                sub     MTEMPL, radio3l             ; Subtract the radio from the memory
                sbc     MTEMPH, radio3h             ;
                cp      CodeFlag, #LRNOCS           ; If we are trying to learn open/close/stop,
                jr      nz, Positive        ; then we must complement to be positive
```

```
            com     MTEMPL              ;
            com     MTEMPH              ;
            add     MTEMPL, #1                  ; Switch from ones complement to 2's
            adc     MTEMPH, #0                  ; complement .
Positive:
            cp      MTEMPH, #00                 ; We must be within 2 to match properly
            jr      nz, NOMATCH2        ;
            cp      MTEMPL, #02                 ;
            jr      ugt, NOMATCH2       ;

            ret                                 ; Return with the address of the match

NOMATCH:
            inc     ADDRESS                     ; set the address to the next code
NOMATCH2:
            inc     ADDRESS                     ; set the address to the next code
            tm      RadioMode, #ROLL_MASK       ; If we are in fixed mode,
            jr      z, AtNextAdd        ; then we are at the next address
            inc     ADDRESS                     ; Roll mode -- advance past the counter
            inc     ADDRESS                     ;
            cp      ADDRESS,#10H        ; If we are on the second page
            jr      nz, AtNextAdd       ; then get the other tx. types
            ld      RadioTypes, RTypes2 ;
AtNextAdd:
            cp      ADDRESS,#22H        ; test for the last address
            jr      ult,NEXTCODE        ; if not the last address then try again

GOTNOMATCH:
            ld      ADDRESS,#0FFH       ; set the no match flag
            ret                                 ; and return

NOTNEWMATCH:
            clr     RTO                         ; reset the radio time out
            and     RFlag,#00000001B            ; clear radio flags leaving recieving w/o error
            clr     radioc              ; clear the radio bit counter
            ld      LEARNT,#0FFH        ; set the learn timer "turn off" and backup
            jp      RADIO_EXIT                  ; return

CheckPast:
      ; Proprietary algorithm for maintaining
      ; rolling code counter
      ; Jumps to either MatchGood, UpdatePast or CLEARRADIO

UpdatePast:

            ld      LastMatch, ADDRESS  ; Store the last fixed code received
            ld      PCounterA, MirrorA  ; Store the last counter received
            ld      PCounterB, MirrorB  ;
            ld      PCounterC, MirrorC  ;
            ld      PCounterD, MirrorD  ;
CLEARRADIO2:
            ld      LEARNT, #0FFH       ; Turn off the learn mode timer
            clr     CodeFlag

CLEARRADIO:

            .IF     TwoThirtyThree
            and     IRQ,#00111111B              ; clear the bit setting direction to neg edge
            .ENDIF

            ld      RINFILTER,#0FFH             ; set flag to active
CLEARRADIOA:
            tm      RFlag,#00000001B            ; test for receiving without error
            jr      z,SKIPRTO                   ; if flag not set then donot clear timer
            clr     RTO                         ; clear radio timer
SKIPRTO:
            clr     radioc              ; clear the radio counter
            clr     RFlag                       ; clear the radio flag
```

```
;               clr     ID_B                    ; Clear the ID bits
                jp      RADIO_EXIT              ; return

TCReceived:

                cp      L_A_C, #070H      ; Test for in learn limits mode
                jr      uge, TestTruncate       ; If so, don't blink the LED
                cp      FAULTFLAG, #0FFH        ; If no fault
                jr      z, TestTruncate         ; turn on the led
                and     ledport, #ledl          ;
                jr      TestTruncate      ; Truncate off most significant digit

TruncTC:

                sub     Radio1L, #0E3h          ; Subtract out 3^9 to truncate
                sbc     Radio1H, #04Ch          ;

TestTruncate:

                cp      Radio1H, #04Ch          ; If we are greater than 3^9,
                jr      ugt, TruncTC      ; truncate down
                jr      ult, GotTC              ;
                cp      Radio1L, #0E3h          ;
                jr      uge, TruncTC      ;

GotTC:

                ld      ADDRESS, #TOUCHID       ; Check to make sure the ID code is good
                call    READMEMORY              ;
                cp      L_A_C, #070H      ; Test for in learn limits mode
                jr      uge, CheckID      ; If so, don't blink the LED
                cp      FAULTFLAG, #0FFH        ; If no fault,
                jr      z, CheckID              ; turn off the LED
                or      ledport, #ledh          ;
CheckID:
                cp      MTEMPH, Radio3H         ;
                jr      nz, CLEARRADIO          ;
                cp      MTEMPL, Radio3L         ;
                jr      nz, CLEARRADIO          ;

                call    TestCounter             ; Test the rolling code counter
                cp      CMP, #EQUAL             ; If the counter is equal,
                jr      z, NOTNEWMATCH          ; then call it the same code
                cp      CMP, #FWDWIN      ;
                jr      nz, CLEARRADIO          ;

                ; Counter good -- update it

                ld      COUNT1H, Radio1H        ; Back up radio code
                ld      COUNT1L, Radio1L        ;

                ld      Radio1H, MirrorA        ;Write the counter
                ld      Radio1L, MirrorB        ;
                ld      Radio3H, MirrorC        ;
                ld      Radio3L, MirrorD        ;
                dec     ADDRESS
                call    WRITECODE               ;

                ld      Radio1H, COUNT1H        ; Restore the radio code
                ld      Radio1L, COUNT1L        ;

                cp      CodeFlag, #NORMAL       ; Find and jump to current mode
                jp      z, NormTC               ;
                cp      CodeFlag, #LRNTEMP  ;
                jp      z, LearnTMP             ;
                cp      CodeFlag, #LRNDURTN ;
                jp      z, LearnDur             ;
                jp      CLEARRADIO              ;
```

```
NormTC:

        ld      ADDRESS, #TOUCHPERM ; Compare the four-digit touch
        call    READMEMORY                ; code to our permanent password
        cp      Radio1H, MTEMPH           ;
        jr      nz, CheckTCTemp           ;
        cp      Radio1L, MTEMPL           ;
        jr      nz, CheckTCTemp           ;

        cp      SW_B, #ENTER        ; If the ENTER key was pressed,
        jp      z, RADIOCOMMAND           ; issue a B code radio command
        cp      SW_B, #POUND        ; If the user pressed the pound key,
        jr      z, TCLearn                ; enter the learn mode
        ; Star key pressed -- start 30 s timer

        clr     LEARNT              ;
        ld      FLASH_COUNTER, #06h ; Blink the worklight three
        ld      FLASH_DELAY,#FLASH_TIME   ; times quickly
        ld      FLASH_FLAG, #0FFH         ;
        ld      CodeFlag, #LRNTEMP  ; Enter learn temporary mode
        jp      CLEARRADIO                ;

TCLearn:

        ld      FLASH_COUNTER, #04h ; Blink the worklight two
        ld      FLASH_DELAY,#FLASH_TIME   ; times quickly
        ld      FLASH_FLAG, #0FFH         ;

        push    RP                        ; Enter learn mode
        srp     #LEARNEE_GRP
        call    SETLEARN
        pop     RP

        jp      CLEARRADIO

CheckTCTemp:

        ld      ADDRESS, #TOUCHTEMP ; Compare the four-digit touch
        call    READMEMORY                ; code to our temporary password
        cp      Radio1H, MTEMPH           ;
        jp.     nz, CLEARRADIO            ;
        cp      Radio1L, MTEMPL           ;
        jp      nz, CLEARRADIO            ;

        cp      STATE, #DN_POSITION ; If we are not at the down limit,
        jp      nz, RADIOCOMMAND          ; issue a command regardless

        ld      ADDRESS, #DURAT           ; If the duration is at zero,
        call    READMEMORY                ; then don't issue a command
        cp      MTEMPL, #00               ;
        jp      z, CLEARRADIO       ;

        cp      MTEMPH, #ACTIVATIONS      ; If we are in number of activations
        jp      nz, RADIOCOMMAND          ; mode, then decrement the
        dec     MTEMPL              ; number of activations left
        call    WRITEMEMORY               ;
        jp      RADIOCOMMAND

LearnTMP:

        cp      SW_B, #ENTER        ; If the user pressed a key other
        jp      nz, CLEARRADIO            ; then enter, reject the code

        ld      ADDRESS, #TOUCHPERM ; If the code entered matches the
        call    READMEMORY                ; permanent touch code,
        cp      Radio1H, MTEMPH           ; then reject the code as a
        jp      nz, TempGood        ; temporary code
        cp      Radio1L, MTEMPL           ;
        jp      z, CLEARRADIO       ;
```

```
TempGood:

        ld      ADDRESS, #TOUCHTEMP ; Write the code into temp.
        ld      MTEMPH, Radio1H            ; code memory
        ld      MTEMPL, Radio1L            ;
        call    WRITEMEMORY                ;

        ld      FLASH_COUNTER, #08h ; Blink the worklight four
        ld      FLASH_DELAY,#FLASH_TIME    ; times quickly
        ld      FLASH_FLAG, #0FFH          ;

        ; Start 30 s timer

        clr     LEARNT
        ld      CodeFlag, #LRNDURTN ; Enter learn duration mode
        jp      CLEARRADIO                 ;

LearnDur:

        cp      Radio1H, #00        ; If the duration was > 255,
        jp      nz, CLEARRADIO             ; reject the duration entered

        cp      SW_B, #POUND        ; If the user pressed the pound
        jr      z, NumDuration             ; key, number of activations mode
        cp      SW_B, #STAR                ; If the star key was pressed,
        jr      z, HoursDur                ; enter the timer mode
        jp      CLEARRADIO                 ; Enter pressed -- reject code

NumDuration:

        ld      MTEMPH, #ACTIVATIONS       ; Flag number of activations mode
        jr      DurationIn                 ;

HoursDur:

        ld      MTEMPH, #HOURS             ; Flag number of hours mode

DurationIn:

        ld      MTEMPL, Radio1L            ; Load in duration
        ld      ADDRESS, #DURAT            ; Write duration and mode
        call    WRITEMEMORY                ; into nonvolatile memory

        ; Give worklight one long blink
        xor     P0, #WORKLIGHT             ; Give the light one blink
        ld      LIGHT1S, #244       ; lasting one second
        clr     CodeFlag                   ; Clear the learn flag
        jp      CLEARRADIO

;-----------------------------------------------------------------------
;       Test Rolling Code Counter Subroutine
;       Note:  CounterA-D will be used as temp registers
;
;-----------------------------------------------------------------------

TestCounter:
        push    RP
        srp     #CounterGroup
        inc     ADDRESS                    ; Point to the rolling code counter
        call    READMEMORY                 ; Fetch lower word of counter
        ld      countera, MTEMPH
        ld      counterb, MTEMPL
        inc     ADDRESS                    ; Point to rest of the counter
        call    READMEMORY                 ; Fetch upper word of counter
        ld      counterc, MTEMPH
        ld      counterd, MTEMPL

        ;-----------------------------------------------------------
        ;       Subtract old counter  countera-d  from current
```

```
;       counter (mirrora-d) and store in countera-d
;-----------------------------------------------------------

com     countera                ; Obtain twos complement of counter
com     counterb
com     counterc
com     counterd
add     counterd, #01H
adc     counterc, #00H
adc     counterb, #00H
adc     countera, #00H

add     counterd, mirrord       ; Subtract
adc     counterc, mirrorc
adc     counterb, mirrorb
adc     countera, mirrora

;-----------------------------------------------------------
;       If the msb of counterd is negative, check to see
;       if we are inside the negative window
;-----------------------------------------------------------

tm      countera, #10000000B
jr      z, CheckFwdWin

CheckBackWin:

cp      countera, #0FFH         ; Check to see if we are
jr      nz, OutOfWindow         ; less than -0400H
cp      counterb, #0FFH         ; (i.e. are we greater than
jr      nz, OutOfWindow         ; 0xFFFFFC00H)
cp      counterc, #0FCH         ;
jr      ult, OutOfWindow        ;

InBackWin:

ld      CMP, #BACKWIN       ; Return in back window
jr      CompDone

CheckFwdWin:

cp      countera, #00H          ; Check to see if we are less
jr      nz, OutOfWindow         ; than 0000 3072 = 1024
cp      counterb, #00H          ; activations
jr      nz, OutOfWindow         ;
cp      counterc, #00H          ;
jr      uge, OutOfWindow

cp      counterc, #00H
jr      nz, InFwdWin
cp      counterd, #00H
jr      nz, InFwdWin

CountersEqual:

ld      CMP, #EQUAL             ;Return equal counters
jr      CompDone

InFwdWin:

ld      CMP, #FWDWIN        ;Return in forward window
jr      CompDone

OutOfWindow:

ld      CMP, #OUTOFWIN          ;Return out of any window

CompDone:
```

```
        pop     RP
        ret

;*******************************************************************
; Clear interrupt
;*******************************************************************
ClearRadio:

        cp      RadioMode, #ROLL_TEST           ;If in fixed or rolling mode,
        jr      ugt, MODEDONE           ;   then we cannot switch

        tm      T125MS, #00000001b      ;If our 'coin toss' was a zero,
        jr      z, SETROLL                      ;   set as the rolling mode

SETFIXED:

        ld      RadioMode, #FIXED_TEST
        call    FixedNums
        jp      MODEDONE

SETROLL:

        ld      RadioMode, #ROLL_TEST
        call    RollNums

MODEDONE:

        clr     RadioTimeOut                    ; clear radio timer
        clr     RadioC                          ; clear the radio counter
        clr     RFlag                                   ; clear the radio flags

RRETURN:
        pop     RP                              ; reset the RP
        iret                                    ; return

FixedNums:

        ld      BitThresh, #FIXTHR
        ld      SyncThresh, #FIXSYNC
        ld      MaxBits, #FIXBITS
        ret

RollNums:

        ld      BitThresh, #DTHR
        ld      SyncThresh, #DSYNC
        ld      MaxBits, #DBITS
        ret

;*****************************************************************************************
; rotate mirror LoopCount * 2 then add
;*****************************************************************************************
RotateMirrorAdd:

        rcf                                     ; clear the carry
        rlc     mirrord                                 ;
        rlc     mirrorc                                 ;
        rlc     mirrorb                                 ;
        rlc     mirrora                                 ;
        djnz    loopcount,RotateMirrorAdd       ; loop till done

;*****************************************************************************************
; Add mirror to counter
;*****************************************************************************************
AddMirrorToCounter:
```

```
        add     counterd,mirrord                ;
        adc     counterc,mirrorc                ;
        adc     counterb,mirrorb                ;
        adc     countera,mirrora                ;
        ret


;*******************************************************************
; LEARN DEBOUNCES THE LEARN SWITCH 80mS
; TIMES OUT THE LEARN MODE 30 SECONDS
; DEBOUNCES THE LEARN SWITCH FOR ERASE 6 SECONDS
;*******************************************************************
LEARN:
        srp     #LEARNEE_GRP            ; set the register pointer
        cp      STATE,#DN_POSITION      ; test for motor stoped
        jr      z,TESTLEARN                     ;
        cp      STATE,#UP_POSITION              ; test for motor stoped
        jr      z,TESTLEARN                     ;
        cp      STATE,#STOP                     ; test for motor stoped
        jr      z,TESTLEARN                     ;
        cp      L_A_C,#074H                     ; Test for traveling
        jr      z,TESTLEARN                     ;
;       ld      learnt,#0FFH                    ; set the learn timer
        cp      learnt,#240                     ; test for the learn 30 second timeout
        jr      nz,ERASETEST            ; if not then test erase
        jr      learnoff                        ; if 30 seconds then turn off the learn mode
TESTLEARN:
        cp      learndb,#236                    ; test for the debounced release
        jr      nz,LEARNNOTRELEASED             ; if debouncer not released then jump
LEARNRELEASED:
SmartRelease:
        cp      L_A_C, #070H            ; Test for in learn limits mode
        jr      nz, NormLearnBreak      ; If not, treat the break as normal

        ld      REASON, #00H                    ; Set the reason as command
        call    SET_STOP_STATE                  ;

NormLearnBreak:

        clr     LEARNDB                         ; clear the debouncer

        ret                                     ; return

LEARNNOTRELEASED:
        cp      CodeFlag,#LRNTEMP               ;test for learn mode
        jr      uge,INLEARN                     ; if in learn jump
        cp      learndb,#20                     ; test for debounce period
        jr      nz,ERASETEST            ; if not then test the erase period
SETLEARN:
        call    SmartSet                        ;
ERASETEST:
        cp      L_A_C, #070H            ; Test for in learn limits mode
        jr      uge,ERASERELEASE                ; If so, DON'T ERASE THE MEMORY
        cp      learndb,#0FFH                   ; test for learn button active
        jr      nz,ERASERELEASE                 ; if button released set the erase timer
        cp      eraset,#0FFH                    ; test for timer active
        jr      nz,ERASETIMING                  ; if the timer active jump
        clr     eraset                          ; clear the erase timer
ERASETIMING:
        cp      eraset,#48                      ; test for the erase period
        jr      z,ERASETIME                     ; if timed out the erase
        ret                                     ; else we return
ERASETIME:
        or      ledport,#ledh                   ; turn off the led
        ld      skipradio,#NOEECOMM             ; set the flag to skip the radio read
        call    CLEARCODES                      ; clear all codes in memory
        clr     skipradio                       ; reset the flag to skip radio

        ld      learnt,#0FFH                    ; set the learn timer
```

```
        clr     CodeFlag
        ret                                     ; return

SmartSet:
        cp      L_A_C, #070H                    ; Test for in learn limits mode
        jr      nz, NormLearnMake1              ; If not, treat normally
        ld      REASON, #00H                    ; Set the reason as command
        call    SET_DN_NOBLINK                  ;
        jr      LearnMakeDone                   ;
NormLearnMake1:
        cp      L_A_C, #074H                    ; Test for traveling down
        jr      nz, NormLearnMake2              ; If not, treat normally
        ld      L_A_C, #075H                    ; Reverse off false floor
        ld      REASON, #00H                    ; Set the reason as command
        call    SET_AREV_STATE                  ;
        jr      LearnMakeDone                   ;
NormLearnMake2:
        clr     LEARNT                          ; clear the learn timer
        ld      CodeFlag, #REGLEARN             ; Set the learn flag
        and     ledport,#ledl                   ; turn on the led
        clr     VACFLAG                         ; clear vacation mode
        ld      ADDRESS,#VACATIONADDR           ; set the non vol address for vacation
        clr     MTEMPH                          ; clear the data for cleared vacation
        clr     MTEMPL                          ;
        ld      SKIPRADIO,#NOEECOMM             ; set the flag
        call    WRITEMEMORY                     ; write the memory
        clr     SKIPRADIO                       ; clear the flag
LearnMakeDone:
        ld      LEARNDB,#0FFH                   ; set the debouncer
        ret

ERASERELEASE:
        ld      eraset,#0FFH                    ; turn off the erase timer
        cp      learndb,#236                    ; test for the debounced release
        jr      z,LEARNRELEASED                 ; if debouncer not released then jump
        ret                                     ; return

INLEARN:
        cp      learndb,#20                     ; test for the debounce period
        jr      nz,TESTLEARNTIMER               ; if not then test the learn timer for time out
        ld      learndb,#0FFH                   ; set the learn db
TESTLEARNTIMER:
        cp      learnt,#240                     ; test for the learn 30 second timeout
        jr      nz,ERASETEST                    ; if not then test erase
learnoff:
        or      ledport,#ledh                   ; turn off the led
        ld      learnt,#0FFH                    ; set the learn timer
        ld      learndb,#0FFH                   ; set the learn debounce
        clr     CodeFlag                        ; Clear ANY code types
        jr      ERASETEST                       ; test the erase timer


;*********************************************************************
; WRITE WORD TO MEMORY
; ADDRESS IS SET IN REG ADDRESS
; DATA IS IN REG MTEMPH AND MTEMPL
; RETURN ADDRESS IS UNCHANGED
;*********************************************************************
WRITEMEMORY:
        push    RP                              ; SAVE THE RP
        srp     #LEARNEE_GRP                    ; set the register pointer

        call    STARTB                          ; output the start bit
        ld      serial,#00110000B               ; set byte to enable write
        call    SERIALOUT                       ; output the byte
        and     csport,#csl                     ; reset the chip select
        call    STARTB                          ; output the start bit
        ld      serial,#01000000B               ; set the byte for write
```

```
        or      serial,address                    ; or in the address
        call    SERIALOUT                         ; output the byte
        ld      serial,mtemph                     ; set the first byte to write
        call    SERIALOUT                         ; output the byte
        ld      serial,mtempl                     ; set the second byte to write
        call    SERIALOUT                         ; output the byte
        call    ENDWRITE                          ; wait for the ready status
        call    STARTB                            ; output the start bit
        ld      serial,#00000000B               ; set byte to disable write
        call    SERIALOUT                         ; output the byte
        and     csport,#csl                     ; reset the chip select
        or      P2M_SHADOW,#clockh              ; Change program switch back to read
        ld      P2M,P2M_SHADOW                    ;
        pop     RP                                ; reset the RP
        ret

;*****************************************************************
; READ WORD FROM MEMORY
; ADDRESS IS SET IN REG ADDRESS
; DATA IS RETURNED IN REG MTEMPH AND MTEMPL
; ADDRESS IS UNCHANGED
;*****************************************************************
READMEMORY:
        push    RP                                ;
        srp     #LEARNEE_GRP                    ; set the register pointer

        call    STARTB                            ; output the start bit
        ld      serial,#10000000B               ; preamble for read
        or      serial,address                    ; or in the address
        call    SERIALOUT                         ; output the byte
        call    SERIALIN                          ; read the first byte
        ld      mtemph,serial                     ; save the value in mtemph
        call    SERIALIN                          ; read teh second byte
        ld      mtempl,serial                     ; save the value in mtempl
        and     csport,#csl                     ; reset the chip select
        or      P2M_SHADOW,#clockh                ; Change program switch back to read
        ld      P2M, P2M_SHADOW                   ;
        pop     RP                                ;
        ret

;*****************************************************************
; WRITE CODE TO 2 MEMORY ADDRESS
; CODE IS IN RADIO1H RADIO1L RADIO3H RADIO3L
;*****************************************************************
WRITECODE:
                push    RP                        ;
                srp     #LEARNEE_GRP ; set the register pointer
                ld      mtemph,Radio1H            ; transfer the data from radio 1 to the temps
                ld      mtempl,Radio1L            ;
                call    WRITEMEMORY               ; write the temp bits
                inc     address                   ; next address
                ld      mtemph,Radio3H            ; transfer the data from radio 3 to the temps
                ld      mtempl,Radio3L            ;
                call    WRITEMEMORY               ; write the temps
                pop     RP                        ;
                ret                               ; return

;*****************************************************************
; CLEAR ALL RADIO CODES IN THE MEMORY
;*****************************************************************

CLEARCODES:
        push    RP                                ;
        srp     #LEARNEE_GRP                      ; set the register pointer
        ld      MTEMPH,#0FFH                      ; set the codes to illegal codes
        ld      MTEMPL,#0FFH                      ;
        ld      address,#00H                      ; clear address 0
```

```
CLEARC:
        call    WRITEMEMORY                ; "A0"
        inc     address                          ; set the next address
        cp      address,#(AddressCounter - 1)    ; test for the last address of radio
        jr      ult,CLEARC
        clr     mtemph                     ; clear data
        clr     mtempl
        call    WRITEMEMORY                      ; Clear radio types
        ld      address,#AddressAPointer   ; clear address F
        call    WRITEMEMORY                ;

        ld      address,#MODEADDR          ;Set EEPROM memory as fixed test
        call    WRITEMEMORY                ;

        ld      RadioMode, #FIXED_TEST     ;Revert to fixed mode testing
        ld      BitThresh, #FIXTHR
        ld      SyncThresh, #FIXSYNC
        ld      MaxBits, #FIXBITS

CodesCleared:

        pop     RP                         ;
        ret                                ; return
;*****************************************************************
;*START BIT FOR SERIAL NONVOL
;*ALSO SETS DATA DIRECTION AND AND CS
;*****************************************************************
STARTB:
        and     P2M_SHADOW, # clockl & dol       ; Set output mode for clock line and
        ld      P2M,P2M_SHADOW                   ; I/O lines
        and     csport,#csl                ;
        and     clkport,#clockl                  ; start by clearing the bits
        and     dioport,#dol               ;
        or      csport,#csh                ; set the chip select
        or      dioport,#doh               ; set the data out high
        or      clkport,#clockh                  ; set the clock
        and     clkport,#clockl                  ; reset the clock low
        and     dioport,#dol               ; set the data low
        ret                                      ; return
;*****************************************************************
; END OF CODE WRITE
;*****************************************************************
ENDWRITE:
        and     csport,#csl                ; reset the chip select
        nop                                      ; delay
        or      csport,#csh                ; set the chip select
        or      P2M_SHADOW, #doh                 ; Set the data line to input
        ld      P2M,P2M_SHADOW                   ; set port 2 mode forcing input mode data
ENDWRITELOOP:
        ld      temph,dioport                    ; read the port
        and     temph,#doh                       ; mask
        jr      z,ENDWRITELOOP                   ; if the bit is low then loop until done
        and     csport,#csl                ; reset the chip select
        or      P2M_SHADOW, #clockh        ; Reset the clock line to read smart button
        and     P2M_SHADOW, #dol                 ; Set the data line back to output
        ld      P2M,P2M_SHADOW                   ; set port 2 mode forcing output mode
        ret


;*****************************************************************
; SERIAL OUT
; OUTPUT THE BYTE IN SERIAL
;*****************************************************************
SERIALOUT:
        and     P2M_SHADOW,#(dol & clockl)  ; Set the clock and data lines to outputs
        ld      P2M,P2M_SHADOW                   ; set port 2 mode forcing output mode data
        ld      templ,#8H                        ; set the count for eight bits
```

```
SERIALOUTLOOP:
        rlc     serial                          ; get the bit to output into the carry
        jr      nc,ZEROOUT                              ; output a zero if no carry
ONEOUT:
        or      dioport,#doh                    ; set the data out high
        or      clkport,#clockh                         ; set the clock high
        and     clkport,#clockl                         ; reset the clock low
        and     dioport,#dol                    ; reset the data out low
        djnz    templ,SERIALOUTLOOP

                                                        ; loop till done
        ret                                             ; return
ZEROOUT:
        and     dioport,#dol                    ; reset the data out low
        or      clkport,#clockh                         ; set the clock high
        and     clkport,#clockl                         ; reset the clock low
        and     dioport,#dol                    ; reset the data out low
        djnz    templ,SERIALOUTLOOP

                                                        ; loop till done
        ret                                             ; return

;*******************************************************************
; SERIAL IN
; INPUTS A BYTE TO SERIAL
;*******************************************************************
SERIALIN:
        or      P2M_SHADOW, #doh                        ; Force the data line to input
        ld      P2M,P2M_SHADOW                          ; set port 2 mode forcing input mode data
        ld      templ,#8H                               ; set the count for eight bits
SERIALINLOOP:
        or      clkport,#clockh                         ; set the clock high
        rcf                                             ; reset the carry flag
        ld      temph,dioport                           ; read the port
        and     temph,#doh                              ; mask out the bits
        jr      z,DONTSET
        scf                                             ; set the carry flag
DONTSET:
        rlc     serial                          ; get the bit into the byte
        and     clkport,#clockl                         ; reset the clock low
        djnz    templ,SERIALINLOOP

                                                        ; loop till done
        ret                                             ; return

;*******************************************************************
; TIMER UPDATE FROM INTERUPT EVERY 0.256mS
;*******************************************************************
SkipPulse:
;       tm      SKIPRADIO, #NOINT               ;If the 'no radio interrupt'
;       jr      nz, NoPulse                     ;flag is set, just leave
;       or      IMR,#RadioImr                   ; turn on the radio
;NoPulse:
        iret



TIMERUD:

        tm      SKIPRADIO, #NOINT                       ;If the 'no radio interrupt'
        jr      nz, NoEnable            ;flag is set, just leave
        or      IMR,#RadioImr           ; turn on the radio
NoEnable:
        decw    TOEXTWORD                               ; decrement the TO extension

TOExtDone:

        tm      P2, #LINEINPIN                          ; Test the AC line in
        jr      z, LowAC                                ; If it's low, mark zero crossing
HighAC:
```

```
        inc     LineCtr                        ; Count the high time
        jr      LineDone                       ;
LowAC:
        cp      LineCtr, #08           ; If the line was low before
        jr      ult, HighAC                    ; then one-shot the edge of the line
        ld      LinePer, LineCtr               ; Store the high time
        clr     LineCtr                        ; Reset the counter
        ld      PhaseTMR, PhaseTime    ; Reset the timer for the phase control

LineDone:

        cp      PowerLevel, #20                ; Test for at full wave of phase
        jr      uge, PhaseOn           ; If not, turn off at the start of the phase
        cp      PowerLevel, #00                ; If we're at the minimum,
        jr      z, PhaseOff                    ; then never turn the phase control on
        dec     PhaseTMR                       ; Update the timer for phase control
        jr      mi, PhaseOn                    ; If we are past the zero point, turn on the line

PhaseOff:
        and     PhasePrt, #~PhaseHigh          ; Turn off the phase control
        jr      PhaseDone                      ;

PhaseOn:
        or      PhasePrt, #PhaseHigh           ; Turn on the phase control

PhaseDone:

        tm      P3, #00000010b                 ; Test the RPM in pin
        jr      nz, IncRPMDB           ; If we're high, increment the filter
DecRPMDB:
        cp      RPM_FILTER, #00                ; Decrement the value of the filter if
        jr      z, RPMFiltered                 ; we're not already at zero
        dec     RPM_FILTER                     ;
        jr      RPMFiltered                    ;
IncRPMDB:
        inc     RPM_FILTER                     ; Increment the value of the filter
        jr      nz, RPMFiltered                ; and back turn if necessary
        dec     RPM_FILTER                     ;

RPMFiltered:
        cp      RPM_FILTER, #12                ; If we've seen 2.5 ms of high time
        jr      z, VectorRPMHigh               ; then vector high
        cp      RPM_FILTER, # 255 - 12         ; If we've seen 2.5 ms of low time
        jr      nz, TaskSwitcher               ; then vector low
VectorRPMLow:
        clr     RPM_FILTER                     ;
        jr      TaskSwitcher           ;
VectorRPMHigh:
        ld      RPM_FILTER, #0FFH              ;

TaskSwitcher

        tm      T0EXT,#00000001b               ; skip everyother pulse
        jr      nz,SkipPulse
        tm      T0EXT,#00000010b               ; Test for odd numbered task
        jr      nz,TASK1357                    ; If so do the 1ms timer update
        tm      T0EXT,#00000100b               ; Test for task 2 or 6
        jr      z, TASK04                      ; If not, then go to Tasks 0 and 4
        tm      T0EXT,#00001000b               ; Test for task 6
        jr      nz, TASK6                      ; If so, jump
                                               ; Otherwise, we must be in task 2

TASK2:
                or      IMR,#RETURN_IMR        ; turn on the interrupt
                ei
                call    STATEMACHINE   ; do the motor function
                iret

TASK04:
```

```
        or      IMR,#RETURN_IMR         ; turn on the interrupt
        ei
        push    rp                      ; save the rp
        srp     #TIMER_GROUP        ; set the rp for the switches
        call    switches                ; test the switches
        pop     rp
        iret

TASK6:
        or      IMR,#RETURN_IMR         ; turn on the interrupt
        ei
        call    TIMER4MS                ; do the four ms timer
        iret

TASK1357:
        push    RP
        or      IMR,#RETURN_IMR         ; turn on the interrupt
        ei

ONEMS:
        tm      p0,#DOWN_COMP           ; Test down force pot.
        jr      nz,HigherDn             ; Average too low -- output pulse
LowerDn:
        and     p3,#(~DOWN_OUT)         ; take pulse output low
        jr      DnPotDone               ;
HigherDn:
        or      p3,#DOWN_OUT        ; Output a high pulse
        inc     DN_TEMP                 ; Increase measured duty cycle
DnPotDone:
        tm      p0,#UP_COMP             ; Test the up force pot.
        jr      nz,HigherUp             ; Average too low -- output pulse
LowerUp:
        and     P3,#(~UP_OUT        ; Take pulse output low
        jr      UpPotDone               ;
HigherUp:
        or      P3,#UP_OUT              ; Output a high pulse
        inc     UP_TEMP                 ; Increase measured duty cycle
UpPotDone:
        inc     POT_COUNT               ; Increment the total period for
        jr      nz, GoTimer             ; duty cycle measurement
        rcf                             ; Divide the pot values by two to obtain
        rrc     UP_TEMP                 ; a 64-level force range
        rcf                             ;
        rrc     DN_TEMP                 ;
        di                              ; Subtract from 63 to reverse the direction
        ld      UPFORCE, #63        ; Calculate pot. values every 255
        sub     UPFORCE, UP_TEMP        ; counts
        ld      DNFORCE, #63        ;
        sub     DNFORCE, DN_TEMP        ;
        ei                              ;
        clr     UP_TEMP                 ; counts
        clr     DN_TEMP                 ;
GoTimer:
        srp     #LEARNEE_GRP        ; set the register pointer
        dec     AOBSTEST                ; decrease the aobs test timer
        jr      nz,NOFAIL               ; if the timer not at 0 then it didnot fail
        ld      AOBSTEST,#11        ; if it failed reset the timer
        tm      AOBSF,#00100000b        ; If the aobs was blocked before,
        jr      nz, BlockedBeam         ;   don't turn on the light
        or      AOBSF,#10000000b        ; Set the break edge flag
BlockedBeam:
        or      AOBSF,#00000001b        ; Set the single break flag
NOFAIL:
        inc     RadioTimeOut
        cp      OBS_COUNT, #00          ; Test for protector timed out
        jr      z, TEST125              ; If it has failed, then don't decrement
```

```
        dec     OBS_COUNT                       ; Decrement the timer

PPointDeb:
        di                                      ; Disable ints while debouncer being modified (16us)
        tm      PPointPort, #PassPoint          ; Test for pass point being seen
        jr      nz, IncPPDeb            ; If high, increment the debouncer
DecPPDeb:
        and     PPOINT_DEB, #00000011b          ; Debounce 3-0
        jr      z, PPDebDone            ; If already zero, don't decrement
        dec     PPOINT_DEB                      ; Decrement the debouncer
        jr      PPDebDone                       ;
IncPPDeb:
        inc     PPOINT_DEB                      ; Increment 0-3 debouncer
        and     PPOINT_DEB, #00000011B          ;
        jr      nz, PPDebDone           ; If rolled over,
        ld      PPOINT_DEB, #00000011B          ; keep it at the max.
PPDebDone:
        ei                                      ; Re-enable interrupts
TEST125:
        inc     t125ms                          ; increment the 125 mS timer
        cp      t125ms,#125                     ; test for the time out
        jr      z,ONE25MS                       ; if true the jump
        cp      t125ms,#63                      ; test for the other timeout
        jr      nz,N125
        call    FAULTB
N125:
        pop     RP
        iret
ONE25MS:
        cp      RsMode, #00                     ; Test for not in RS232 mode
        jr      z, CheckSpeed           ; If not, don't update RS timer
        dec     RsMode                  ; Count down RS232 time
        jr      nz, CheckSpeed                  ; If not done yet, don't clear wall
        ld      STATUS, #CHARGE                 ; Revert to charging wall control
CheckSpeed:
        cp      RampFlag, #STILL                ; Test for still motor
        jr      z, StopMotor            ; If so, turn off the FET's
        tm      BLINK_HI, #10000000b            ; If we are flashing the warning light,
        jr      z, StopMotor            ; then don't ramp up the motor
        cp      L_A_C, #076H            ; Special case -- use the ramp-down
        jr      z, NormalRampFlag               ; when we're going to the learned up limit
        cp      L_A_C, #070H            ; If we're learning limits,
        jr      uge, RunReduced                 ; then run at a slow speed
NormalRampFlag:
        cp      RampFlag, #RAMPDOWN ; Test for slowing down
        jr      z, SlowDown                     ; If so, slow to minimum speed
SpeedUp:
        cp      PowerLevel, MaxSpeed            ; Test for at max. speed
        jr      uge, SetAtFull                  ; If so, leave the duty cycle alone
RampSpeedUp:
        inc     PowerLevel                      ; Increase the duty cycle of the phase
        jr      SpeedDone                       ;
SlowDown:
        cp      PowerLevel, MinSpeed            ; Test for at min. speed
        jr      ult, RampSpeedUp                ; If we're below the minimum, ramp up to it
        jr      z, SpeedDone            ; If we're at the minimum, stay there
        dec     PowerLevel                      ; Increase the duty cycle of the phase
        jr      SpeedDone                       ;
RunReduced:
        ld      RampFlag, #FULLSPEED            ; Flag that we're not ramping up
        cp      MinSpeed, #8            ; Test for high minimum speed
        jr      ugt, PowerAtMin                 ;
        ld      PowerLevel, #8                  ; Set the speed at 40%
        jr      SpeedDone                       ;
PowerAtMin:
        ld      PowerLevel, MinSpeed            ; Set power at higher minimum
        jr      SpeedDone                       ;

StopMotor:
```

```
            clr     PowerLevel                ; Make sure that the motor is stopped (FMEA
protection)
            jr      SpeedDone                 ;
SetAtFull:
            ld      RampFlag, #FULLSPEED      ; Set flag for done with ramp-up
SpeedDone:
            cp      LinePer, #36       ; Test for 50Hz or 60Hz
            jr      uge, FiftySpeed           ; Load the proper table
SixtySpeed:
            di                                ; Disable interrupts to avoid pointer collizion
            srp     #RadioGroup               ; Use the radio pointers to do a ROM fetch
            ld      pointerh, #HIGH SPEED_TABLE_60  ; Point to the force look-up table
            ld      pointerl, #LOW SPEED_TABLE_60   ;
            add     pointerl, PowerLevel                 ; Offset for current phase step
            adc     pointerh, #00H                       ;
            ldc     addvalueh, @pointer            ; Fetch the ROM data for phase control
            ld      PhaseTime, addvalueh                 ; Transfer to the proper register
            ei                                ; Re-enable interrupts
            jr      WorkCheck                 ; Check the worklight toggle

FiftySpeed:
            di                                ; Disable interrupts to avoid pointer collision
            srp     #RadioGroup               ; Use the radio pointers to do a ROM fetch
            ld      pointerh, #HIGH SPEED_TABLE_50  ; Point to the force look-up table
            ld      pointerl, #LOW SPEED_TABLE_50   ;
            add     pointerl, PowerLevel                 ; Offset for current phase step
            adc     pointerh, #00H                       ;
            ldc     addvalueh, @pointer            ; Fetch the ROM data for phase control
            ld      PhaseTime, addvalueh                 ; Transfer to the proper register
            ei                                ; Re-enable interrupts
WorkCheck:
            srp     #LEARNEE_GRP       ; Re-set the RP
;4-22-97
            CP      EnableWorkLight,#01100000B
            JP      EQ,DontInc                ;Has the button already been held for 10s?
            INC     EnableWorkLight           ;Work light function is added to every
                                              ;125ms if button is light button is held
                                              ;for 10s will iniate change, if not held
                                              ;down will be cleared in switch routine
;
DontInc:    cp      AUXLEARNSW,#0FFh          ; test for the rollover position
            jr      z,SKIPAUXLEARNSW          ; if so then skip
            inc     AUXLEARNSW         ; increase
SKIPAUXLEARNSW:
            cp      ZZWIN,#0FFH               ; test for the roll position
            jr      z,TESTFA                  ; if so skip
            inc     ZZWIN                     ; if not increase the counter
TESTFA:
            call    FAULTB                    ; call the fault blinker
            clr     T125MS                    ; reset the timer
            inc     DOG2                      ; incrwease the second watch dog
            di
            inc     SDISABLE                  ; count off the system disable timer
            jr      nz,DO12                   ; if not rolled over then do the 1.2 sec
            dec     SDISABLE                  ; else reset to FF
DO12:
            cp      ONEP2,#00                 ; test for 0
            jr      z,INCLEARN                ; if counted down then increment learn
            dec     ONEP2                     ; else down count
INCLEARN:
            inc     learnt                    ; increase the learn timer
            cp      learnt,#0H                ; test for overflow
            jr      nz,LEARNTOK               ; if not 0 skip back turning
            dec     learnt                    ;
LEARNTOK:
            ei
            inc     eraset                    ; increase the erase timer
            cp      eraset,#0H                ; test for overflow
            jr      nz,ERASETOK               ; if not 0 skip back turning
```

```
            dec     eraset                         ;
ERASETOK:
            pop     RP
            iret

;       fault blinker

FAULTB:
            inc     FAULTTIME                      ; increase the fault timer
            cp      L_A_C, #070H           ; Test for in learn limits mode
            jr      ult, DoFaults          ; If not, handle faults normally
            cp      L_A_C, #071H           ; Test for failed learn
            jr      z, FastFlash           ; If so, blink the LED fast
RegFlash:
            tm      FAULTTIME, #00000100b          ; Toggle the LED every 250ms
            jr      z, FlashOn                     ;
FlashOff:
            or      ledport, #ledh                 ; Turn off the LED for blink
            jr      NOFAULT                        ; Don't test for faults
FlashOn:
            and     ledport, #ledl                 ; Turn on the LED for blink
            jr      NOFAULT                        ;
FastFlash:
            tm      FAULTTIME, #00000010b          ; Toggle the LED every 125ms
            jr      z, FlashOn                     ;
            jr      FlashOff                       ;
DoFaults:
            cp      FAULTTIME,#80h                 ; test for the end
            jr      nz,FIRSTFAULT                  ; if not timed out
            clr     FAULTTIME                      ; reset the clock
            clr     FAULT                          ; clear the last
            cp      FAULTCODE,#05h                 ; test for call dealer code
            jr      UGE,GOTFAULT           ; set the fault
            cp      CMD_DEB,#0FFH                  ; test the debouncer
            jr      nz,TESTAOBSM           ; if not set test aobs
            cp      FAULTCODE,#03h                 ; test for command shorted
            jr      z,GOTFAULT                     ; set the error
            ld      FAULTCODE,#03h                 ; set the code
            jr      FIRSTFAULT                     ;
TESTAOBSM:
            tm      AOBSF,#00000001b               ; test for the skiped aobs pulse
            jr      z,NOAOBSFAULT                  ; if no skips then no faults
            tm      AOBSF,#00000010b               ; test for any pulses
            jr      z,NOPULSE                      ; if no pulses find if hi or low
                                                   ; else we are intermittent
            ld      FAULTCODE,#04h                 ; set the fault
            jr      GOTFAULT                       ; if same got fault
;           cp      FAULTCODE,#04h                 ; test the last fault
;           jr      z,GOTFAULT                     ; if same got fault
;           ld      FAULTCODE,#04h                 ; set the fault
;           jr      FIRSTFC                        ;
NOPULSE:    tm      P3,#00000001b                  ; test the input pin
            jr      z,AOBSSH                       ; jump if aobs is stuck hi
            cp      FAULTCODE,#01h                 ; test for stuck low in the past
            jr      z,GOTFAULT                     ; set the fault
            ld      FAULTCODE,#01h                 ; set the fault code
            jr      FIRSTFC                        ;
AOBSSH:     cp      FAULTCODE,#02h                 ; test for stuck high in past
            jr      z,GOTFAULT                     ; set the fault
            ld      FAULTCODE,#02h                 ; set the code
            jr      FIRSTFC                        ;

GOTFAULT:   ld      FAULT,FAULTCODE                ; set the code
            swap    FAULT                          ;
            jr      FIRSTFC                        ;
NOAOBSFAULT:
            clr     FAULTCODE                      ; clear the fault code
FIRSTFC:    and     AOBSF, #11111100b              ; clear flags
```

```
FIRSTFAULT:
                tm      FAULTTIME, #00000111b      ; If one second has passed,
                jr      nz, RegularFault           ; increment the 60min

                incw    HOUR_TIMER                 ; Increment the 1 hour timer
                tcm     HOUR_TIMER_LO, #00011111b  ; If 32 seconds have passed
                jr      nz, RegularFault                  ; poll the radio mode

                or      AOBSF, #01000000b          ; Set the 'poll radio' flag

RegularFault:

                cp      FAULT,#00                  ; test for no fault
                jr      z,NOFAULT
                ld      FAULTFLAG,#0FFH            ; set the fault flag
                cp      CodeFlag,#REGLEARN         ; test for not in learn mode
                jr      z,TESTSDI                  ; if in learn then skip setting
                cp      FAULT,FAULTTIME            ;
                jr      ULE,TESTSDI

                tm      FAULTTIME,#00001000b       ; test the 1 sec bit
                jr      nz,BITONE
                and     ledport,#ledl                    ; turn on the led
                ret

BITONE:
                or      ledport,#ledh                    ; turn off the led
TESTSDI:
                ret

NOFAULT:        clr     FAULTFLAG                  ; clear the flag
                ret

;-------------------------------------------------------------------
;
;       Four ms timer tick routines and aux light function
;
;-------------------------------------------------------------------

TIMER4MS:
                cp      RPMONES,#00H           ; test for the end of the one sec timer
                jr      z,TESTPERIOD           ; if one sec over then test the pulses
                                                   ; over the period
                dec     RPMONES                    ; else decrease the timer
                di
                clr     RPM_COUNT                  ; start with a count of 0
                clr     BRPM_COUNT                 ; start with a count of 0
                ei
                jr      RPMTDONE
TESTPERIOD:
                cp      RPMCLEAR,#00H              ; test the clear test timer for 0
                jr      nz,RPMTDONE            ; if not timed out then skip
                ld      RPMCLEAR,#122              ; set the clear test time for next cycle .5
                cp      RPM_COUNT,#50              ; test the count for too many pulses
                jr      ugt,FAREV                  ; if too man pulses then reverse
                di
                clr     RPM_COUNT                  ; clear the counter
                clr     BRPM_COUNT                 ; clear the counter
                ei
;               clr     FAREVFLAG                  ; clear the flag    temp test
                jr      RPMTDONE                   ; continue
FAREV:
                ld      FAULTCODE,#06h             ; set the fault flag
                ld      FAREVFLAG,#088H            ; set the forced up flag
                and     p0,#LOW ~WORKLIGHT         ; turn off light
                ld      REASON,#80H            ; rpm forcing up motion
                call    SET_AREV_STATE             ; set the autorev state
RPMTDONE:
                dec     RPMCLEAR                   ; decrement the timer
```

```
        cp      LIGHT1S,#00                ; test for the end
        jr      z,SKIPLIGHTE
        dec     LIGHT1S                    ; down count the light time
SKIPLIGHTE:
        inc     R_DEAD_TIME
        cp      RTO,#RDROPTIME             ; test for the radio time out
        jr      ult,DONOTCB                ; if not timed out donot clear b
        cp      CodeFlag, #LRNOCS          ; If we are in a special learn mode,
        jr      uge, DONOTCB            ; then don't clear the code flag
        clr     CodeFlag                   ; else clear the b code flag
DONOTCB:
        inc     RTO                        ; increment the radio time out
        jr      nz,RTOOK                   ; if the radio timeout ok then skip
        dec     RTO                        ; back turn
RTOOK:
        cp      RRTO,#0FFH                 ; test for roll
        jr      z,SKIPRRTO                 ; if so then skip
        inc     RRTO
SKIPRRTO:                                  ;
        cp      SKIPRADIO, #00             ; Test for EEPROM communication
        jr      nz, LEARNDBOK           ; If so, skip reading program switch
        cp      RsMode, #00                ; Test for in RS232 mode,
        jr      nz, LEARNDBOK           ; if so, don't update the debouncer
        tm      psport,#psmask             ; Test for program switch
        jr      z,PRSWCLOSED            ; if the switch is closed count up
        cp      LEARNDB,#00             ; test for the non decrement point
        jr      z,LEARNDBOK             ; if at end skip dec
        dec     LEARNDB                    ;
        jr      LEARNDBOK                  ;

PRSWCLOSED:
        cp      LEARNDB,#0FFH              ; test for debouncer at max.
        jr      z,LEARNDBOK             ; if not at max increment
        inc     LEARNDB                    ; increase the learn debounce timer
LEARNDBOK:
;-------------------------------------------------------------------------
; AUX OBSTRUCTION OUTPUT AND LIGHT FUNCTION
;-------------------------------------------------------------------------

AUXLIGHT:
test_light_on:
    cp      LIGHT_FLAG,#LIGHT              ;
    jr      z,dec_light                    ;
    cp      LIGHT1S,#00                    ; test for no flash
    jr      z,NO1S                         ; if not skip
    cp      LIGHT1S,#1                     ; test for timeout
    jr      nz,NO1S                        ; if not skip
    xor     p0,#WORKLIGHT                  ; toggle light
    clr     LIGHT1S                        ; oneshoted
NO1S:
    cp      FLASH_FLAG,#FLASH
    jr      nz,dec_light               ;
    clr     VACFLASH                       ; Keep the vacation flash timer off
    dec     FLASH_DELAY                    ; 250 ms period
    jr      nz,dec_light               ;

    cp      STATUS, #RSSTATUS              ; Test for in RS232 mode
    jr      z, BlinkDone               ; If so, don't blink the LED
    ; Toggle the wall control LED
    cp      STATUS, #WALLOFF               ; See if the LED is off or on
    jr      z, TurnItOn                    ;
TurnItOff:
    ld      STATUS, #WALLOFF               ; Turn the light off
    jr      BlinkDone                      ;
TurnItOn:
    ld      STATUS, #CHARGE                ; Turn the light on
    ld      SWITCH_DELAY, #CMD_DEL_EX  ; Reset the delay time for charge
BlinkDone:
    ld      FLASH_DELAY,#FLASH_TIME
```

```
        dec     FLASH_COUNTER                       ;
        jr      nz,dec_light
        clr     FLASH_FLAG                          ;
dec_light:
        cp      LIGHT_TIMER_HI,#0FFH                ; test for the timer ignore
        jr      z,exit_light                        ; if set then ignore
        tm      T0EXT, #00010000b                   ; Decrement the light every 8 ms
        jr      nz,exit_light               ; (Use T0Ext to prescale)
        decw    LIGHT_TIMER                         ;
        jr      nz,exit_light                       ; if timer 0 turn off the light
        and     p0,# ~LIGHT_ON                      ; turn off the light
        cp      L_A_C, #00                          ; Test for in a learn mode
        jr      z, exit_light               ; If not, leave the LED alone
        clr     L_A_C                               ; Leave the learn mode
        or      ledport,#ledh               ; turn off the LED for program mode
exit_light:
        ret                                         ; return

;-----------------------------------------------------------------------
; MOTOR STATE MACHINE
;-----------------------------------------------------------------------

STATEMACHINE:
        cp      MOTDEL, #0FFH               ; Test for max. motor delay
        jr      z, MOTDELDONE               ; if do, don't increment
        inc     MOTDEL                      ; update the motor delay
MOTDELDONE:
        xor     p2,#FALSEIF                         ; toggle aux output
        cp      DOG2,#8                             ; test the 2nd watchdog for problem
        jp      ugt,START                           ; if problem reset
        cp      STATE,#6                            ; test for legal number
        jp      ugt,start                           ; if not the reset
        jp      z,stop                              ; stop motor 6
        cp      STATE,#3                            ; test for legal number
        jp      z,start                                     ; if not the reset
        cp      STATE,#0                            ; test for autorev
        jp      z,auto_rev                          ; auto reversing 0
        cp      STATE,#1                            ; test for up
        jp      z,up_direction                              ; door is going up 1
        cp      STATE,#2                            ; test for autorev
        jp      z,up_position                       ; door is up 2
        cp      STATE,#4                            ; test for autorev
        jp      z,dn_direction                              ; door is going down 4
        jp      dn_position                         ; door is down       5

;-----------------------------------------------------------------------
;       AUTO_REV ROUTINE
;-----------------------------------------------------------------------

auto_rev:
        cp      FAREVFLAG,#088H                     ; test for the forced up flag
        jr      nz,LEAVEREV
        and     p0,#LOW(~WORKLIGHT          ; turn off light
;       clr     FAREVFLAG                           ; one shot temp test
LEAVEREV:
        cp      MOTDEL, #10                         ; Test for 40 ms passed
        jr      ult, AREVON                         ; If not, keep the relay on
AREVOFF:
        and     p0,#LOW(~MOTOR_UP & ~MOTOR_DN)      ; disable motor
AREVON:
        WDT                                         ; kick the dog
        call    HOLDFREV                            ; hold off the force reverse
        ld      LIGHT_FLAG,#LIGHT                   ; force the light on no blink
        di
        dec     AUTO_DELAY                          ; wait for .5 second
        dec     BAUTO_DELAY                 ; wait for .5 second
        ei
```

```
        jr      nz,arswitch                     ; test switches

        or      p2,#FALSEIR                     ; set aux output    for FEMA

        ;LOOK FOR LIMIT HERE(No)
        ld      REASON,#40H                     ; set the reason for the change
        cp      L_A_C, #075H            ; Check for learning limits,
        jp      nz, SET_UP_NOBLINK      ; If not, proceed normally
        ld      L_A_C, #076H            ;
        jp      SET_UP_NOBLINK                  ; set the state
arswitch:
        ld      REASON,#00H                     ; set the reason to command
        di
        cp      SW_DATA,#CMD_SW                 ; test for a command
        clr     SW_DATA
        ei
        jp      z,SET_STOP_STATE                ; if so then stop
        ld      REASON,#10H                     ; set the reason as radio command
        cp      RADIO_CMD,#0AAH                 ; test for a radio command
        jp      z,SET_STOP_STATE                ; if so the stop
exit_auto_rev:
        ret                                     ; return

HOLDFREV:
        ld      RPMONES,#244            ; set the hold off
        ld      RPMCLEAR,#122                   ; clear rpm reverse .5 sec
        di
        clr     RPM_COUNT                       ; start with a count of 0
        clr     BRPM_COUNT                      ; start with a count of 0
        ei
        ret

;-----------------------------------------------------------------------
;       DOOR GOING UP
;-----------------------------------------------------------------------

up_direction:
        WDT                                     ; kick the dog
        cp      OnePass, STATE                  ; Test for the memory read one-shot
        jr      z, UpReady                      ; If so, continue
        ret                                     ; Else wait
UpReady:
        call    HOLDFREV                        ; hold off the force reverse
        ld      LIGHT_FLAG,#LIGHT               ; force the light on no blink
        and     p0,#LOW ~MOTOR_DN       ; disable down relay

        or      p0,#LIGHT_ON                    ; turn on the light
        cp      MOTDEL,#10                      ; test for 40 milliseconds
        jr      ule,UPOFF                       ; if not timed
CheckUpBlink:
        and     P2M_SHADOW, #~BLINK_PIN         ; Turn on the blink output
        ld      P2M, P2M_SHADOW                 ;
        or      P2, #BLINK_PIN                  ; Turn on the blinker
        decw    BLINK                           ; Decrement blink time
        tm      BLINK_HI, #10000000b            ; Test for pre-travel blinking done
        jp      z, NotUpSlow            ; If not, delay normal motor travel

UPON:
        or      p0,#(MOTOR_UP ! LIGHT_ON)  ; turn on the motor and light
UPOFF:
        cp      FORCE_IGNORE,#1                 ; test fro the end of the force ignore
        jr      nz,SKIPUPRPM            ; if not donot test rpmcount
        cp      RPM_ACOUNT,#02H                 ; test for less the 2 pulses
        jr      ugt,SKIPUPRPM                   ;
        ld      FAULTCODE,#05h
SKIPUPRPM:
```

```
        cp      FORCE_IGNORE,#00                ; test timer for done
        jr      nz,test_up_sw_pre               ; if timer not up do not test force
TEST_UP_FORCE:
        di
        dec     RPM_TIME_OUT            ; decrease the timeout
        dec     BRPM_TIME_OUT                   ; decrease the timeout
        ei
        jr      z,failed_up_rpm
        cp      RampFlag, #RAMPUP               ; Check for ramping up the force
        jr      z, test_up_sw           ; If not, always do full force check
TestUpForcePot:
        di                                      ; turn off the interrupt
        cp      RPM_PERIOD_HI, UP_FORCE_HI ; Test the RPM against the force setting
        jr      ugt, failed_up_rpm      ;
        jr      ult, test_up_sw                 ;
        cp      RPM_PERIOD_LO, UP_FORCE_LO ;
        jr      ult, test_up_sw                 ;
failed_up_rpm:
        ld      REASON,#20H                     ; set the reason as force
        cp      L_A_C, #076H            ; If we're learning limits,
        jp      nz, SET_STOP_STATE      ; then set the flag to store
        ld      L_A_C, #077H            ;
        jp      SET_STOP_STATE
test_up_sw_pre:
        di
        dec     FORCE_IGNORE
        dec     BFORCE_IGNORE
test_up_sw:
        di
        ld      LIM_TEST_HI, POSITION_HI  ; Calculate the distance from the up limit
        ld      LIM_TEST_LO, POSITION_LO  ;
        sub     LIM_TEST_LO, UP_LIMIT_LO  ;
        sbc     LIM_TEST_HI, UP_LIMIT_HI  ;
        cp      POSITION_HI, #0B0H        ; Test for lost door
        jr      ugt, UpPosKnown                 ; If not lost, limit test is done
        cp      POSITION_HI, #050H        ;
        jr      ult, UpPosKnown                 ;
        ei                                      ;
UpPosUnknown:
        sub     LIM_TEST_LO, #062H        ; Calculate the total travel distance allowed
        sbc     LIM_TEST_HI, #07FH        ; from the floor when lost
        add     LIM_TEST_LO, DN_LIMIT_LO  ;
        adc     LIM_TEST_HI, DN_LIMIT_HI  ;
UpPosKnown:
        ei                                      ;
        cp      L_A_C, #070H              ; If we're positioning the door, forget the limit
        jr      z, test_up_time                 ; and the wall control and radio
        cp      LIM_TEST_HI, #00                ; Test for exactly at the limit
        jr      nz, TestForPastUp               ; If not, see if we've passed the limit
        cp      LIM_TEST_LO, #00                ;
        jr      z, AtUpLimit              ;
TestForPastUp:
        tm      LIM_TEST_HI, #10000000b         ; Test for a negative result (past the limit, but
close)
        jr      z, get_sw                       ; If so, set the limit
AtUpLimit:
        ld      REASON,#50H                     ; set the reason as limit
        cp      L_A_C, #072H              ; If we're re-learning limits,
        jr      z, ReLearnLim             ; jump
        cp      L_A_C, #076H              ; If we're learning limits,
        jp      nz, SET_UP_POS_STATE            ; then set the flag to store
        ld      L_A_C, #077H              ;
        jp      SET_UP_POS_STATE                ;
ReLearnLim:
        ld      L_A_C, #073H              ;
        jp      SET_UP_POS_STATE                ;
get_sw:
        cp      L_A_C, #070H              ; Test for positioning the up limit
        jr      z,NotUpSlow                     ; If so, don't slow down
```

```
TestUpSlow:
        cp      LIM_TEST_HI, #HIGH(UPSLOWSTART)   ; Test for start of slowdown
        jr      nz, NotUpSlow              ;  (Cheating -- the high byte of the number is zero)
        cp      LIM_TEST_LO, #LOW(UPSLOWSTART)    ;
        jr      ugt, NotUpSlow                     ;
UpSlow:
        ld      RampFlag, #RAMPDOWN        ; Set the slowdown flag
NotUpSlow:
        ld      REASON,#10H                        ; set the radio command reason
        cp      RADIO_CMD,#0AAH                    ; test for a radio command
        jp      z,SET_STOP_STATE                   ; if so stop
        ld      REASON,#00H                        ; set the reason as a command
        di
        cp      SW_DATA,#CMD_SW                    ; test for a command condition
        clr     SW_DATA
        ei
        jr      ne,test_up_time                            ;
        jp      SET_STOP_STATE                     ;
test_up_time:
        ld      REASON,#70H                        ; set the reason as a time out
        decw    MOTOR_TIMER                ; decrement motor timer
        jp      z,SET_STOP_STATE                   ;
exit_up_dir:
        ret                                        ; return to caller
;-----------------------------------------------------------------------------
;       DOOR UP
;-----------------------------------------------------------------------------

up_position:
        WDT                                        ; kick the dog
        cp      FAREVFLAG,#088H                    ; test for the forced up flag
        jr      nz,LEAVELIGHT
        and     p0,#LOW(~WORKLIGHT)        ; turn off light
        jr      UPNOFLASH                          ; skip clearing the flash flag
LEAVELIGHT:
        ld      LIGHT_FLAG,#00H                    ; allow blink
UPNOFLASH:
        cp      MOTDEL, #10                        ; Test for 40 ms passed
        jr      ult, UPLIMON               ; If not, keep the relay on
UPLIMOFF:
        and     p0,#LOW(~MOTOR_UP & ~MOTOR_DN     ; disable motor
UPLIMON:
        cp      L_A_C, #073H               ; If we've begun the learn limits cycle,
        jr      z,LACUPPOS                         ; then delay before traveling
        cp      SW_DATA,#LIGHT_SW          ; light sw debounced?
        jr      z,work_up                          ;
        ld      REASON,#10H                        ; set the reason as a radio command
        cp      RADIO_CMD,#0AAH                    ; test for a radio cmd
        jr      z,SETDNDIRSTATE                    ; if so start down
        ld      REASON,#00H                        ; set the reason as a command
        di
        cp      SW_DATA,#CMD_SW                    ; command sw debounced?
        clr     SW_DATA
        ei
        jr      z,SETDNDIRSTATE                    ; if command
        ret
SETDNDIRSTATE:
        ld      ONEP2,#10                          ; set the 1.2 sec timer
        jp      SET_DN_DIR_STATE

LACUPPOS:
        cp      MOTOR_TIMER_HI, #HIGH LACTIME ; Make sure we're set to the proper time
        jr      ule, UpTimeOk
        ld      MOTOR_TIMER_HI, #HIGH(LACTIME)
        ld      MOTOR_TIMER_LO, #LOW(LACTIME
UpTimeOk:
        decw    MOTOR_TIMER                        ; Count down more time
        jr      nz, up_pos_ret                     ; If not timed out, leave
StartLACDown:
```

```
        ld      L_A_C, #074H            ; Set state as traveling down in LAC
        clr     UP_LIMIT_HI                     ; Clear the up limit
        clr     UP_LIMIT_LO                     ; and the position for
        clr     POSITION_HI                     ; determining the new up
        clr     POSITION_LO                     ; limit of travel
        ld      PassCounter, #030H      ; Set pass points at max.
        jp      SET_DN_DIR_STATE                ; Start door traveling down

work_up:
        xor     p0,#WORKLIGHT                   ; toggle work light
        ld      LIGHT_TIMER_HI,#0FFH            ; set the timer ignore
        and     SW_DATA, #LOW(~LIGHT_SW)  ; Clear the worklight bit
up_pos_ret:
        ret                                     ; return
;-----------------------------------------------------------------------------
;       DOOR GOING DOWN
;-----------------------------------------------------------------------------

dn_direction:
        WDT                                     ; kick the dog
        cp      OnePass, STATE                  ; Test for the memory read one-shot
        jr      z, DownReady            ; If so, continue
        ret                                     ; else wait
DownReady:
        call    HOLDFREV                        ; hold off the force reverse
        clr     FLASH_FLAG                      ; turn off the flash
        ld      LIGHT_FLAG,#LIGHT               ; force the light on no blink
        and     p0,#LOW(~MOTOR_UP)      ; turn off motor up

        or      p0,#LIGHT_ON                    ; turn on the light
        cp      MOTDEL,#10                      ; test for 40 milliseconds
        jr      ule,DNOFF                       ; if not timed

CheckDnBlink:
        and     P2M_SHADOW, #~BLINK_PIN         ; Turn on the blink output
        ld      P2M, P2M_SHADOW                 ;
        or      P2, #BLINK_PIN                  ; Turn on the blinker
        decw    BLINK                           ; Decrement blink time
        tm      BLINK_HI, #10000000b            ; Test for pre-travel blink done
        jr      z, NotDnSlow            ; If not, don't start the motor

DNON:

        or      p0,#(MOTOR_DN | LIGHT_ON)  ; turn on the motor and light
DNOFF:
        cp      FORCE_IGNORE,#01                ; test fro the end of the force ignore
        jr      nz,SKIPDNRPM            ; if not donot test rpmcount
        cp      RPM_ACOUNT,#02H                 ; test for less the 2 pulses
        jr      ugt,SKIPDNRPM                   ;
        ld      FAULTCODE,#05h
SKIPDNRPM:
        cp      FORCE_IGNORE,#00                ; test timer for done
        jr      nz,test_dn_sw_pre               ; if timer not up do not test force

TEST_DOWN_FORCE:
        di
        dec     RPM_TIME_OUT            ; decrease the timeout
        dec     BRPM_TIME_OUT                   ; decrease the timeout
        ei
        jr      z,failed_dn_rpm
        cp      RampFlag, #RAMPUP               ; Check for ramping up the force
        jr      z, test_dn_sw           ; If not, always do full force check
TestDownForcePot:
        di                                      ; turn off the interrupt
        cp      RPM_PERIOD_HI, DN_FORCE_HI ; Test the RPM against the force setting
        jr      ugt, failed_dn_rpm      ; if too slow then force reverse
        jr      ult, test_dn_sw                 ; if faster then we're fine
        cp      RPM_PERIOD_LO, DN_FORCE_LO ;
        jr      ult, test_dn_sw                 ;
```

```
failed_dn_rpm:
        cp      L_A_C, #074H             ; Test for learning limits
        jp      z, DnLearnRev            ; If not, set the state normally
        tm      POSITION_HI, #11000000b        ; Test for below last pass point
        jr      nz, DnRPMRev             ; if not, we're nowhere near the limit
        tm      LIM_TEST_HI, #10000000b        ; Test for beyond the down limit
        jr      nz, DoDownLimit                ; If so, we've driven into the down limit
DnRPMRev:
        ld      REASON,#20H                    ; set the reason as force
        cp      POSITION_HI, #0B0H       ; Test for lost,
        jp      ugt, SET_AREV_STATE      ; if not, autoreverse normally
        cp      POSITION_HI, #050H       ;
        jp      ult, SET_AREV_STATE      ;
        di                                     ; Disable interrupts
        ld      POSITION_HI, #07FH       ; Reset lost position for max. travel up
        ld      POSITION_LO, #080H       ;
        ei                                     ; Re-enable interrupts
        jp      SET_AREV_STATE                 ;
DnLearnRev:
        ld      L_A_C, #075H             ; Set proper LAC
        jp      SET_AREV_STATE                 ;


test_dn_sw_pre:
        di
        dec     FORCE_IGNORE
        dec     BFORCE_IGNORE
test_dn_sw:
        di                                     ;
        cp      POSITION_HI, #050H       ; Test for lost in mid travel
        jr      ult, TestDnLimGood       ;
        cp      POSITION_HI, #0B0H       ; If so, don't test for limit until
        jr      ult, NotDnSlow                 ; a proper pass point is seen
TestDnLimGood:
        ld      LIM_TEST_HI, DN_LIMIT_HI ; Measure the distance to the down limit
        ld      LIM_TEST_LO, DN_LIMIT_LO ;
        sub     LIM_TEST_LO, POSITION_LO ;
        sbc     LIM_TEST_HI, POSITION_HI ;
        ei                                     ;

        cp      L_A_C, #070H             ; If we're in the learn cycle, forget the limit
        jr      uge, test_dn_time              ; and ignore the radio and wall control
        tm      LIM_TEST_HI, #10000000b        ; Test for a negative result (past the down limit
        jr      z, call_sw_dn            ; If so, set the limit
        cp      LIM_TEST_LO, #(255 - 36  ; Test for 36 pulses (3") beyond the limit
        jr      ugt, NotDnSlow                 ; if not, then keep driving into the floor
DoDownLimit:
        ld      REASON,#50H                    ; set the reason as a limit
        cp      CMD_DEB,#0FFH                  ; test for the switch still held
        jr      nz,TESTRADIO             ;
        ld      REASON,#90H                    ; closed with the control held
        jr      TESTFORCEIG
TESTRADIO:
        cp      LAST_CMD,#00             ; test for the last command being radio
        jr      nz,TESTFORCEIG                 ; if not test force
        cp      CodeFlag,#BRECEIVED            ; test for the b code flag
        jr      nz,TESTFORCEIG                 ;
        ld      REASON,#0A0H             ; set the reason as b code to limit
TESTFORCEIG:
        cp      FORCE_IGNORE,#00H        ; test the force ignore for done
        jr      z,NOAREVDN                     ; a rev if limit before force enabled
        ld      REASON,#60h                    ; early limit
        jp      SET_AREV_STATE                 ; set autoreverse
NOAREVDN:
        and     p0,#LOW ~MOTOR_DN        ;
        jp      SET_DN_POS_STATE               ; set the state
call_sw_dn:
        cp      LIM_TEST_HI, #HIGH(DNSLOWSTART)  ; Test for start of slowdown
```

```
        jr      nz, NotDnSlow           ;  (Cheating -- the high byte is zero)
        cp      LIM_TEST_LO, #LOW(DNSLOWSTART)   ;
        jr      ugt, NotDnSlow                   ;
DnSlow:
        ld      RampFlag, #RAMPDOWN     ; Set the slowdown flag
NotDnSlow:
        ld      REASON,#10H                     ; set the reason as radio command
        cp      RADIO_CMD,#0AAH                 ; test for a radio command
        jp      z,SET_AREV_STATE                ; if so arev
        ld      REASON,#00H                     ; set the reason as command
        di
        cp      SW_DATA,#CMD_SW                 ; test for command
        clr     SW_DATA
        ei
        jp      z,SET_AREV_STATE                ;
test_dn_time:
        ld      REASON,#70H                     ; set the reason as timeout
        decw    MOTOR_TIMER             ; decrement motor timer
        jp      z,SET_AREV_STATE                ;
test_obs_count:
        cp      OBS_COUNT,#00                   ; Test the obs count
        jr      nz, exit_dn_dir                 ; if not done, don't reverse
        cp      FORCE_IGNORE, #(ONE_SEC / 2)    ; Test for 0.5 second passed
        jr      ugt, exit_dn_dir                ; if within first 0.5 sec, ignore it
        cp      LAST_CMD,#00            ; test for the last command from radio
        jr      z,OBSTESTB                      ; if last command was a radio test b
        cp      CMD_DEB,#0FFH                   ; test for the command switch holding
        jr      nz,OBSAREV                      ; if the command switch is not holding
                                                ; do the autorev
        jr      exit_dn_dir                     ; otherwise skip
OBSAREV:
        ld      FLASH_FLAG,#0FFH                ; set flag
        ld      FLASH_COUNTER,#20       ; set for 10 flashes
        ld      FLASH_DELAY,#FLASH_TIME         ; set for .5 Hz period
        ld      REASON,#30H                     ; set the reason as autoreverse
        jp      SET_AREV_STATE                  ;
OBSTESTB:
        cp      CodeFlag,#BRECEIVED                     ; test for the b code flag
        jr      nz,OBSAREV                      ; if not b code then arev
exit_dn_dir:
        ret                                     ; return

;---------------------------------------------------------------------------
;       DOOR DOWN
;---------------------------------------------------------------------------

dn_position:
        WDT                                     ; kick the dog
;       cp      FAREVFLAG,#088H                 ; test for the forced up flag
;       jr      nz,DNLEAVEL                     ;
;       and     p0,#LOW(~WORKLIGHT)     ; turn off light
;       jr      DNNOFLASH                       ; skip clearing the flash flag

DNLEAVEL:
        ld      LIGHT_FLAG,#00H                 ; allow blink
DNNOFLASH:
        cp      MOTDEL, #10                     ; Test for 40 ms passed
        jr      ult, DNLIMON            ; If not, keep the relay on
DNLIMOFF:
        and     p0,#LOW(~MOTOR_UP & ~MOTOR_DN)   ; disable motor
DNLIMON:
        cp      SW_DATA,#LIGHT_SW       ; debounced? light
        jr      z,work_dn                       ;
        ld      REASON,#10H                     ; set the reason as a radio command
        cp      RADIO_CMD,#0AAH                 ; test for a radio command
        jr      z,SETUPDIRSTATE                 ; if so go up
        ld      REASON,#00H                     ; set the reason as a command
        di
        cp      SW_DATA,#CMD_SW                 ; command sw pressed?
```

```
        clr     SW_DATA
        ei
        jr      z,SETUPDIRSTATE                 ; if so go up
        ret

SETUPDIRSTATE:
        ld      ONEP2,#10                       ; set the 1.2 sec timer
        jp      SET_UP_DIR_STATE

work_dn:
        xor     p0,#WORKLIGHT                   ; toggle work light
        ld      LIGHT_TIMER_HI,#0FFH            ; set the timer ignore
        and     SW_DATA, # LOW ~LIGHT_SW     ; Clear the worklight bit
dn_pos_ret:
        ret                                     ; return
;-------------------------------------------------------------------------
;       STOP
;-------------------------------------------------------------------------

stop:
        WDT                                     ; kick the dog
        cp      FAREVFLAG,#088H                 ; test for the forced up flag
        jr      nz,LEAVESTOP
        and     p0,#LOW ~WORKLIGHT           ; turn off light
        jr      STOPNOFLASH                     ;
LEAVESTOP:
        ld      LIGHT_FLAG,#00H                 ; allow blink
STOPNOFLASH:
        cp      MOTDEL, #10                     ; Test for 40 ms passed
        jr      ult, STOPMIDON                  ; If not, keep the relay on
STOPMIDOFF:
        and     p0,#LOW ~MOTOR_UP & ~MOTOR_DN      ; disable motor
STOPMIDON:
        cp      SW_DATA,#LIGHT_SW            ; debounced? light
        jr      z,work_stop                     ;
        ld      REASON,#10H                     ; set the reason as radio command
        cp      RADIO_CMD,#0AAH                 ; test for a radio command
        jp      z,SET_DN_DIR_STATE           ; if so go down
        ld      REASON,#00H                     ; set the reason as a  command
        di
        cp      SW_DATA,#CMD_SW                 ; command sw pressed?
        clr     SW_DATA
        ei
        jp      z,SET_DN_DIR_STATE           ; if so go down
        ret
work_stop:
        xor     p0,#WORKLIGHT                   ; toggle work light
        ld      LIGHT_TIMER_HI,#0FFH            ; set the timer ignore
        and     SW_DATA, #LOW ~LIGHT_SW      ; Clear the worklight bit
stop_ret:
        ret                                     ; return

;-------------------------------------------------------------------------
;       SET THE AUTOREV STATE
;-------------------------------------------------------------------------
SET_AREV_STATE:
        di                                      ;
        cp      L_A_C, #070H                 ; Test for learning limits,
        jr      uge, LearningRev                ; If not, do a normal autoreverse

        cp      POSITION_HI, #020H           ; Look for lost postion
        jr      ult, DoTheArev                  ; If not, proceed as normal
        cp      POSITION_HI, #0D0H           ; Look for lost postion
        jr      ugt, DoTheArev                  ; If not, proceed as normal

        ;Otherwise, we're lost -- ignore commands
        cp      REASON, #020H                ; Don't respond to command or radio
        jr      uge, DoTheArev                  ;
        clr     RADIO_CMD                       ; Throw out the radio command
```

```
        ei                                  ; Otherwise, just ignore it
        ret                                 ;

DoTheArev:

        ld      STATE,#AUTO_REV             ; if we got here, then reverse motor
        ld      RampFlag, #STILL            ; Set the FET's to off
        clr     PowerLevel                  ;
        jr      SET_ANY                     ; Done

LearningRev:
        ld      STATE,#AUTO_REV             ; if we got here, then reverse motor
        ld      RampFlag, #STILL            ; Set the FET's to off
        clr     PowerLevel                  ;
        cp      L_A_C, #075H            ; Check for proper reversal
        jr      nz, ErrorLearnArev      ; If not, stop the learn cycle
        cp      PassCounter, #030H      ; If we haven't seen a pass point,
        jr      z, ErrorLearnArev               ; then flag an error
GoodLearnArev:
        cp      POSITION_HI, #00                ; Test for down limit at least
        jr      nz, DnLimGood           ; 20 pulses away from pass point
        cp      POSITION_LO, #20                ;
        jr      ult, MovePassPoint      ; If not, use the upper pass point
DnLimGood:
        and     PassCounter, #10000000b         ; Set at lowest pass point
GotDnLim:
        di
        ld      DN_LIMIT_HI, POSITION_HI    ; Set the new down limit
        ld      DN_LIMIT_LO, POSITION_LO    ;
        add     DN_LIMIT_LO, #01                ; Add in a pulse to guarantee reversal off the block
        adc     DN_LIMIT_HI, #00                ;
        jr      SET_ANY                         ;
ErrorLearnArev:
        ld      L_A_C, #071H            ; Set the error in learning state
        jr      SET_ANY

MovePassPoint:
        cp      PassCounter, #02FH          ; If we have only one pass point,
        jr      z, ErrorLearnArev                   ; don't allow it to be this close to the floor
        di
        add     POSITION_LO, #LOW PPOINTPULSES  ; Use the next pass point up
        adc     POSITION_HI, #HIGH PPOINTPULSES ;
        add     UP_LIMIT_LO, #LOW PPOINTPULSES  ;
        adc     UP_LIMIT_HI, #HIGH PPOINTPULSES ;
        ei                                          ;
        or      PassCounter, #01111111b             ; Set pass counter at -1
        jr      GotDnLim                            ;


;---------------------------------------------------------------------------
;       SET THE STOPPED STATE
;---------------------------------------------------------------------------
SET_STOP_STATE:
        di
        cp      L_A_C, #070H            ; If we're in the learn mode,
        jr      uge, DoTheStop                  ; Then don't ignore anything
        cp      POSITION_HI, #020H      ; Look for lost postion
        jr      ult, DoTheStop                  ; If not, proceed as normal
        cp      POSITION_HI, #0D0H      ; Look for lost postion
        jr      ugt, DoTheStop                  ; If not, proceed as normal

        ;Otherwise, we're lost -- ignore commands
        cp      REASON, #020H           ; Don't respond to command or radio
        jr      uge, DoTheStop                  ;
        clr     RADIO_CMD                       ; Throw out the radio command
        ei                                      ; Otherwise, just ignore it
        ret                                     ;

DoTheStop:
```

```
        ld      STATE,#STOP                     ;
        ld      RampFlag, #STILL                ; Stop the motor at the FET's
        clr     PowerLevel                      ;
        jr      SET_ANY

;--------------------------------------------------------------------------
;       SET THE DOWN DIRECTION STATE
;--------------------------------------------------------------------------
SET_DN_DIR_STATE:

        ld      BLINK_HI, #0FFH                 ;Initially disable pre-travel blink
        call    LookForFlasher                  ;Test to see if flasher present
        tm      P2, #BLINK_PIN                  ;If the flasher is not present,
        jr      nz, SET_DN_NOBLINK          ;don't flash it
        ld      BLINK_LO, #0FFH                 ;Turn on the blink timer
        ld      BLINK_HI, #01H                  ;

SET_DN_NOBLINK:

        di
        ld      RampFlag, #RAMPUP               ; Set the flag to accelerate motor
        ld      PowerLevel, #4                  ; Set speed at minimum
        ld      STATE,#DN_DIRECTION             ; energize door
        clr     FAREVFLAG                       ; one shot the forced reverse

        cp      L_A_C, #070H                ; If we're learning the limits,
        jr      uge, SET_ANY                ; Then don't bother with testing anything

        cp      POSITION_HI, #020H          ; Look for lost postion
        jp      ult, SET_ANY                ; If not, proceed as normal
        cp      POSITION_HI, #0D0H          ; Look for lost postion
        jp      ugt, SET_ANY                ; If not, proceed as normal

LostDn:

        cp      FirstRun, #00               ; If this isn't our first operation when lost,
        jr      nz, SET_ANY                         ; then ALWAYS head down
        tm      PassCounter, #01111111b             ; If we are below the lowest
        jr      z, SET_UP_DIR_STATE         ; pass point, head up to see it
        tcm     PassCounter, #01111111b             ; If our pass point number is set at -1,
        jr      z, SET_UP_DIR_STATE         ; then go up to find the position
        jr      SET_ANY                             ; Otherwise, proceed normally

;--------------------------------------------------------------------------
;       SET THE DOWN POSITION STATE
;--------------------------------------------------------------------------
SET_DN_POS_STATE:
        di
        ld      STATE,#DN_POSITION          ; load new state
        ld      RampFlag, #STILL                    ; Stop the motor at the FET's
        clr     PowerLevel                          ;
        jr      SET_ANY

;--------------------------------------------------------------------------
;       SET THE UP DIRECTION STATE
;--------------------------------------------------------------------------
SET_UP_DIR_STATE:

        ld      BLINK_HI, #0FFH                 ;Initially turn off blink
        call    LookForFlasher                  ;Test to see if flasher present
        tm      P2, #BLINK_PIN                  ;If the flasher is not present,
        jr      nz, SET_UP_NOBLINK          ;don't flash it
        ld      BLINK_LO, #0FFH                 ;Turn on the blink timer
        ld      BLINK_HI, #01H                  ;

SET_UP_NOBLINK:
        di
        ld      RampFlag, #RAMPUP               ; Set the flag to accelerate to max.
        ld      PowerLevel, #4                  ; Start speed at minimum
```

```
        ld      STATE,#UP_DIRECTION         ;
        jr      SET_ANY                     ;

;------------------------------------------------------------------------
;       SET THE UP POSITION STATE
;------------------------------------------------------------------------
SET_UP_POS_STATE:
        di
        ld      STATE,#UP_POSITION      ;
        ld      RampFlag, #STILL            ; Stop the motor at the FET's
        clr     PowerLevel                  ;

;------------------------------------------------------------------------
;       SET ANY STATE
;------------------------------------------------------------------------
SET_ANY:
        and     P2M_SHADOW, #~BLINK_PIN         ; Turn on the blink output
        ld      P2M, P2M_SHADOW                 ;
        and     P2, #~BLINK_PIN                 ; Turn off the light

        cp      PPOINT_DEB, #2                  ; Test for pass point being seen
        jr      ult, NoPrePPoint                ; If signal is low, none seen
PrePPoint:
        or      PassCounter, #10000000b         ; Flag pass point signal high
        jr      PrePPointDone           ;
NoPrePPoint:
        and     PassCounter, #01111111b         ; Flag pass point signal low
PrePPointDone:

        ld      FirstRun, #0FFH                 ; One-shot the first run flag DONE IN MAIN
        ld      BSTATE,STATE            ; set the backup state
        di
        clr     RPM_COUNT                       ; clear the rpm counter
        clr     BRPM_COUNT                      ;
        ld      AUTO_DELAY,#AUTO_REV_TIME  ; set the .5 second auto rev timer
        ld      BAUTO_DELAY,#AUTO_REV_TIME ;
        ld      FORCE_IGNORE,#ONE_SEC           ; set the force ignore timer to one sec
        ld      BFORCE_IGNORE,#ONE_SEC          ; set the force ignore timer to one sec
        ld      RPM_PERIOD_HI, #0FFH            ; Set the RPM period to max. to start
        ei                                      ; Flush out any pending interrupts
        di                                      ;
        cp      L_A_C, #070H            ; If we are in learn mode,
        jr      uge, LearnModeMotor     ; don't test the travel distance
        push    LIM_TEST_HI                     ; Save the limit tests
        push    LIM_TEST_LO                     ;
        ld      LIM_TEST_HI, DN_LIMIT_HI  ; Test the door travel distance to
        ld      LIM_TEST_LO, DN_LIMIT_LO  ; see if we are shorter than 2.3M
        sub     LIM_TEST_LO, UP_LIMIT_LO  ;
        sbc     LIM_TEST_HI, UP_LIMIT_HI  ;
        cp      LIM_TEST_HI, #HIGH SHORTDOOR    ; If we are shorter than 2.3M,
        jr      ugt, DoorIsNorm                 ; then set the max. travel speed to 2/3
        jr      ult, DoorIsShort                ; Else, normal speed
        cp      LIM_TEST_LO, #LOW SHORTDOOR     ;
        jr      ugt, DoorIsNorm                 ;
DoorIsShort:
        ld      MaxSpeed, #12           ; Set the max. speed to 2/3
        jr      DoorSet                         ;
DoorIsNorm:
        ld      MaxSpeed, #20           ;
DoorSet:
        pop     LIM_TEST_LO                     ; Restore the limit tests
        pop     LIM_TEST_HI                     ;
        ld      MOTOR_TIMER_HI,#HIGH MOTORTIME
        ld      MOTOR_TIMER_LO,#LOW MOTORTIME
MotorTimeSet:
        ei
        clr     RADIO_CMD                       ; one shot
        clr     RPM_ACOUNT                      ; clear the rpm active counter
        ld      STACKREASON,REASON      ; save the temp reason
```

```
        ld      STACKFLAG,#0FFH                 ; set the flag
TURN_ON_LIGHT:
        call    SetVarLight                     ; Set the worklight to the proper value
        tm      P0, #LIGHT_ON              ; If the light is on skip clearing
        jr      nz,lighton                      ;
lightoff:
        clr     MOTDEL                     ; clear the motor delay
lighton:
        ret

LearnModeMotor:
        ld      MaxSpeed, #12              ; Default to slower max. speed
        ld      MOTOR_TIMER_HI,#HIGH(LEARNTIME)
        ld      MOTOR_TIMER_LO,#LOW(LEARNTIME)
        jr      MotorTimeSet               ; Set door to longer run for learn

;-----------------------------------------------------------------------
;       THIS IS THE MOTOR RPM INTERRUPT ROUTINE
;-----------------------------------------------------------------------
RPM:
        push    rp                              ; save current pointer
        srp     #RPM_GROUP                      ;point to these reg
        ld      rpm_temp_of,T0_OFLOW            ; Read the 2nd extension
        ld      rpm_temp_hi,T0EXT               ; read the timer extension
        ld      rpm_temp_lo,T0                  ; read the timer
        tm      IRQ,#00010000B                  ; test for a pending interrupt
        jr      z,RPMTIMEOK                     ; if not then time ok
RPMTIMEERROR:
        tm      rpm_temp_lo,#10000000B          ; test for timer reload
        jr      z,RPMTIMEOK                     ; if no reload time is ok
        decw    rpm_temp_hiword                 ; if reloaded then dec the hi to resync
RPMTIMEOK:
        cp      RPM_FILTER, #128                ; Signal must have been high for 3 ms before
        jr      ult, RejectTheRPM               ; the pulse is considered legal
        tm      P3, #00000010B                  ; If the line is sitting high,
        jr      nz, RejectTheRPM                ; then the falling edge was a noise pulse
RPMIsGood:
        and     imr,#11111011b                  ; turn off the interupt for up to 500uS

        ld      divcounter, #03                 ; Set to divide by 8 (destroys value in RPM_FILTER)
DivideRPMLoop:
        rcf                                     ; Reset the carry
        rrc     rpm_temp_of                     ; Divide the number by 8 so that
        rrc     rpm_temp_hi                     ; it will always fit within 16 bits
        rrc     rpm_temp_lo                     ;
        djnz    divcounter, DivideRPMLoop  ; Loop three times (Note:  This clears RPM_FILTER)

        ld      rpm_period_lo, rpm_past_lo ;
        ld      rpm_period_hi, rpm_past_hi ;
        sub     rpm_period_lo, rpm_temp_lo ; find the period of the last pulse
        sbc     rpm_period_hi, rpm_temp_hi ;

        ld      rpm_past_lo, rpm_temp_lo   ; Store the current time for the
        ld      rpm_past_hi, rpm_temp_hi   ; next edge capture

        cp      rpm_period_hi,#12          ; test for a period of at least 6.144mS
        jr      ult,SKIPC                       ; if the period is less then skip counting
TULS:
INCRPM:
        inc     RPM_COUNT                       ; increase the rpm count
        inc     BRPM_COUNT                      ; increase the rpm count
SKIPC:
        inc     RPM_ACOUNT                      ; increase the rpm count
        cp      RampFlag, #RAMPUP               ; If we're ramping the speed up,
        jr      z, MaxTimeOut              ; then set the timeout at max.
        cp      STATE, #DN_DIRECTION            ; If we're traveling down,
        jr      z, DownTimeOut                  ; then set the timeout from the down force
UpTimeOut:
```

```
        ld      rpm_time_out,UP_FORCE_HI   ; Set the RPM timeout to be equal to the up force setting
        rcf                                      ; Divide by two to account
        rrc     rpm_time_out               ; for the different prescalers
        add     rpm_time_out, #2                 ; Round up and account for free-running prescale
        jr      GotTimeOut
MaxTimeOut:
        ld      rpm_time_out, #125         ; Set the RPM timeout to be 500ms
        jr      GotTimeOut                       ;
DownTimeOut:
        ld      rpm_time_out,DN_FORCE_HI   ; Set the RPM timeout to be equal to the down force setting
        rcf                                      ; Divide by two to account
        rrc     rpm_time_out               ; for the different prescalers
        add     rpm_time_out, #2                 ; Round up and account for free-running prescale
GotTimeOut:
        ld      BRPM_TIME_OUT,rpm_time_out ; Set the backup to the same value
        ei
;-------------------------------
;       Position Counter
;               Position is incremented when going down and decremented when
;               going up.  The zero position is taken to be the upper edge of the pass
;               point signal (i.e. the falling edge in the up direction, the rising edge in
;               the down direction
;-------------------------------
        cp      STATE, #UP_DIRECTION             ; Test for the proper direction of the counter
        jr      z, DecPos                        ;
        cp      STATE, #STOP                     ;
        jr      z, DecPos                        ;
        cp      STATE, #UP_POSITION        ;
        jr      z, DecPos                        ;

IncPos:

        incw    POSITION                         ;
        cp      PPOINT_DEB, #2                   ; Test for pass point being seen
        jr      ult, NoDnPPoint                  ; If signal is low, none seen

DnPPoint:

        or      PassCounter, #10000000b          ; Mark pass point as currently high
        jr      CtrDone                          ;

NoDnPPoint:

        tm      PassCounter, #10000000b          ; Test for pass point seen before
        jr      z, PastDnEdge              ; If not, then we're past the edge
AtDnEdge:
        cp      L_A_C, #074H               ; Test for learning limits
        jr      nz, NormalDownEdge         ; if not, treat normally
LearnDownEdge:
        di
        sub     UP_LIMIT_LO, POSITION_LO   ; Set the up position higher
        sbc     UP_LIMIT_HI, POSITION_HI   ;
        dec     PassCounter                      ; Count pass point as being seen
        jr      Lowest1                          ; Clear the position counter
NormalDownEdge:
        dec     PassCounter                      ; Mark as one pass point closer to floor
        tm      PassCounter, #01111111b          ; Test for lowest pass point
        jr      nz, NotLowest1                   ; If not, don't zero the position counter
Lowest1:
        di
        clr     POSITION_HI                      ; Set the position counter back to zero
        ld      POSITION_LO, #1                  ;
        ei                                       ;
NotLowest1:
        cp      STATUS, #RSSTATUS                ; Test for in RS232 mode
        jr      z, DontResetWall3                ; If so, don't blink the LED
        ld      STATUS, #WALLOFF                 ; Blink the LED for pass point
        clr     VACFLASH                         ; Set the turn-off timer
DontResetWall3:
```

```
PastDnEdge:
NoUpPPoint:
        and     PassCounter, #01111111b         ; Clear the flag for pass point high
        jr      CtrDone                         ;

DecPos:

        decw    POSITION                        ;
        cp      PPOINT_DEB, #2                  ; Test for pass point being seen
        jr      ult, NoUpPPoint                 ; If signal is low, none seen

UpPPoint:

        tm      PassCounter, #10000000b         ; Test for pass point seen before
        jr      nz, PastUpEdge                  ; If so, then we're past the edge
AtUpEdge:
        tm      PassCounter, #01111111b         ; Test for lowest pass point
        jr      nz, NotLowest2                  ; If not, don't zero the position counter
Lowest2:
        di
        clr     POSITION_HI                     ; Set the position counter back to zero
        clr     POSITION_LO                     ;
        ei                                      ;
NotLowest2:
        cp      STATUS, #RSSTATUS               ; Test for in RS232 mode
        jr      z, DontResetWall2               ; If so, don't blink the LED
        ld      STATUS, #WALLOFF                ; Blink the LED for pass point
        clr     VACFLASH                        ; Set the turn-off timer
DontResetWall2:
        inc     PassCounter                     ; Mark as one pass point higher above
        cp      PassCounter, FirstRun           ; Test for pass point above max. value
        jr      ule, PastUpEdge                 ; If not, we're fine
        ld      PassCounter, FirstRun           ; Otherwise, correct the pass counter
PastUpEdge:
        or      PassCounter, #10000000b         ; Set the flag for pass point high before

CtrDone:
RejectTheRPM:

        pop     rp                              ; return the rp
        iret                                    ; return


;---------------------------------------------------------------------------
;       THIS IS THE SWITCH TEST SUBROUTINE
;
;       STATUS
;       0 => COMMAND TEST
;       1 => WORKLIGHT TEST
;       2 => VACATION TEST
;       3 => CHARGE
;       4 => RSSTATUS -- In RS232 mode, don't scan for switches
;       5 => WALLOFF  -- Turn off the wall control LED
;
;       SWITCH DATA
;       0 => OPEN
;       1 => COMMAND CMD_SW
;       2 => WORKLIGHT       LIGHT_SW
;       4 => VACATION        VAC_SW
;---------------------------------------------------------------------------


switches:

        ei
;4-22-97
        CP      LIGHT_DEB,#0FFH                 ;is the light button being held?
        JR      NZ,NotHeldDown                  ;if not debounced, skip long hold
```

```
        CP      EnableWorkLight,#01100000B ;has the 10 sec. already passed?
        JR      GE,HeldDown
        CP      EnableWorkLight,#01010000B
        JR      LT,HeldDown
        LD      EnableWorkLight,#10000000B ;when debounce occurs, set register
                                           ;to initiate e2 write in mainloop
        JR      HeldDown
NotHeldDown:
        CLR     EnableWorkLight
HeldDown:
;
;       and     SW_DATA, #LIGHT_SW        ; Clear all switches except for worklight
        cp      STATUS, #WALLOFF          ; Test for illegal status
        jp      ugt, start                ; if so reset
        jr      z, NoWallCtrl             ; Turn off wall control state
        cp      STATUS, #RSSTATUS         ; Check for in RS232 mode
        jr      z, NOTFLASHED             ; If so, skip the state machine
        cp      STATUS,#3                 ; test for illegal number
        jp      z,charge                  ; if it is 3 then goto charge
        cp      STATUS,#2                 ; test for vacation
        jp      z,VACATION_TEST           ; if so then jump
        cp      STATUS,#1                 ; test for worklight
        jp      z,WORKLIGHT_TEST          ; if so then jump
                                          ; else it id command
COMMAND_TEST:
        cp      VACFLAG,#00H              ; test for vacation mode
        jr      z,COMMAND_TEST1           ; if not vacation skip flash

        inc     VACFLASH                  ; increase the vacation flash timer
        cp      VACFLASH,#10              ; test the vacation flash period
        jr      ult,COMMAND_TEST1         ; if lower period skip flash
        and     p3,#~CHARGE_SW            ; turn off wall switch
        or      p3,#DIS_SW                ; enable discharge
        cp      VACFLASH,#60              ; test the time delay for max
        jr      nz,NOTFLASHED             ; if the flash is not done jump and ret
        clr     VACFLASH                  ; restart the timer
NOTFLASHED:
        ret                               ; return

NoWallCtrl:
        and     P3, #~CHARGE_SW           ; Turn off the circuit
        or      P3, #DIS_SW               ;
        inc     VACFLASH                  ; Update the off time
        cp      VACFLASH, #50             ; If off time hasn't expired,
        jr      ult, KeepOff              ; keep the LED off
        ld      STATUS, #CHARGE           ; Reset the wall control
        ld      SWITCH_DELAY, #CMD_DEL_EX ; Reset the charge timer
KeepOff:
        ret                               ;

COMMAND_TEST1:
        tm      p0,#SWITCHES1             ; command sw pressed?
        jr      nz,CMDOPEN                ; open command
        tm      P0,#SWITCHES2             ; test the second command input
        jr      nz,CMDOPEN
CMDCLOSED:                                ; closed command
;       call    DECVAC                    ; decrease vacation debounce
;       call    DECLIGHT                  ; decrease light debounce
        cp      CMD_DEB,#0FFH             ; test for the max number
        jr      z,SKIPCMDINC              ; if at the max skip inc
        di
        inc     CMD_DEB                   ; increase the debouncer
        inc     BCMD_DEB                  ; increase the debouncer
        ei
SKIPCMDINC:
        cp      CMD_DEB,#CMD_MAKE         ;
        jr      nz,CMDEXIT                ; if not made then exit
        call    CmdSet                    ; Set the command switch
CMDEXIT:
```

```
        or      p3,#CHARGE_SW                   ; turn on the charge system
        and     p3,#~DIS_SW                     ;
        ld      SWITCH_DELAY,#CMD_DEL_EX   ; set the delay time to 8mS
        ld      STATUS,#CHARGE                  ; charge time
CMDDELEXIT:
        ret                                     ;

CmdSet:
        cp      L_A_C, #070H               ; Test for in learn limits mode
        jr      ult, RegCmdMake                 ; If not, treat as normal command
        jr      ugt, LeaveLAC              ; If learning, command button exits
        call    SET_UP_NOBLINK                  ; Set the up direction state
        jr      CMDMAKEDONE                     ;
RegCmdMake:
        cp      LEARNDB, #0FFH                  ; Test for learn button held
        jr      z, GoIntoLAC               ; If so, enter the learn mode
NormalCmd:
        di
        ld      LAST_CMD,#055H                  ; set the last command as command
cmd:    ld      SW_DATA,#CMD_SW                 ; set the switch data as command
        cp      AUXLEARNSW,#100                 ; test the time
        jr      ugt,SKIP_LEARN
        push    RP
        srp     #LEARNEE_GRP
        call    SETLEARN                        ; set the learn mode
        clr     SW_DATA                         ; clear the cmd
        pop     RP
        or      p0,#LIGHT_ON               ; turn on the light
        call    TURN_ON_LIGHT                   ; turn on the light
CMDMAKEDONE:
SKIP_LEARN:
        ld      CMD_DEB,#0FFH                   ; set the debouncer to ff one shot
        ld      BCMD_DEB,#0FFH                  ; set the debouncer to ff one shot
        ei
        ret

LeaveLAC:
        clr     L_A_C                           ; Exit the learn mode
        or      ledport,#ledh              ; turn off the LED for program mode
        call    SET_STOP_STATE                  ;
        jr      CMDMAKEDONE                     ;

GoIntoLAC:
        ld      L_A_C, #070H               ; Start the learn limits mode
        clr     FAULTCODE                       ; Clear any faults that exist
        clr     CodeFlag                        ; Clear the regular learn mode
        ld      LEARNT, #0FFH              ; Turn off the learn timer
        ld      ERASET, #0FFH              ; Turn off the erase timer
        jr      CMDMAKEDONE                     ;


CMDOPEN:                                        ; command switch open
        and     p3,#~CHARGE_SW                  ; turn off charging sw
        or      p3,#DIS_SW                      ; enable discharge
        ld      DELAYC,#16                      ; set the time delay
DELLOOP:
        dec     DELAYC
        jr      nz,DELLOOP                      ; loop till delay is up
        tm      p0,#SWITCHES1                   ; command line still high
        jr      nz,TESTWL                       ; if so return later
        call    DECVAC                     ; if not open line dec all debouncers
        call    DECLIGHT                        ;
        call    DECCMD                     ;
        ld      AUXLEARNSW,#0FFH                ; turn off the aux learn switch
        jr      CMDEXIT                         ; and exit

TESTWL:
        ld      STATUS,#WL_TEST                 ; set to test for a worklight
        ret                                     ; return
```

```
WORKLIGHT_TEST:
        tm      p0,#SWITCHES1          ; command line still high
        jr      nz,TESTVAC2            ; exit setting to test for vacation
        call    DECVAC                 ; decrease the vacation debouncer
        call    DECCMD                 ; and the command debouncer
        cp      LIGHT_DEB,#0FFH        ; test for the max
        jr      z,SKIPLIGHTINC         ; if at the max skip inc
        inc     LIGHT_DEB              ; inc debouncer
SKIPLIGHTINC:
        cp      LIGHT_DEB,#LIGHT_MAKE  ; test for the light make
        jr      nz,CMDEXIT             ; if not then recharge delay
        call    LightSet               ; Set the light debouncer
        jr      CMDEXIT                ; then recharge

LightSet:
        ld      LIGHT_DEB,#0FFH        ; set the debouncer to max
        ld      SW_DATA,#LIGHT_SW      ; set the data as worklight
        cp      RRTO,#RDROPTIME        ; test for code reception
        jr      ugt,CMDEXIT            ; if not then skip the seting of flag
        clr     AUXLEARNSW             ; start the learn timer
        ret

TESTVAC2:
        ld      STATUS,#VAC_TEST       ; set the next test as vacation
        ld      switch_delay,#VAC_DEL  ; set the delay
LIGHTDELEXIT:
        ret                            ; return

VACATION_TEST:
        djnz    switch_delay,VACDELEXIT   ;

        tm      p0,#SWITCHES1          ; command line still high
        jr      nz,EXIT_ERROR          ; exit with a error setting open state
        call    DECLIGHT               ; decrease the light debouncer
        call    DECCMD                 ; decrease the command debouncer
        cp      VAC_DEB,#0FFH          ; test for the max
        jr      z,VACINCSKIP           ; skip the incrementing
        inc     VAC_DEB                ; inc vacation debouncer
VACINCSKIP:
        cp      VACFLAG,#00H           ; test for vacation mode
        jr      z,VACOUT               ; if not vacation use out time
VACIN:
        cp      VAC_DEB,#VAC_MAKE_IN   ; test for the vacation make point
        jr      nz,VACATION_EXIT       ; exit if not made
        call    VacSet                 ;
        jr      VACATION_EXIT          ;

VACOUT:
        cp      VAC_DEB,#VAC_MAKE_OUT  ; test for the vacation make point
        jr      nz,VACATION_EXIT       ; exit if not made
        call    VacSet                 ;
        jr      VACATION_EXIT          ; Forget vacation mode

VacSet:
        ld      VAC_DEB,#0FFH          ; set vacation debouncer to max
        cp      AUXLEARNSW,#100        ; test the time
        jr      ugt,SKIP_LEARNV
        push    RP
        srp     #LEARNEE_GRP
        call    SETLEARN               ; set the learn mode
        pop     RP
        or      p0, #LIGHT_ON          ; Turn on the worklight
        call    TURN_ON_LIGHT          ;
        ret

SKIP_LEARNV:
        ld      VACCHANGE,#0AAH        ; set the toggle data
```

```
        cp      RRTO,#RDROPTIME                 ; test for code reception
        jr      ugt,VACATION_EXIT               ; if not then skip the seting of flag
        clr     AUXLEARNSW                      ; start the learn timer
VACATION_EXIT:
        ld      SWITCH_DELAY,#VAC_DEL_EX  ; set the delay
        ld      STATUS,#CHARGE                  ; set the next test as charge
VACDELEXIT:
        ret

EXIT_ERROR:
        call    DECCMD                    ; decrement the debouncers
        call    DECVAC                    ;
        call    DECLIGHT                        ;
        ld      SWITCH_DELAY,#VAC_DEL_EX  ; set the delay
        ld      STATUS,#CHARGE                  ; set the next test as charge
        ret


charge:
        or      p3,#CHARGE_SW                   ;
        and     p3,#~DIS_SW                     ;
        dec     SWITCH_DELAY              ;
        jr      nz,charge_ret                   ;
        ld      STATUS,#CMD_TEST                ;
charge_ret:
        ret


DECCMD:
        cp      CMD_DEB,#00H              ; test for the min number
        jr      z,SKIPCMDDEC              ; if at the min skip dec
        di
        dec     CMD_DEB                         ; decrement debouncer
        dec     BCMD_DEB                        ; decrement debouncer
        ei
SKIPCMDDEC:
        cp      CMD_DEB,#CMD_BREAK        ; if not at break then exit
        jr      nz,DECCMDEXIT                   ; if not break then exit
        call    CmdRel                    ;
DECCMDEXIT:
        ret                                     ; and exit

CmdRel:
        cp      L_A_C, #070H              ; Test for in learn mode
        jr      nz, NormCmdBreak                ; If not, treat normally
        call    SET_STOP_STATE                  ; Stop the door
NormCmdBreak:
        di
        clr     CMD_DEB                         ; reset the debouncer
        clr     BCMD_DEB                        ; reset the debouncer
        ei
        ret


DECLIGHT:
        cp      LIGHT_DEB,#00H                  ; test for the min number
        jr      z,SKIPLIGHTDEC                  ; if at the min skip dec
        dec     LIGHT_DEB                       ; decrement debouncer
SKIPLIGHTDEC:
        cp      LIGHT_DEB,#LIGHT_BREAK          ; if not at break then exit
        jr      nz,DECLIGHTEXIT                 ; if not break then exit
        clr     LIGHT_DEB                       ; reset the debouncer
DECLIGHTEXIT:
        ret                                     ; and exit


DECVAC:
        cp      VAC_DEB,#00H              ; test for the min number
```

```
        jr      z,SKIPVACDEC            ; if at the min skip dec
        dec     VAC_DEB                         ; decrement debouncer
SKIPVACDEC:
        cp      VACFLAG,#00H            ; test for vacation mode
        jr      z,DECVACOUT                     ; if not vacation use out time
DECVACIN:
        cp      VAC_DEB,#VAC_BREAK_IN           ; test for the vacation break point
        jr      nz,DECVACEXIT                   ; exit if not
        jr      CLEARVACDEB             ;

DECVACOUT:
        cp      VAC_DEB,#VAC_BREAK_OUT          ; test for the vacation break point
        jr      nz,DECVACEXIT                   ; exit if not
CLEARVACDEB:
        clr     VAC_DEB                         ; reset the debouncer
DECVACEXIT:
        ret                                     ; and exit

;-----------------------------------------------------------------------------
;       FORCE TABLE
;-----------------------------------------------------------------------------
force_table:

f_0:    .byte   000H,   06BH,   06CH
        .byte   000H,   06BH,   06CH
        .byte   000H,   06DH,   073H
        .byte   000H,   06FH,   08EH
        .byte   000H,   071H,   0BEH
        .byte   000H,   074H,   004H
        .byte   000H,   076H,   062H
        .byte   000H,   078H,   0DAH
        .byte   000H,   07BH,   06CH
        .byte   000H,   07EH,   01BH
        .byte   000H,   081H,   0E6H
        .byte   000H,   083H,   0D6H
        .byte   000H,   086H,   09BH
        .byte   000H,   089H,   07FH
        .byte   000H,   08CH,   084H
        .byte   000H,   08FH,   0ABH
        .byte   000H,   092H,   0F7H
        .byte   000H,   096H,   06BH
        .byte   000H,   09AH,   0C9H
        .byte   000H,   09DH,   0D5H
        .byte   000H,   0A1H,   0D2H
        .byte   000H,   0A6H,   004H
        .byte   000H,   0AAH,   076H
        .byte   000H,   0AFH,   027H
        .byte   000H,   0B4H,   01CH
        .byte   000H,   0B9H,   05BH
        .byte   000H,   0BEH,   0EBH
        .byte   000H,   0C4H,   0D3H
        .byte   000H,   0CBH,   01BH
        .byte   000H,   0D1H,   0CDH
        .byte   000H,   0D8H,   0F4H
        .byte   000H,   0E0H,   09CH
        .byte   000H,   0E7H,   01CH
        .byte   000H,   0EDH,   0FFH
        .byte   000H,   0F5H,   04FH
        .byte   000H,   0FDH,   015H
        .byte   001H,   005H,   05DH
        .byte   001H,   00EH,   035H
        .byte   001H,   017H,   0ABH
        .byte   001H,   021H,   0D2H
        .byte   001H,   02CH,   0EBH
        .byte   001H,   038H,   0E0H
        .byte   001H,   045H,   03AH
        .byte   001H,   053H,   008H
        .byte   001H,   062H,   010H
```

```
        .byte  001H,  072H,  07DH
        .byte  001H,  084H,  083H
        .byte  001H,  098H,  061H
        .byte  001H,  0AEH,  064H
        .byte  001H,  0C6H,  0E8H
        .byte  001H,  0E2H,  062H
        .byte  002H,  001H,  065H
        .byte  002H,  024H,  0AAH
        .byte  002H,  04DH,  024H
        .byte  002H,  07CH,  010H
        .byte  002H,  0B3H,  01BH
        .byte  002H,  0F4H,  094H
        .byte  003H,  043H,  0C1H
        .byte  003H,  0A5H,  071H
        .byte  004H,  020H,  0FCH
        .byte  004H,  0C2H,  036H
        .byte  005H,  09DH,  08CH
        .byte  013H,  012H,  0DCH
f_63:   .byte  013H,  012H,  0D0H

SIM_TABLE:

                .WORD  00000H        ; Numbers set to zero (proprietary table)
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H
                .WORD  00000H

SPEED_TABLE_50:

        .BYTE  40
        .BYTE  34
        .BYTE  32
        .BYTE  30
        .BYTE  28
        .BYTE  27
        .BYTE  25
        .BYTE  24
        .BYTE  23
        .BYTE  21
        .BYTE  20
        .BYTE  19
        .BYTE  17
        .BYTE  16
        .BYTE  15
        .BYTE  13
        .BYTE  12
        .BYTE  10
        .BYTE  8
        .BYTE  6
        .BYTE  0

SPEED_TABLE_60:

        .BYTE  33
        .BYTE  29
        .BYTE  27
        .BYTE  25
```

```
.BYTE  23
.BYTE  22
.BYTE  21
.BYTE  20
.BYTE  19
.BYTE  18
.BYTE  17
.BYTE  16
.BYTE  15
.BYTE  13
.BYTE  12
.BYTE  11
.BYTE  10
.BYTE  8
.BYTE  7
.BYTE  5
.BYTE  0

; Fill 49 bytes of unused memory

FILL10
FILL10
FILL10
FILL10
FILL
FILL
FILL
FILL
FILL
FILL
FILL
FILL
FILL

.end
```

While there has been illustrated and described a particular embodiment of the present invention, it will be appreciated that numerous changes and modifications will occur to those skilled in the art, and it is intended in the appended claims to cover all those changes and modifications which followed in the true spirit and scope of the present invention.

What is claimed is:

1. A method of controlling a barrier operator comprising an electric motor for moving a barrier between open and closed positions, the method comprising:

storing a barrier travel value representing the distance between open and closed positions;

receiving a request to move the barrier;

controlling the motor to move the barrier at a speed computed from the stored barrier travel value.

2. A method of controlling a barrier in accordance with claim 1 comprising generating the barrier travel value during a learning mode of operation.

3. A barrier operator for moving a barrier between open and closed positions:

an electric motor assembly connected to the barrier and responsive to motor control signals for moving the barrier between the open and the closed positions;

storage apparatus for storing a barrier travel value representing the distance between the open position and the closed position; and a controller responsive to the stored barrier travel value for sending motor control signals to the motor assembly to control a speed of movement of the barrier in accordance with the travel value.

4. A barrier operator in accordance with claim 3 comprising apparatus for automatically measuring the distance of travel of the barrier and for generating the barrier travel value.

5. A barrier operator in accordance with claim 3 comprising user adjustable apparatus representing forces to be applied to the barrier and the controller responds to the user adjustable apparatus for sending motor control signals in accordance with the user adjustable apparatus.

6. A barrier operator in accordance with claim 5 wherein the user adjustable apparatus comprises a first adjustable apparatus representing forces to be applied to the barrier when moving toward the closed position and a second adjustable apparatus representing forces to be applied to the barrier when moving toward the open position.

7. A movable barrier operator which automatically detects barrier size, comprising:

an electric motor having a maximum output speed;

a transmission connected to the motor to be driven thereby and to the movable barrier to be moved;

a position detector for sensing the position of the barrier with respect to a frame of reference; and a controller, responsive to the position detector, for calculating a time of travel between a first barrier travel limit and a second barrier travel limit and responsive to the calculated time of barrier travel, for automatically adjusting a barrier travel speed.

8. A movable barrier operator according to claim 7 wherein the barrier comprises a segmented panel door and wherein the controller adjusts the barrier travel speed such that a maximum barrier travel speed is based on one hundred percent of the motor's maximum output speed.

9. A movable barrier operator according to claim 8 further comprising a routine for varying the motor speed in accordance with a predetermined set of values, wherein in accordance with the predetermined set of values, a speed of the motor is linearly varied from zero to a maximum speed and from the maximum speed to zero.

10. A movable barrier operator according to claim 7 wherein the barrier comprises a single panel door and wherein the controller adjusts the barrier travel speed such that a maximum barrier travel speed is based on percentage less than one hundred percent of the motor's maximum output speed.

11. A movable barrier operator according to claim 10 further comprising a routine for varying the motor speed in accordance with a predetermined set of values, wherein in accordance with the predetermined set of values, a speed of the motor speed is linearly varied from zero to the motor's scaled output speed and from the motor's scaled output speed to zero.

12. A movable barrier operator which automatically detects barrier size, comprising:

an electric motor having a maximum output speed;

a transmission connected to the electric motor to be driven thereby and to a movable barrier to be moved;

a position detector for sensing the position of the movable barrier with respect to a frame of reference; and a controller, responsive to the position detector, for determining movable barrier travel between a first barrier travel limit and a second barrier travel limit and responsive to the determined movable barrier travel, for automatically adjusting a barrier travel speed.

13. A movable barrier operator according to claim 12 wherein the movable barrier comprises a segmented panel door and wherein the controller adjusts the barrier travel speed such that a maximum barrier travel speed is based on one hundred percent of the motor's maximum output speed.

14. A movable barrier operator according to claim 12 wherein the movable barrier comprises a single panel door and wherein the controller adjusts the barrier travel speed such that a maximum barrier travel speed is based on a percentage less than one hundred percent of the motor's maximum output speed.

15. A movable barrier operator according to claim 12 wherein the controller's determination of barrier travel is made by counting the number of rotational displacement pulses between the first and second barrier travel limits.

* * * * *